United States Patent [19]
MacLennan et al.

[11] Patent Number: 6,137,237
[45] Date of Patent: Oct. 24, 2000

[54] HIGH FREQUENCY INDUCTIVE LAMP AND POWER OSCILLATOR

[75] Inventors: Donald A. MacLennan, Gaithersburg; Brian P. Turner, Damascus; James T. Dolan, Frederick, all of Md.; Douglas A. Kirkpatrick, Great Falls, Va.; Yongzhang Leng, Damascus, Md.

[73] Assignee: Fusion Lighting, Inc., Rockville, Md.

[21] Appl. No.: 09/228,230

[22] Filed: Jan. 11, 1999

Related U.S. Application Data

[60] Provisional application No. 60/071,192, Mar. 13, 1998, provisional application No. 60/071,284, Jan. 13, 1998, provisional application No. 60/071,285, Jan. 13, 1998, provisional application No. 60/083,093, Apr. 28, 1998, provisional application No. 60/091,920, Jul. 7, 1998, provisional application No. 60/099,288, Sep. 4, 1998, provisional application No. 60/102,968, Oct. 2, 1998, and provisional application No. 60/109,591, Nov. 23, 1998.

[51] Int. Cl.⁷ .................................................. H05B 41/16
[52] U.S. Cl. .................... 315/248; 315/39; 315/111.51; 315/344; 313/231.61; 313/231.71
[58] Field of Search .............................. 315/248, 39, 344, 315/111.51, 209 R, 244; 313/231.31, 231.41, 231.61, 231.71, 153, 154, 634

[56] References Cited

U.S. PATENT DOCUMENTS

| | | | |
|---|---|---|---|
| Re. 21,150 | 7/1939 | Lepel | 176/122 |
| Re. 32,527 | 10/1987 | Shinkawa et al. | 331/99 |
| 843,534 | 2/1907 | Hewitt . | |
| 1,854,912 | 4/1932 | Spaeth . | |
| 2,333,052 | 10/1943 | Smith | 176/122 |

(List continued on next page.)

FOREIGN PATENT DOCUMENTS

| | | |
|---|---|---|
| 0309270 | 3/1989 | European Pat. Off. . |
| 0357453 | 3/1990 | European Pat. Off. . |
| 0457242 | 11/1991 | European Pat. Off. . |
| 0458546 | 11/1991 | European Pat. Off. . |
| 38 42 756 | 6/1990 | Germany . |
| 8-148127 | 6/1996 | Japan . |
| 2170668 | 8/1986 | United Kingdom . |
| 93/21655 | 10/1993 | WIPO . |
| 97/45858 | 12/1997 | WIPO . |

OTHER PUBLICATIONS

PCT Application No. PCT/US99/00047.

Godyak, V.A. et al., "Electrical and light charascterics of RF–inductive fluorescent lamps", *J. of the Illuminating Engineering Society*, pp. 40–44(Winter 1994), presented at the 1993 IESNA Annual Conference.

Peijak, R.B. et al., "A simple analysis of an inductive RF discharge", *Plasma Sources Sci. Technol.* 1:179–186 (1992).

(List continued on next page.)

*Primary Examiner*—Haissa Philogene
*Attorney, Agent, or Firm*—Paul E. Steiner

[57] ABSTRACT

A high frequency inductively coupled electrodeless lamp includes an excitation coil with an effective electrical length which is less than one half wavelength of a driving frequency applied thereto, preferably much less. The driving frequency may be greater than 100 MHz and is preferably as high as 915 MHz. Preferably, the excitation coil is configured as a non-helical, semi-cylindrical conductive surface having less than one turn, in the general shape of a wedding ring. At high frequencies, the current in the coil forms two loops which are spaced apart and parallel to each other. Configured appropriately, the coil approximates a Helmholtz configuration. The lamp preferably utilizes an bulb encased in a reflective ceramic cup with a pre-formed aperture defined therethrough. The ceramic cup may include structural features to aid in alignment and/or a flanged face to aid in thermal management. The lamp head is preferably an integrated lamp head comprising a metal matrix composite surrounding an insulating ceramic with the excitation integrally formed on the ceramic. A novel solid-state oscillator preferably provides RF power to the lamp. The oscillator is a single active element device capable of providing over 70 watts of power at over 70% efficiency. Various control circuits may be employed to match the driving frequency of the oscillator to a plurality of tuning states of the lamp.

28 Claims, 76 Drawing Sheets

U.S. PATENT DOCUMENTS

| | | | |
|---|---|---|---|
| 3,860,854 | 1/1975 | Hollister | 315/248 |
| 3,943,404 | 3/1976 | McNeil et al. | 315/39 |
| 4,007,392 | 2/1977 | Valfells et al. | 313/154 |
| 4,010,400 | 3/1977 | Hollister | 315/248 |
| 4,016,507 | 4/1977 | Havens | 331/96 |
| 4,021,727 | 5/1977 | Fellows | 324/20 R |
| 4,070,603 | 1/1978 | Regan et al. | 315/248 |
| 4,127,797 | 11/1978 | Perper | 315/209 R |
| 4,206,387 | 6/1980 | Kramer et al. | 315/248 |
| 4,245,178 | 1/1981 | Justice | 315/248 |
| 4,380,744 | 4/1983 | Kantorowicz | 331/107 R |
| 4,427,920 | 1/1984 | Proud et al. | 315/248 |
| 4,484,156 | 11/1984 | Khanna et al. | 331/60 |
| 4,547,750 | 10/1985 | Torizuka et al. | 331/99 |
| 4,613,796 | 9/1986 | Bay | 315/219 |
| 4,705,987 | 11/1987 | Johnson | 313/634 |
| 4,736,454 | 4/1988 | Hirsch | 455/129 |
| 4,775,845 | 10/1988 | McCoy | 331/96 |
| 4,783,615 | 11/1988 | Dakin | 315/248 |
| 4,812,702 | 3/1989 | Anderson | 313/153 |
| 4,864,194 | 9/1989 | Kobayashi et al. | 315/248 |
| 4,894,590 | 1/1990 | Witting | 315/248 |
| 4,894,591 | 1/1990 | Witting | 315/248 |
| 4,906,946 | 3/1990 | Mekata et al. | 331/99 |
| 4,908,492 | 3/1990 | Okamoto et al. | 219/121.52 |
| 4,922,210 | 5/1990 | Flachenecker et al. | 331/167 |
| 4,926,791 | 5/1990 | Hirose et al. | 118/723 |
| 4,949,053 | 8/1990 | Havens | 331/96 |
| 4,982,168 | 1/1991 | Sigmon et al. | 331/107 SL |
| 5,039,903 | 8/1991 | Farrall | 313/160 |
| 5,070,277 | 12/1991 | Lapatovich | 315/248 |
| 5,072,157 | 12/1991 | Greb et al. | 315/248 |
| 5,084,801 | 1/1992 | El-Hamamsy et al. | 315/248 X |
| 5,107,229 | 4/1992 | Chessman | 331/185 |
| 5,118,997 | 6/1992 | El-Hamamsy | 315/248 |
| 5,159,346 | 10/1992 | Bosch et al. | 342/175 |
| 5,214,357 | 5/1993 | Dakin et al. | 315/248 |
| 5,259,436 | 11/1993 | Yun et al. | 164/97 |
| 5,289,139 | 2/1994 | Fiedziuszko et al. | 331/56 |
| 5,339,047 | 8/1994 | Mizan et al. | 330/286 |
| 5,367,226 | 11/1994 | Ukegawa et al. | 315/248 |
| 5,387,850 | 2/1995 | Bray et al. | 315/248 |
| 5,397,966 | 3/1995 | Vrionis et al. | 315/248 |
| 5,404,076 | 4/1995 | Dolan et al. | 313/572 |
| 5,448,137 | 9/1995 | Bobel | 315/244 |
| 5,483,206 | 1/1996 | Lohninger | 331/107 SL |
| 5,498,928 | 3/1996 | Lapatovich et al. | 315/39 |
| 5,498,937 | 3/1996 | Körber et al. | 315/248 |
| 5,500,574 | 3/1996 | Popov et al. | 315/248 |
| 5,541,482 | 7/1996 | Siao | 315/248 |
| 5,570,502 | 11/1996 | Sawtell et al. | 29/527.6 |
| 5,587,629 | 12/1996 | Gornstein | 315/200 R |
| 5,616,421 | 4/1997 | Sawtell et al. | 428/614 |
| 5,624,266 | 4/1997 | Popov et al. | 313/46 |
| 5,637,961 | 6/1997 | Ishii et al. | 315/111.51 |
| 5,661,365 | 8/1997 | Turner | 313/637 |
| 5,682,080 | 10/1997 | Dolan et al. | 313/570 |
| 5,834,895 | 11/1998 | Dolan et al. | 315/248 X |
| 5,834,904 | 11/1998 | Waymouth | 315/248 |
| 5,841,243 | 11/1998 | Hooper | 315/248 |
| 5,841,244 | 11/1998 | Hamilton et al. | 315/248 |
| 5,852,339 | 12/1998 | Hamilton et al. | 313/11 |
| 5,885,478 | 5/1999 | Smith et al. | 315/248 |
| 5,886,479 | 5/1999 | Kennedy et al. | 315/248 |
| 5,962,986 | 10/1999 | Morse | 315/248 |
| 5,990,632 | 11/1999 | Smith et al. | 315/248 |
| 6,017,221 | 1/2000 | Flamm | 437/225 |

OTHER PUBLICATIONS

Thomson, J.J., "On the discharge of electricity through exhausted tubes without electrodes", *Phil. Mag.* S.5., vol. 32, No. 197, pp. 321–464 (Oct. 1891), The London, Edinburgh, and Dublin Philisophical Magazine and Journal of Science.

Wharmby, D., "Review of electrodeless discharges for lighting", Thorn Lighting Limited Presentation (Sep. 5, 1989).

Wharmby, D., "Electrodeless discharges for lighting", GE Lighting Europe Presentation (1994).

Wharmby, D.O., Ph.D., "Electrodeless lamps for lighting: A review", *IEEE Proceedings–A,* vol. 140, No. 6 (Nov. 1993).

Hagen, Jon B., "Radio–Frequency Electronics: Circuits and Applications", pp. 115–123, Cambridge University Press (1996).

Kipling, Kent et al., "Low Wattage, Solid State Electrodes Lamp Having High Brightness", *Journal of Technical Disclosure,* (Oct. 1, 1998).

"Low Wattage Solid State Electrodeless Lamp Having High Brightness", *Research Disclosure,* pp. 1341–1344 (Oct. 1998).

Martin, Jose L.J. and González, Francisco J.O., "Accurate Linear Oscillator Analysis and Design", *Microwave Journal,* pp. 22, 24, 26, 28, 30–32, 37 (entire article) (Jun. 1996).

Raab, Frederick, "Class–F Power Amplifiers With Maximally Flat Waveforms", *IEEE Transactions on Microwave Theory and Techniques,* vol. 45(11):2007–2012 (Nov. 1997).

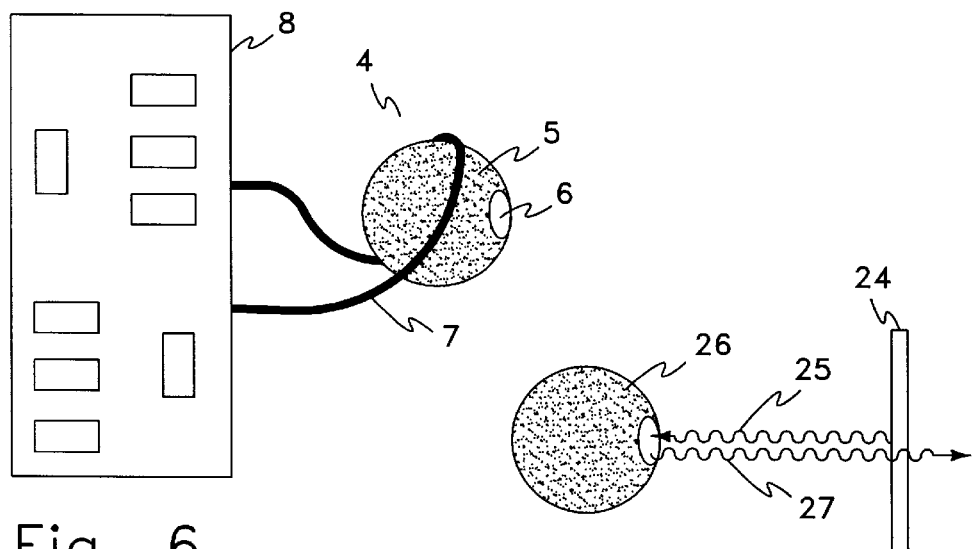
Fig. 6
Fig. 9
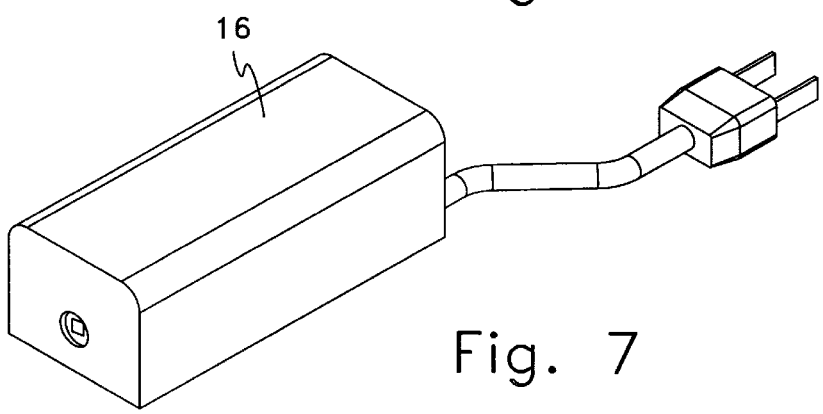
Fig. 7
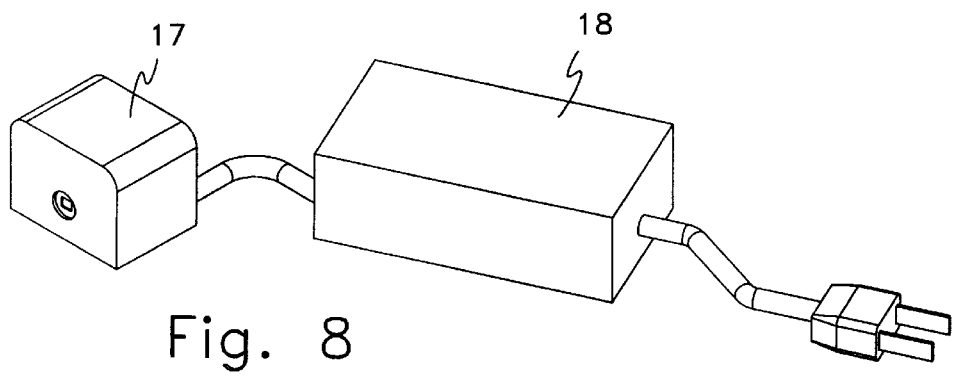
Fig. 8

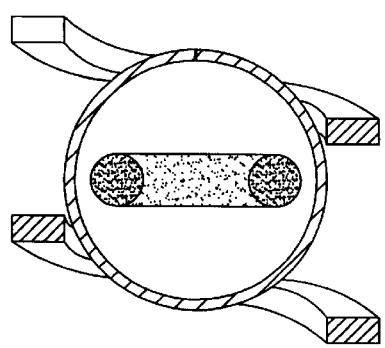
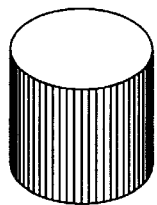
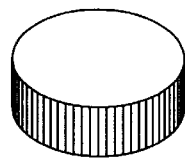
Fig. 22     Fig. 23
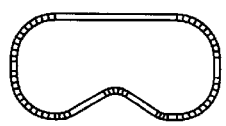
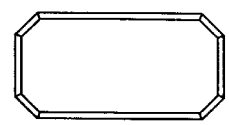
Fig. 25     Fig. 26
Fig. 21
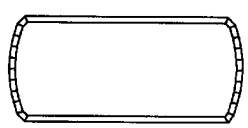
Fig. 24
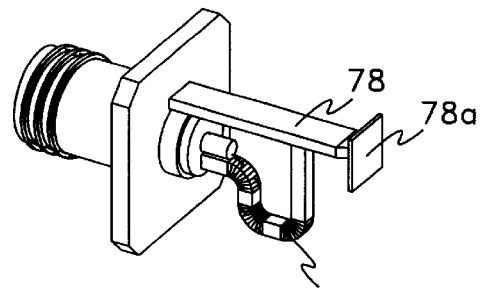
Fig. 28
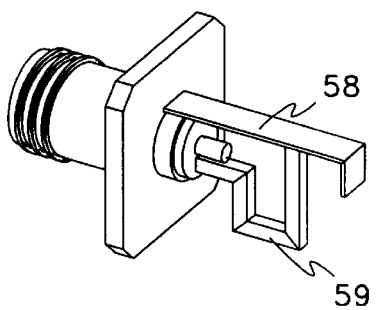
Fig. 27
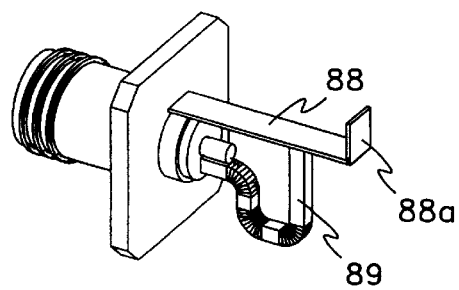
Fig. 29

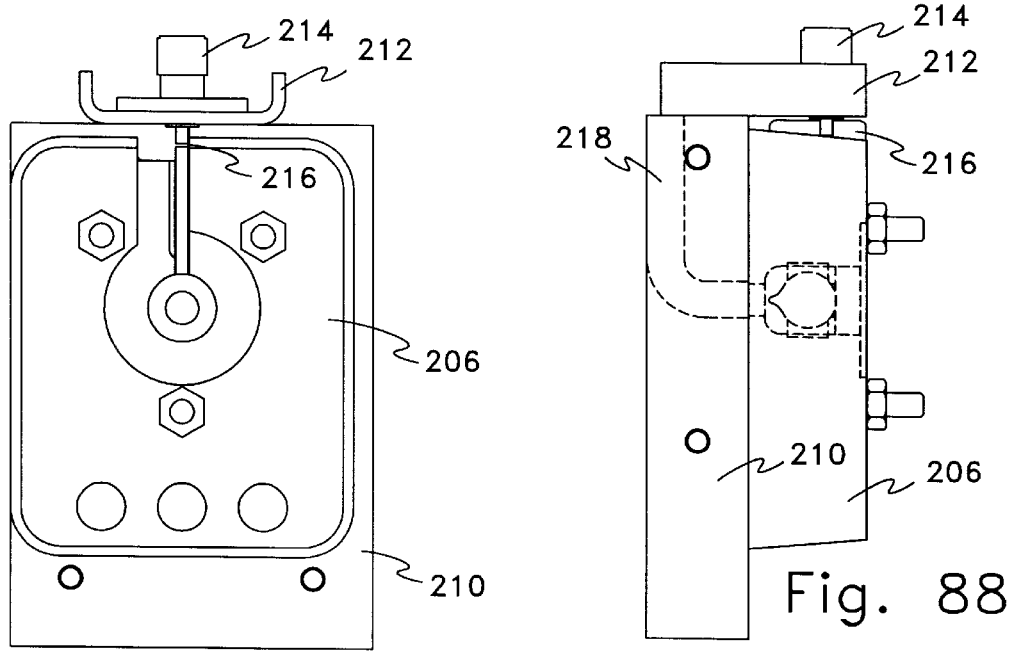
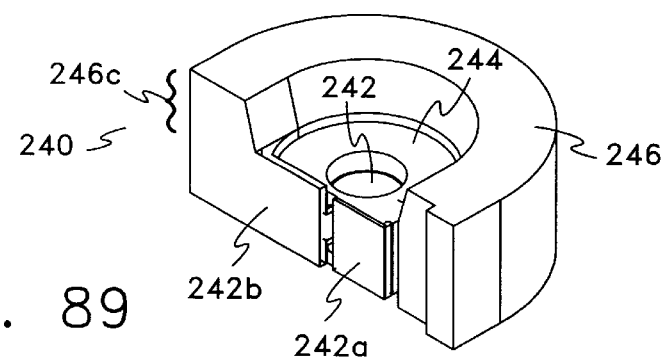
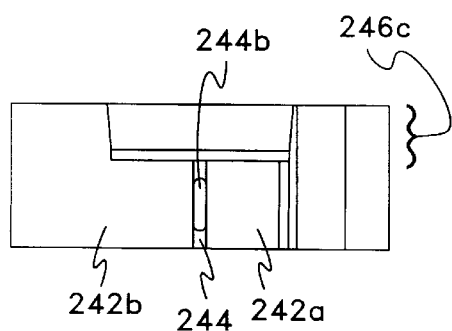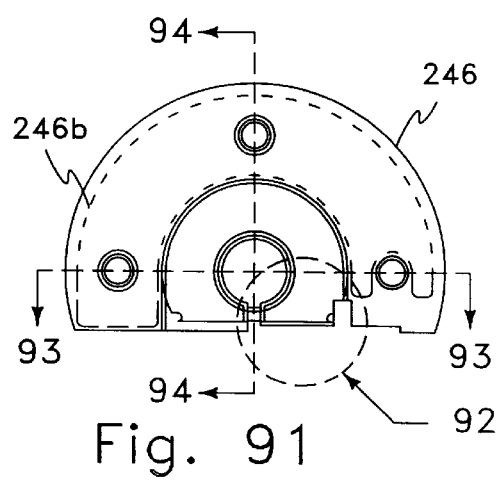

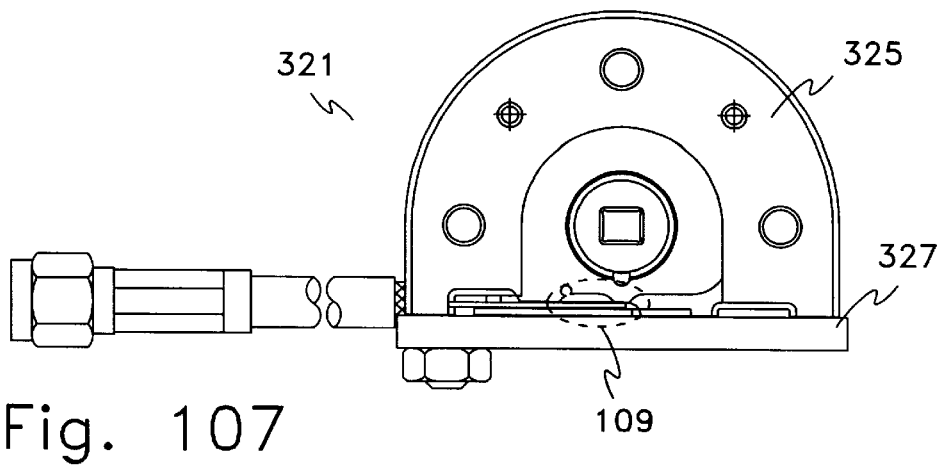
Fig. 107
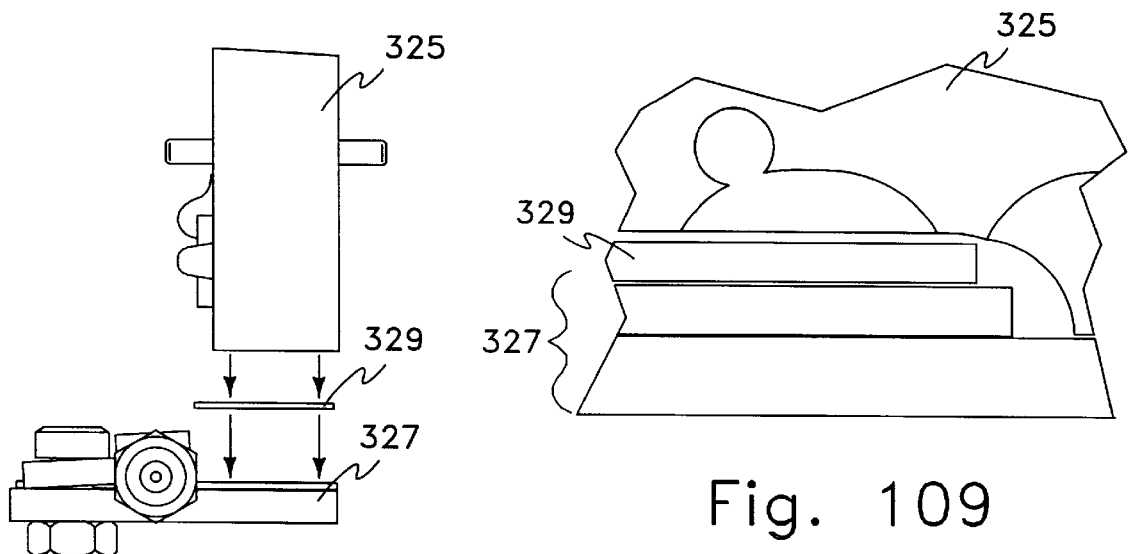
Fig. 108
Fig. 109
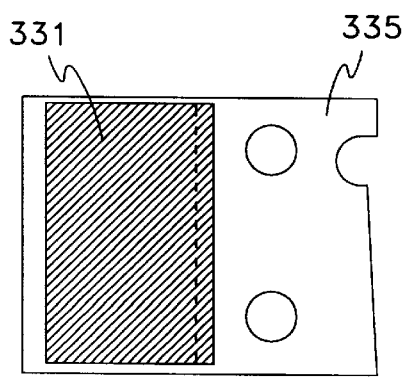
Fig. 110
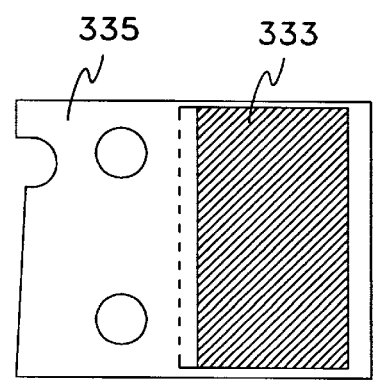
Fig. 111

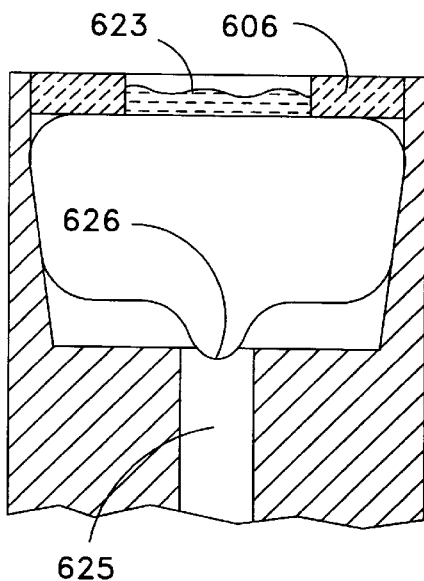
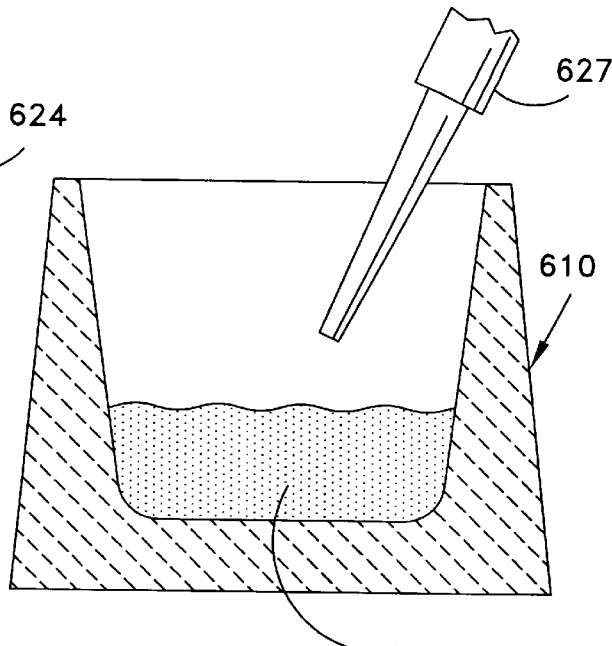
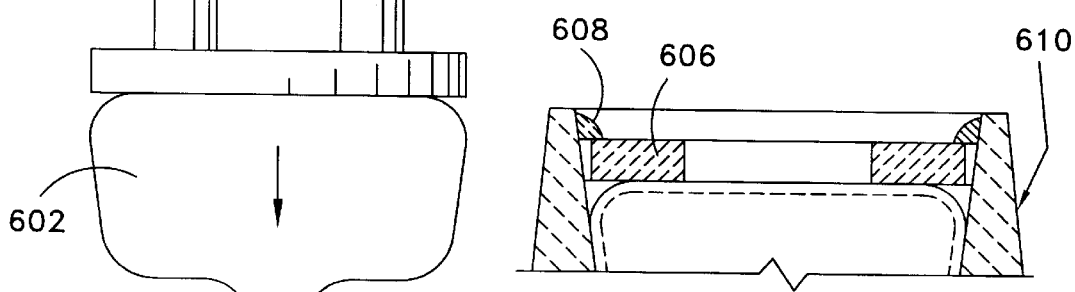
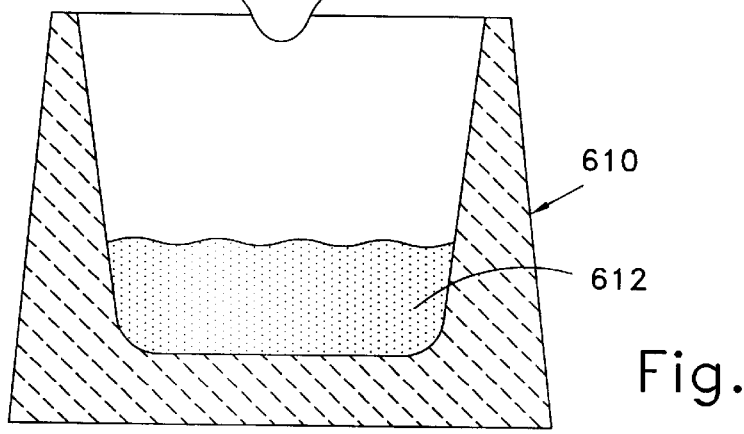
Fig. 162
Fig. 163
Fig. 164
Fig. 165

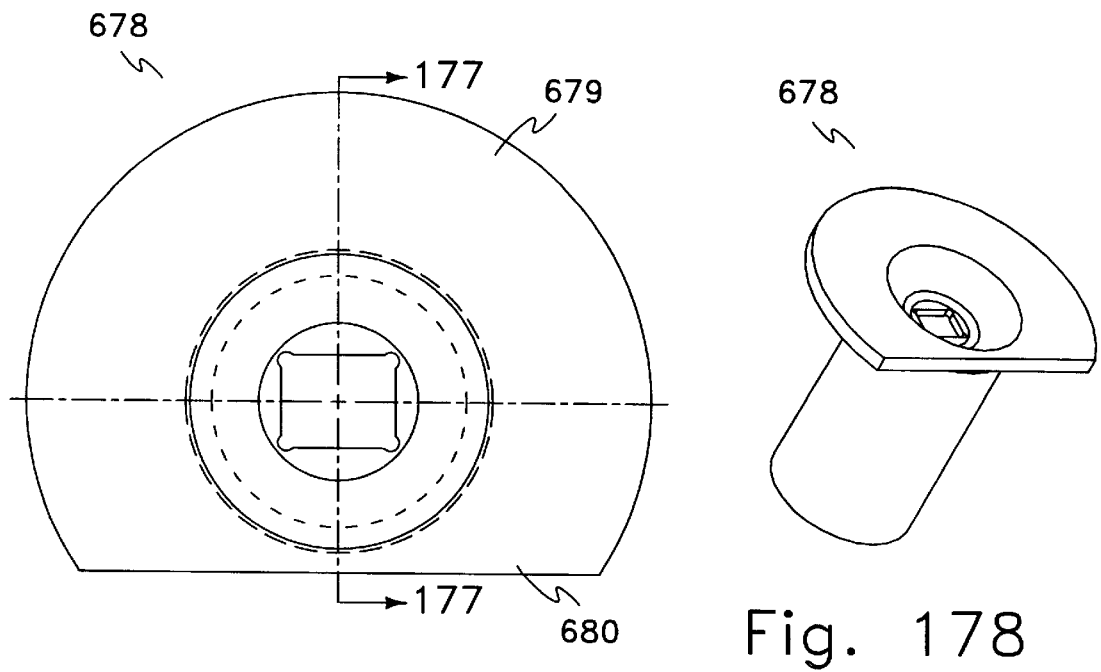
Fig. 176
Fig. 178
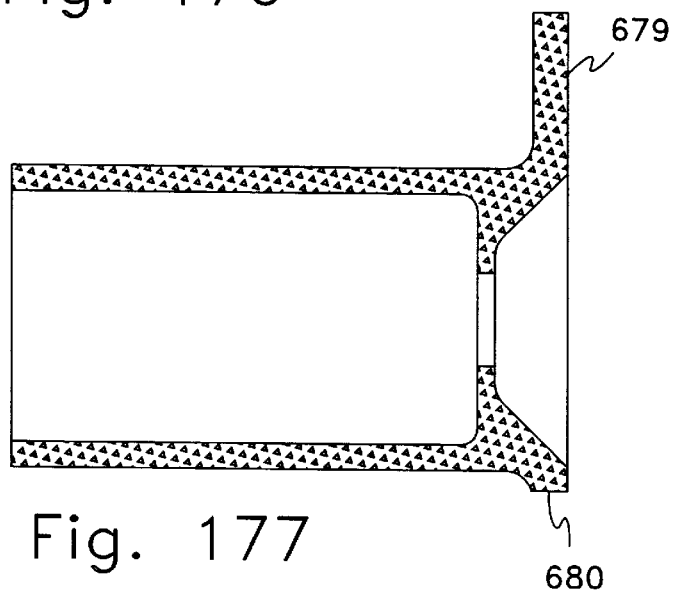
Fig. 177
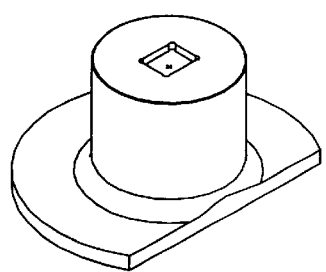
Fig. 180
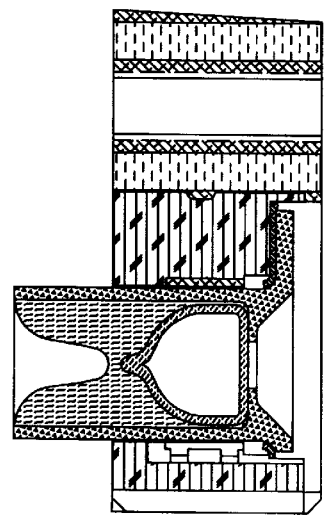
Fig. 179

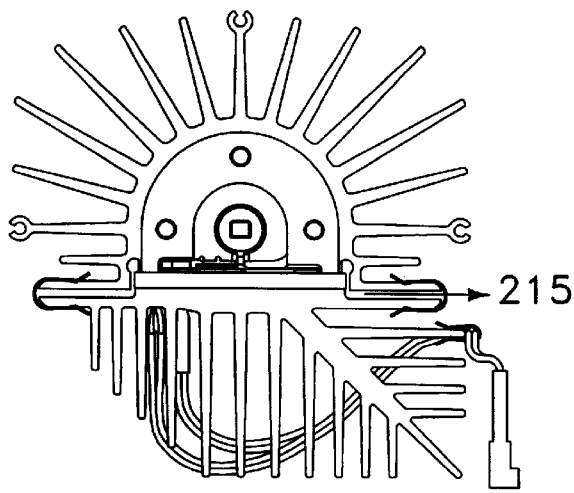
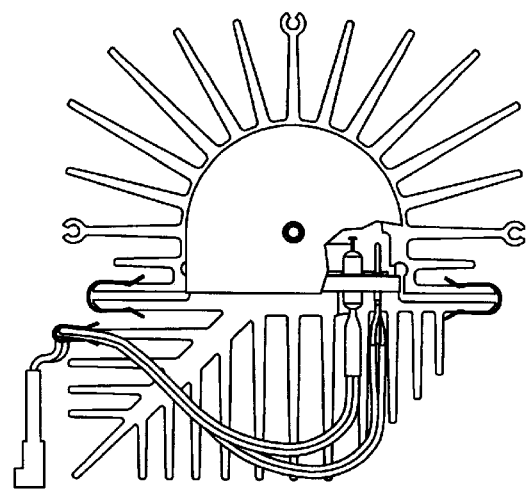
Fig. 213  Fig. 214
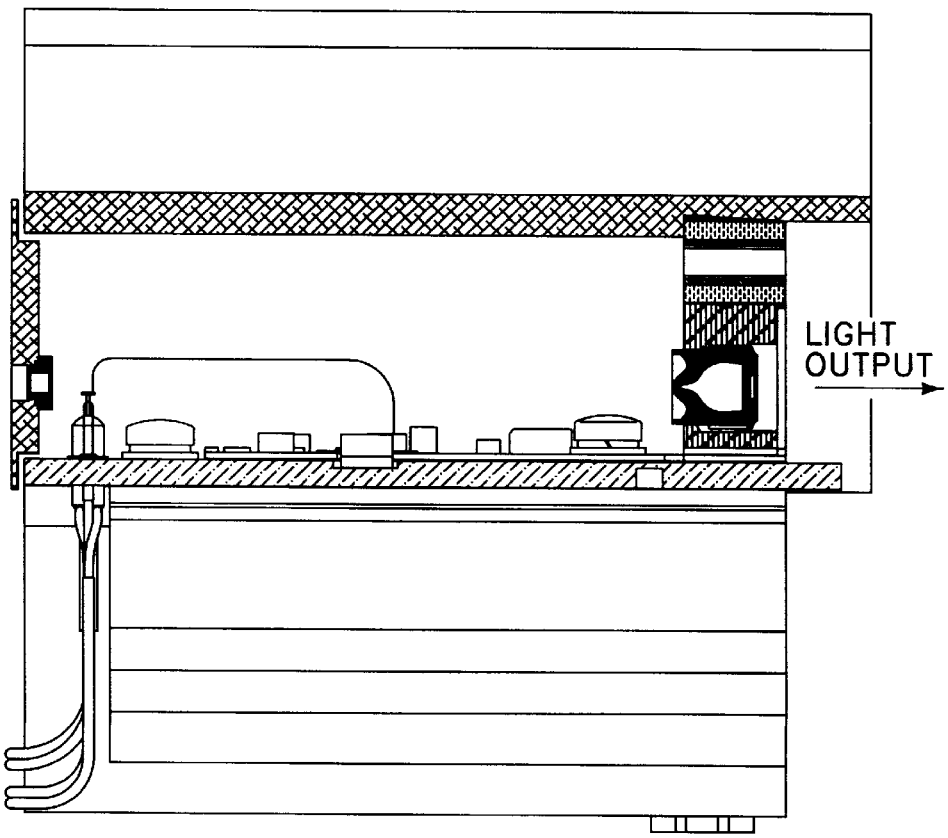
Fig. 215

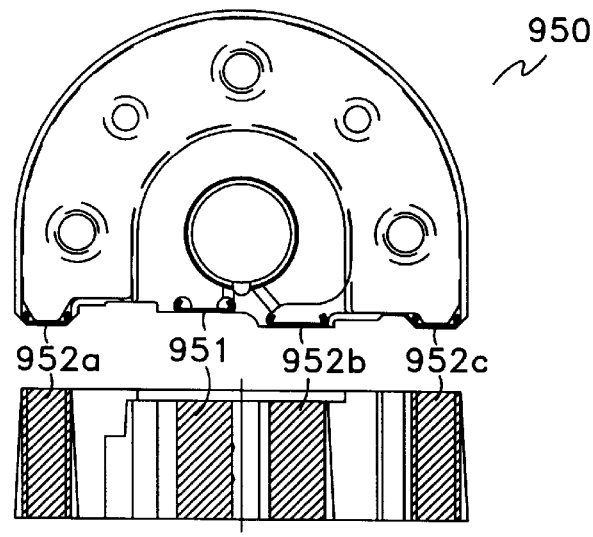
Fig. 245
Fig. 246
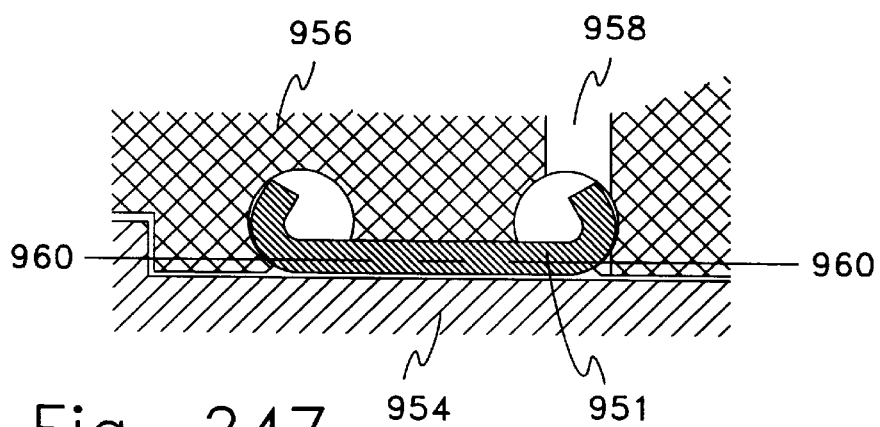
Fig. 247
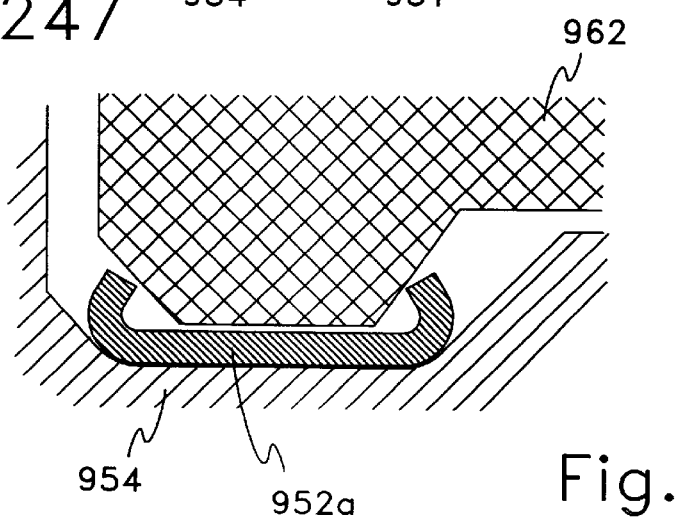
Fig. 248

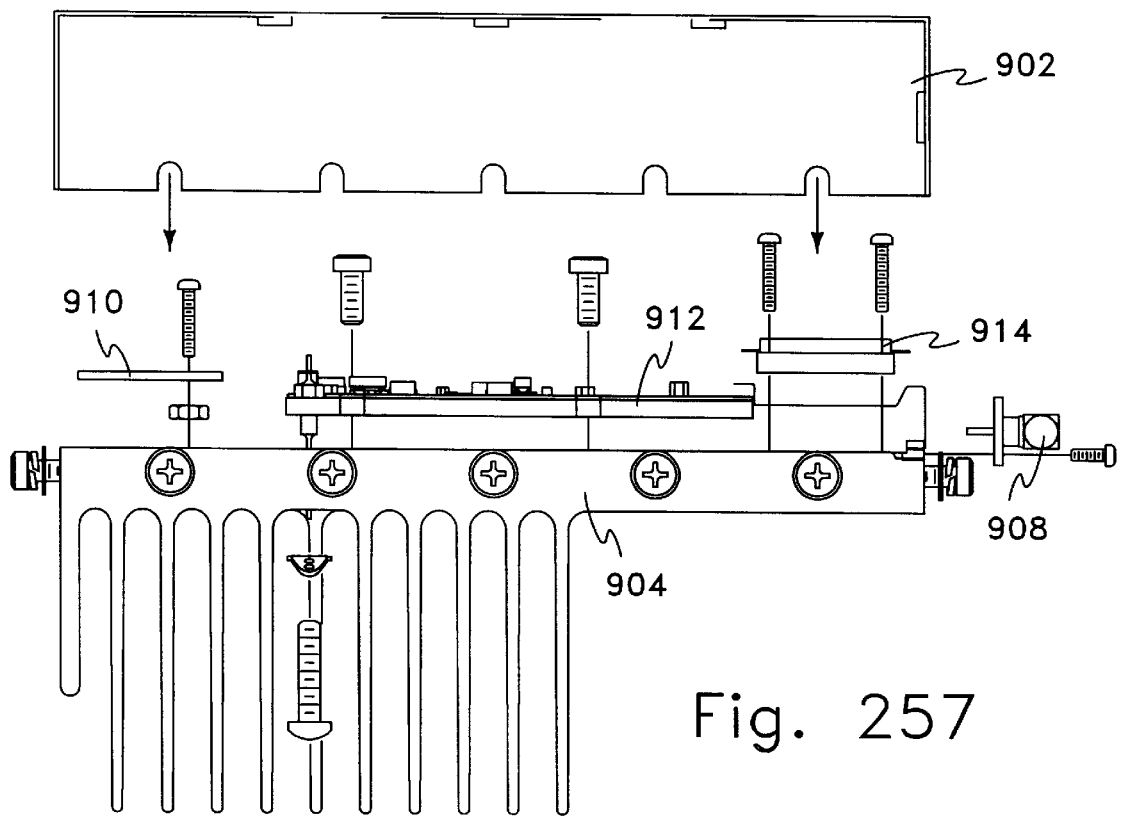
Fig. 257
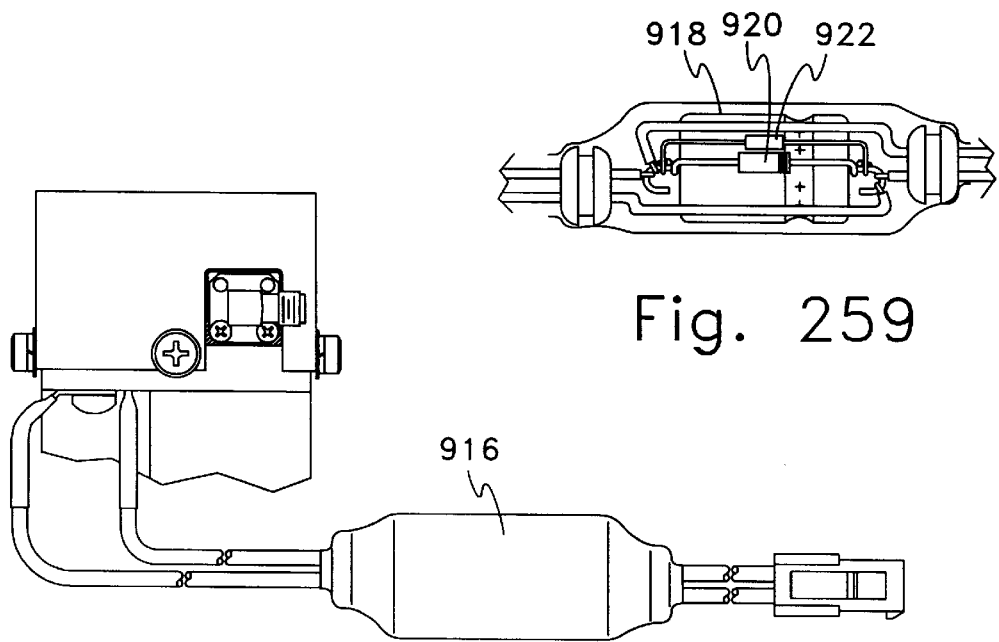
Fig. 259
Fig. 258

HIGH FREQUENCY INDUCTIVE LAMP AND POWER OSCILLATOR

CROSS REFERENCE TO RELATED APPLICATIONS

This application is a non-provisional patent application claiming priority to provisional application Nos. 60/071,192, 60/071,284, and 60/071,285, all filed Jan. 13, 1998, 60/083,093, filed Apr. 28, 1998, 60/091,920, filed Jul. 7, 1998, 60/099,288, filed Sep. 4, 1998, 60/102,968, filed Oct. 2, 1998, and 60/109,591, filed Nov. 23, 1998, each of which is herein incorporated by reference in its entirety.

Certain inventions described herein were made with Government support under Contract Nos. DE-FG01-95EE23796 and/or DE-FC01-97EE23776 awarded by the Department of Energy. The Government has certain rights in those inventions.

1. BACKGROUND

1. Field of the Invention

The invention relates generally to discharge lamps. The invention relates more specifically to inductively coupled electrodeless lamps. The invention also relates to novel lamp configurations, coupling circuits, bulbs, aperture structures, starting aids, and excitation coils for inductively coupled electrodeless lamps. The present invention also relates to an improved electrodeless aperture lamp, and to an improved method of manufacturing an electrodeless aperture lamp. The invention also relates generally to a novel high power, high frequency solid state oscillator.

2. Related Art

In general, the present invention relates to the type of lamp disclosed in U.S. Pat. No. 5,404,076, as well as U.S. patent application Ser. No. 08/865,516 (PCT Publication No. 97/45858), each of which is herein incorporated by reference in its entirety.

Electrodeless lamps are known in the art. Such lamps may be characterized according to the type of discharge they produce. Electrodeless discharges may be classified as either E discharges, microwave discharges, travelling wave discharges, or H discharges. The invention relates to those discharges preponderantly characterized as H discharges.

FIG. 1 is a schematic diagram of a conventional electrodeless lamp which produces an E discharge. A power source 1 provides power to a capacitor 2. A gas-filled vessel 3 is placed between the plates of the capacitor 2. E discharges in electrodeless lamps are similar to arc discharges in an electroded lamp, except that current is usually much less in an E discharge. Once breakdown of the gas to its ionized or plasma state is achieved, current flows through the capacitance of the vessels walls between the plates of the capacitor 2, thereby producing a discharge current in the plasma.

FIG. 2 is a schematic diagram of a conventional electrodeless lamp which produces a microwave discharge. A microwave power source 11 provides microwave energy which is directed by a waveguide 12 to a microwave cavity 14 which houses a gas-filled bulb 13. The microwave energy excites the fill in the bulb 13 and produces a plasma discharge. In a microwave discharge, the wavelength of the electromagnetic field is comparable to the dimensions of the exciting structure, and the discharge is excited by both E and H components of the field.

FIG. 3 is a schematic diagram of a conventional electrodeless lamp which produces a travelling wave discharge. A power source 21 provides power to a launcher 22. A gas-filled vessel 23 is disposed in the launcher 22. The gap between the electrodes of the launcher 22 provides an E field which launches a surface wave discharge. The plasma in the vessel 23 is the structure along which the wave is then propagated.

FIG. 4 is a schematic diagram of a conventional electrodeless lamp which produces an H discharge. Electrodeless lamps which produce an H discharge are also referred to as inductively coupled lamps. Inductively coupled lamps were first described more than 100 years ago. Experiments by J. J. Thomson are described in the article "On the discharge of Electricity through Exhausted Tubes without Electrodes," printed in the London, Edinburgh, and Dublin Philosophical Magazine and Journal of Science, Fifth Series, Vol. 32, No. 197, October 1891. More recently, D. O. Wharmby, PhD surveyed the state of the electrodeless lamp art in the article entitled "Electrodeless lamps for lighting: a review," IEEE PROCEEDINGS-A, Vol. 140, No. 6, November 1993, pages 465 to 473.

Certain aspects of the operation of inductively coupled lamps are well understood and have been characterized analytically, for example, in articles by R. B. Piejack, V. A. Godyak and B. M. Alexandrovich entitled "A simple analysis of an inductive RF discharge," Plasma Sources Sci. Technol. 1, 1992, pages 179–186, and "Electrical and Light Characteristics of RF-Inductive Fluorescent Lamps," Journal of the Illuminating Engineering Society, Winter 1994, pages 40–44.

Inductively coupled lamps having various bulb and coil configurations are described in U.S. Pat. No. 843,534, entitled "Method of Producing Electric Light." More recently, inductively coupled lamps having novel excitation coils are described in U.S. Pat. Nos. 4,812,702, 4,894,591, and 5,039,903 (hereinafter, "the '903 patent").

As shown in FIG. 4, one example for a conventional inductively coupled lamp includes a low frequency power source 31 providing power to a coil 32 which is wound around a gas-filled vessel 33. The alternating current around the coil 32 causes a changing magnetic field, which induces an electric field which drives a current in the plasma. In effect, the plasma can be analyzed as a single turn secondary to the coil 32. See Piejack et al., referenced above. An H discharge is characterized by a closed electrical field, which in many examples forms a visible donut-shaped plasma discharge.

Other geometries have been disclosed for inductively coupled lamps. For example, FIG. 1 of the Wharmby article set forth examples (a)–(e), including a high inductance coil wound on a ferrite toroid, internal (or optionally external) to the bulb. See Wharmby at p. 471.

As used herein, "low frequency" with respect to an inductively coupled lamp is defined as a frequency less than or equal to about 100 MHz. For example, a typical operating frequency for conventional inductively coupled lamps is 13.56 MHz. For example, the '903 patent discusses an operating frequency range of 1 to 30 MHz, with an exemplary operating frequency being 13.56 MHz. Most, if not all, of the developments relating to known inductively coupled lamps provide lamps operating at low frequency (i.e. less than or equal to about 100 MHz).

Referring again to FIG. 4, during the starting operation of an inductively coupled lamp, an E field ionizes the fill in the gas-filled vessel 33 and the discharge is initially characteristic of an E discharge. Once breakdown occurs, however, an abrupt and visible transition to the H discharge occurs.

During operation of an inductively coupled lamp, both E and H discharge components are present, but the applied H discharge component provides greater (usually much greater) power to the plasma than the applied E discharge component.

As used herein, "high frequency" with respect to an electrodeless lamp is defined as a frequency substantially greater than about 100 MHz. The prior art describes electrodeless lamps operating at high frequency, including lamps exhibiting coil structures. However, none of the "high frequency" electrodeless lamps in the prior art are, in fact, inductively coupled lamps.

For example, U.S. Pat. No. 4,206,387 describes a "termination fixture" electrodeless lamp which includes a helical coil around the bulb. The "termination fixture" lamp is described as operating the range from 100 MHz to 300 GHz, and preferably at 915 MHz. As noted by Wharmby, "termination fixture" lamps have a size-wavelength relationship such that they produce a microwave discharge, not an inductively coupled discharge.

U.S. Pat. No. 4,908,492 (hereinafter "the '492 patent") describes a microwave plasma production apparatus which includes a helical coil component. The apparatus is described as operating at 1 GHz or higher, and preferably at 2.45 GHz. As disclosed, however, the coil need not be terminated and a large diameter, multi-turn coil is preferred to produce a large diameter plasma. In such a configuration, the dimension of the exciting structure is comparable to the wavelength of the microwave frequency power and the discharge appears to be a travelling wave discharge, a microwave discharge, or some combination thereof. In any event, the resulting structure apparently does not operate by inductive coupling.

U.S. Pat. No. 5,070,277 describes an electrodeless lamp which includes helical couplers. The lamp is described as operating in the range of 10 MHz to 300 GHz, with a preferred operating frequency of 915 MHz. The helical couplers transfer energy through an evanescent wave which produces an arc discharge in the lamp. The arc discharge is described as very straight and narrow, comparable to an incandescent filament. Hence, this lamp apparently does not operate by inductive coupling.

U.S. Pat. No. 5,072,157 describes an electrodeless lamp which includes a helical coil extending along a discharge tube. The operating range for the lamp is described as 1 MHz to 1 GHz. The discharge produced by the lamp is a travelling wave discharge. The effect of the helical coil is discussed as enhancing the light output and providing some RF screening.

Japanese publication No. 8-148127 describes a microwave discharge light source device which includes a resonator inside the microwave cavity which has the shape of a cylindrical ring with a gap. The resonator is described as a starting aid and microwave field concentrator.

A number of parameters characterize highly useful sources of light. These include spectrum, efficiency, brightness, economy, durability (working life), and others. For example, a highly efficient, low wattage light source with a long working life, particularly a light source with high brightness, represents a highly desirable combination of operating features. Electrodeless lamps have the potential to provide a much longer working life than electroded lamps. However, low wattage electrodeless lamps have found only limited commercial applications.

2. SUMMARY

The invention provides a high frequency inductively coupled electrodeless lamp. In particular, the present invention provides an efficient, high frequency inductively coupled electrodeless lamp.

An object of one aspect of the present invention is to provide an ultra bright, low wattage electrodeless lamp which has many commercially practical applications. Specifically, an object of one aspect of the present invention is to describe an electrodeless aperture lamp which is powered by a solid state RF source in the range of several tens to several hundreds of watts. The lamp of the present invention represents the first of a revolutionary new family of lighting products. With its spectacular brightness, spectral stability, and long life time, the present invention provides an excellent light source for such diverse applications as projection display, automotive headlamps and general illumination.

FIG. 6 is a schematic, conceptual diagram of a high brightness electrodeless lamp according to the invention. As shown in FIG. 6, an electrodeless lamp bulb 4 is covered with a reflective covering 5 which defines an aperture 6. An inductive coupling loop 7 is driven by a solid state RF source 8 to power the lamp.

The lamp of the present invention improves on earlier work done in connection with microwave-powered sulfur lamp technology. The power consumption has been reduced from thousands of watts to tens or hundreds of watts. The magnetron RF generator has been replaced with solid state electronics. A simple inductive coupling structure replaces the cavity structure used to transfer the RF power to the electrodeless bulb. The size of the bulb may be reduced to less than 7 mm in diameter. Lamp brightness may be enhanced by optical elements built directly into the lamp providing a nearly ideal two dimensional light source.

Preferably, the lamp according to invention is extremely compact in size. Advantageously, the lamp can be conveniently packaged into a variety of configurations. For example, the bulb, RF source and DC power supply can be packaged together or each of these modules can be packaged and located separately. FIG. 7 is a perspective view of a lamp according to the invention, wherein the bulb, RF source, and DC power supply are located in a single housing 16. FIG. 8 is a perspective view a lamp according to the present invention, wherein the bulb is located in a first housing 17 and the RF source and DC power supply are located in a second housing 18. The bulb receives the RF energy through suitable transmission means (e.g., a coaxial cable).

The lamp of the present invention offers other unique system level advantages. For example, in certain applications, all of the photons emitted from a source may not be useful. With a conventional light source, rays of an undesired wavelength or polarization must be treated simply as waste light. However, as shown in FIG. 9, an optical system which utilizes the lamp of the present invention may include an optical element 24 which directs waste light 25 back, to be "recaptured" by the aperture bulb 26. Some of these returned photons interact with the plasma and are converted to useful light 27, before being re-emitted, increasing the overall efficiency of the lamp. Such light recapture is described in more detail in U.S. Pat. No. 5,773,918 and PCT publication WO 97/45858 (assigned in common with the assignee of the present invention), both of which are herein incorporated by reference in their entireties.

Long life is a fundamental characteristic of electrodeless lamps. The elimination of all metal components in the bulb such as the filaments and electrodes, and the elimination of the accompanying glass to metal seals remove the dominant determinants of conventional lamp life times. The selection of specific bulb fills minimizes and in some cases eliminates the chemical interactions between the plasma and the bulb envelop. Such interactions can significantly affect the life time and color stability of conventional high intensity discharge lamps. Further, the lamp of the present invention is made more reliable through the use of all solid state electronics.

Color stability in conventional discharge lamps is a function of the chemical interaction between the bulb fill and the electrodes, the interaction between the bulb fill and the bulb envelope, and the interaction of the various components of the bulb fill with each other. Advantageously, the lamp of the present invention can be configured with a minimally reactive single element bulb fill and no electrodes assuring an output spectra that is stable over the life time of the lamp.

Applications

Applications for a long lived high brightness electrodeless light source such as the lamp of the present invention are both numerous and readily apparent to persons skilled in the use of light sources. In general, the lamp of present invention may be configured as an effective light source in virtually any application which requires or benefits from artificial light. It is instructive to review some of the some of the applications that take special advantage of the unique properties of such a light source.

One of the most important applications of the lamp of the present invention is to projection displays. A variety of imaging technologies are currently being used to modulate beams of light to create still or moving images. Technologies such as Texas Instrument's DMD devices, as well as reflective and transmissive LCDs, require a focused collimated beam of light. The unique characteristics of the of the lamp of the present invention lamp, long life, high brightness, optical efficiency, color stability, and excellent RGB ratios make the lamp of the present invention an excellent source for this application.

The same characteristics are also desirable for applications that are based upon the use of fiber optics. Before light can be transmitted in an optical fiber it must enter the end of the fiber within a critical angle of the fiber axis. Light that does not enter the end of the fiber within the critical angle is lost. To a very large extent the total efficiency of a fiber optic illumination system is determined by the coupling efficiency of the light into the end of the fiber bundle. The two dimensional lamp of the present invention source significantly enhances this coupling efficiency. In fact, the two-dimensional source provided by the lamp of the present invention allows for direct coupling to large core or bundled fiber optics. Fiber optic illumination can be advantageously used in a variety of applications including medical devices, automotive lighting, and general illumination.

FIG. 10 is a perspective view of the lamp of the present invention utilized in conjunction with a tapered light pipe (TLP). FIG. 11 is a perspective view of the lamp of the present invention utilized in conjunction with a compound parabolic concentrator (CPC). FIG. 12 is a perspective view of the lamp of the present invention utilized in conjunction with a ball lens. FIG. 13 is a perspective view of the lamp of the present invention directly coupled to a large core fiber optic. FIG. 14 is a schematic diagram of the lamp of the present invention used in an automotive lighting system with fiber optic distribution. FIG. 15 is a perspective view of the lamp of the present invention used in a projection display.

The present invention can be used with both imaging and non-imaging optics to produce spot and flood type lighting as well as general illumination products.

The present invention can be paired with various optical films such as 3M's optical lighting film (OLF) to produce such lighting schemes as light pipe systems and light boxes which substitute for conventional fluorescent fixtures.

Most of the examples of the lamp of the present invention described hereinafter are scaled to power a small screen display, a medical instrument, a vehicle headlamp or other application requiring a bright source with an output of one to three thousand lumens. However, the lamp of present invention may be scaled up in power and/or size to provide a bright source capable of emitting tens of thousands of lumens. Applications as diverse as theater projectors, large screen display TV, theater spot lights and lighthouse beacons are further contemplated uses of the present lamp.

Use of Lamp to Cure Adhesives

Many adhesives can be cured by intense visible light. Because of the small spot size and high lumen intensity, the lamp of the present invention is an excellent source for adhesive curing. In some processes, selective curing is preferred over "flood" light type-curing. It may also be more cost effective from an energy point of view to only expose the adhesive to light. Light shielding is also simplified if only a selected work area needs to be illuminated. As noted below in section 4.2.2, the aperture may be shaped to match a desired area and/or shape of illumination.

A partial listing of some of the applications for the lamp of the present invention includes the following:

TABLE 1

| Projection Applications | Architectural Accent Lighting |
|---|---|
| Fiber Optics | Fiber optic distribution |
| Automated Lights (Gate/Shutter) | Plastic Frenel lens with mirror |
| Slide Projector | between source and lens to project |
| Display projector | beam |
| Overhead projector | Spot/Wash lighting |
| Automobile | Theatrical lighting |
| Head lamps | Film/television |
| Interior lamps | Stage/studio |
| Fiber optic distribution | Frenel lens (variable beam spotlight) |
| Hazard lighting | Signage |
| Rugged nature of invention | Neon sign replacement |
| Strobe/warning light | |
| Personal head lamp | Street light |
| Surgeon's light | Full cutoff |
| Miner's light | |
| Traffic light | LCD backlighting |
| Fiber optic distribution | Daylight readable display |
| Landing light | Inspection light |
| Runway | Flashlight |
| Airplane | |
| General Lighting | Residential lighting |
| Up lights | Safety |
| Down lights | Indirect lighting |
| Spot lights | Wall wash |
| Flood lights | Outdoor controlled flood light (no spill) |
| | Landscape lighting |

TABLE 1-continued

| Beam projector | Underwater lighting |
|---|---|
| Search light | Aquarium |
| Materials processing | Light house |
| Curing light | |
| Intensity and near UV | |
| Reprographic Lighting | |
| Cold storage lighting | Shipboard lighting |
| Instrument lighting | Horticultural |

A table of headings is provided below.

1. BACKGROUND
2. SUMMARY
3. BRIEF DESCRIPTION OF THE DRAWINGS
4. DESCRIPTION
    4.1 High Frequency Inductive Lamp
        4.1.1 First Coupling Circuit
        4.1.2 Novel Wedding Ring Shaped Excitation Coil
        4.1.3 Second Coupling Circuit
        4.1.4 Field Concentrating Conductive Surface
        4.1.5 Ceramic Heatsink for Cooling the Excitation Coil
        4.1.6 Lamp with Improved Thermal Characteristics
        4.1.7 Novel Omega Shaped Excitation Coil
        4.1.8 Integrated Lamp Head
            4.1.8.1 Omega Coil
            4.1.8.2 Pre-formed Coil Connection for Lamp Head
            4.1.8.3 Tunable High Voltage Capacitor
        4.1.9 Exemplary Fills
    4.2 Bulb and Aperture Structures
        4.2.1 Blow Molded Bulbs
        4.2.2 Aperture Structures
        4.2.3 Exemplary Processes for Filling Aperture Cup
            4.2.3.1 Hand gupping
            4.2.3.2 Solid Casting
            4.2.3.3 Use of Centrifuge to Pack Cup
        4.2.4 Exemplary Performance Data
        4.2.5 Spectral Distribution
        4.2.6 Ball Lens
        4.2.7 Ceramo-quartz lamp
        4.2.8 Design Feature for Alignment of the Aperture Cup
        4.2.9 Flanged Aperture Cup
        4.2.10 Starting Aid
    4.3 High Power Oscillator
    4.4 Lamp and Oscillator
        4.4.1 Cantilevered Oscillator Board
        4.4.2 Separate Lamp Head Housing
        4.4.3 Exemplary Lamp Head Soldering Processes
        4.4.4 Improved Solderability Inserts
        4.4.5 Separate RF Source
        4.4.6 Oscillator Control Circuits
5. CLAIMS
6. ABSTRACT According to the invention, a high frequency inductively coupled electrodeless lamp includes an excitation coil with an effective electrical length which is less than one half wavelength of a driving frequency applied thereto, preferably much less. The driving frequency may be greater than 100 MHz and is preferably as high as 915 MHz or higher. Preferably, the excitation coil is configured as a non-helical, semi-cylindrical conductive surface having less than one turn, in the general shape of a wedding ring. At high frequencies, the current in the coil forms two loops which are spaced apart and parallel to each other. Configured appropriately, the coil approximates a Helmholtz configuration. The lamp preferably utilizes an bulb encased in a reflective ceramic cup with a pre-formed aperture defined therethrough. The ceramic cup may include structural features to aid in alignment and/or a flanged face to aid in thermal management. The lamp head is preferably an integrated lamp head comprising a metal matrix composite surrounding an insulating ceramic with the excitation integrally formed on the ceramic. A novel solid-state oscillator preferably provides RF power to the lamp. The oscillator is a single active element device capable of providing over 70 watts of power at over 70% efficiency. Various control circuits may be employed to match the driving frequency of the oscillator to a plurality of tuning states of the lamp.

According to one aspect of the invention, an inductively coupled electrodeless lamp includes an envelope enclosing a fill, said fill forming a plasma discharge when excited; an excitation coil positioned proximate to the envelope, the excitation coil having an effective electrical length which is less than a half wavelength of a driving frequency applied thereto; and a high frequency power source connected to the excitation coil, the high frequency power source being configured to provide power to the excitation coil at the driving frequency, the driving frequency being greater than 100 MHz, wherein said excitation coil is configured to inductively couple power to the excited plasma. Preferably, the driving frequency is greater than about 300 or 500 MHz. More preferably the driving frequency is greater than about 700 or 900 MHz. Preferably, the effective electrical length of the excitation coil is less than a quarter wavelength. More preferably, the effective electrical length of the excitation coil is less than one eighth wavelength. The high frequency power source may be, for example, a solid state high frequency power source.

According to another aspect of the invention, an inductively coupled electrodeless lamp includes a series resonant coupling circuit for coupling high frequency power source to an excitation coil. For example, the series resonant coupling circuit includes the excitation coil, a series resonant capacitor, a low inductive power feed connected to receive the power from the high frequency power source and supply power to the series resonant capacitor, and a lower inductance conductive surface, relative to the power feed, connected between the series resonant capacitor and ground. The lower inductance conductive surface may be a diving board structure, as hereinafter defined. The series resonant capacitor may be formed, for example, between a portion of the diving board and a portion of the excitation coil, wherein the portion of the diving board provides a first electrode of the series resonant capacitor and the portion of the excitation coil provides a second electrode of the series resonant capacitor, and wherein a dielectric is provided between the first electrode and the second electrode.

According to another aspect of the invention, the series resonant coupling circuit includes a conductive low inductance surface connected to receive the power from the high frequency power source. The conductive low inductance surface may include, for example, a blade structure as hereinafter defined. In this aspect, the series resonant circuit includes a first capacitor formed between a first portion of the blade and a first portion of the excitation coil and a second capacitor formed between a second portion of the blade and a second portion of the excitation coil, wherein a first dielectric is provided between the first portion of the blade and the first portion of the excitation coil and a second dielectric is provided between the second portion of the blade and the second portion of the excitation coil.

According to another aspect of the invention, an inductively coupled electrodeless lamp includes a grounded conductive surface spaced from and radially surrounding an excitation coil by at least 180 degrees. For example, the grounded conductive surface may include a stovepipe as hereinafter defined. Preferably, the grounded conductive surface is spaced from the excitation coil by a distance corresponding to between about one half and one excitation coil diameter, and wherein the grounded conductive surface axially extends above and below the excitation coil, respectively, by a distance corresponding to between about one half and one excitation coil diameter.

According to another aspect of the invention, an inductively coupled electrodeless lamp includes a heatsink in thermal contact with an excitation coil over substantially all of the excitation coil's outer surface. Preferably, the heatsink comprises a thermally conductive ceramic having a relatively low dielectric constant such as, for example, boron nitride.

According to another aspect of the invention, a fill for an electrodeless lamp include one of sulfur, selenium, and a mixture of sulfur and selenium. Alternatively, a fill for an electrodeless lamp producing primarily visible light in a continuous spectrum consists essentially of selenium, a halide of cesium, and a noble gas. Alternatively, a fill for an electrodeless lamp producing primarily visible light in a continuous spectrum consists essentially of a halide of indium, a halide of cesium, and a noble gas. Alternatively, a fill for an electrodeless lamp producing primarily visible light in a continuous spectrum consists essentially of a halide of praseodymium, a halide of indium, and a noble gas. Alternatively, a fill for an electrodeless lamp producing primarily visible light in a continuous spectrum consists essentially of a halide of indium and a noble gas.

According to another aspect of the present invention, an excitation coil for an inductively coupled electrodeless lamp includes a substantially non-helical, semi-cylindrical conductive surface having less than one turn. Preferably, the conductive surface comprises a wedding ring shape. Preferably, the conductive surface has a relatively thin radial thickness and an axial height at least greater than the radial thickness. More preferably, the axial height is between about one-third and about two-thirds of a diameter of the conductive surface.

According to another aspect of the invention, an excitation coil for an inductively coupled electrodeless lamp includes a conductive surface having a wedding ring shaped excitation portion and first and second leads bent tangential to the excitation portion and parallel to each other, the conductive surface having a cross-sectional shape generally corresponding to the upper-case Greek letter omega ($\Omega$).

According to another aspect of the invention, an excitation coil for an inductively coupled electrodeless lamp includes one or more conductive surfaces configured to provide at least two current loops, wherein the at least two current loops are spaced apart from and substantially parallel to each other. Preferably, the one or more conductive surfaces are configured to provide two semi-circular current loops, the two semi-circular current loops being substantially parallel to each other and having a substantially same axis and diameter, wherein the two current loops are spaced apart by a height which is about 40 to 60 percent of the diameter of the two semi-circular current loops. The one or more conductive surfaces may include, for example, a single non-helical, semi-cylindrical surface having less than one turn. Alternatively, the one or more conductive surfaces comprise two non-helical, semi-cylindrical surfaces, each having less than one turn. The two non-helical, semi-cylindrical surfaces may be, for example, connected in series.

According to another aspect of the invention, an excitation structure for an inductively coupled electrodeless lamp includes two excitation coils connected in series, spaced apart from and substantially parallel to each other. Preferably, the two excitation coils are spaced apart from each other by a distance which approximates a Helmholtz configuration.

According to another aspect of the invention, an integrated lamp head for an electrodeless lamp includes a metal-matrix composite body, an insulating material encased by the metal-matrix body, the insulating material having an interior surface, and an excitation structure integrally formed on the interior surface of the insulating material. The insulating material may be, for example, a ceramic. The integrally formed excitation structure may include, for example, an excitation coil. Preferably, the integrally formed excitation structure comprises a wedding ring shape excitation coil. The integrally formed excitation structure may also include a cross-sectional shape generally corresponding to the upper-case Greek letter omega. According to another aspect of the invention, the integrally formed excitation structure comprises a pre-formed connection from an exterior portion of the integrated lamp head to the excitation structure.

According to another aspect of the invention, an oscillator includes an amplifier having an input and an output, and an impedance transformation network connected between the input of the amplifier and the output of the amplifier, wherein the impedance transformation network is configured to provide suitable positive feedback from the output of the amplifier to the input of the amplifier to initiate and sustain an oscillating condition, and wherein the impedance transformation network is configured to protect the input of the amplifier from a destructive feedback signal. The oscillator may further include a load connected to the output of the amplifier and the impedance transformation network is configured to protect the input of the amplifier from the destructive feedback signal as the load varies from a low impedance to a high impedance. Preferably, the impedance transformation network is configured to protect the input of the amplifier from the destructive feedback signal as the load varies from a short circuit to an open circuit. Preferably, the impedance transformation network comprises only micro-strip transmission lines, stubs, and non-inductive elements. For example, the impedance transformation network may include micro-strip transmission lines, stubs, and capacitor elements. The destructive feedback signal includes, for example, a high voltage and the impedance transformation network is configured to prevent the high voltage from building up at the output of the amplifier. Preferably, the impedance transformation network is further configured to transform the high voltage on the output side of the amplifier to a high current on the input side of the amplifier. Preferably, the impedance transformation network comprises dual feedback loops. More preferably, the dual feedback loops are substantially symmetrical. The dual feedback loops may be coupled to matching stubs at the input of the amplifier.

According to another aspect of the invention, the oscillator further includes an output impedance matching circuit having a first end connected to the output of the amplifier and a high impedance end coupled to the impedance transformation network. The output of the amplifier produces an RF output voltage and wherein the output impedance matching circuit comprises stubs configured to limit a reflected voltage on the high impedance end to at most two times the RF output voltage from the output of the amplifier.

According to a preferred aspect of the invention, the amplifier comprises a single active element providing an output signal having an output power in excess of 10 watts. Preferably, the oscillator exhibits an efficiency greater than 50 percent.

According to another aspect of the invention, an oscillator includes a tuning circuit having micro-strip transmission lines connected to the input of the amplifier, wherein the output of the amplifier produces an RF output voltage having an oscillating frequency with a third harmonic thereof, and wherein a sum of the lengths of the tuning circuit transmission lines is about one-half wavelength of the third harmonic of the oscillating frequency.

According to yet another aspect of the invention, a jacketed lamp bulb envelope includes a ceramic cup having an open end and a partially closed end, the partially closed end defining an aperture, a lamp bulb positioned inside the ceramic cup abutting the aperture, and a reflective ceramic material at least partially covering a portion of the bulb not abutting the aperture. For example, the reflective ceramic material substantially fills an interior volume of the ceramic cup not occupied by the bulb.

According to another aspect of the invention, the ceramic cup comprises a structural feature for aiding in alignment of the jacketed lamp bulb envelope in a lamp. For example, the structural feature comprises a protrusion adapted to mate with a corresponding slot in the lamp. Alternatively, the structural feature comprises an indexing feature adapted to mate with a corresponding feature in the lamp. Alternatively, the structural feature comprises a rim adapted to mate with a corresponding shoulder in the lamp. Alternatively, the structural feature comprises a raised portion on an exterior of the ceramic cup in the area of the aperture, the raised portion being adapted to be readily grasped for positioning the ceramic cup. The ceramic cup may also include a combination of the foregoing structural features.

According to another aspect of the invention, the ceramic cup comprises a external flange about a periphery thereof. For example, the flange may be located proximate the open end of the ceramic cup. Alternatively, the flange may be located proximate the partially closed end of the ceramic cup.

According to another aspect of the invention, the ceramic cup comprises at least one partially embedded conductive element position in the ceramic cup to aid in starting the lamp.

According to another aspect of the invention, a jacketed lamp bulb envelope includes a ceramic cup having an open end and a closed end, a ceramic washer covering the open end of the ceramic cup, the washer defining an aperture therethrough, a lamp bulb positioned inside the ceramic cup abutting the aperture, and a reflective ceramic material filling an interior volume of the ceramic cup not occupied by the bulb.

According to another aspect of the invention, a method of packing a jacketed lamp bulb envelope of the type comprising a ceramic cup with a lamp bulb disposed therein includes the steps of filling the ceramic cup with a flowable slurry of reflective material, and applying centrifugal force to the cup to pack the reflective material therein.

According to another aspect of the invention, a lamp apparatus includes a discharge lamp, an RF power source connected to the discharge lamp for providing RF power at a driving frequency, and a control circuit for controlling the driving frequency of the RF power source. For example, the control circuit is configured to set the driving frequency in accordance with a plurality of tuning states of the discharge lamp. For example, the discharge lamp operates in a first tuning state during lamp ignition and a second tuning state during lamp operation, and the control circuit comprises a timing circuit which sets the driving frequency in accordance with the first tuning state for a pre-determined period of time and thereafter sets the driving frequency in accordance with the second tuning state.

According to another aspect of the invention, the lamp apparatus further includes a detector for detecting a lamp operating parameter, and the detector is configured to provide a signal to the control circuit in accordance with the detected parameter. For example, the lamp operating parameter may include one of a light output level, an RF power reflection, and a light color. For example, the detector may include a photo-detector positioned to receive light from the discharge lamp, and the lamp operating parameter ma include one of a light output level and a light color. Alternatively, the detector may include a circulator connected in between the RF power source and the discharge lamp, and the lamp operating parameter may correspond to an RF power reflection.

The foregoing aspects of the invention are achieved individually and in combination. The invention should not be construed as requiring two or more of the foregoing aspects unless expressly required by the claims.

3. BRIEF DESCRIPTION OF THE DRAWINGS

The invention will be better understood with reference to the accompanying figures, wherein:

FIG. 6 is a schematic, conceptual diagram of a high brightness electrodeless lamp according to the invention.

FIG. 7 is a perspective view of a lamp according to the invention, wherein the bulb, RF source, and DC power supply are located in a single housing.

FIG. 8 is a perspective view a lamp according to the present invention, wherein the bulb is located in a first housing and the RF source and DC power supply are located in a second housing.

FIG. 9 is a schematic diagram of an optical system which utilizes the lamp of the present invention.

FIG. 21 is a sectional schematic representation of an H discharge occurring within a bulb.

FIG. 22 shows a perspective view of a generally cylindrical shaped bulb.

FIG. 23 is a perspective view of a generally disc shaped bulb.

FIGS. 24–26 are cross sectional views of generally disc shaped bulbs.

FIGS. 27–29 are perspective views of exemplary alternative coupling structures.

FIGS. 87–88 are top and side schematic views, respectively, of a lamp assembly utilizing the tenth example of the invention.

FIG. 89 is a perspective view of an integrated lamp head for a eleventh example of an electrodeless lamp according to the invention.

FIGS. 90–91 are front and top schematic views, respectively, of the eleventh example.

FIGS. 107 and 108 are schematic views of a lamp head/power feed assembly.

FIG. 109 is an enlarged, fragmented view of the area 109 in FIG. 107.

FIGS. 110 and 111 are schematic views of opposite sides of a capacitor assembly according to one aspect of the invention.

FIGS. 162–165 illustrate an embodiment of a method for making the bulb depicted in FIG. 160.

FIG. 176 is a schematic view of an alternative, preferred aperture cup 678 according to the present invention.

FIG. 177 is a cross-sectional view taken along line 177—177 in FIG. 176.

FIG. 178 is a perspective view of the aperture cup 678.

FIG. 179 is a cross-sectional view of an integrated lamp head according to the invention utilizing a flanged aperture cup.

FIG. 180 is a perspective view of an alternative flanged aperture cup with the flange at the end of the cup opposite from the end with the aperture.

FIGS. 213 and 214 are schematic views of the completed assembly of the first example.

FIG. 215 is a cross sectional view taken along line 215—215 in FIG. 213.

FIG. 245 is a schematic, top view of a lamp head according to the invention.

FIG. 246 is a schematic, front view of the lamp head.

FIG. 247 is an enlarged, fragmented, cross-sectional view of the insert positioned in a mold prior to infiltration of the aluminum.

FIG. 248 is an enlarged, fragmented, cross-sectional view of the insert positioned in the mold prior to infiltration of aluminum.

FIG. 257 is an exploded, schematic view of the RF source.

FIG. 258 is a schematic diagram of a power connection for the RF source.

FIG. 259 is a partial cross sectional view of the power filter assembly.

4. DESCRIPTION

4.1 High Frequency Inductive Lamp

Embodiments of the present invention can provide a highly efficient, low power light source with a long working life, particularly a light source with high brightness, which represents a highly desirable combination of operating features. Low power, as used herein with respect to a light source, is defined as less than about 400 watts (W). Brightness, as used herein, is defined as the amount of light per unit solid angle per unit of light source area. The present invention provides electrodeless lamps that have the potential to provide a much longer working life than electroded lamps. Conventional low power electrodeless lamps heretofore have found only limited commercial applications.

The present invention provides an efficient, low power electrodeless lamp with intense brightness, capable of serving in many commercially practical applications.

Although high frequency power sources and inductively coupled lamps are known, the prior art does not appear to teach the combination of a high frequency power source with a lamp configured for inductive coupling. The present invention resolves both practical barriers and technological barriers that have heretofore prevented such useful combinations.

In a capacitively coupled lamp system (i.e. an E discharge lamp) the impedance of the coupling circuit is inversely proportional to frequency. Thus, at high frequencies the impedance decreases and the lamp may be run at higher current and thus more efficiently. Hence, reduced impedance and higher efficiency offers a motivation for those skilled in the art to develop higher frequency capacitively coupled lamps.

In an inductively coupled lamp system (i.e. an H discharge lamp), the impedance of the circuit would be expected to vary in direct proportion to frequency. Thus, at sufficiently high frequencies, the impedance would so increase such that an inductively coupled lamp would not operate with any reasonable efficiency, if at all.

Figure 1:
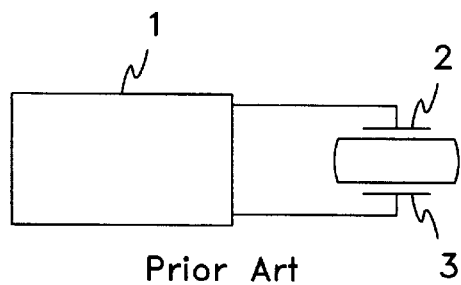
FIG. 1 is a schematic diagram of a conventional electrodeless lamp which produces an E discharge.
Figure 3:
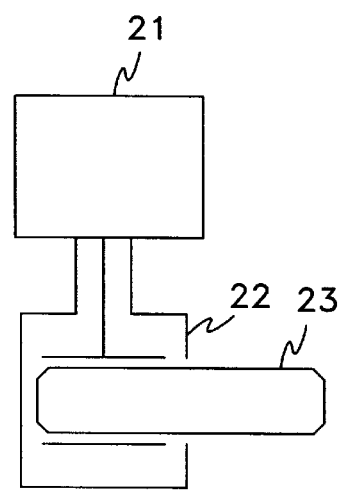
FIG. 3 is a schematic diagram of a conventional electrodeless lamp which produces a travelling wave discharge.
Figure 2:
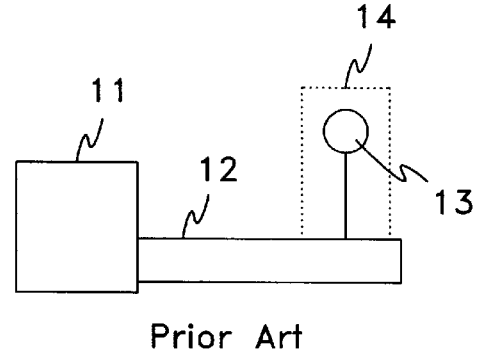
FIG. 2 is a schematic diagram of a conventional electrodeless lamp which produces a microwave discharge.
Figure 4:
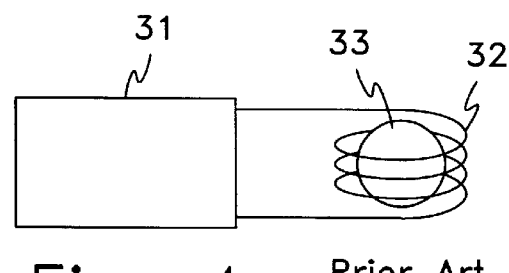
FIG. 4 is a schematic diagram of a conventional electrodeless lamp which produces an H discharge.
Figure 5:
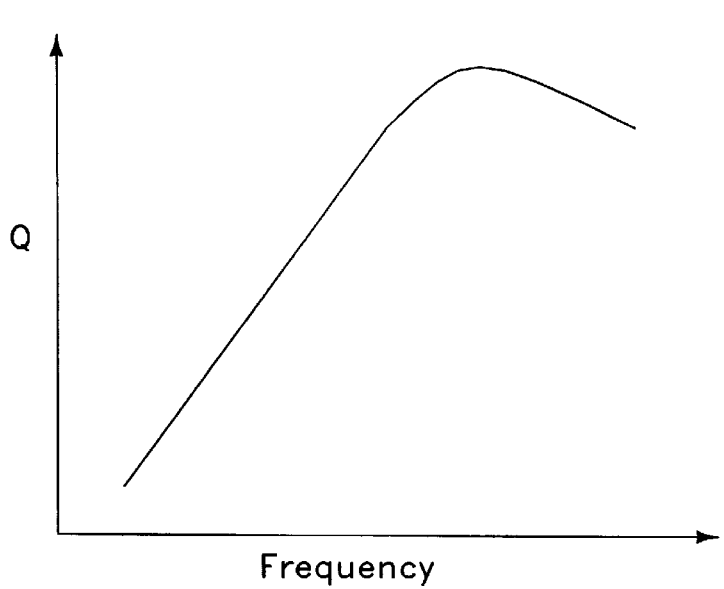
FIG. 5 is a graph of Q versus frequency.
Figure 10:
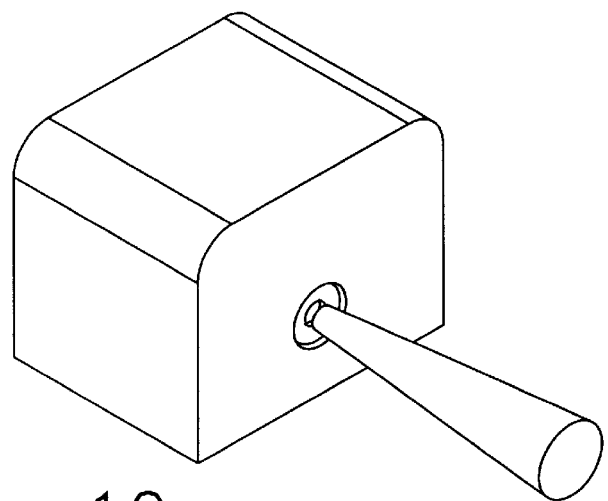
FIG. 10 is a perspective view of the lamp of the present invention utilized in conjunction with a tapered light pipe (TLP).
Figure 11:
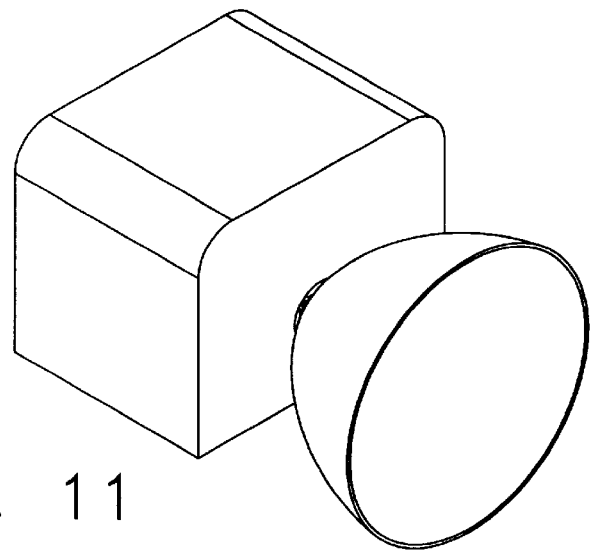
FIG. 11 is a perspective view of the lamp of the present invention utilized in conjunction with a compound parabolic concentrator (CPC).

By way of illustration, the quality factor Q of a coil is an indication of the coil's operating efficiency, i.e. efficiency in transferring energy to a device (e.g. a secondary coil coupled thereto). Q may be represented by the equation:

$$Q = \frac{\omega L}{R} \quad \text{Equation (1)}$$

where L is the inductance of the coil, R is the resistance of the coil, and $\omega$ is the radian or angular frequency ($\omega=2\pi \times f$, where f is the operating frequency). FIG. 5 shows a typical plot of Q versus frequency for a given coil. As can be seen from the plot, Q increases proportional to the square root of frequency up to a point, beyond which Q declines. One reason that Q declines or "rolls off" from its peak value is that, at higher frequencies, "parasitics" or untoward factors are present which affect the coil performance by increasing the coil losses (i.e. the impedance of the coil). At these higher frequencies, the coil losses increase proportionately greater with increasing frequency, thereby causing Q to roll off.

For example, the "proximity effect" is a known phenomenon which describes how, as the coil turns get closer together, the Q rolls over sooner due to inter-turn capacitance. Other factors, such as skin depth and eddy current effects, may also contribute to increasing the effective resistance of the coil at higher frequencies. Increasing the effective resistance (i.e. R in equation 1) of the circuit may cause the roll off to accelerate. Thus, at higher frequencies, the proximity effect (inter-turn capacitance) and other parasitic effects which degrade coil performance become significant obstacles to efficient coil operation.

A further technological barrier to operating an inductively coupled lamp at high frequencies is that parasitic effects, such as those which affect coil performance, are also present in the coupling circuit, i.e. the circuitry operatively linking the power source to the lamp. Such effects would be expected to complicate the circuit design of the coupling circuit. For example, at high frequencies even straight wires take on inductive characteristics; a mutual inductance may occur between one straight wire and another straight wire. Further, stray capacitances of certain parts of the coil to other parts of the coupling circuit are also present.

Thus, in light of both practical and technological barriers, persons skilled in the art apparently have not heretofore configured electrodeless lamps as inductively coupled lamps connected to a power source operating at high frequency. For example, considerations relating to the coil Q factor and high frequency coupling circuits suggest that a very high frequency (e.g. above about 1 GHz) inductively coupled lamp would be very inefficient, if operable at all.

The devices in accordance with the present invention overcome one or more of the problems presented in the prior art through the design of the lamp and circuit elements, i.e. through the size of the exciting structure and the physical size of the circuit elements. Because physically large circuit elements are more susceptible to the above discussed parasitics, the device of the present invention overcomes this deficiency by making the circuit elements sufficiently small (e.g., as small as practically possible) to permit efficient operation.

Preferably, an effective electrical length of the coil is less than about a half wavelength of a driving frequency applied thereto. More preferably, the effective electrical length of the coil is less than about a quarter wavelength. Most preferably, the effective electrical length of the coil is less than about one eighth wavelength. The driving frequency is preferably greater than 100 Mhz and may be greater than about 300 MHz, 500 Mhz, 700 Mhz, or 900 MHz.

The devices of the present invention optimally operate with coils in which the number of turns is preferably less than about 2 turns and, in certain examples, less than one turn. At high frequencies, fewer turns minimize and/or effectively eliminate inter-turn capacitance. Also, at high frequencies, the present devices use a coil with fewer turns to minimize energy transfer losses due to the phase lag around the coil. Accordingly, the present invention encompasses coils having less than one turn to coils having up to about six turns. Optionally, for example at operating frequencies of less than about 150 MHz, more than 2 turns are employed. At progressively higher frequencies, about 2 turns or less is especially preferred.

In general, for a given diameter bulb, and a given diameter coil, the preferred number of turns depends on frequency, with fewer turns or less than one turn being preferred for lamps operating at the higher frequencies.

4.1.1 First Coupling Circuit

First Example of a High Frequency Inductively Coupled Lamp

As used herein, the first example refers generally to an inductively coupled electrodeless lamp according to the invention in which the coupling circuit comprises a "diving board" structure (as hereinafter described) and a helical excitation coil.

Figure 16:
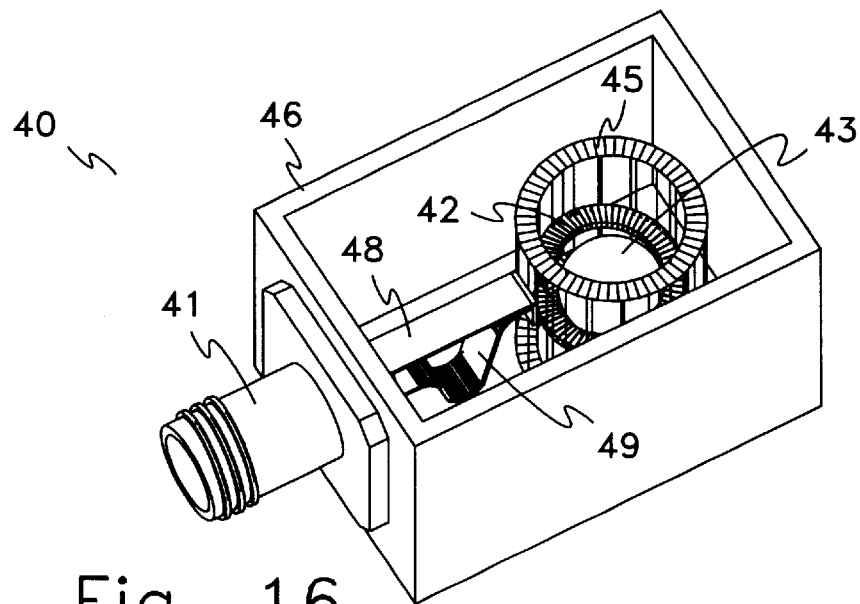
FIG. 16 is a perspective view of the first example of an electrodeless lamp according to the invention.
Figure 17:
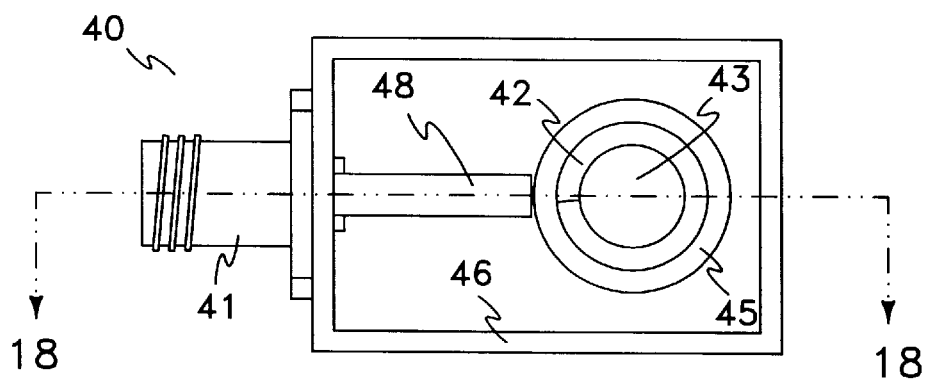
FIG. 17 is a top, schematic view of the first example of an electrodeless lamp according to the invention.
Figure 18:
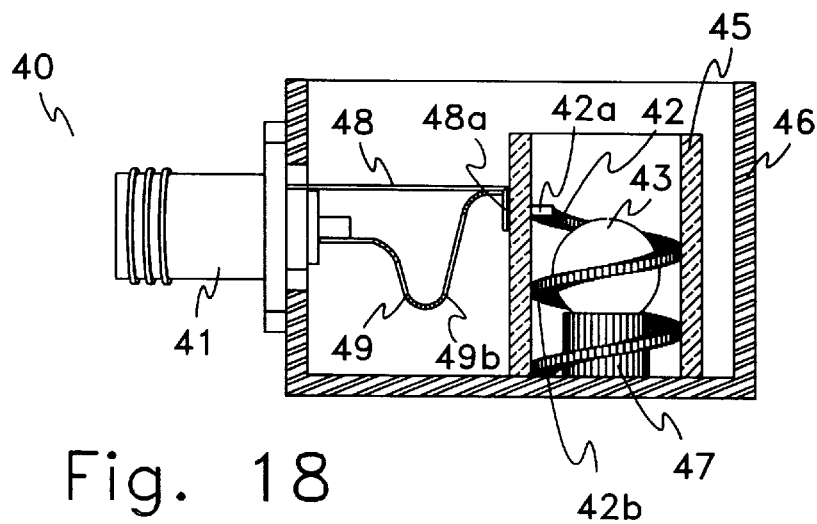
FIG. 18 is a partial section view of the first example of an electrodeless lamp according to the invention, taken along line 18—18 in FIG. 17.

Description of a first example of the invention will be made with reference to FIGS. 16–18, wherein like elements are referenced by like numerals. FIG. 16 is a perspective view of the first example of an electrodeless lamp according to the invention. FIG. 17 is a top, schematic view of the first example of an electrodeless lamp according to the invention. FIG. 18 is a partial section view of the first example of an electrodeless lamp according to the invention, taken along line 18—18 in FIG. 17.

As illustrated, an inductively coupled electrodeless lamp 40 includes an enclosure 46 housing a helical coil 42 with a bulb 43 disposed in the center of the coil 42. The bulb 43 is positioned in the coil 42 by a support 47 (as can best be seen in FIG. 18). The support 47 is preferably made of a material which is capable of handling the high temperatures of the bulb surface, but which does not conduct too much energy away from bulb (e.g. the support 47 should not be too heat conductive, although some heat conduction may be desirable, as hereinafter described). For example, a suitable material for the support 47 is quartz. The coil 42, bulb 43, and support 47 are disposed within a dielectric tube 45. The dielectric tube 45 may be made from any suitable dielectric material including, for example, quartz or alumina.

Power is provided to the lamp 40 via an input connector 41. The input connector 41 may be, for example, an N-type coaxial connector having a center conductor, for receiving the high frequency signal, and a grounded outer conductor, the grounded outer conductor being electrically connected to the enclosure 46. A first conductive element, hereinafter referred to as a "diving board" 48, is connected at one end to the grounded outer conductor of the input connector 41. A second conductive element, hereinafter referred to as a power feed 49, is connected at one end to the center conductor of the input connector 41. As shown in FIGS. 16–18, the diving board 48 and power feed 49 are connected to each other at their respective other ends, near the dielectric tube 45. One end of the coil 42 is positioned opposite of the diving board 49, and the other end of the coil 42 is grounded to the enclosure 46.

As can best be seen in FIG. 18, a first capacitor is formed between a portion 42a of the coil 42 and a portion 48a of the diving board 48, with the dielectric tube 45 providing the dielectric material for the first capacitor. A second capacitor is formed between a portion 42b of the coil 42 and a portion 49b of the power feed 49, with both the dielectric tube 45 and the air in the space between the tube 45 and the power feed 49 providing the dielectric material for the second capacitor.

In the figures, coil 42 is illustrated as having about 2 turns, but may be more or less turns depending on the bulb diameter, operating frequency, etc., as discussed above.

Lamps having outer diameter bulb sizes ranging from about 1 inch (25 mm) down to about 0.2 inches (5 mm), with a typical bulb wall thickness of about 0.02 inches (0.5 mm) were constructed and employed, including bulbs with 5, 6, and 7 mm diameters. Of course, larger or smaller size bulbs can be used in the electrodeless lamp according to the invention, with corresponding adjustments of the frequency, coil size, and circuit design.

For example, efficiency is generally improved if the inside coil diameter is closely matched to the outside bulb diameter. A power transfer ratio for inductively coupled lamps was quantified by David Wharmby, Ph.D., in a 1994 presentation at the Gaseous Electronics Conference in Gaithersburg, Md., in the following equation:

$$\frac{P_a}{P_u} = k^2 Q_u \left\{ \frac{Q_a}{(1+Q_a^2)} \right\} \qquad \text{Equation (2)}$$

where the subscript a refers to the plasma, the subscript u refers to the coil, P is power, Q is the quality factor, and k is the coupling coefficient. The coupling coefficient k is a measure of the magnetic flux lines linking the coupling coil and the current loop within the bulb. Placing the coil closer to the bulb increases the coupling coefficient, thereby increasing the power transfer ratio.

In accordance with the foregoing, an exemplary high frequency, inductively coupled lamp is constructed with the following dimensions. An enclosure 46 is constructed as a metal box, about 25 mm (1 inch) tall, 38 mm (1.5 inches) wide, and 50 mm (2 inches) long, with the top (i.e. one of the 38 by 50 mm walls) removed. A conventional N-type connector 41 is installed through an opening at one end (i.e. one of the 25 by 38 mm walls) of the enclosure 46. The power feed 49 is a thin ribbon conductor, about 0.33 mm (0.013 inch) thick, having a width of about 4 mm (0.16 inch). The power feed 49 traces a curved path, beginning at the center conductor of the input connector 41, bending downwardly in an extension having a length of about 6.5 mm (0.25 inch) to a lower extreme, curving back and extending towards the diving board 48 with an inside radius of about 1.25 mm (0.05 inch), the distance from the lower extreme to the diving board 48 being about 15.25 mm (0.6 inch). The curved shape and length of the power feed 49 provides a relatively high inductance and a distributed capacitance with respect to the coil 42.

The diving board 48 is a straight ribbon conductor, about 0.65 mm (0.025 inch) thick, having a width of about 8 mm (0.32 inch) and an overall length of about 26 mm (1.02 inches). One end of the diving board 48 is connected to the outer conductor of the N-type connector 41. The diving board 48 has a portion 48a bent at a right angle approximately 21.5 mm (0.85 inch) from the connector 41 end to form a plate having a height of about 4.25 mm (0.17 inch). The power feed 49 was connected (e.g. soldered) to the diving board 48 at the bend. The straight section of the diving board 48 is adapted to provide low inductance and low resistance. The bent portion 48a of the diving board 48 provides one electrode of the series resonant capacitor.

The dielectric tube 45 is a quartz right circular cylindrical enclosure having a height of about 28.75 mm (1.13 inches), an inside diameter of about 10 mm (0.4 inch), and a wall thickness of about 2 mm (0.08 inch). The dielectric tube 45 sits on the bottom of the enclosure 46 and abuts the bent portion 48a of the diving board 48.

The series resonant coil 42 is wound two and one half turns in a helix, having an outside diameter of about 10 mm (0.4 inch), an inside diameter of about 8 mm (0.32 inch), and a pitch of about 5 mm (0.2 inch). The top most portion of the coil 42 is positioned opposite of the bent portion 48a of the diving board 48 and forms the other electrode of the series resonant capacitor. The other end of the coil 42 is grounded (e.g. soldered to the bottom of the enclosure 46).

The bulb 43 is made of quartz, having an outside diameter of about 8 mm (0.32 inch) and an inside diameter of about 7 mm (0.28 inch). The bulb 43 is filled with about 4 to 6 mg of selenium and a buffer gas of Xenon to a pressure of 300–1000 Torr. The bulb rests on a right circular cylindrical quartz support 47 having an inside diameter of about 6 mm (0.24 inch), an outside diameter of about 8 mm (0.32 inch) and a height of about 6 mm (0.24 inch).

Figure 19:
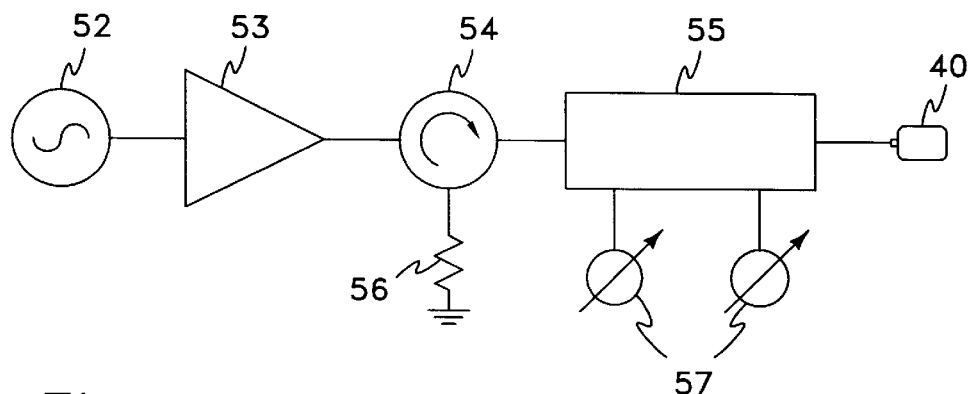
FIG. 19 is a schematic diagram of a system for operating and evaluating the lamps described herein.

FIG. 19 is a schematic diagram of a system for operating and evaluating the lamps described herein. A high frequency signal source 52 is connected to an amplifier 53. The output of the amplifier 53 is connected to a circulator 54, which is connected through a directional coupler 55 to the lamp 40. The circulator 54 shunts reflected power to a load 56. The directional coupler 55 provides a plurality of taps which may be connected to measurement devices 57.

The above described device is operated, for example, at 915 MHz with 30–100 watts of power supplied by an amplifier made by Communication Power Corporation, Brentwood, N.Y., Model No. 5M-915-1,5E2 OPT 001, connected by a coaxial cable to a Hewlett-Packard Network Analyzer Model No. 8505A. The circulator and directional coupler employ commercially available components. The output of the directional coupler is connected to the input connector 41 via a coaxial cable. The inductively coupled lamp produces up to approximately 80 lumens per watt (i.e. approximately 8000 lumens with 100 watts of power).

The above-described device is powered by any suitable power source capable of providing a suitable level of power at high frequency. For example, a magnetron may be used as the power source. Preferably, the microwave power from the magnetron would be coupled through an impedance matching device into a coaxial cable for supplying the power to the device.

Figure 20:
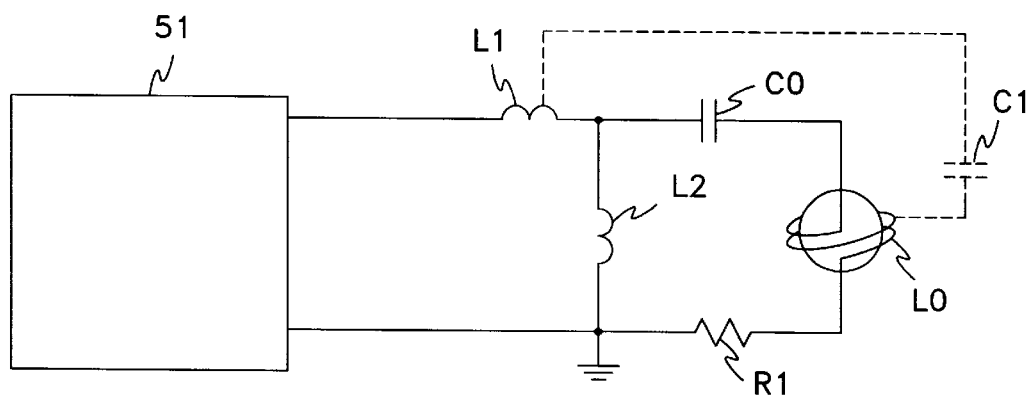
FIG. 20 is a schematic diagram of the first example of an electrodeless lamp according to the invention.

FIG. 20 is a schematic diagram of the first example of an electrodeless lamp according to the invention. The circuit which couples the input power to the bulb is a series resonant circuit. A series resonant circuit includes, for example, an inductor (e.g. a coil) and a capacitor in series, and has an alternating current ringing in the circuit during operation. Initially, power is supplied to the circuit and charges the capacitor, then the capacitor discharges and the energy is stored in the inductor. As the current reaches a peak in the inductor, it recharges the capacitor with an opposite polarity and the process repeats itself. The ringing would be perpetual, except for the fact that there are inevitable losses in the circuit. The power supplied to the circuit replenishes the losses to maintain the circuit ringing at its resonant frequency. Because much of the current is preserved between the capacitor and the inductor, only a fraction of the stored energy is required to be replaced to keep the circuit ringing with relatively high current, thereby allowing relatively efficient operation of the circuit.

As shown in FIG. 20, a series resonant capacitor C0 and a series resonant coil L0 form the main components of a series resonant circuit. A high frequency power source 51 provides a feed current through a feed inductor L1. L1 is connected to the series resonant capacitor C0. The series resonant capacitor C0 is connected in series with the series resonant coil L0, which is connected through a resistor R1 to ground. A small inductor L2 is connected between ground and the junction of L1 and C0. A distributed capacitance C1 is shown with dotted lines connecting the middle of L0 and L1.

With respect to the first example shown in FIGS. 16–18, the series resonant coil L0 corresponds to the coil 42. The series resonant capacitor C0 corresponds to the first capacitor formed between portions 42a and 48a of the coil 42 and diving board 48, respectively. The feed inductor L1 corresponds to the power feed 49 and the small inductor L2 corresponds to the diving board 48. The distributed capacitance C1 corresponds primarily to the second capacitor formed between portions 42b and 49b of the coil 42 and power feed 49, respectively, but also includes many small capacitances formed between the feed inductor L1 surface and the coil L0 surface (i.e. every portion of the coil 42 surface has some capacitance with respect to every portion of the power feed 49 surface).

During operation, energy is initially stored on the series resonant capacitor C0, which then discharges and the current passes through the series resonant coil L0, down to ground. The current then passes back through the small inductor L2 (i.e. the diving board 48), which is preferably a low inductance device. Thus, the series resonant circuit includes primarily C0 and L0, with a small inductance being contributed by L2. The feed inductor L1 couples a small amount of energy into the series resonant circuit, which makes up for the losses (represented by R1) for each ring. R1 represents, for example, two loss components. One is the plasma resistance reflected back into the primary circuit (e.g., L2, C0, L0). The other is the inherent resistance of any non-superconductive circuit. The distributed capacitance C1 (between L1 and L0) may be adjusted to match the input impedance by altering the location of L2.

Referring back to FIGS. 16–18, the energy is brought in via the N-type connector 41 through the power feed 49, which is a relatively low current carrying element, compared to the series resonant circuit, and it feeds energy into the series resonant circuit as the energy is dissipated through the coil 42 and other elements in the circuit (some energy is lost in operation, mostly resistively, and a negligibly small amount due to RF radiative losses). In comparison to the power feed 49, the diving board 48 is a high current carrying element connected directly to ground, and is part of the series resonant circuit. The ringing current passes through the diving board 48, through the dielectric tube 45, through the coil 42, down to ground, and around again.

During operation, a large voltage develops between the diving board 48 and the coil 42, on the order of 1000 to 10,000 volts. The dielectric tube 45 helps prevent breakdown of the lamp circuit due to this high voltage. The dielectric tube 45 may also advantageously enclose an optically reflecting powder, such as high purity alumina or silica.

The distributed capacitance C1 is relatively small and its function is to improve the coupling (i.e. impedance matching). For example, the position of portion 49b of the power feed 49 may be adjusted during bulb operation, with respect to the portion 42b of the coil (e.g., bent to be closer, farther, higher, or lower), to as closely as practical match the input impedance of the power source (e.g. nominally 50 ohms, although other input impedances are possible). Of course, in production, the circuit can be readily configured so that the desired impedance match is provided without any post-production adjustments.

According to the invention, the schematic circuit components are in fact formed by the physical structure of the conductive elements themselves. This circuit structure provides numerous advantages including reduction of cost and complexity, and improved reliability. For example, this circuit structure overcomes problems with breakdown of discrete circuit elements at high frequencies.

FIG. 21 is a sectional schematic representation of an H discharge occurring within a bulb. A simplified description of an H discharge is as follows. A plasma (e.g. an ionized gas) is contained inside a bulb (e.g. a vessel made of quartz). The series resonant circuit drives an alternating current through the coil that creates a time varying magnetic field. The changing magnetic field induces a current inside the bulb. The current passes through the plasma and excites the production of light. The plasma functions analytically as a lossy single turn secondary coil of a transformer.

While the bulb shown in most of the examples described herein is shown with a generally spherical shape, other bulb shapes may be used with the inductively coupled lamp according to the invention. FIGS. 22–26 show exemplary alternative bulb shapes suitable for accommodating an H discharge. FIG. 22 shows a perspective view of a generally cylindrical shaped bulb. FIGS. 23–26 show generally disc shaped bulbs, also referred to as pill-box shaped bulbs. FIG. 23 is a perspective view. FIGS. 24–26 are cross sectional views through the bulb center, where the bulb is rotationally symmetric around a vertical axis through the center. FIG. 24 shows a pill-box shaped bulb with rounded corners. The bulb shown in FIG. 25 includes a re-entrant dimple in the bottom. The bulb shapes shown are for purposes of illustration only and not limitation. Other bulb shapes are also possible.

The fill material employed can be sulfur or selenium based, but can include any other fills suitable for use in electrodeless lamp. Preferably, the fill in its ionized state provides a moderately low impedance. Examples of suitable fill materials include metal halides (e.g. InBr, NaI, CaI, CsI, SnCl). Mercury based fills may also be used.

FIGS. 27–29 are perspective views of exemplary alternative structures of the first conductive element (i.e. the diving board) and the second conductive element (i.e. the power feed) which are suitable for use by the first example of an electrodeless lamp according to the invention.

The power feed is a lower current carrying element because the power feed only needs to carry the feed current, which varies depending on the input power. The power feed may have any reasonable shape, and is preferably curved or bent to provide a longer length (and therefore a higher inductance) than the diving board.

The diving board, on the other hand, is preferably a high current carrying, low inductance conductive element. The diving board carries all of the current of the ringing series resonant circuit because that current passes through the capacitor, through the diving board to ground, back up through the coil. The diving board is shown thicker in some examples (e.g. FIG. 28), but the diving board need only be thick enough to accommodate the skin depth of the ringing current. The skin depth varies depending on the material. While the diving board is preferably straight, it may have small bends or curves. In FIG. 27, the power feed 59 is a relatively thick (e.g. about 12 gauge) wire bent at approximately right angles and connected to the diving board 58 a short distance past the center of the diving board 58 (i.e. spaced inwardly from the bend). In FIG. 28, the power feed 79 is a relatively thick wire with curved bends. In FIG. 28, the diving board 78 is a thicker ribbon conductor with a tapered end connected (e.g. soldered) to a metal plate 78a. In FIG. 29, the diving board 88 has a portion 88a which is bent up, rather than down.

Although the first capacitor electrode has been illustrated with specific shapes and/or positions, other shapes and/or positions are alternately employed. For example, by way of illustration and not limitation, the capacitor electrode may be square, rectangular, octagonal, circular, semi-circular, or other shapes. The electrode may be positioned above, below, centered, or otherwise offset with respect to the end of the diving board. One of skill in the art will appreciate that numerous other design choices for the power feed, diving board, and the plate of the capacitor are alternately employed.

Figure 30:
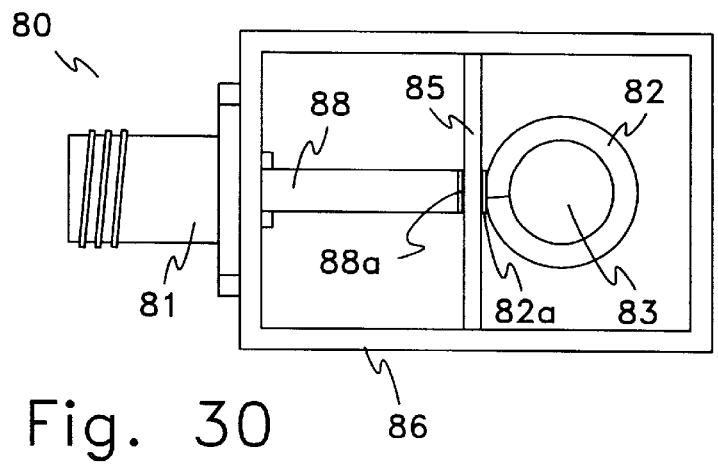
FIGS. 30–32 show an alternative structure of the first example of an electrodeless lamp according to the invention.
Figure 31:
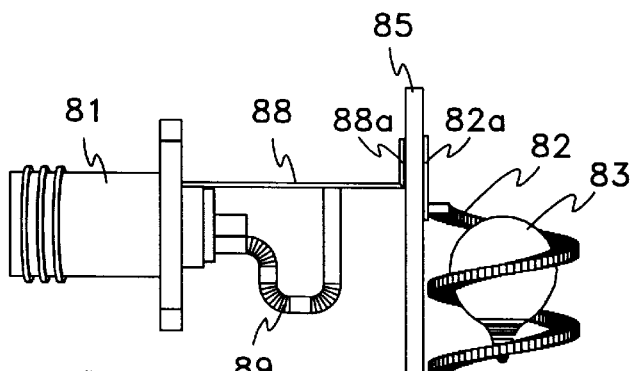
Figure 32:
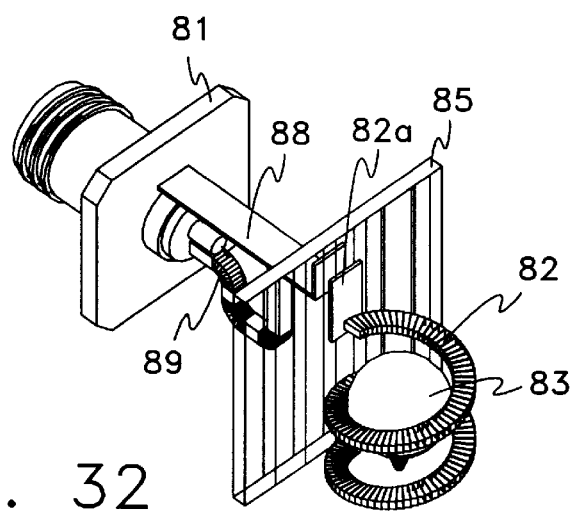

FIGS. 30–32 show an alternative structure of the first example of an electrodeless lamp according to the invention. The main differences between this alternative structure and the example shown in FIGS. 16–18 is that the inductively coupled electrodeless lamp 80 utilizes the diving board 88/power feed 89 combination shown in FIG. 29 (with the portion 88a bent up instead of down), a straight dielectric 85 is used instead of the dielectric tube 45, and the coil 82 includes a metal plate 82a (as can best be seen in FIG. 27) as the second electrode of the capacitor. Operation of this alternative structure is essentially the same as that described above with respect to operation of the lamp 40 shown in FIGS. 16–18.

Second Example of a High Frequency Inductively Coupled Lamp

As used herein, the second example refers generally to an inductively coupled electrodeless lamp according to the invention which utilizes the diving board structure coupled to a "washer" shaped excitation coil (as hereinafter described).

A device encompassing the first example described above (i.e. an inductively a coupled lamp having a diving board structure and a helical coil with about 1½ turns) is hereinafter to compared to several other examples including devices having a diving board structure and (1) a coil having a trapezoidal cross-sectional shape (as disclosed in the '903 patent)and (2) a flat, washer shaped coil (which approximates the '903 patent's coil shape).

Figure 33:
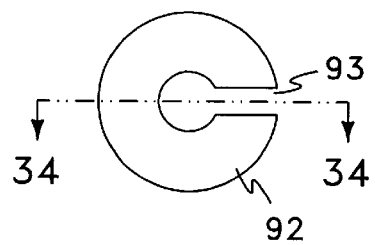
FIGS. 33–35 show a schematic view, a sectional view, and a perspective view, respectively, of a coil utilized by a second example of an electrodeless lamp according to the invention.
Figure 34:
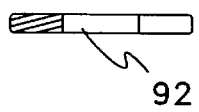
Figure 35:
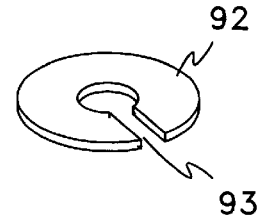

FIGS. 33–35 show a schematic view, a sectional view, and a perspective view, respectively, of a coil 92 comprising the second example of an electrodeless lamp according to the invention. The coil 92 has a flat, generally washer shaped structure with a slot 93. Comparisons were made with washer shaped coils having the following dimensions (in mm):

TABLE 2

| INNER DIAMETER | OUTER DIAMETER | SLOT WIDTH | AXIAL HEIGHT |
| --- | --- | --- | --- |
| 9.5 | 15.9 | 3.5 | 1.6 |
| 9.5 | 19.7 | 3.5 | 3.3 |
| 9.5 | 22.9 | 3.5 | 1.0 |
| 9.5 | 22.9 | 3.5 | 0.1 |
| 9.5 | 15.9 | 3.5 | 1.0 |
| 9.5 | 15.9 | 3.5 | 0.3 |

Figure 36:
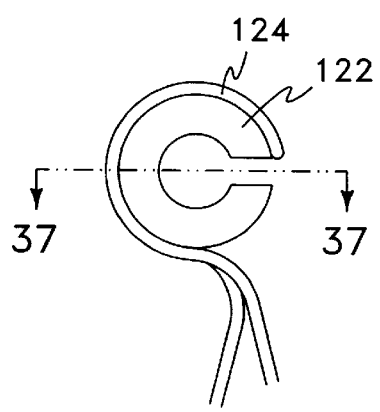
FIGS. 36–37 show a schematic view and a sectional view, respectively, of a water cooled, washer shaped coil utilized in the second example of an electrodeless lamp according to the invention.
Figure 37:
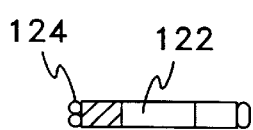

For some comparisons, a metal plate was soldered on the side of the coil, adjacent to the slot, to form an electrode of the series resonant capacitor (see FIG. 32). Also, for some comparisons, copper tubing was added to the outside of the coil to provide water cooling. FIGS. 36–37 show a schematic view and a sectional view, respectively, of a water cooled, washer shaped coil 122 utilized in the second example of an electrodeless lamp according to the invention. The perimeter of the coil 122 is in thermal contact with copper tubing 124.

Based on a comparison of the first and second examples, the washer shaped coils were found to be less efficient than the above-mentioned 1½ turn helical coil lamp. Further, the washer shaped coils which had a smaller outside diameter were more efficient than the washer shaped coils that had a larger outside diameter. As suggested in the '903 patent, the washer shaped coils provided an effective shape for less light blockage. In general, the washer shaped coils also appeared to provide good heat handling characteristics.

4.1.2 Novel Wedding Ring Shaped Excitation Coil

Third Example of a High Frequency Inductively Coupled Lamp

As used herein, the third example refers generally to an inductively coupled electrodeless lamp according to the invention which utilizes the diving board structure and a novel "wedding ring" (or split wedding ring) shaped excitation coil (as hereinafter described).

Novel Excitation Coil

Figure 38:
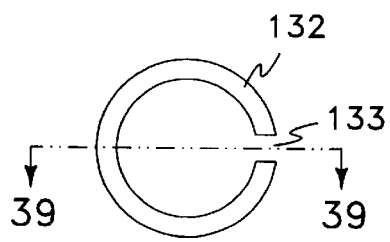
FIGS. 38–40 show a schematic view, a sectional view, and a perspective view, respectively, of a novel excitation coil according to the invention.
Figure 39:
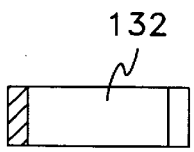
Figure 40:
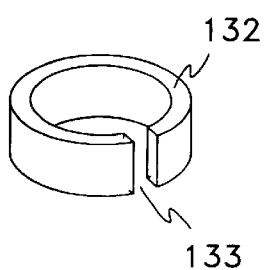

FIGS. 38–40 show a schematic view, a sectional view, and a perspective view, respectively, of a novel excitation coil according to the invention. According to the invention, a coil 132 has a generally "wedding ring" shaped structure with a slot 133. Several wedding ring shaped coils having the following dimensions (in mm) are constructed:

TABLE 3

| INNER DIAMETER | RADIAL THICKNESS | AXIAL HEIGHT |
| --- | --- | --- |
| 9.5 | 1.3 | 1.3 |
| 9.5 | 1.3 | 1.9 |
| 9.5 | 1.3 | 2.5 |
| 9.5 | 1.3 | 3.2 |
| 9.5 | 0.6 | 1.3 |
| 9.5 | 0.6 | 1.8 |
| 9.5 | 0.6 | 2.3 |
| 9.5 | 0.6 | 2.8 |
| 9.5 | 0.6 | 3.3 |
| 9.5 | 0.6 | 3.8 |
| 9.5 | 0.6 | 4.3 |
| 9.5 | 0.6 | 5.1 |
| 9.5 | 0.6 | 6.4 |

In each of the foregoing examples, the slot width is between about 1.8 and 3.5 mm.

As used herein, a "wedding ring" shaped coil refers generally to a radially relatively thin and axially relatively tall conductive surface, preferably less than one turn, and preferably evidencing a non-helical configuration. In other words a wedding ring shaped coil has a small radial thickness (i.e. difference between outer diameter and inner diameter) and an axial height at least greater than the radial thickness.

The wedding ring shaped coils exhibited significantly more efficient operation than either the helical coil or the washer shaped coils when coupled to essentially the same diving board structure.

Figure 41:
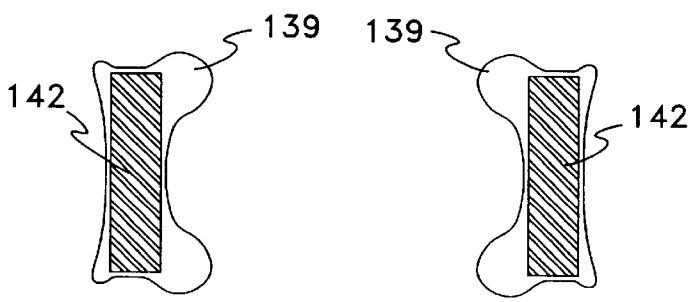
FIG. 41 is a graphical illustration of current distribution in the excitation coil shown in FIGS. 38–40.

FIG. 41 is a graphical illustration of current distribution in the excitation coil shown in FIGS. 38–40, of a well coupled operating lamp at high frequencies. In FIG. 41, the distance the line 139 is spaced from the coil 142 surface represents the amount of current flowing in that area of the coil 142. The current is distributed towards the outside edges of the coil 142. As can be seen from FIG. 41, relatively little current flows in the middle section of the coil 142. Thus, the current flowing in the coil 142 essentially forms two loops of current at opposite outside edges of the coil 142.

During operation, the lamp operates more efficiently with two current loops. One half of the current flows in two rings causes only one fourth the loss in each loop. The total loss in the sum of the loss in each loop, resulting in one half of the overall losses for an operating lamp. Therefore, efficiency is greatly improved.

Generally, more current is distributed on the side facing the bulb (if the coil is closely coupled to the bulb). Effectively, the coil current and the plasma current are drawn together to achieve energy minimization. The closer the coupling between the two currents, the greater the forces driving the two currents to be as close to each other as possible.

At high frequencies, substantially all of the current is carried in the skin depth of the coil material. As is well known in the art, the skin depth depends on the material and the operating frequency. For example, the skin depth of copper (in inches) at room temperature is about 2.61 divided by the square root of the frequency. Thus, at about 1 GHz, the skin depth of copper is about 0.0001 inches (1/10th mil). Preferably, the radial thickness of a wedding ring shaped coil according to the invention is at least several skin depths, and more preferably, the radial thickness should be greater than about 10 skin depths.

Preferable examples have a radial thickness less than about 0.8 mm (0.03 inches). For example, devices with an axial height of between about 4.0 and 5.0 mm (0.15 to 0.2 inch) are constructed with a radial thicknesses of between about 0.18 and 0.54 mm (0.007 to 0.021 inch) and maintain comparable efficiency within that range of radial thicknesses. For very thin coils, the coil material is alternatively deposited directly on an insulating surface.

The preferred axial height for the wedding ring shaped coil according to the invention is at least greater than the radial thickness and up to about 2/3 of the inside diameter of the coil, with between 1/3 and 2/3 of the inside diameter of the coil providing better efficiency.

For example, when the axial height of the coil is about equal to the inside radius of the coil, the operation of the wedding ring shaped coil approximates a Helmholtz coil configuration, i.e. a pair of flat, circular coils having equal numbers of turns and equal diameters, arranged with a common axis and connected in series. The optimum arrangement for Helmholtz coils is when the spacing between the two coils is equal to the radius. Helmholtz coils are known to produce a uniform magnetic field, with the midpoint between the two coils, along the common axis, being the point of nearly uniform field strength. In an inductively coupled lamp, uniformity of field is not generally thought of as a critical operating parameter. However, the volume integral of the power density in a wedding ring/Helmholtz coil configuration is also at an optimum, thereby providing optimum inductive coupling to the volume between the coils.

Thus, with the appropriate axial height, an operating lamp utilizing the wedding ring shaped coil according to the invention provides two current loops spaced apart by a distance equal to the inside radius of the coil. Each current loop corresponds approximately to one coil of the Helmholtz coil configuration. A precise Helmholtz arrangement, however, is not required for acceptable efficiency. As the coil height approaches the Helmholtz arrangement, the losses become less, but decreasing asymptotically. Thus, the axial height of the coil may be somewhat greater or smaller than the inside radius of the coil with only a small effect on efficiency. Accordingly, the wedding ring/Helmholtz configuration provides a robust system which allows a wide range of design for other lamp parameters.

FIGS. 42–57 are perspective views and schematic views, respectively, of different examples of the novel excitation coil according to the invention. FIGS. 38–40 show a preferred wedding ring shaped coil with an axial height about equal to the inside radius.

As illustrated in FIG. 41, little current flows in the middle section of the wedding ring shaped coil. Accordingly, the middle section may be removed with little effect on coil efficiency. A "split wedding ring" shaped coil refers to a generally wedding ring shaped coil with at least a portion of the middle section of the wedding ring removed. When split wedding ring shaped coils having two or more parallel rings are compared for efficiency with the wedding ring shaped coil, no significant differences in efficiency are noted.

Figure 42:
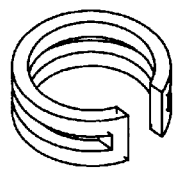
FIGS. 42–43 are perspective and schematic views, respectively, of a preferred structure of a split wedding ring shaped coil according to the invention.
Figure 44:
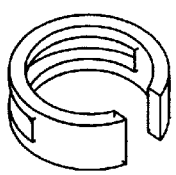
FIGS. 44–45 are perspective and schematic views, respectively, of a first alternative split coil structure.
Figure 43:
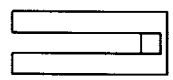
Figure 45:

FIGS. 42–43 show a preferred structure of a split wedding ring shaped coil with all but a small portion of the middle one-third of the wedding ring shaped coil removed. FIGS. 44–45 show an alternative structure with the middle one-third of the wedding removed from about one half of the wedding ring shaped coil.

Figure 46:
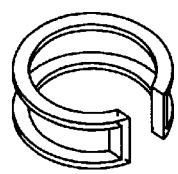
FIGS. 46–47 are perspective and schematic views, respectively, of a second alternative split coil structure.
Figure 47:
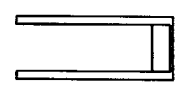

FIGS. 46–47 show an alternative structure, where only a thin sliver of each split ring remains. More preferably, the split rings are made relatively thicker in order to reduce the current density in the coil material, thereby reducing power losses (e.g., heating the coil to a lesser extent) and making the lamp more efficient.

Figure 48:
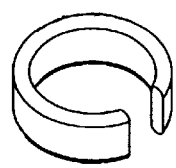
FIGS. 48–49 are perspective and schematic views, respectively, of a coil with rounded edges.
Figure 49:
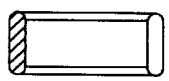
Figure 52:
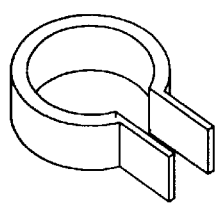
FIGS. 52–53 are perspective and schematics views, respectively, of a wedding ring shaped coil with integral leads.
Figure 54:
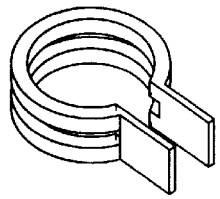
FIGS. 54–55 are perspective and schematics views, respectively, of a split coil with integral leads.

FIGS. 48–49 illustrate that a rectangular cross section is not required and the edges may be rounded. Other shapes for the edges are also possible. Preferably, the coil cross section shape allows the current to spread out. In general, the more the current spreads out the greater the efficiency because localized power losses are reduced. Making the radial thickness of the coil too thin (although minimizing eddy current losses) increases current density and the corresponding power losses.

Figure 50:
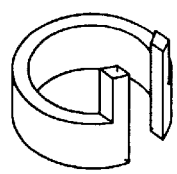
FIG. 50 is a perspective view of a further example of the novel excitation coil according to the invention.
Figure 51:
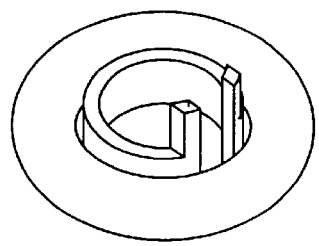
FIG. 51 shows a perspective view of the coil from FIG. 50 positioned inside a torus shaped bulb.

FIGS. 50–51 are perspective views and schematic views, respectively, of a further example of the novel excitation coil according to the invention. In this example, leads to the coil do not extend beyond the outside diameter of the coil, so that the coil may be positioned inside a torus shaped bulb. FIG. 51 shows a perspective view of a torus shaped bulb. In the case of FIG. 51, the coil 42 could be positioned either inside the bulb or outside the bulb, depending on the application.

Figure 56:
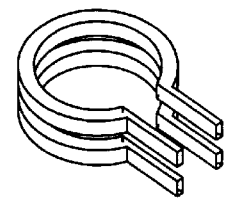
FIGS. 56–57 are perspective and schematics views, respectively, of another split coil with integral leads.
Figure 53:
Figure 55:
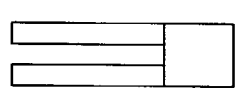
Figure 57:
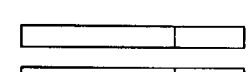

FIGS. 52–57 show examples of wedding ring and split wedding ring coils with integral leads for connecting to the rest of the lamp circuit. Note that, as shown in FIGS. 56–57, the top and bottom coil sections need not be physically connected as long the currents passing through the two sections are close in phase and about equal in magnitude.

Figure 58:
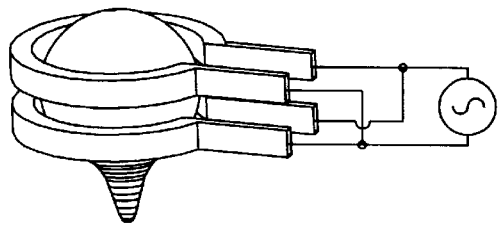
FIGS. 58–61 are partially schematic diagrams showing lamps utilizing different split coil arrangements according to the invention.
Figure 59:
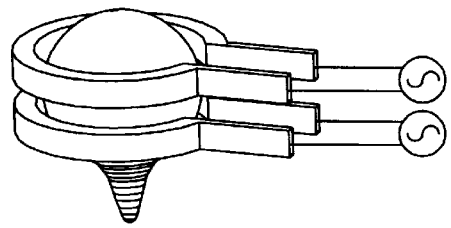
Figure 60:
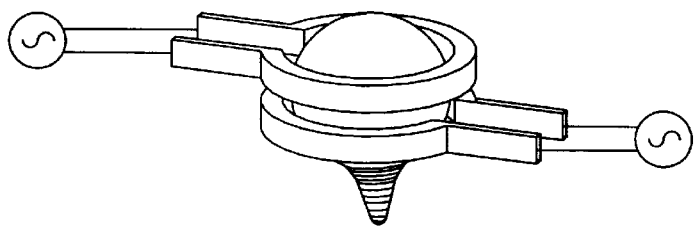
Figure 61:
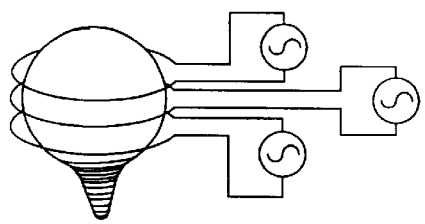

FIGS. 58–62 are schematic diagrams showing lamps utilizing different split wedding shaped coil arrangements according to the invention. In each of FIGS. 58–61, the circuit are configured so that the current in each of the split rings is close in phase and about equal in magnitude. In FIG. 58, a single power source drives both rings. In FIG. 59, two power sources drive the two rings separately. In FIG. 60, two power sources separately power the two rings, and the leads of the two rings are positioned at opposite directions. In FIG. 61, three power sources separately power three rings, with one ring being centrally positioned, and the other two rings being symmetrically spaced about the center.

Figure 62:
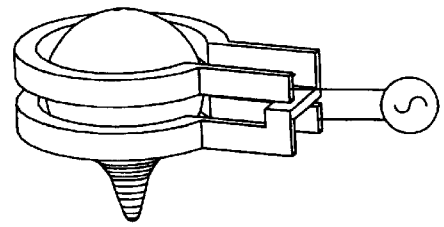
FIG. 62 is a partially schematic diagram of an alternative coil structure according to the invention.

The circuit in FIG. 62 deviates from the above discussed split wedding ring structure because it does not provide two loops of current precisely in phase. Rather, the circuit in FIG. 61 illustrates the two rings of the split wedding ring coil being connected in series to form a two turn ribbon coil. Ribbon coils typically have a higher Q, providing advantages at low frequencies. With the appropriate spacing of the current loops, the circuit in FIG. 61 would approximate a Helmholtz coil configuration and may provide good efficiency at relatively lower frequencies. At relatively higher frequencies, however, proximity effects and other parasitics would adversely affect the efficiency of the circuit shown in FIG. 62 to a greater extent than, for example, the circuit shown in FIG. 58.

While the novel "wedding ring" shaped excitation coil has been described above with reference to specific shapes and structures, these examples should be considered as illustrative and not limiting. For example, by way of illustration and not limitation, elliptical, square, rectangular, kidney, and arbitrary cross-sectional shaped coils may alternatively be employed in place of the circular cross sections exemplified above. Also, while the novel "wedding ring" shaped excitation coil has been described above coupled to a diving board structure, the novel excitation coil according to the invention may be utilized with other circuit designs. For example, depending on the operating frequency, a suitable lamp may be built from discrete components (e.g. off the shelf capacitors). Moreover, while the novel "wedding ring" coil has been described with respect to high efficiency lamps operating at high frequencies and/or very high frequencies (e.g. above about 900 MHz), the utility of this configuration is not limited to such high or very high frequency applications. For example, the novel excitation coil according to the invention is suitable for a lamp operating at about 13.56 MHz, 2 MHz, 1 MHz, or lower frequencies, providing advantages as set forth above at these lower operating frequencies.

4.1.3 Second Coupling Circuit

Fourth Example of a High Frequency Inductively Coupled Lamp

As used herein, the fourth example refers generally to an inductively coupled electrodeless lamp according to the invention which couples a "blade" structure (as hereinafter defined) to the wedding ring (or split wedding ring) shaped excitation coil.

Figure 63:
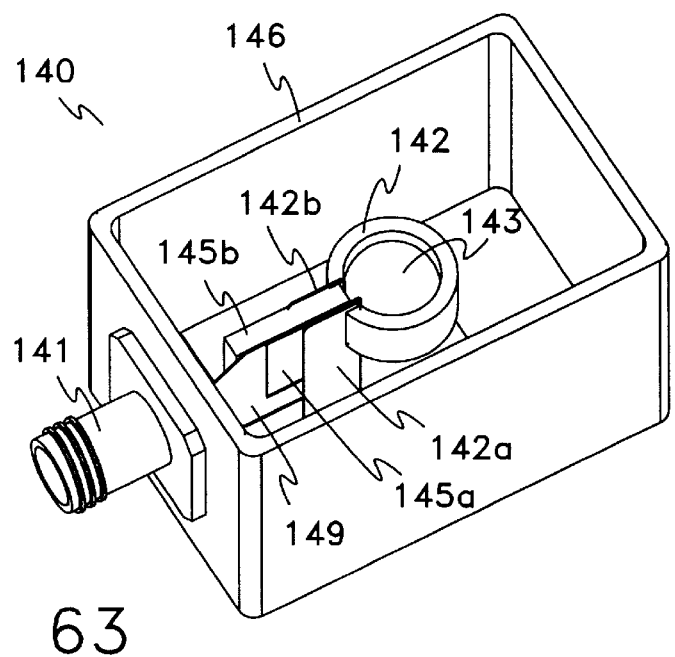
FIG. 63 is a perspective view of a fourth example of an electrodeless lamp according to the invention.
Figure 64:
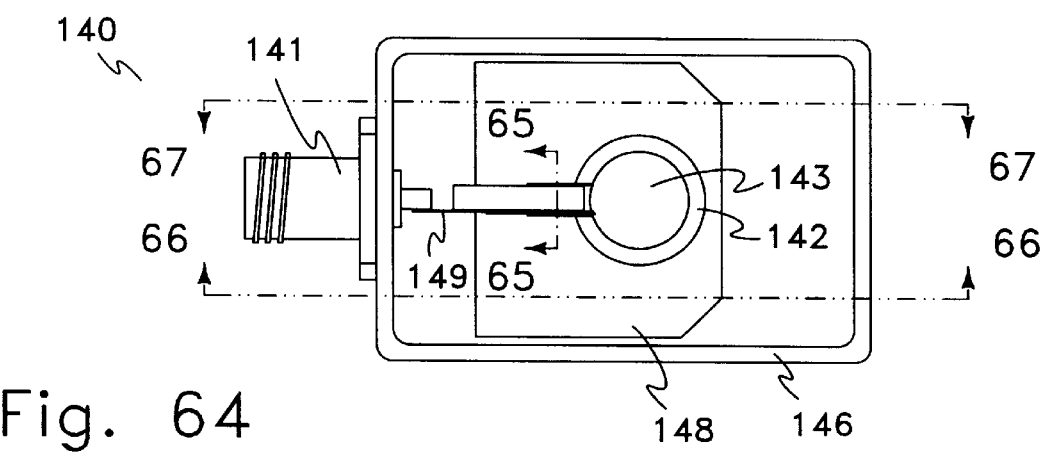
FIG. 64 is a top, schematic view of the fourth example.
Figure 65:
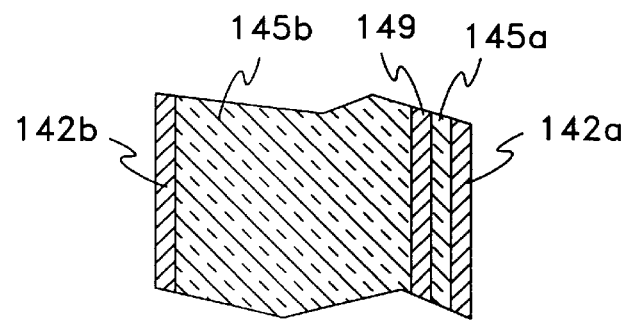
FIG. 65 is a fragmented, sectional view of an exemplary capacitor structure utilized by the fourth example of an electrodeless lamp according to the invention, taken along line 65—65 in FIG. 64.
Figure 66:
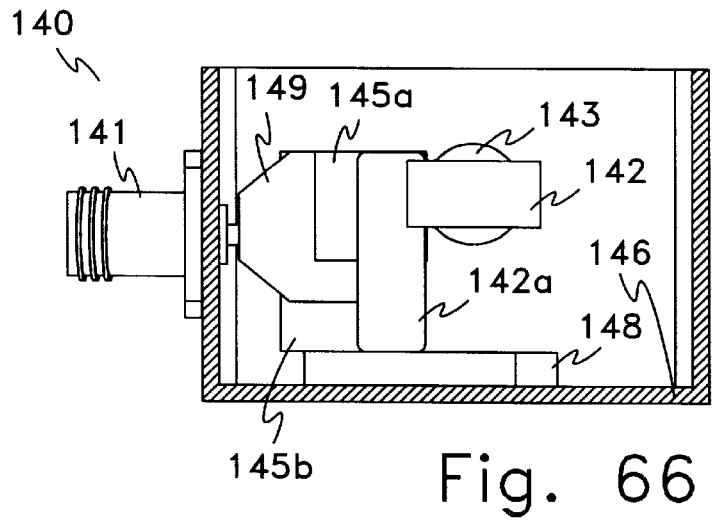
FIG. 66 is a section view of the fourth example, taken along line 66—66 in FIG. 64.
Figure 67:
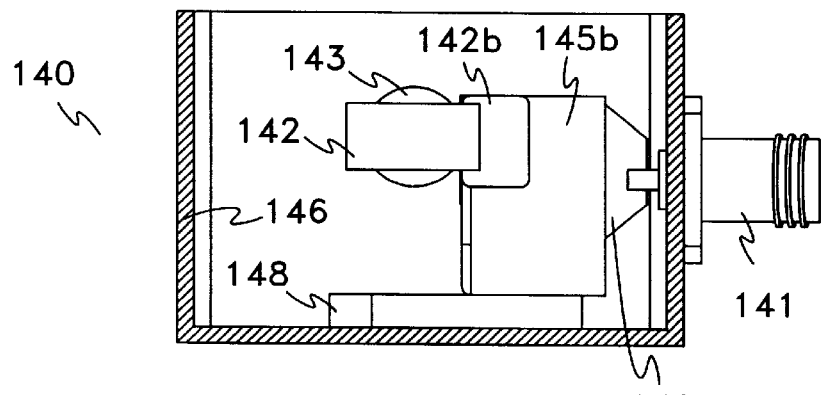
FIG. 67 is a section view of the fourth example, taken along line 67—67 in FIG. 64.

The fourth example of the invention is described generally by reference to FIGS. 63–67, wherein like elements are referenced by like numerals. FIG. 63 is a perspective view of the fourth example of an electrodeless lamp according to the invention, utilizing an example of the wedding ring shaped excitation coil shown in FIGS. 38–40. FIG. 64 is a top, schematic view of the fourth example. FIG. 65 is a fragmented, sectional view of an exemplary capacitor structure utilized by the fourth example of an electrodeless lamp according to the invention, taken along line 65—65 in FIG. 64. FIG. 66 is a section view of the fourth example, taken along line 66—66 in FIG. 64. FIG. 67 is a section view of the fourth example, taken along line 67—67 in FIG. 64.

As illustrated, an inductively coupled electrodeless lamp 140 includes an enclosure 146 housing a wedding ring shaped coil 142 with a bulb 143 disposed in the center of the coil 142. The bulb 143 may be positioned in the coil 142 by, for example, a support as described in connection with the first example. One side of the slot of the coil 142 is connected (e.g. soldered) to a first plate 142a which extends down and connects to a base 148 which is grounded to the enclosure 146. The first plate 142a positions the coil 142 within the enclosure 146. The other side of the slot of the coil 142 is connected to a second plate 142b, which is not grounded.

Power is provided to the lamp 140 via an input connector 141. The input connector 141 may be, for example, a coaxial connector having a center conductor and a grounded outer conductor. The center conductor carries the high frequency signal (i.e. the power). The grounded outer conductor is electrically connected to the enclosure 146.

A conductive element, hereinafter referred to as a blade 149, is connected at one end to the center conductor of the input connector 141. A portion of the other end of the blade 149 extends in between the plates 142a and 142b, where it is sandwiched in between a first dielectric 145a and a second dielectric 145b.

As can best be seen in FIGS. 63 and 65, capacitors are formed between the end portion of the blade 149 and the plates 142a and 142b. A first capacitor is formed between the plate 142a and the end portion of the blade 149, with the dielectric 145a providing the dielectric material for the first capacitor. A second capacitor is formed between the plate 142b the end portion of the blade 149, with the dielectric 145b providing the dielectric material for the second capacitor.

Figure 68:
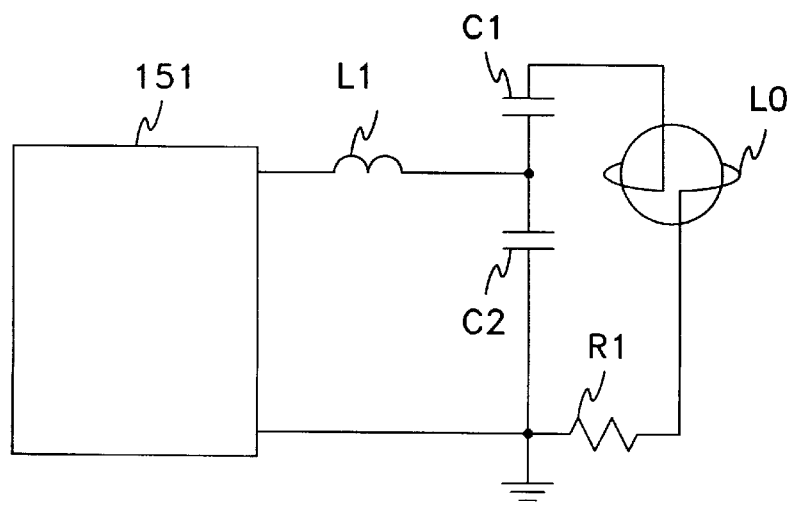
FIG. 68 is a schematic diagram of the fourth example of an electrodeless lamp according to the invention.

FIG. 68 is a schematic diagram of the fourth example of an electrodeless lamp according to the invention. The series resonant circuit includes two capacitors C1 and C2 connected in series with each other and connected in series with a series resonant coil L0. A power source 151 provides a high frequency signal through a small inductance L1 to the junction of C1 and C2. The other side of C2 is grounded. The series resonant coil L0 is also connected to ground through a small resistance R1, which represents the lumped circuit resistance.

During operation, the circuit operates as a series resonant circuit, in which L0 is the series resonant inductor and both C1 and C2 operating together are the series resonant capacitor. In other words, the two capacitors C1 and C2 tied together in series effectively provides one series resonance capacitance C0. The capacitor C0 and the inductor L0 together form the series resonant circuit, which during operation has a ringing current. Power is supplied to the series resonant circuit in the form of a high frequency alternating current. As the power continues to be supplied, the energy moves between the capacitors, C1 and C2, and the coil L0 in an alternating manner. There are inevitable losses in the circuit, represented by R1 in FIG. 68. The energy (power) supplied to the series resonant circuit replenishes the losses, and the series resonant circuit continues to ring.

The lamp is considered to operate at the applied input power frequency. In other words, the system operates at the power source frequency, assuming that the power source frequency is sufficiently close to the actual series resonant circuit frequency. During operation, the bulb plasma reflects a certain amount of resistance back into the circuit and there is some natural resistance (represented collectively by R1). The actual resonant frequency of the series resonant circuit need not exactly match the power source frequency. The resonant frequency is preferably about the same as the power source frequency, taking into account the Q of the circuit with the circuit loaded (i.e. with an operating bulb). Depending on the Q of the circuit, the range of effective operating frequencies may be relatively wide. In other words, the circuit may operate off actual resonance and still operate efficiently (i.e. fairly well matched and fairly well working).

Referring back to FIG. 63, during operation of the fourth example of the invention, high frequency power is brought in through the connector 141 and is supplied through the blade 149 to the series resonant circuit. The blade 149 is a relatively low current carrying element, compared to the rest of the circuit, and has a small inductance (i.e. included in L1 along with the connector lead). The blade 149 feeds energy into the series resonant circuit as the energy is dissipated through the coil 142 (i.e. L0) and other lossy elements in the circuit. For example, some energy is lost in operation, mostly by resistance (i.e. R1). A small amount of energy may also be lost by radiation. The ringing current passes around the coil 142 and through the first capacitor (formed by the plate 142a, dielectric 145a, and the end portion of the blade 149) and the second capacitor (formed by the end portion of the blade 149, the dielectric 145b and the plate 142b). Preferably, the first capacitor (i.e. C1) provides a high voltage and a low capacitance and the second capacitor (i.e. C2) provides a low voltage and high capacitance.

Thus, in the fourth example, the series resonant circuit is confined in space to just around the coil 142 and through the two capacitors. Preferably, the two capacitors are formed between the slot of the coil 142 to keep the circuit elements as small as possible. The two capacitors perform a dual function of (1) tuning the resonant frequency and (2) providing impedance matching for the input power source.

The impedance of the input power source is matched by the impedance of the coupling circuit (including the blade). The impedance is nominally 50 ohms because many commercially available power sources are 50 ohms. However, the circuit may readily be impedance matched to other input sources impedances including, for example, 10 ohms. The impedance matching depends on the ratio of the capacitors C1 and C2, and on L1. Typically, there is no problem in choosing capacitor values which provide both good impedance matching and also the appropriate resonant frequency for the series resonant circuit. The resonant frequency is determined by the equation:

$$f = \frac{1}{2\pi\sqrt{C0 \times L0}} \quad \text{Equation (3)}$$

where $$C0 = \frac{1}{\frac{1}{C1} + \frac{1}{C2}} \quad \text{Equation (4)}$$

With respect to the series resonant circuit, C1 and C2 can have any ratio as long as the reciprocal of the sum of the reciprocals equates to the desired C0. Preferably, as discussed above, C1 and C2 are split so that C1 provides a high voltage and low capacitance and C2 provides a low voltage and a high capacitance. Thus 1/C2 is a small value compared to 1/C1, and, therefore, C2 has only a small or negligible influence on the resonant frequency.

With respect to impedance matching, the ratio of C1 and C2 is the important factor. Thus to select appropriate values for C1 and C2 which provide both the desired resonant frequency and the appropriate impedance, the following procedure may be used:

1) Determine the value of L0 for the specific lamp configuration;

2) Select a value of C0 which provides a series resonant frequency closely matched to the power source frequency (this may be subsequently adjusted slightly to take into account the Q of the loaded, operating circuit);

3) Choose L1 (preferably small) and a ratio of C1 and C2 to provide impedance matching for the signal source (e.g. 50 Ohms);

4) Select a value of C1 close to the value of C0 (typically a small capacitance, for example, on the order of picofarads); and 5) Select a value of C2 which satisfies the ratio for impedance matching (typically a much larger capacitance, for example, on the order of 50 to 100 times larger than C1).

The specific dimensions (i.e. how much of a turn the coil makes, the spacing between the blade and the electrode on one side, and the spacing between the blade and the electrode on the other side) are determined as a function of the dielectric material (i.e. its dielectric constant), the operating frequency, and the resonant frequency of the circuit (which depends on the inductance of the coil). The capacitance depends on the area of the electrode size as well as the dielectric material and its thickness. For a particular lamp configuration, the choices for the capacitor materials and sizes may be readily determined by one of skill in the art. The material of choice is preferably a low-loss tangent material of reasonable dielectric constant. Preferred dielectric materials include, for example, alumina and quartz.

In comparison to the diving board coupling circuit, the blade coupling circuit is well confined in space. While both structures include a series resonant circuit, in the diving board coupling structure high current passes through the enclosure and the diving board itself. This current path produces a series resonant circuit that is larger than for the blade coupling circuit, and therefore less efficient. By reducing the current path, the blade coupling structure can be made about 1.3 to 2 times more efficient than the diving board coupling structure, depending on the particular lamp configuration.

4.1.4 Field Concentrating Conductive Surface

Fifth Example of a High Frequency Inductively Coupled Lamp

As used herein, the fifth example refers generally to an inductively coupled electrodeless lamp according to the invention which utilizes a blade structure, the wedding ring (or split wedding ring) shaped excitation coil, and a "stove pipe" (as hereinafter defined).

The lamp enclosure is important for providing RF shielding. The lamp enclosure may have any reasonable shape which encloses the lamp circuit in a Faraday cage. In general, radiative losses can occur through electromagnetic radiation or conduction through the power cord. A Faraday cage prevents electromagnetic radiation from escaping through the enclosure. Other conventional methods may be used to shield the radiation through the power cord.

Further, the choice of enclosure can improve the efficiency of the lamp. For example, in the absence of an enclosure (e.g. a bottom, but no sides or top) the lamp operates less efficiently than with a suitably sized enclosure (sides included).

Moreover, as the size of the enclosure changes, the relative efficiency of the lamp also changes. The location of the wedding ring shaped coil above the ground plane, and the distance between the coil and the enclosure walls likewise affects the efficiency of the lamp.

Figure 69:
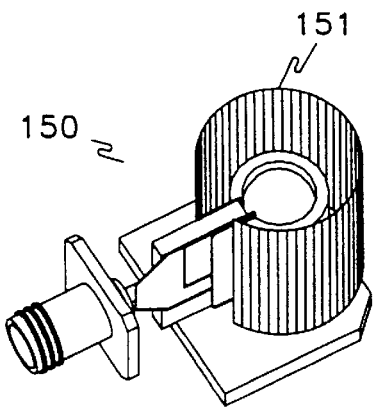
FIG. 69 is a perspective view of selected components of a fifth example of an electrodeless lamp according to the invention.

FIG. 69 is a perspective view of selected components of the fifth example of an electrodeless lamp according to the invention. As shown in FIG. 69, an inductively coupled electrodeless lamp 150 includes a conductive surface (hereinafter referred to as a stove pipe 151). The lamp 150 is otherwise similar to the lamp 140, described above with respect to FIGS. 63–68. As shown in FIG. 69, the stove pipe 151 is a semi-cylindrical conductive surface which is connected (e.g. soldered) to the mounting base of the lamp 150 thereby grounding the stove pipe 151.

The stove pipe 151 is preferably positioned symmetrically around the coil. However, the stove pipe 151 may be asymmetrically positioned with respect to the coil with only a small effect on the efficiency. If the lamp enclosure includes a top, the coil is preferably positioned central to the top and bottom. However, where the enclosure does not include a top, moving the coil closer to the bottom of the enclosure improves efficiency, with a preferred spacing being about one coil diameter from the bottom. The distance from the coil to the stove pipe walls also has an effect on efficiency, with a preferred distance for optimal efficiency also being about one half to one coil diameter.

For example, with a wedding ring shaped coil having an outer diameter of about 7.62 mm (0.3 inch), the height and diameter of the stove pipe 151 is preferably about 22.86 mm (0.9 inch). In enclosures with an open top, the lamp is most efficient if the wedding ring shaped coil was placed about one coil diameter (i.e. 7.62 mm) above the ground plane.

Figure 70:
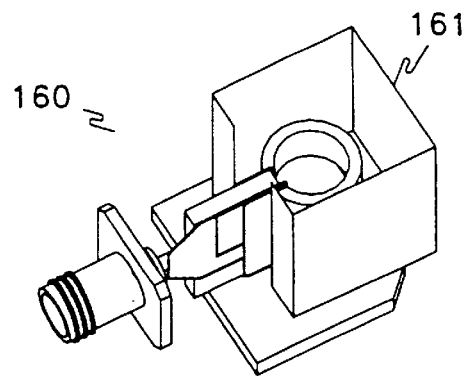
FIG. 70 is a perspective view of an exemplary alternative structure for a stove pipe utilized by the fifth example of the invention.

The stove pipe according to the invention may have any reasonable shape. For example, FIG. 70 is a perspective view of an exemplary alternative structure for a stove pipe utilized by the fifth example of the invention. In FIG. 70, a lamp 160 includes a stove pipe 161 which is generally box-shaped.

Electrical fields will not penetrate the stove pipe. Mirror currents are induced on the stove pipe. The lamp efficiency may be improved because the mirror currents in the stove pipe can act to concentrate the magnetic and electrical fields to the region interior to the bulb. This affects the electrical parameters of the coil and may affect the resonant frequency.

4.1.5 Ceramic Heatsink for Cooling the Excitation Coil

Sixth Example of a High Frequency Inductively Coupled Lamp

As used herein, the sixth example refers generally to an inductively coupled electrodeless lamp according to the invention which utilizes a blade structure, the wedding ring (or split wedding ring) shaped excitation coil, and a heatsink (as hereinafter described).

During operation, the resistance in the coil results in coil power losses and causes the coil temperature to increase. Elevated temperatures increase the coil resistance, thereby commensurately decreasing efficiency. Thus, it is desirable to use a heatsink to cool the coil. Conventional heatsink methods for cooling conventional coils include water cooling, heat pipes, or making the coil massive (e.g. the '903 patent coil). Each of these conventional methods, however, requires making the radial thickness of the coil larger. As discussed above, it is preferable to make the coil radially relatively thin, as described above.

Figure 71:
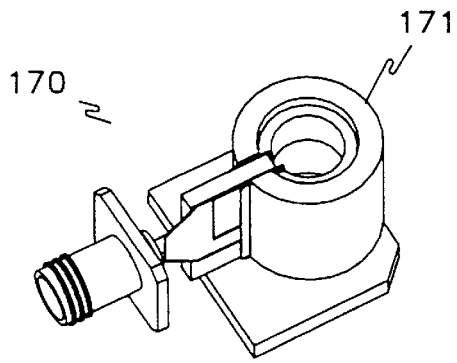
FIG. 71 is a perspective view of selected components of a sixth example of an electrodeless lamp according to the invention.

FIG. 71 is a perspective view of selected components of the sixth example of an electrodeless lamp according to the invention. As shown in FIG. 71, an inductively coupled electrodeless lamp 170 includes a heatsink 171. The heatsink 171 is preferably in intimate thermal contact with the coil. The surface of the heatsink which contacts the coil should be smooth for good thermal contact.

Preferably, the heatsink 171 is made from a material which has a high thermal conductivity, but little or no electrical conductivity. For example, a preferred material for the heatsink 171 includes a high thermal conductivity ceramic, such as, for example, beryllium oxide (BeO). Other materials may also be suitable. For example, boron nitride (BN) has good thermal characteristics and has an additional advantage, in this application, because BN conducts heat laterally (i.e. in a radial direction). Thus, the use of BN may allow for more precise control of heat flow. Aluminum Nitride (AlN) may also be suitable. However, as discussed in detail below, a heatsink made from AlN may degrade the lamp performance at high frequencies.

For example, the addition of a BeO heatsink results in improved lamp operation with respect to both stability and operating range.

Figure 72:
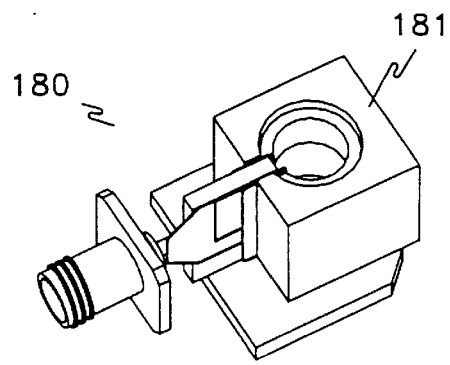
FIG. 72 shows a perspective view of an exemplary alternative structure for a heatsink utilized by the sixth example.

While the heatsink 171 shown in FIG. 71 is generally cylindrically shaped, other shapes are possible. For example, FIG. 72 shows a perspective view of an exemplary alternative structure for a heatsink utilized by the sixth example of an electrodeless lamp according to the invention. In FIG. 72, a lamp 180 includes a heatsink 181 having a box shape. These examples should be considered as illustrative and not limiting.

The choice of material and structure of the heatsink has a significant effect on lamp operation. At high frequency, phase differences around the coil result in a less uniform magnetic field. With the coil surrounded by a dielectric material (i.e. a ceramic), the electrical length of the coil increases, depending on the dielectric constant of the material. As the electrical length of the coil approaches a substantial fraction of the wavelength of the power source, the effects of phase slip become more pronounced.

For example, U.S. Pat. No. 5,498,937 (hereinafter "the '937 patent") discloses an electrodeless lamp which utilizes AlN as a support material for a conventional helical coil. The lamp disclosed in the '937 patent is operating at 13.56 MHz (i.e. low frequency). However, the relatively high dielectric constant of AlN makes it less suitable for high frequency operation.

For example, AlN has a dielectric constant of about 9, and would lengthen the electrical length of the coil by a factor of about 3. On the other hand, BeO, which has thermal characteristics similar to AlN, has a dielectric constant of only about 6, and thus would lengthen the electrical length of the coil to a lesser degree than AlN. The dielectric constant of BN is about 4, although BN's thermal characteristics are less advantageous than either AlN or BeO.

Seventh Example of a High Frequency Inductively Coupled Lamp

As used herein, the seventh example refers generally to an inductively coupled electrodeless lamp according to the invention which utilizes a blade structure, the wedding ring (or split wedding ring) shaped excitation coil, a heatsink, and a stove pipe.

Figure 73:
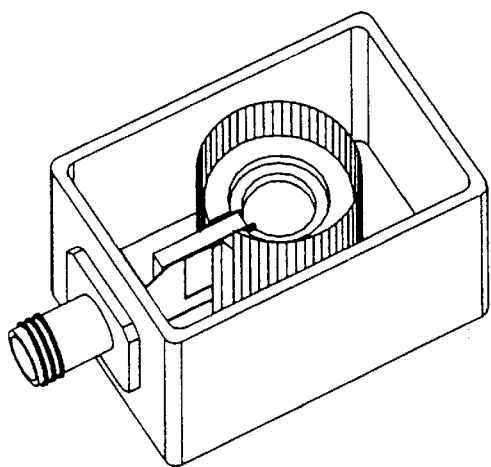
FIG. 73 is a perspective view of a seventh example of an electrodeless lamp according to the invention.
Figure 74:
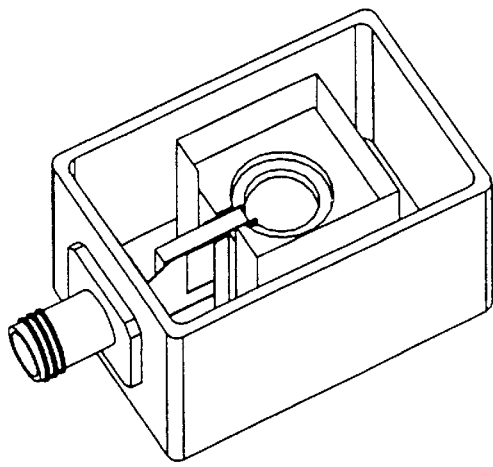
FIG. 74 is a perspective view of an alternative structure of the seventh example of an electrodeless lamp according to the invention.

FIG. 73 is a perspective view of a seventh example of an electrodeless lamp according to the invention. FIG. 74 is a perspective view of an alternative structure of the seventh example of an electrodeless lamp according to the invention. As can be seen in FIGS. 73 and 74, various aspects of the different examples described above may be combined to provide a highly efficient, inductively coupled electrodeless lamp.

The effect of placing the heatsink in the space between the coil and the stove pipe is that the thermal resistance between the coil and the thermal sink may be dramatically reduced. In general, the stovepipe may be fabricated from a metal that is a good thermal conductor, such as copper or aluminum. The large area contact between the coil and the heatsink, and the heatsink and the stovepipe, combined with the relatively short distance through the heatsink, provides for a better thermal contact between the thermal sink and the coil. Consequently, coil temperature is reduced, the concomitant increase in coil resistance is reduced, and overall efficiency is increased.

4.1.6 Lamp with Improved Thermal Characteristics

Eighth Example of a High Frequency Inductively Coupled Lamp

In some applications, the heatsink need not be co-extensive with the coil for the entire circumference of the coil. To reduce phase slip and keep the electrical length of the coil as small as possible, a preferred heatsink arrangement includes a single slab of dielectric material positioned opposite to the coil power feed. Thermal sinking of the coil is further enhanced by the use of substantial input and/or output contacts, preferably made of metal such as, for example, copper.

Figure 75:
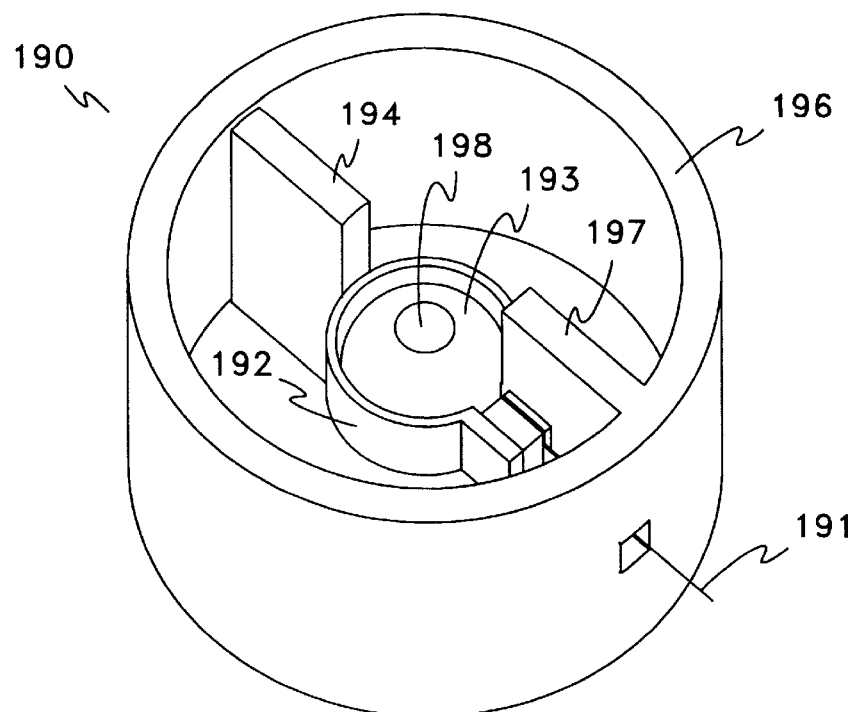
FIG. 75 is a perspective view of an eighth example of an electrodeless lamp according to the invention.
Figure 76:
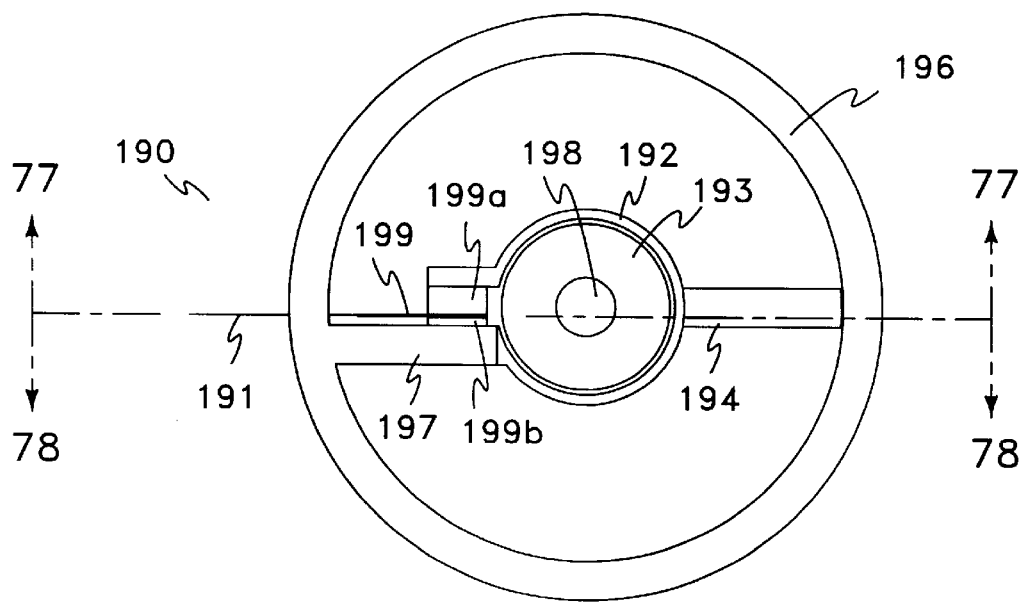
FIG. 76 is a top, schematic view of the eighth example the invention.
Figure 77:
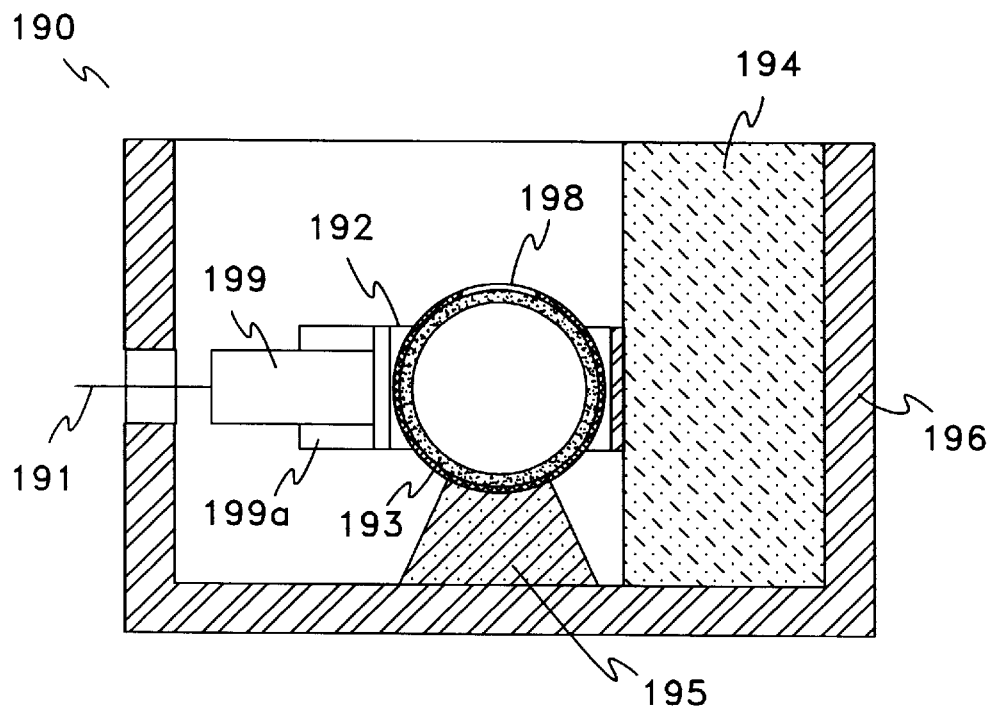
FIG. 77 is a cross sectional view of the eighth example taken along line 77—77 in FIG. 76.
Figure 78:
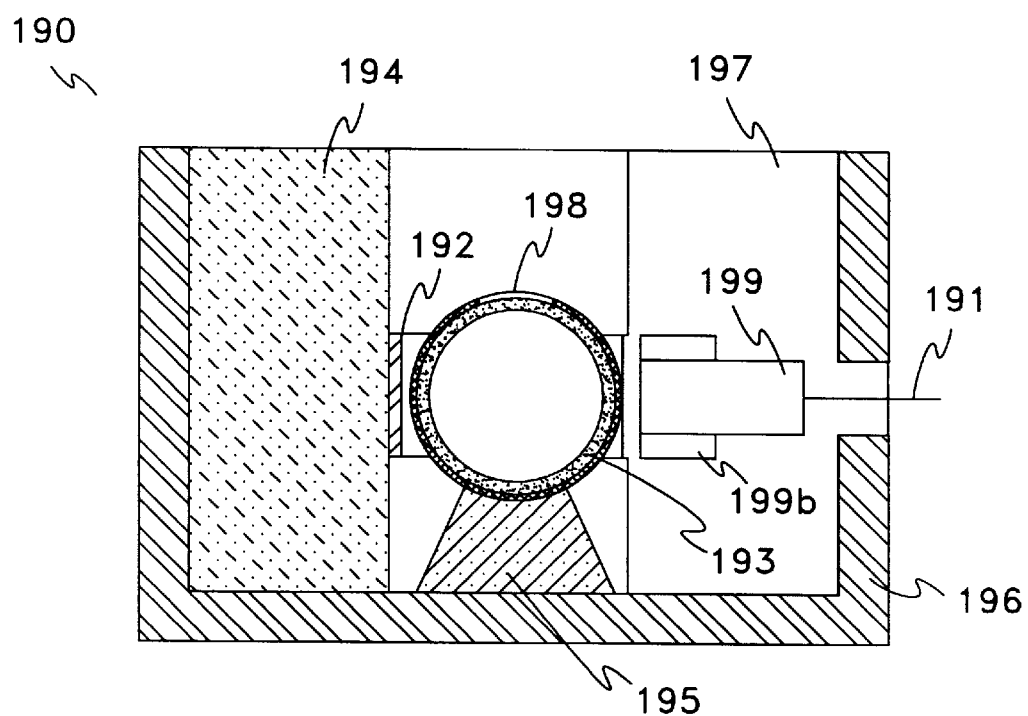
FIG. 78 is a cross sectional view of the eighth example taken along line 78—78 in FIG. 76.

FIG. 75 is a perspective view of an eighth example of an electrodeless lamp according to the invention. FIG. 76 is a top, schematic view of the eighth example the invention. FIG. 77 is a cross sectional view of the eighth example taken along line 77—77 in FIG. 76. FIG. 78 is a cross sectional view of the eighth example taken along line 78—78 in FIG. 76.

Referring to FIGS. 75–78, wherein like elements are indicated by like numerals, an inductively coupled electrodeless lamp 190 includes an enclosure 196 housing a wedding ring shaped coil 192. A bulb 193 is disposed in the center of the coil 192 and supported by a dielectric 195. Power is brought into the lamp 190 by a thin wire lead 191 which is connected to a blade 199. Alternatively, a coaxial connector may be affixed to the housing 196 with power being brought in on the center conductor. A single dielectric 194 is in intimate thermal contact with a portion of the coil 192, at a position opposite to where the power is brought in through lead 191. The lead 191 is connected to a blade 199 inside the housing 196. The blade 199 extends between dielectrics 199a and 199b, thereby forming the capacitors of the series resonant circuit as described in detail above.

To improve thermal conductivity of the coil 192, the radial thickness of the coil is made as thick as possible without significantly reducing efficiency. For example, for a coil having a 5 mm inside radius and a 4 to 6 mm axial height, the coil's radial thickness should be about 0.25 mm to 0.75 mm. To improve thermal sinking of the coil 192, the ground contact is substantial and is connected to the front, top, and bottom of the enclosure. Thermal conduction of the lamp 190 is also improved by minimizing the coil 192 to enclosure 196 spacing, consistent with efficient operation as described above with respect to the stove pipe. For example, for a coil with a 5 mm inside radius, the enclosure 196 should be a right cylinder with the coil at its center. The enclosure 196 should have an outer diameter of about 20–30 mm and a height of about 20 mm.

Preferably, the dielectrics 194 and 195 are thermally conductive ceramics such as, for example, BeO, BN, or AlN. If phase distortion is to be minimized, BN is a preferred material. The bulb size and the coil diameter may be reduced to shorten the electrical length of the coil. Also, the operating frequency may be lowered to reduce the effects of phase slip.

In the eighth example, the bulb 193 is encased by a reflective jacket 198, examples of which are described in section 4.2.2 below and PCT Publication WO 97/45858. The reflective jacket 198 forms an aperture for emitting light therefrom. This aperture lamp configuration provides a high brightness light source. The lamp 190 may be used with or without a light guide in registry with the aperture.

4.1.7 Novel Omega Shaped Excitation Coil

Ninth Example of a High Frequency Inductively Coupled Lamp

Figure 79:
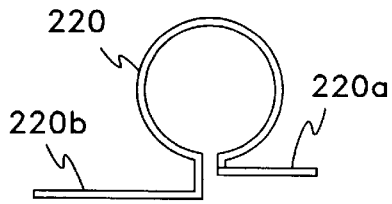
FIGS. 79–80 are schematic and perspective views, respectively, of an alternative structure for the novel excitation coil according to the invention which is utilized in a ninth example of an electrodeless lamp according to the invention.
Figure 80:
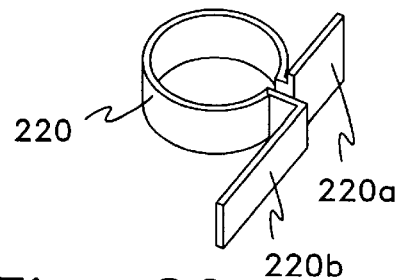
Figure 81:
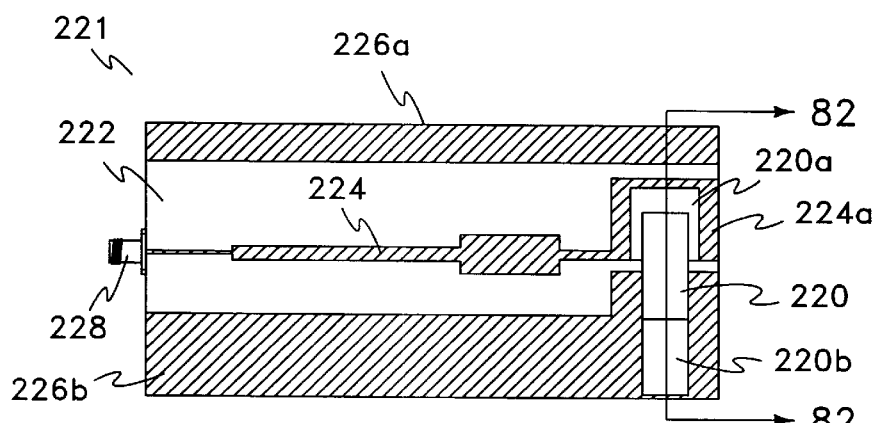
FIG. 81 is a top, schematic view of the ninth example of the invention.
Figure 82:
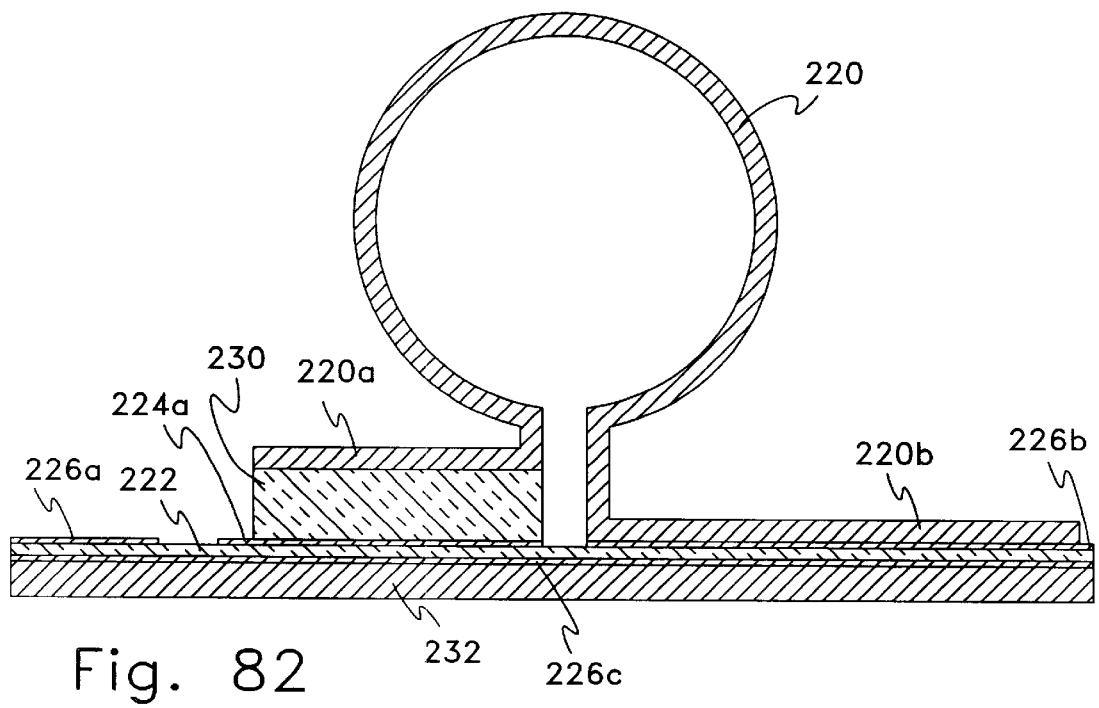
FIG. 82 is a cross sectional view taken along line 82—82 in FIG. 81.

FIGS. 79–80 are schematic and perspective views, respectively, of an alternative structure for the novel excitation coil according to the invention which is utilized in a ninth example of an electrodeless lamp according to the invention. FIG. 81 is a top, schematic view of the ninth example of the invention. FIG. 82 is a cross sectional view taken along line 82—82 in FIG. 81.

As shown in FIGS. 79–80, the novel excitation coil 220 has a cross-sectional shape generally corresponding to the upper-case Greek letter omega ($\Omega$). The "omega" coil 220 has a generally wedding ring shaped excitation portion, but the leads 220a and 220b are bent tangential to the excitation portion and parallel to each other. As can be seen in FIG. 79, the omega coil 220 may include leads 220a and 220b that are not symmetrical with each other.

FIGS. 81–82 show the omega coil 220 mounted on a printed circuit board 221. The printed circuit board 221 is a double-sided board with a dielectric layer 222 and conductive areas 224 and 226a–226c disposed thereon. The manufacture of such printed circuit boards is well known. Conductive area 226c covers one entire side of the printed circuit board 221 and is referred to as a ground plane. Conductive areas 226a and 226b are electrically connected to the ground plane 226c (e.g. by plated through holes or other types of electrical connection). Conductive area 224 forms a stripline impedance matching circuit with a portion 224a essentially corresponding to the blade structure as described in preceding examples.

As can best be seen in FIG. 82, a first capacitor is formed by lead 220a, dielectric 230, and the blade portion 224a. A second capacitor is formed between the blade portion 224a, the dielectric 222 of the printed circuit board 221, and the ground plane 226c. The printed circuit board 221 is mounted on a metal plate 232. The ground plane 226c is in electrical contact with the metal plate 232. The metal plate 232 adds strength to the assembly and provides a mounting location for a coaxial connector 228. The coaxial connector 228 has a center conductor which is connected (e.g. soldered) to the stripline 224. The outer case of the coaxial connector 228 is grounded to the metal plate 232.

Compared to the preceding examples, the omega coil 220 simplifies the manufacturing process. For example, the omega coil 220 is directly mounted on a printed circuit board in a manner similar to a surface mount component. Moreover, the omega coil 220 takes advantage of the dielectric layer 222 of the printed circuit board 221, thus requiring only a single additional dielectric 230 during assembly. The dielectric 230 can be assembled on the printed circuit board 221 using conventional automated assembly techniques.

4.1.8 Integrated Lamp Head

Tenth Example of a High Frequency Inductively Coupled Lamp

Figure 83:
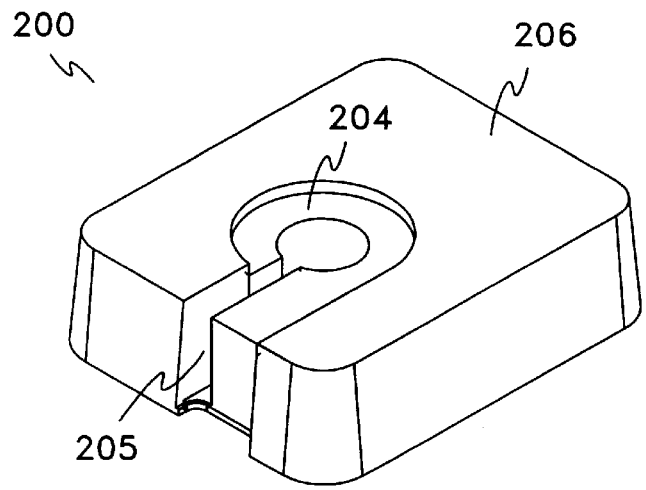
FIG. 83 is a perspective view of an integrated lamp head according to a tenth example of an electrodeless lamp according to the invention.
Figure 84:
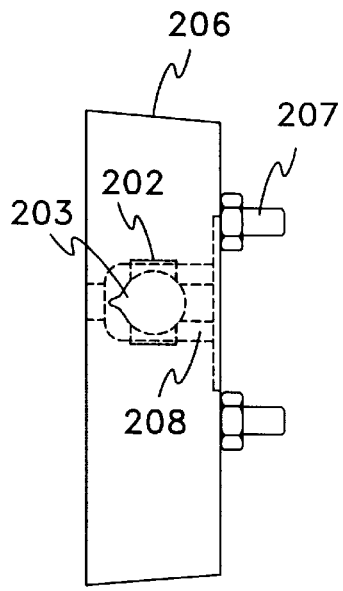
FIGS. 84–85 are side and top schematic views, respectively, of the tenth example.
Figure 85:
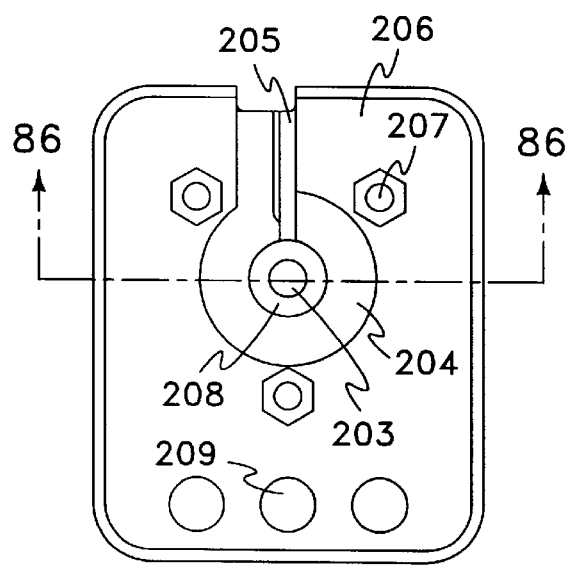
Figure 86:
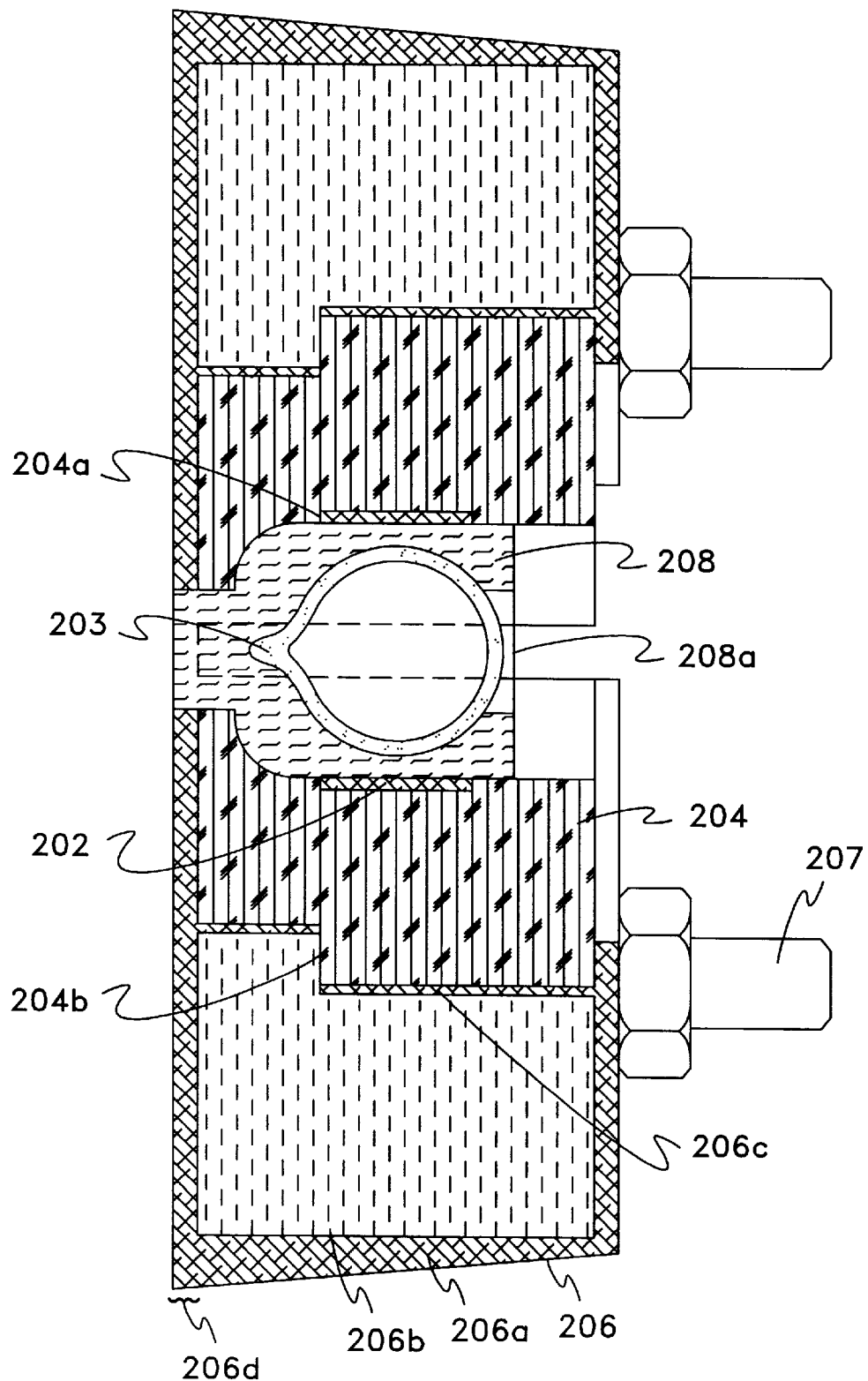
FIG. 86 is a cross sectional view of the tenth example taken along line 86—86 in FIG. 85.

FIG. 83 is a perspective view of an integrated lamp head for a tenth example of an electrodeless lamp according to the invention. FIGS. 84–85 are side and top schematic views, respectively, of the tenth example. FIG. 86 is a cross sectional view of the tenth example taken along line 86—86 in FIG. 85.

As shown in FIG. 83, an integrated lamp head 200 includes an enclosure 206 encasing a ceramic insert 204.

Overall dimensions for the lamp head 200 are approximately 40 mm wide×50 mm long×15 mm deep. As can best be seen in FIG. 86, the enclosure 206 includes aluminum (Al) 206a and aluminum silicon carbide (AlSiC) 206b. The integrated lamp head 200 is a monolithic structure which comprises a metal matrix composite holding an electrically insulating ceramic. The integrated lamp head 200 may be manufactured, for example, by the fabrication methods described in U.S. Pat. Nos. 5,570,502 (entitled "Fabricating Metal Matrix Composites Containing Electrical Insulators"), 5,259,436 (entitled "Fabrication of Metal Matrix Composites by Vacuum Die Casting"), 5,047,182 (entitled "Complex Ceramic and Metallic Shapes by Low Pressure Forming and Sublimative Drying"), 5,047,181 (entitled "Forming of Complex High Performance Ceramic and Metallic Shapes"), 4,904,411 (entitled "Highly loaded, Pourable Suspensions of Particulate Materials"), 4,882,304 (entitled "Liquefaction of Highly Loaded Composite Systems"), and 4,816,182 (entitled "Liquefaction of Highly Loaded Particulate Suspensions"), each of which is herein incorporated by reference in its entirety.

In general terms, the integrated lamp head 200 is fabricated according to the following process. A silicon carbide (SiC) pre-form and a boron nitride (BN) insert 204 are appropriately positioned in a die cavity. Liquid phase aluminum (or aluminum alloy) is forced into the die cavity (e.g. by vacuum pressure), wherein the aluminum infiltrates the porous SiC pre-form and fills any otherwise open spaces in the die cavity. The liquid phase aluminum is solidified, thereby forming a die cast structure having metal matrix composite around and through the porous SiC pre-form and BN insert 204. Aluminum solidifies in a gap between the BN insert 204 and the AlSiC 206b, thereby forming a stove pipe 206c as described above with respect to the fifth example.

The die cast structure is then machined to form the lamp head 200. For example, the BN insert 204 is formed with a channel 204a corresponding to the outer diameter and axial height of the wedding ring shaped excitation coil 202. During the fabrication process, the aluminum fills the channel and the center of the BN insert 204. Subsequently, the center of the BN insert 204 is drilled out with a drill bit having a diameter corresponding to the inside diameter of the coil 202, thereby forming the wedding ring shaped coil 202. The die cavity may include a pin which occupies a substantial portion of the center of the BN insert during the infiltration process so as to limit the amount of aluminum which is later drilled out.

Similarly, a slot 205 is machined in the die cast structure to form the leads to the coil 202. The width of the machined slot provides the appropriate space for a blade and associated dielectrics to be subsequently inserted to form the series resonant circuit. Other machining may be done as may be desired for particular applications. For example, the lamp head 200 includes holes 209 and is machined to receive mounting hardware 207.

As shown in FIGS. 84–86, a bulb 203 is encased in a reflective jacket 208 which forms an aperture 208a. The bulb 203 is approximately centered axially and radially with respect to the coil 202. The bulb 203 and jacket 208 may be manufactured, for example, as described in section 4.2 below. In general terms, the reflective jacket 208 is formed by positioning the bulb 203 in the lamp head 200 and pouring a liquid solution of micro and nano particulate alumina and silica around the bulb 203. The solution hardens when it dries and the aperture is subsequently formed by removing some of the hardened reflective material. Alternatively, the bulb 203 may be separately encased with the reflective jacket 208 and subsequently inserted in the lamp head 200 as a unit.

In preferred examples, a bottom portion 206d of the enclosure 206 is removed (e.g. by milling or otherwise machining the die cast structure). The BN insert 204 forms a shoulder 204b with the AlSiC 206b which vertically registers the BN insert 204 during the infiltration process and secures the BN insert 204 if the bottom portion 206d is removed.

The integrated lamp head 200 provides many advantages. For example, the lamp head 200 provides a mechanically rigid physical structure to contain and protect the bulb. The lamp head 200 provides a package which is readily adapted for attachment to external optical elements. The integrated lamp head 200 also provides advantages in thermal management. The lamp head 200 provides intimate thermal contact between the coil 202 and the heatsink (e.g., BN insert 204) and between the heatsink and the lamp body (e.g., enclosure 206). Preferably, the coefficient of expansion of the coil, the heatsink, and the lamp body are matched so that intimate thermal contact is maintained during thermal cycling (e.g. lamp start up, steady state operation, and lamp shut down). Preferably, the heatsink material also provides a coefficient of thermal conduction which is suitable for operating the lamp at the desired temperature. In the ninth example, the coefficient of expansion of the BN insert 204 is suitably matched with the coefficient of expansion of the AlSiC 206a portion of the enclosure 206. With these materials, the lamp head 200 effectively conducts heat away from the bulb and also conducts heat away from the inductive coupling to maintain high RF efficiency of the coupling.

The integrated lamp head 200 advantageously further provides a conductive screen around the bulb and coupling circuit to reduce the radiation of RF energy to the external environment. Moreover, the lamp head 200 provides the above-described advantages in an integrated package that may be manufactured cost effectively in volume.

FIGS. 87–88 are top and side schematic views, respectively, of a lamp assembly utilizing the tenth example of the invention. The lamp head enclosure 206 is mounted on a base 210. A bracket 212 is connected to one end of the base 210 and supports a coaxial connector 214. A center conductor of the coaxial connector 214 is electrically connected to a blade 216 which extends in between the leads of the coil 202. As described above with respect to the fourth example, a thin dielectric is positioned between the blade 216 and the grounded lead of the coil 202 and a relatively thicker dielectric is positioned between the blade 216 and the other lead of the coil 202.

The base 210 includes a channel 218 which accommodates a starter wire. For bulbs which are difficult to start, an insulated wire may be routed through the channel 218 so that an exposed end of the wire is positioned proximate to the bottom of the bulb. A high potential may be applied between the coil and the starter wire to generate a sufficient electric field strength to ionize the gas inside the bulb and thereby initiate the breakdown process. While a channel for a starter wire has been provided in the base 210, for most lamp configurations the use of a starter wire is not required.

Integrated lamp heads are built with coils having inner diameters ranging from about 7 mm up to about 8.5 mm, radial thicknesses ranging from about 0.15 mm up to about 0.8 mm with a preferred radial thickness being about 0.5 mm, and axial heights ranging from about 3 mm to 5 mm with about ½ the inner diameter being a preferred axial height. Bulbs are used with the integrated lamp heads typically having an outer diameter (O.D.) of about 7 mm and an inner diameter (I.D.) of about 6 mm. The bulbs are typically spherical, although some optionally have a flattened top and some are optionally pill box shaped.

While the examples of an integrated lamp head described herein relate generally to inductively coupled lamps, the integrated lamp head according to the invention may be readily adapted to provide capacitively coupled lamps, travelling wave launchers, and even microwave lamps. Other excitation structures may be integrally formed on the interior surface of the insulating ceramic to provide differently configured lamps. For example, opposed electrodes may be formed to provide a capacitively coupled lamp. Other modifications will be apparent to those skilled in the art.

4.1.8.1 Omega Coil

Eleventh Example of a High Frequency Inductively Coupled Lamp

Figure 92:
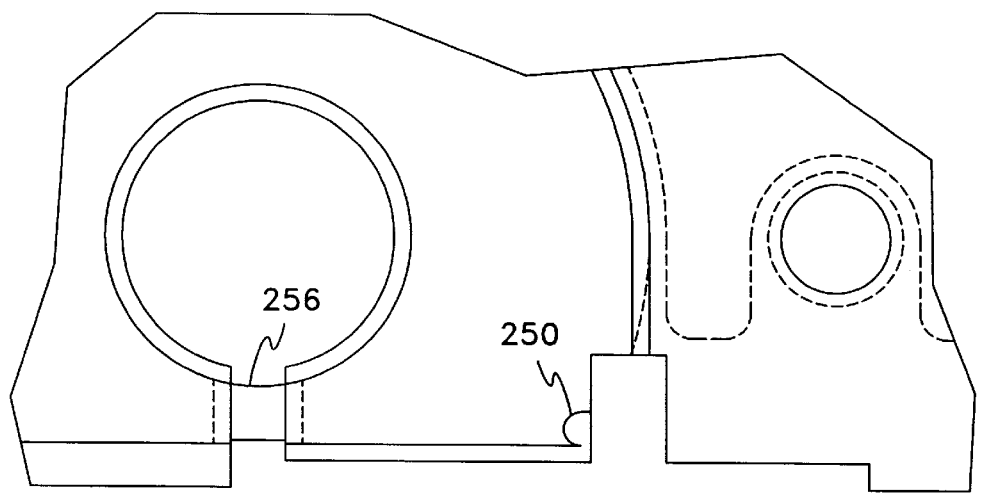
FIG. 92 is an enlarged, fragmented view of the circled area 92 in FIG. 91.
Figure 93:
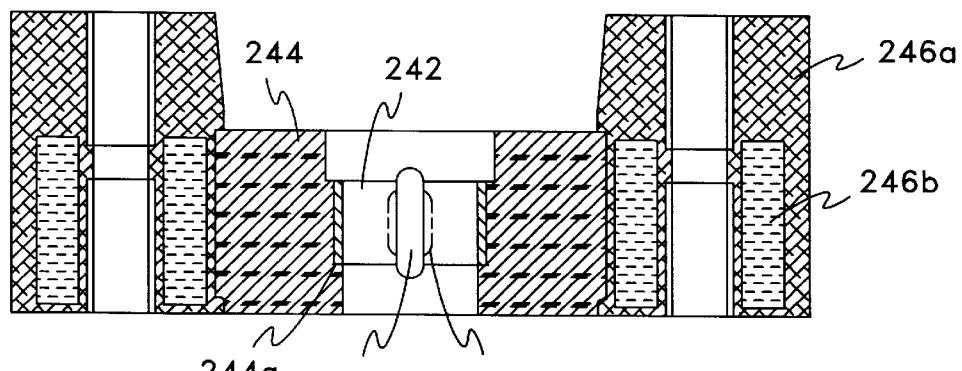
FIG. 93 is a cross sectional view of the eleventh example taken along line 93—93 in FIG. 91.
Figure 94:
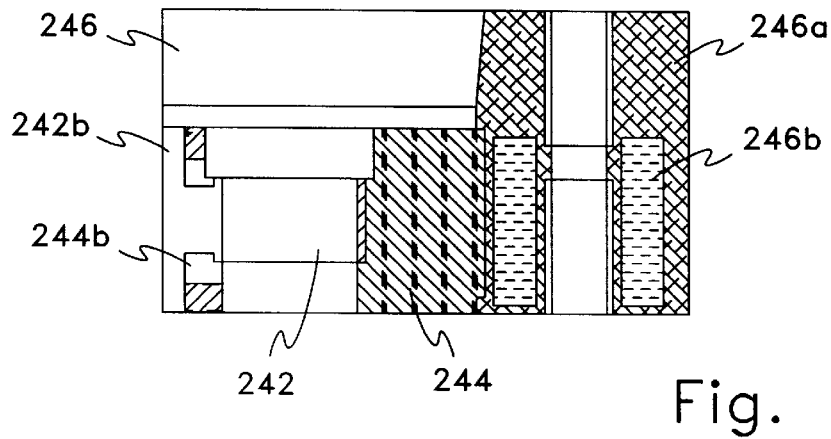
FIG. 94 is a cross sectional view of the eleventh example taken along line 94—94 in FIG. 91.

FIG. 89 is a perspective view of an integrated lamp head for a eleventh example of an electrodeless lamp according to the invention. FIGS. 90–91 are front and top schematic views, respectively, of the eleventh example. FIG. 92 is an enlarged, fragmented view of the circled area 92 in FIG. 91. FIG. 93 is a cross sectional view of the eleventh example taken along line 93—93 in FIG. 91. FIG. 94 is a cross sectional view of the eleventh example taken along line 94—94 in FIG. 91.

The eleventh example utilizes an omega coil 242, but otherwise is similar in construction to the tenth example. An integrated lamp head 240 includes an enclosure 246 encasing a ceramic insert 244. A slot 244b separates the leads 242a and 242b of the omega coil 242. Overall dimensions for the lamp head 240 are approximately 31 mm wide×47 mm long×18 mm deep. From the center of the ceramic insert 244, the enclosure 246 is substantially semi-circular with a radius of about 23.5 mm. The main body of the enclosure 246 is about 11 mm deep, with an optional protruding ridge 246c about 7 mm deep. The ridge 246c is provided primarily for application interface purposes. As discussed above with respect to the tenth example, and as can best be seen in FIGS. 93 and 94, the enclosure 246 includes aluminum (Al) 246a and aluminum silicon carbide (AlSiC) 246b and encases a BN insert 244.

The omega coil 242 is formed according to the following process. The BN insert 244 is pre-formed with a shoulder 244a corresponding to the outer diameter and lower extent of the omega coil 242. The BN insert 244 further includes an opening 244c positioned centrally along the flat face of the BN insert 244. During the fabrication process, the aluminum fills the center of the BN insert 244 and the opening 244c. Subsequently, the center of the BN insert 244 is drilled out with a drill bit having a diameter corresponding to the inside diameter of the omega coil 242. The BN insert 244 is then counter-bored with a drill bit which has a diameter slightly larger than the outside diameter of the omega coil 242 to a depth corresponding to the desired height of the omega coil 242. As can best be seen in FIG. 93, the width of the machined slot 244b is less than the width of the opening 244c while the height of the machined slot 244b is taller than the height of the opening 244c. Thus, machining the slot 244b in the die cast structure forms the slot in the wedding ring shaped coil and forms the connection from the leads 242a and 242b to the coil 242.

FIG. 92 illustrates a feature of the invention referred to as a locking pin 250. The BN insert 244 is formed with a recess which fills with aluminum and solidifies during the fabrication process. The aluminum solidified in the recess forms a locking pin 250 which helps prevent the lead 242a from separating from the BN insert 244.

Preferably, the integrated lamp head 240 is used with a bulb encased in a reflective jacket and with bulb fills as described above with respect to the tenth example.

4.1.8.2 Pre-formed Coil Connection for Lamp Head

In the above-described eleventh example, after infiltration of the aluminum and subsequent cooling, the coil connection is accomplished by milling a slot 244b through the BN insert to make blade-type connections on each side of the wedding ring shaped coil and isolate the high voltage plate from the ground plate. This leaves a relatively thin section 256 of the BN insert (see FIG. 92).

Figure 95:
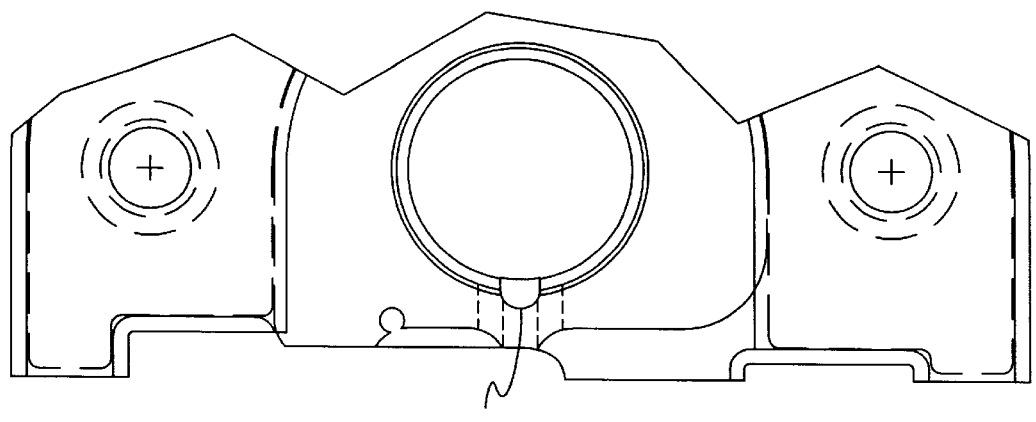
FIG. 95 is an enlarged, fragmented view of the lamp head.
Figure 96:
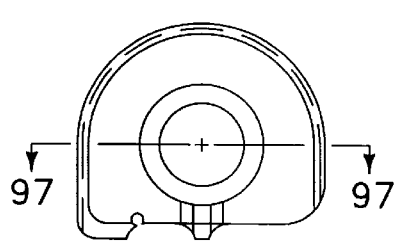
FIG. 96 is a schematic view of a BN insert with pre-formed coil connections.
Figure 97:
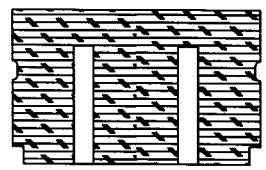
FIG. 97 is a cross sectional view of the BN insert taken along line 97—97 in FIG. 96.
Figure 98:
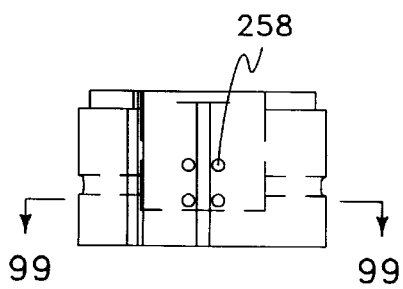
FIG. 98 is a schematic view of the BN insert showing the location of pre-drilled holes used to form a peg-type connection to the coil.
Figure 99:
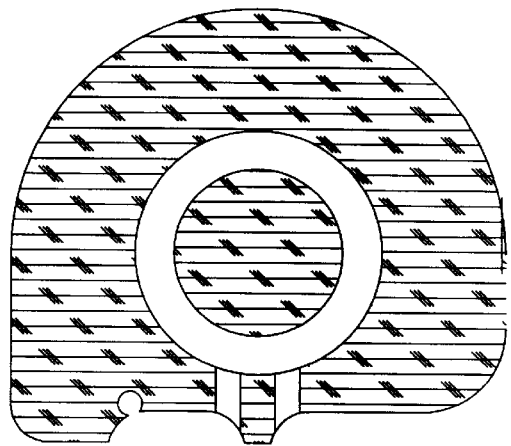
FIG. 99 is a cross sectional view taken along line 99—99 in FIG. 98.

According to the present aspect of the invention, the BN insert is made relatively stronger in the area of the coil connection by pre-forming the coil connection in the BN insert to avoid subsequent milling. For example, peg-type connections to the coil may be utilized instead of blade-type connections. FIG. 95 is an enlarged, fragmented view of the lamp head. FIG. 96 is a schematic view of a BN insert with pre-formed coil connections. FIG. 97 is a cross sectional view of the BN insert taken along line 97—97 in FIG. 96. FIG. 98 is a schematic view of the BN insert showing the location of pre-drilled holes used to form a peg-type connection to the coil. FIG. 99 is a cross sectional view taken along line 99—99 in FIG. 98. As shown in FIGS. 95–99, four holes 258 are drilled in the BN insert prior to infiltration with the aluminum metal. Once the casting process is complete, the wedding ring shaped coil is separated by drilling a hole partially through the BN insert in an area 260 (see FIG. 95). Thus, the relatively thin area is eliminated and the BN insert is made relatively stronger. This approach also improves manufacturability because less machining is required after the casting process is complete.

As noted in section 4.1.2 in connection with the split coil examples, using two pegs instead of a single blade does not significantly affect circuit performance because most of the current spreads to the outside of the conductive elements.

Figure 100:
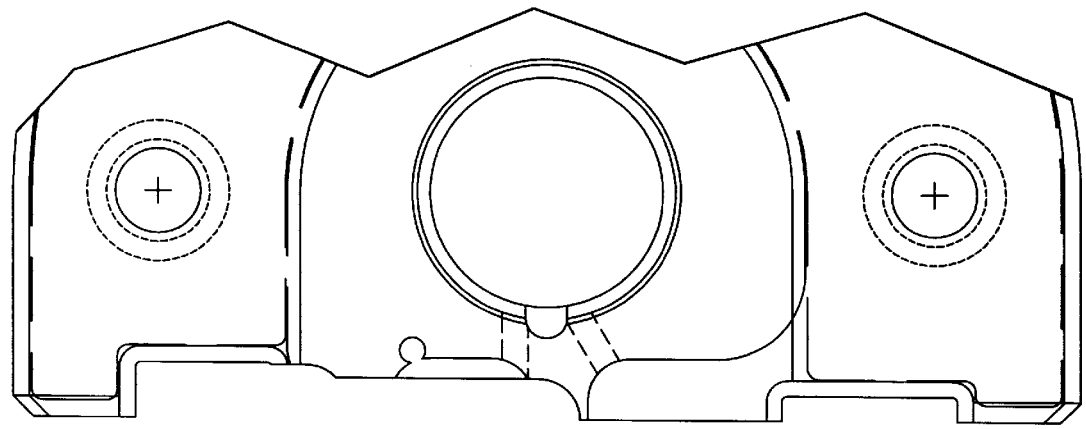
FIGS. 100 and 101 are enlarged, fragmented views of the lamp head showing alternative arrangements for the pegs.
Figure 101:
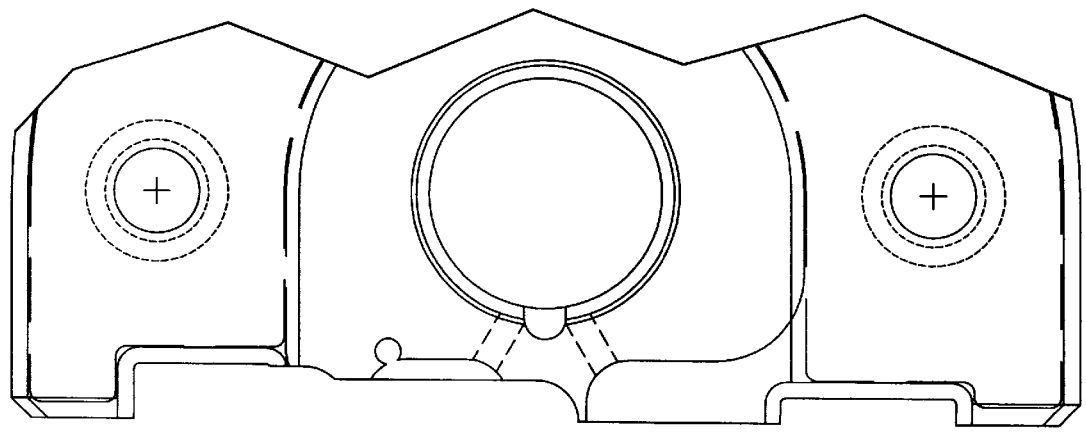
Figure 102:
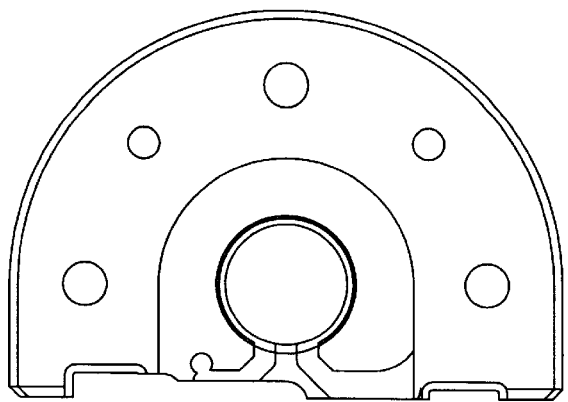
FIGS. 102–106 are schematic and perspective views, respectively, of an alternative lamp head and BN insert which is pre-formed to provide blade-type connections.
Figure 103:
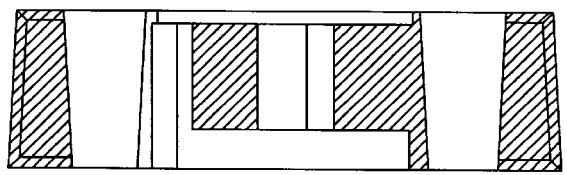
Figure 105:
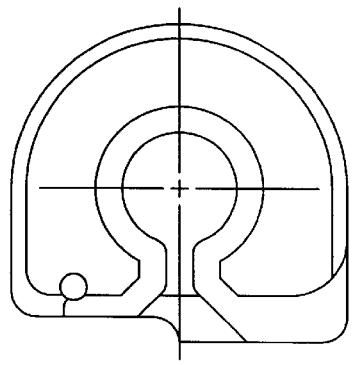
Figure 104:
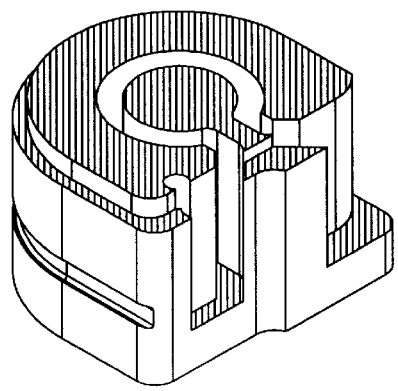
Figure 106:
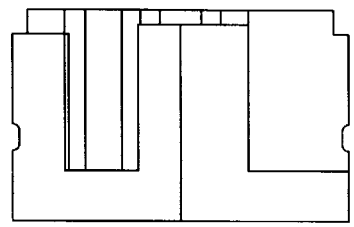

FIGS. 100 and 101 are enlarged, fragmented views of the lamp head showing alternative arrangements for the pegs. As shown in FIGS. 100 and 101, angled pegs may also be utilized for one or both of the connections. Using angled pegs allows greater separation between the high voltage plate and the various electrically grounded surfaces of the lamp head to further reduce the possibility of arcing therebetween. Also, while the illustrated examples utilize round pegs, any suitable shape may be used (e.g. square, rectangular, elliptical).

Also, the BN insert may alternatively be pre-formed with blade-type connections, as shown in FIGS. 102–106. Because the later milling step is avoided, the BN insert is still relatively stronger as compared to the example shown in FIGS. 89–94.

4.1.8.3 Tunable High Voltage Capacitor

FIGS. 107 and 108 are schematic views of a lamp head/power feed assembly. A lamp head 325 is mounted on a power feed assembly 327. A capacitor assembly 329 is positioned between a high voltage plate of the lamp head 325 and a power feed pad of the power feed assembly 327. FIG. 109 is an enlarged, fragmented view of the area 109 in FIG. 107, showing the relative positioning of the capacitor assembly 329 with respect to the lamp head 325 and the power feed assembly 327.

Further details regarding the construction of the lamp head 325, the power feed assembly 327 and the lamp 321 are discussed in sections 4.1.8.1 and 4.1.8.3 above and section 4.4.3 below.

FIGS. 110 and 111 are schematic views of opposite sides of the capacitor assembly 329. Conductive pads 331 and 333 are disposed on opposite sides of a dielectric material 335. For example, capacitor assembly 329 may comprise a printed circuit board having a dielectric material made of a Teflon® composite and clad with copper plating for the conductive pads. The thickness of the dielectric material 335 and the size of the conductive pads 331, 333 are selected to provide a desired capacitance value.

A present aspect of the invention is directed to various improvements for the capacitor assembly.

The lamp 321 is an RF-powered, inductively coupled electrodeless lamp which utilizes a capacitor stack as part of a series resonant circuit for coupling the RF power to the lamp fill. The capacitor is subject to high voltages during lamp operation and is preferably designed to minimize arcing.

A problem with the capacitor assembly 329 shown in FIGS. 110 and 111 is that the capacitance value is fixed and cannot be easily adjusted. It is sometimes desirable to tune the final lamp assembly to match a preferred operating frequency.

It is an object of one aspect of a present aspect of the invention to provide an adjustable high voltage capacitor. It is a further object of the present invention to provide an adjustable high voltage capacitor which is designed to minimize arcing.

First Example of a Tunable High Voltage Capacitor

Figure 112:
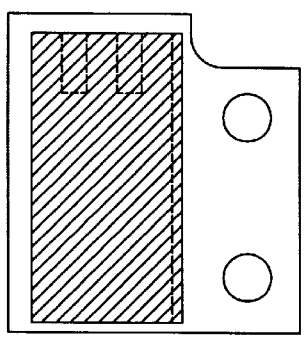
FIGS. 112 and 113 are schematic views of opposite sides of a first alternative capacitor assembly according to the invention.
Figure 113:
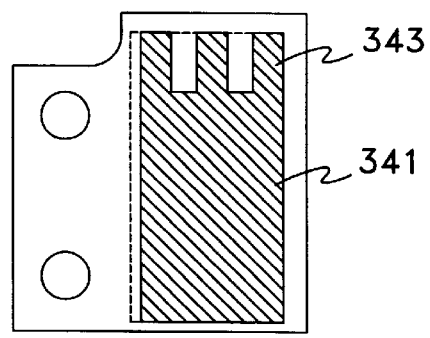

FIGS. 112 and 113 are schematic views of opposite sides of a first example of a capacitor assembly according to the invention. One side of the assembly is provided with a conductive pad 341 having a plurality of protruding fingers 343. The capacitance value of the assembly may be readily adjusted by removing some of the conductive material from the fingers 343. For example, a razor blade may be used to scrape the conductive material off of the dielectric material. Removing the conductive material lowers the capacitance value.

Second Example of a Tunable High Voltage Capacitor

Figure 114:
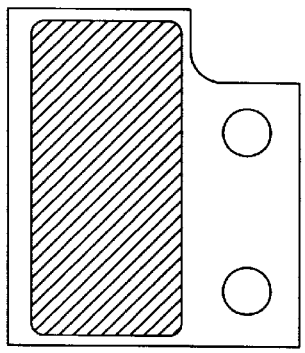
FIGS. 114 and 115 are schematic views of opposite sides of a second alternative capacitor assembly according to the invention.
Figure 115:
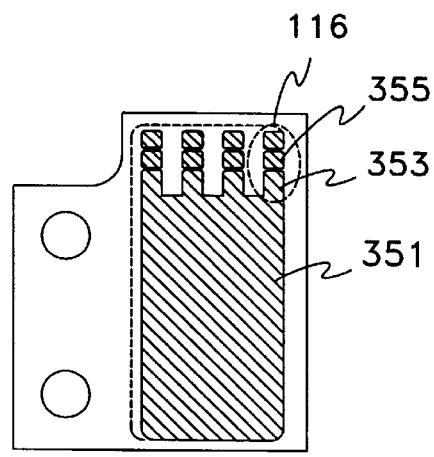
Figure 116:
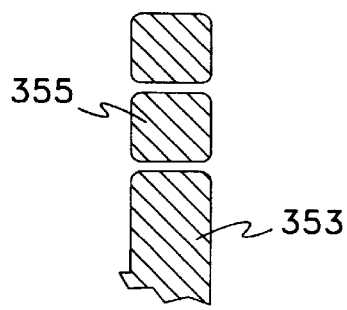
FIG. 116 is an enlarged, fragmented view of the area 116 in FIG. 115.

FIGS. 114 and 115 are schematic views of opposite sides of a second example of a capacitor assembly according to the invention. One side of the assembly is provided with a conductive pad 351 having a plurality of protruding fingers 353 and a plurality of isolated conductive areas 355 in close proximity to the fingers 353. FIG. 116 is an enlarged, fragmented view of the area 116 in FIG. 115. The capacitance value of the assembly may be readily adjusted by adding conductive material between the fingers 353 and the isolated areas 355. For example, a solder bridge may be formed across the small gaps between the fingers 353 and the isolated areas 355. Likewise, conductive material may be added between additional isolated areas to adjust the capacitance value. Adding conductive material increases the capacitance value. As compared to the first example, the second example ameliorates arcing from metal slices associated with the cutting technique.

Third Example of a Tunable High Voltage Capacitor

Figure 117:
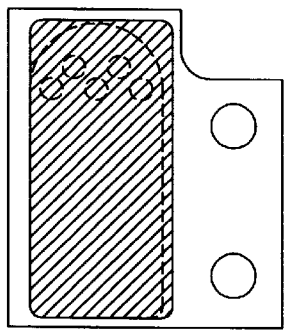
FIGS. 117 and 118 are schematic views of opposite sides of a third alternative capacitor assembly according to the invention.
Figure 118:
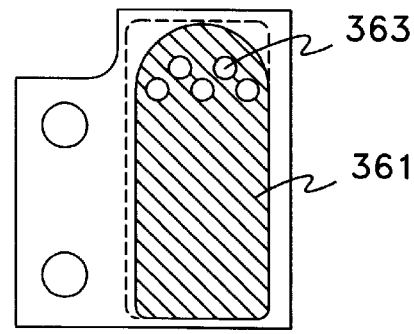

FIGS. 117 and 118 are schematic views of opposite sides of a third example of a capacitor assembly according to the invention. One side of the assembly is provided with a conductive pad 361 which defines a plurality of voids 363 in the conductive pad 361. The voids 363 extend through the conductive pad 361 to the surface of the dielectric material. The capacitance value of the assembly may be readily adjusted by adding conductive material or dielectric material to cover the voids 363. For example, a conductive plate may be soldered across one or more of the voids 363. The conductive plate may be disc-shaped, for example. Alternatively, a conductive film or a dielectric material may be adhesively bonded over one or more of the voids 363.

As compared to the first example, the conductive pad 361 has smoothly rounded corners at one end and a hemispherical shape at the other end. By maintaining a simple peripheral shape (e.g. omitting the protruding conductive areas), the third example reduces voltage stresses caused by the more complex peripheral shapes of the first and second examples. Advantageously, the third example suppresses arcing to a greater extent than either the first or second examples.

Figure 119:
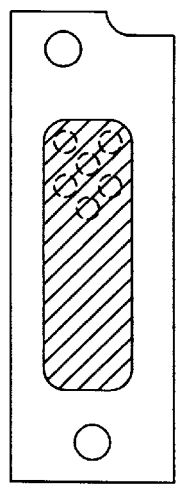
FIGS. 119 and 120 are schematic views of opposite sides of an alternative configuration for a capacitor assembly of the third example.
Figure 120:
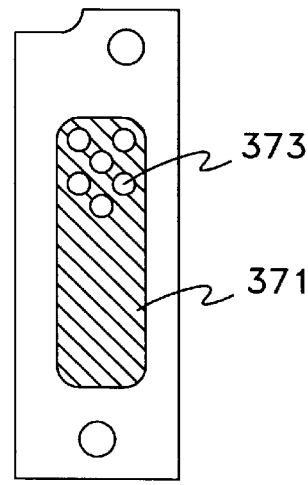
Figure 121:
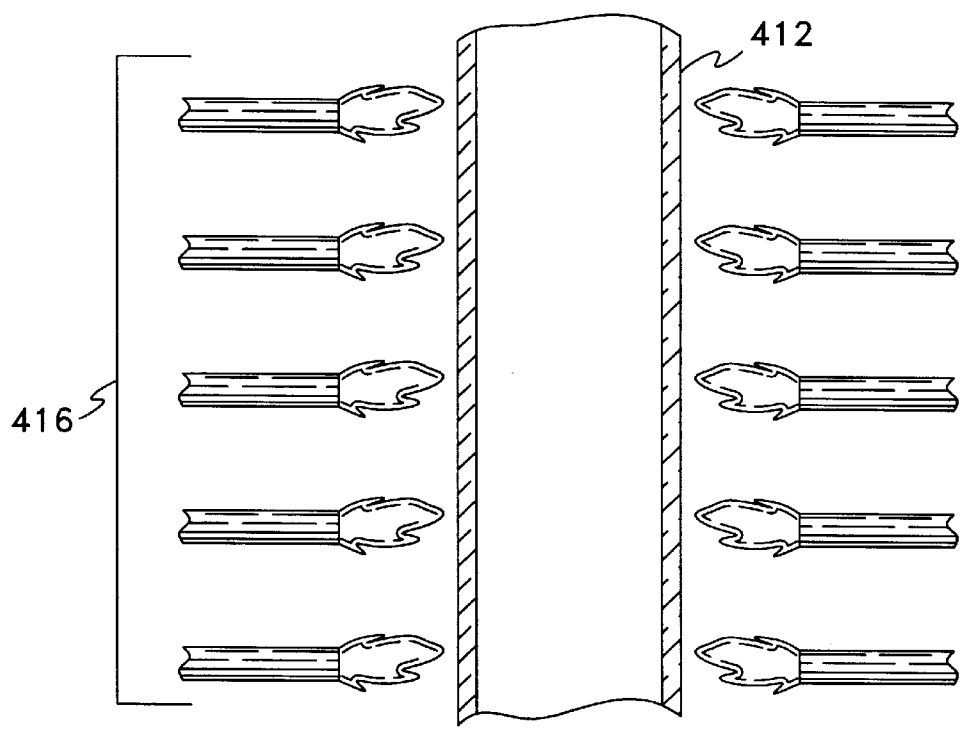
FIG. 121 is a schematic diagram of a bulb blank being heated.
Figure 122:
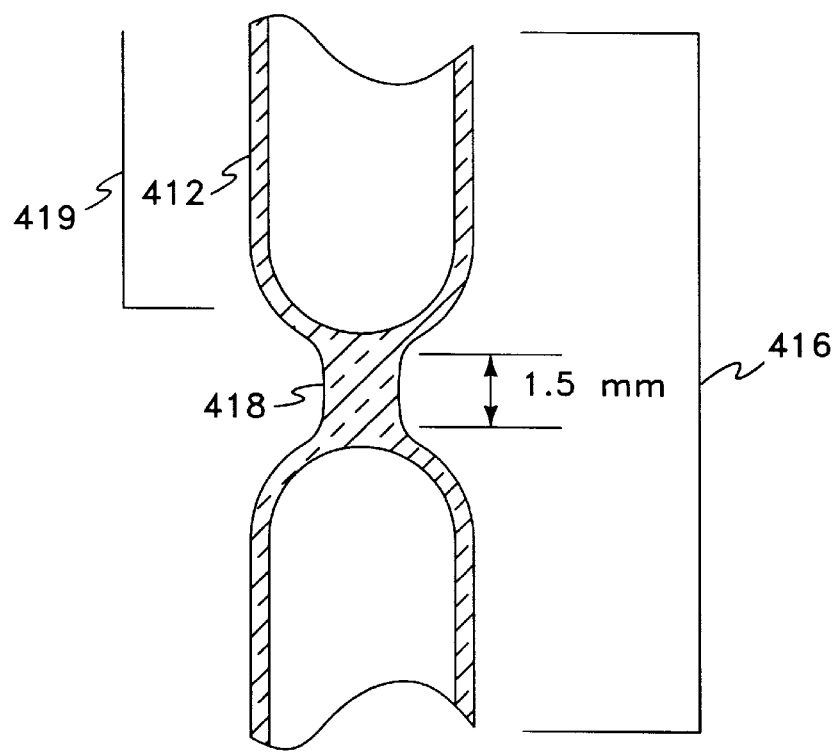
FIG. 122 is a schematic diagram of the bulb blank with a pinched off section.

FIGS. 119 and 120 are schematic views of opposite sides of an alternative configuration for a capacitor assembly of the third example. This preferred configuration includes a conductive pad 371 which is substantially rectangular with smoothly rounded corners. The conductive pad 371 defines a plurality of voids 373.

While the invention has been described with respect to specific examples, variations will occur to those skilled in the art. For example, the number of fingers, isolated areas, and/or voids may be increased or decreased depending on the amount of adjustment desired. Also, a conductive pad may include a combination of fingers, isolated areas, and/or voids. The size and shape and the conductive pads, fingers, isolated areas, and/or voids may be configured to suit the particular application.

4.1.9 Exemplary Fills

Bulb fills are typically mercury free, and include metal halide(s) and a noble gas. Suitable metal halides include indium bromide (InBr), cesium bromide (CsBr), praseodymium tri-bromide (PrBr$_3$), and praseodymium tri-chloride (PrCl$_3$). Exemplary fills for a 7 mm O.D.×6 mm I.D. spherical bulb are as follows:

TABLE 4

| Fill 1 | Fill 2 | Fill 3 |
| --- | --- | --- |
| 0.08 mg InBr | 0.02 mg PrCl$_3$ | 0.02 mg Se |
| 0.02 mg CsBr | 0.04 mg InBr | 0.02 mg CsBr |
| 50 Torr Kr | 500 Torr Xe | 50 Torr Kr |

Alternatively, a small amount of mercury (or mercury halide) may be added to the fill. For example, for a 7 mm O.D.×6 mm I.D. spherical bulb, about 0.1 to 0.5 mg of mercury iodine (HgI) may be added.

4.2 Bulb and Aperture Structures 4.2.1 Blow Molded Bulbs

A present aspect of the invention pertains to improvements in envelopes and the methods for manufacturing envelopes containing fill for use in electrodeless lamps and has utility in lamps of the type disclosed herein.

The prior art method for making envelope blanks is gathering of a gob of molten quartz on the end of a section of quartz tubing and, by means of manually changing the internal pressure within the tubing and applying fire to the exterior of the tubing and the gob, shaping the end of the quartz tubing and gob into a thin walled sphere having an interior volume in communication with the quartz tube.

The shape of the thin walled sphere produced by the prior art method cannot readily be altered, and it is difficult to repeatably, consistently inflate a gob of flexible quartz into any desired shape (including a sphere). Additionally, it is difficult to process the resulting tube and sphere structures using automated manufacturing machinery for making electrodeless lamps, or the like.

An electrodeless lamp aperture bulb is a bulb jacketed or enclosed in a highly diffusely reflective material having a small opening or aperture through which light is emitted. The bulb may be properly characterized as having a multiplicity of internal reflection paths. In order for an aperture bulb to function efficiently, a photon, once generated, must exit the bulb either directly or after a number of internal reflections, possibly after a number of absorptions and re-emissions. Colder regions in a sulfur, selenium, or sulfur-like fill material, in which a plasma has been created, reradiate the absorbed radiant energy with a temperature characteristic of the temperature of the colder region. The absorption and radiation in the colder regions reduce the lamp efficacy, because the eye is less sensitive at these wavelengths. In an electrodeless lamp having a sulfur fill or the like, the lower radiation efficacy is a function of the volume of the colder regions contained within a bulb or envelope. In the past, pill-box shaped bulbs or envelopes have been used with inductively operated high intensity discharge laps (without an aperture in a reflective jacket or the like). Examples in the prior art include U.S. Pat. No. 4,783,615 (Dakin et al), U.S. Pat. No. 5,367,226 (Ukegawa et al) and U.S. Pat. No. 4,705,987 (Johnson). None of the pill-box shaped bulbs in the prior art have been used with a sulfur and selenium fill as part of an electrodeless lamp surrounded by a jacket having an aperture, however.

A number of problems have been encountered in producing electrodeless aperture lamps; in particular, some of the conventional bulb shapes are not well suited to excitation using a conventional, spiral wound RF coil that has been wound on a cylindrical coil former or the like. For spherical bulbs driven by cylindrical RF excitation coils having a coil height shorter than the bulb diameter, the spherical interior volume occupied by the fill material is not uniformly excited by the coil, since top and bottom portions of the spherical bulb extend along the coil cylinder axis and project beyond the height of the coil.

Another problem encountered in mass producing aperture lamps with spherical envelopes is that there is no practicable automated method to provide the optically reflective jacket while leaving a uniformly sized aperture. There is also no practicable automated method for accurately positioning and attaching a light guide member to the spherical surface of the envelope of the prior art. Ordinarily, jackets having apertures formed by the insertion of a core in a reflective material slurry must be sintered with the aperture defining core held in place. After the reflective material is cured or sintered and assumes a solid consistency, the core is removed, leaving an aperture having the same cross sectional shape as the core. Problems with manipulating the core and removing the core include risk of destroying the lamp envelope or the reflective material of the jacket around the core. The envelope must be manipulated before and after the jacket molding process and it is difficult to position and manipulate the envelope within the mold cavity before and after filling the mold with the reflective material. Accordingly, several problems have been encountered in attempts to develop a practicable method for automated high speed fabrication of large numbers of aperture electrodeless lamps.

It is an object of the present invention to overcome one or more of the aforesaid problems associated with the prior art.

Another object of the present invention is to provide an electrodeless lamp bulb or envelope adapted for use with cylindrical RF coils or the like.

It is another object of the present invention to provide an envelope having surface features well suited to receiving an attached light extraction pipe or aperture defining member.

Another object of the present invention is to provide a method for manufacturing an electrodeless aperture lamp using high speed automated equipment.

Yet another object of the present invention is to provide a pill-box shaped envelope for overcoming the lower efficacy observed in the bulbs of the prior art by eliminating or greatly reducing the volume of the colder regions of the envelope.

The aforesaid objects are achieved individually and in combination, and it is not intended that the present invention be construed as requiring two or more of the objects to be combined unless expressly required by the claimed attached hereto.

Surprisingly, it has been discovered that a sulfur plasma exhibits an extremely large light absorption in short light wavelengths. The large light absorption was observed within a multiply reflecting bulb structure (i.e., an aperture bulb), and, as a consequence, lower efficacy was observed. The pill-box shaped electrodeless lamp bulb of the present invention, however, has few colder regions in the envelope interior and the fill was observed to reradiate absorbed energy at a higher temperature, thereby resulting in a more efficient lamp. By eliminating or reducing colder portions of the plasma within the envelope volume, the sulfur aperture bulb was observed to exhibit a higher efficacy.

EXAMPLES OF BLOW MOLDED BULBS

Figure 123:
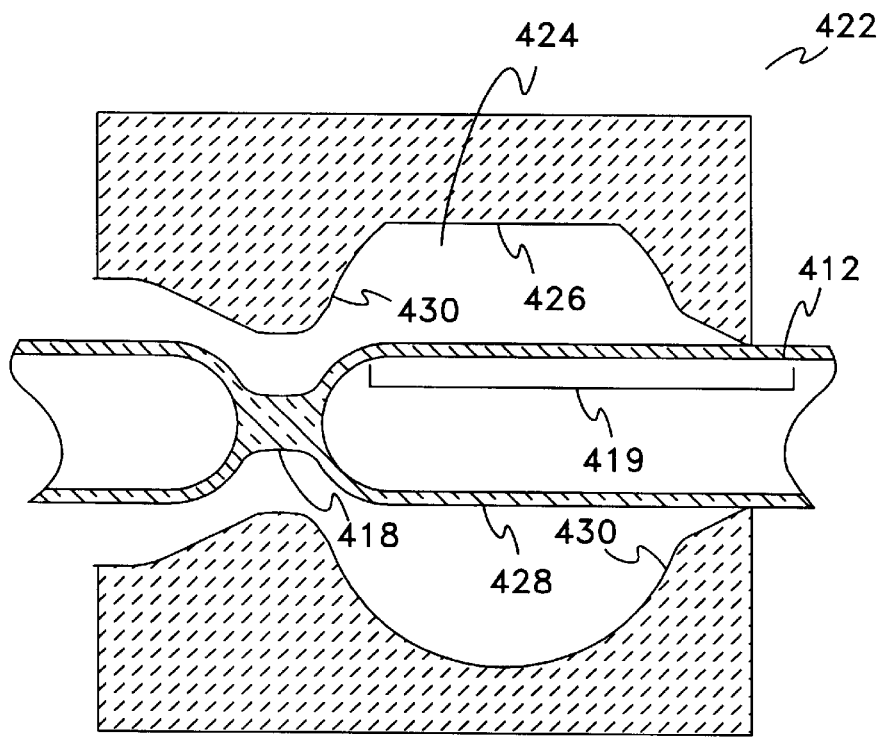
FIG. 123 is a schematic diagram of the bulb blank positioned in a mold.
Figure 124:
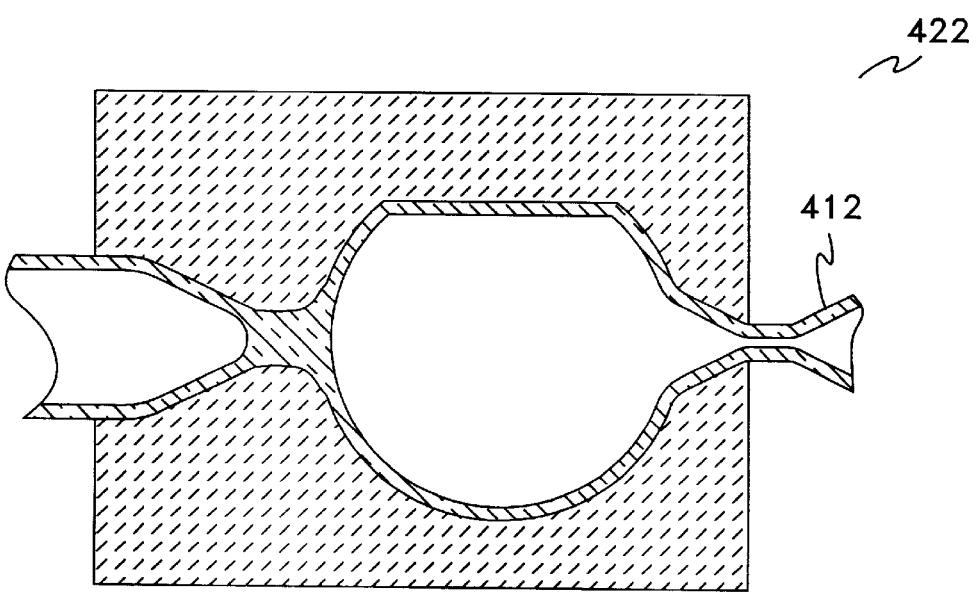
FIG. 124 is a schematic diagram of the bulb blank after being conformed to the mold.
Figure 125:
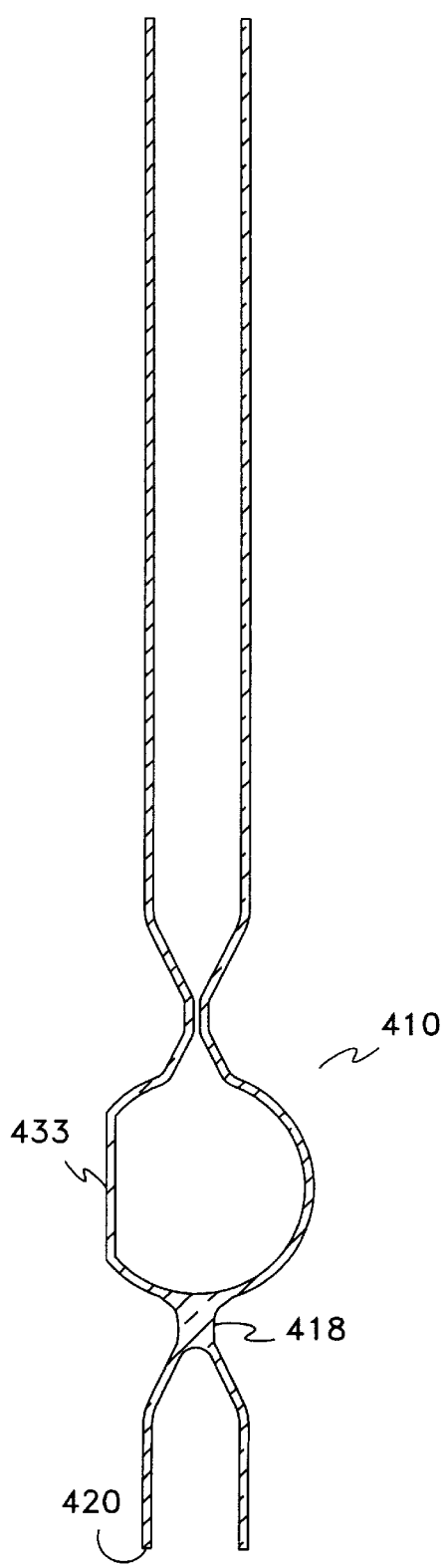
FIG. 125 is a schematic, cross-sectional diagram of the resulting bulb.

As illustrated in FIGS. 121–125, a bulb blank 410 (see FIG. 125) is manufactured from a length of quartz tubing 412, preferably, a 3 by 5 mm fused quartz (e.g., GE 214) tubing section of approximately 150 mm in length. The quartz tube 412 has a fire polished end 414 with a minimum opening of 2.5 mm in diameter. In the first step of the method of the present invention, shown in FIG. 121, a selected longitudinal section 416 of the tubing is flame heated and caused to transversely shrink and close off by means of surface tension and working of the liquid quartz within the flame. A closed off or occluded section 418, shown in FIG. 122, one and one half mm in length and one and one half mm in outside diameter is thereby produced, preferably at a location approximately 15 mm from the tubing lower end (as tubing 412 is held in a vertical orientation). After the tubing section 416 is closed off by occluded section 418 and allowed to cool, upper tubing section 419 (above occluded section 418) is heated until a plastic state is reached and, as shown in FIG. 123, a mold 422 having a cavity 424 with a selected substantially spherical interior shape including a planar section 426 is closed about the heated upper tube section 419. In the particular example illustrated in FIGS. 123 and 124, the cavity portion, other than planar section 426, is generally spherical. Gas pressure is applied via open upper tubing end 414 to pressurize the tube interior. Pressure is increased to a point above atmospheric pressure to deform and expand the plastic quartz tube wall section 428 at approximately the mid-point of upper tubing section 419. Pressure is applied until the plastic quartz material has expanded, within mold cavity 424, outwardly or transversely and has come into contact with, and becomes contoured to match, the mold interior surface 430, as shown in FIG. 124. Mold 422 is immediately removed after the tubing blank has assumed the shape of the mold interior cavity 424. The tubing blank is thereby molded into a bulb blank 410 having a planar interface area 433 and an upper bulb opening 432 located just above the expanded part of the bulb blank.

Upper opening 432 is a short constricted tube section having an inner diameter of between one half to one mm over a length of one mm.

Figure 126:
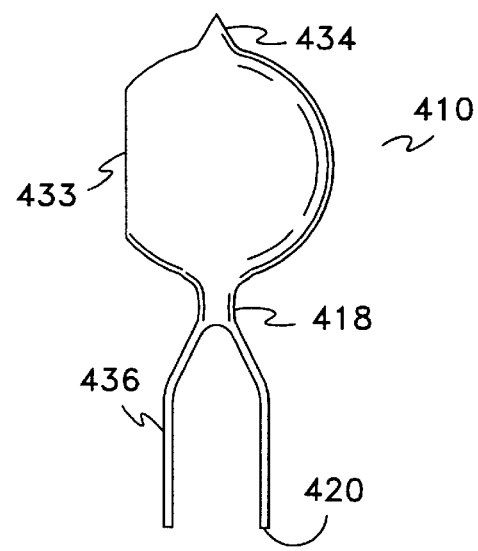
FIG. 126 is a schematic diagram of the bulb after being filled and tipped off.
Figure 127:
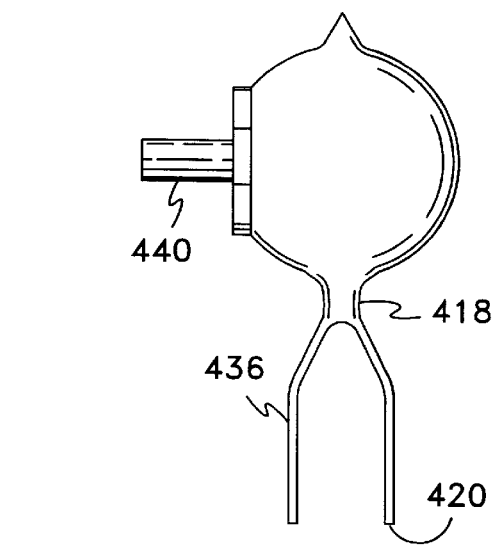
FIG. 127 is a schematic diagram of the bulb from FIG. 126 with an aperture forming tool secured thereto.
Figure 128:
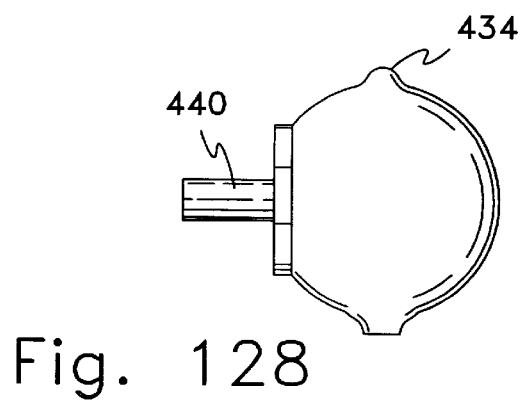
FIG. 128 is a cross-sectional view, in elevation, of the bulb of FIG. 127, after removal of the lower tubing stub.

Bulb blank 410 is then cooled to a temperature sufficiently low to allow contact (in a subsequent filling procedure) with sulfur or selenium and gas mixture fill materials (and other materials, as discussed in U.S. Pat. No. 5,404,076, cited above). During the filling process, the fill materials are injected via top end 414 and through upper bulb opening 432, after which upper opening 432 is closed using a torch flame, forming the tip of the bulb 434, as shown in FIG. 126. While the tip 434 of the bulb is being formed, the 15 mm long lower stub 436 of tubing is used to support and position the bulb. After filling, the bulb, supported by lower stub 436, is transported to an automated reflective jacket forming machine. An aperture forming tool or aperture defining member 440 having an outer contour of the aperture is then glued to the flat window formed on the bulb interface area 433 using a hot melt polymer or other bonding agent, as shown in FIG. 127. Once the aperture defining member 440 is secured, lower stub 436 is scored at occluded section 418 and removed. Scoring is performed with a sharp knife and the stub 436 is then snapped off, resulting in the bulb shape illustrated in FIG. 128. The tool 440 is then used to manipulate the bulb through the reflective jacket forming operations and subsequent stops. During high temperature curing or sintering of the reflective jacket (not shown), the hot melt polymer pyrolizes and the bulb is released from the aperture defining member or tool 440.

Figure 129:
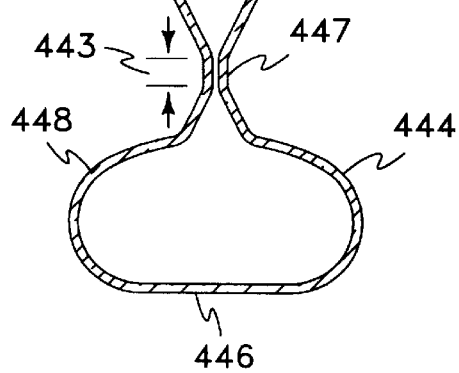
FIG. 129 is a cross-sectional view, in elevation, of an alternate embodiment of the bulb blank, after removal from a mold.

Turning now to FIG. 129 an alternate example of the bulb blank 442 is illustrated as it appears after removal from a mold (not shown). Bulb blank 442 has a pill-box-shaped bulb segment 444 with a downwardly oriented, circular, planar interface area or flat 446 with a diameter of four and one half mm. Bulb blank 442 also includes an upper bulb opening 447 (having an inside diameter of between one half and one mm and a length of one mm) produced just above the shoulders 448 of the newly formed bulb 444. The bulb height of four mm is measured from the outside of flat 446 to the bottom of upper opening 447, and the bulb outside width (i.e. extent transverse to the tubing axis) is seven mm. The wall thickness of bulb 444 is one half mm (with a tolerance of plus or minus one tenth mm), and so the inside bulb height is three and one half mm. As above, bulb blank 442 is manufactured from a length of quartz tubing, preferably, a 3 by 5 mm fused quartz (e.g., GE 214) tubing section of approximately 150 mm in length and having a fire polished upper end 448 with a minimum opening of 2.5 mm in diameter.

Figure 130:
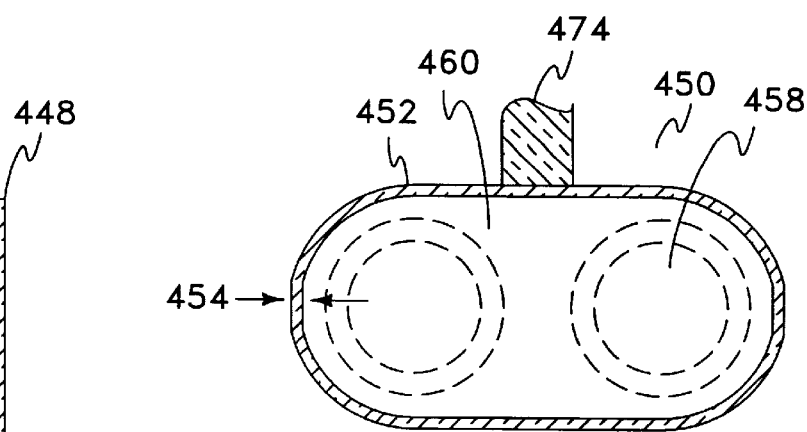
FIG. 130 is a cross-sectional view, in elevation, of a pill-box bulb.
Figure 131:
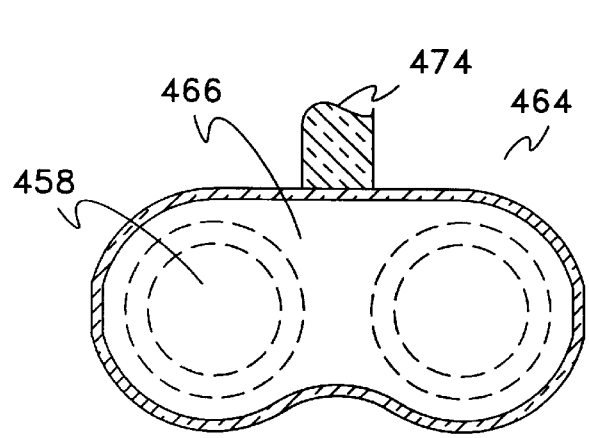
FIG. 131 is a cross-sectional view, in elevation, of a reentrant pill-box bulb.
Figure 132:
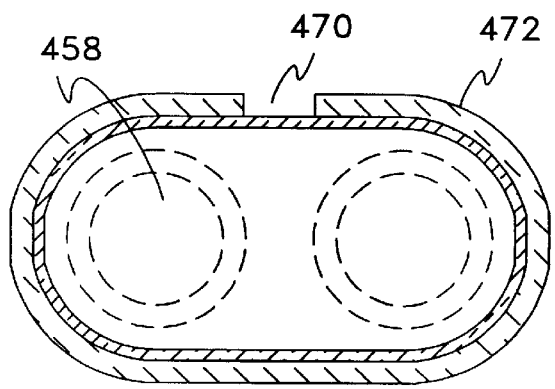
FIG. 132 is a cross-sectional view, in elevation, of a pill-box bulb having a reflective jacket with a relatively high walled aperture.

In accordance with another aspect of the present invention, pill-box or reentrant bulb shapes illustrated in FIGS. 130, 131 and 132 are provided to overcome lower efficacy caused by having a significant volume of colder gas regions.

The pill-box shaped bulb 450 of FIG. 130 is approximately eight mm in outer diameter or width (i.e., in the longer, horizontal dimension) and six mm high (i.e., in the shorter, vertical dimension), and has an envelope 452 with a wall thickness 454 of one half to one mm. Envelope 452 encloses an interior volume 456 including a fill having approximately 0.05 mg of selenium, 500 Torr of xenon gas (at room temperature) and a small amount of cesium bromide (typically less than 1 mg), provided as a plasma forming medium. Bulb 450 is inductively coupled with an encircling RF coil for excitation of a toroidal plasma 458 in the fill. The shape of toroidal plasma 458 is approximated by a ring or toroid having a central hole 460 and those regions within the interior volume 456 occupied by the plasma are relatively "hotter" while those parts lying outside the plasma toroid 458 are relatively "colder". Pill-box shaped bulb 450 is closely contoured to match plasma toroid 458 and exhibits improved brightness; it is believed that this is due to an envelope shape having fewer colder regions within the bulb, and as a result, greater brightness and light output (i.e., efficacy) are observed. Pill-box shaped bulb 450 eliminates colder interior volume regions and the fill reradiates absorbed energy at a higher temperature, resulting in a more efficient lamp. By eliminating or reducing the colder portions of the plasma within the envelope volume, the sulfur aperture bulb was observed to exhibit a higher efficacy.

The pill-box shaped bulb 450 is substantially circular in cross section and shaped as a short cylinder having a diameter which is greater than the cylinder height and so is sized to approximate the toroidally shaped plasma 458 in the bulb fill. Pill-box shaped bulb 450 includes an outwardly projecting solid quartz light guide 474, affixed in the center of a substantially circular transparent upper wall. In an alternative example illustrated in FIG. 131, an alternate example of a pill-box shaped bulb 464 has a reentrant concave downwardly facing indentation 466 roughly aligned with the central hole 460 of toroidal plasma 458. Bulb 454 also includes an outwardly projecting solid quartz light guide 474, affixed in the center of a substantially circular transparent upper wall. In yet another example illustrated in FIG. 132, a pill-box shaped bulb includes a relatively high walled aperture 470 in a reflective jacket 472, as an alternative to a solid quartz light guide 474, as in the examples of FIGS. 131 and 132.

4.2.2 Aperture Structures

Electrodeless lamps of the type with which the present invention is concerned are comprised of a light transmissive bulb having an envelope containing a plasma-forming medium. The bulb may be partially or completely covered or jacketed with a reflective material,, and may, optionally, include an outwardly projecting light guide member. A microwave or radio frequency (RF) energy source has its output energy coupled to the envelope via a coupling arrangement to excite a plasma, resulting in a light discharge. The envelope is embedded in or surrounded by a jacket of reflective material over nearly the entire envelope surface, except for a small area through which light is permitted to pass.

A number of problems have been encountered in producing electrodeless aperture lamps; in particular, jackets having apertures formed by the insertion of a core in a reflective material slurry have to be sintered with the core held in place. After the reflective material is sintered and assumes a solid consistency, the core is removed, leaving an aperture having the same cross-sectional shape as the core. Problems with manipulating the core and removing the core include risk of destroying the aperture, lamp envelope, or the reflective material jacket surface. Another problem is that it is difficult to accurately position the envelope or bulb within the cavity used in molding the reflective material jacket from the slurry. Finally, with the molds and methods of the prior art, a distinct mold must be fabricated for each desired aperture (and core) cross-sectional shape, since the core must fit tightly in the mold to prevent the reflective material slurry from flowing or leaking around the core.

It is an object of a present aspect of the present invention to overcome one or more of the aforesaid problems associated with the prior art.

It is another object of the present invention to enable use of an aperture having any desired cross-sectional configuration in an electrodeless lamp made in a mold receiving an envelope and a flowable reflective material slurry.

Yet another object of the present invention is to properly position the envelope within the mold cavity to permit proper filling of the mold with flowable reflective material slurry.

The aforesaid objects are achieved individually and in combination, and it is not intended that the present invention be construed as requiring two or more of the objects to be combined unless expressly required by the claims attached hereto.

EXAMPLES OF APERTURE STRUCTURES

Figure 133:
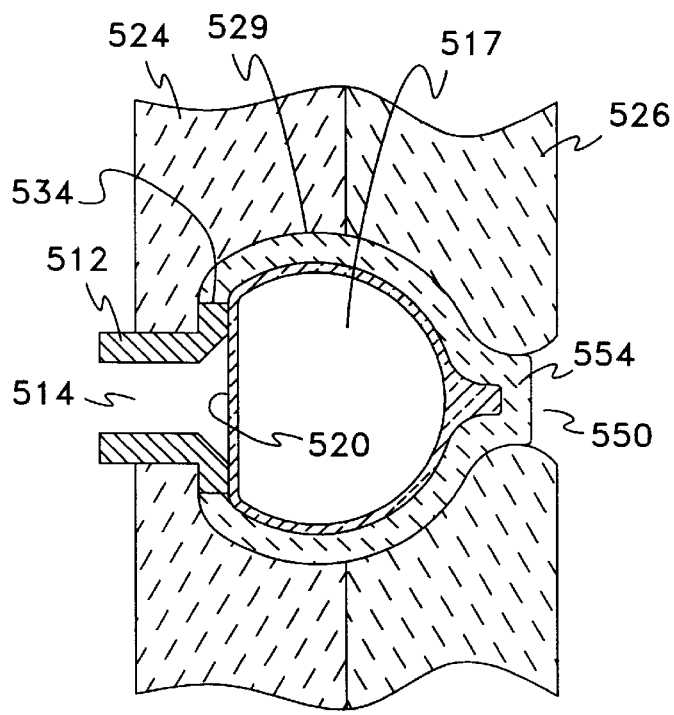
FIG. 133 is a cross-sectional view, in elevation, of an electrodeless lamp aperture bulb having a molded-on reflector, in a mold and affixed with an aperture defining member, in accordance with the present invention.
Figure 134:
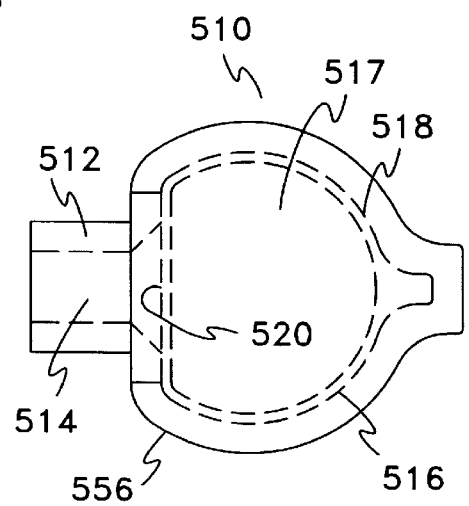
FIG. 134 is an elevation view of an electrodeless lamp aperture bulb having a molded-on reflector and affixed with an aperture defining member, in accordance with the present invention.

According to a first example of the present invention, illustrated in FIGS. 133 and 134, an electrodeless lamp 510 includes an elongate aperture defining member or mold insert 512. Aperture defining member 512 includes an aperture or light passage defining bore 514 defined longitudinally therethrough. The aperture defining member 512 is made from ceramic or another material having high light reflectance and sufficient mechanical strength to withstand automated assembly machinery handling. The aperture defining member material is capable of withstanding a wide range of temperatures, e.g., a winter ambient temperature at one extreme and a high operating temperature of several hundred degrees Fahrenheit at the other extreme. Aperture defining member 512 is bonded or cemented to a light transmissive envelope 516 having an exterior surface 518 including a substantially flat or planar envelope interface area 520. The cement is preferably an organic material selected to decompose at the temperature used in a subsequent sintering step. Envelope 516 may be ball-shaped or pill-box-shaped and encloses an interior volume 517 including a fill material having sulfur, selenium or another substance or compound producing light when subjected to microwave or radio frequency (RF) energy.

Figure 135:
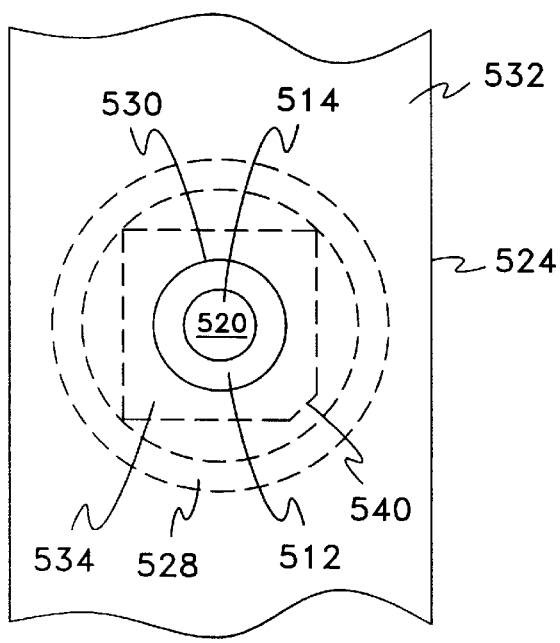
FIG. 135 is a bottom plan view of a mold an aperture defining member.

As shown in FIG. 133, envelope 516 is disposed within a separable, two-part, reflective material mold 522 having a first mold segment 524 separably mated to a second mold segment 526 to define a mold interior cavity 528 having an interior surface 529 therein. Mold segments 524, 526 are preferably made of carbon. As shown in FIGS. 133 and 135, first mold segment 524 includes a mold opening 530 providing access from mold interior cavity 528 to a bottom exterior mold surface 532.

Figure 136:
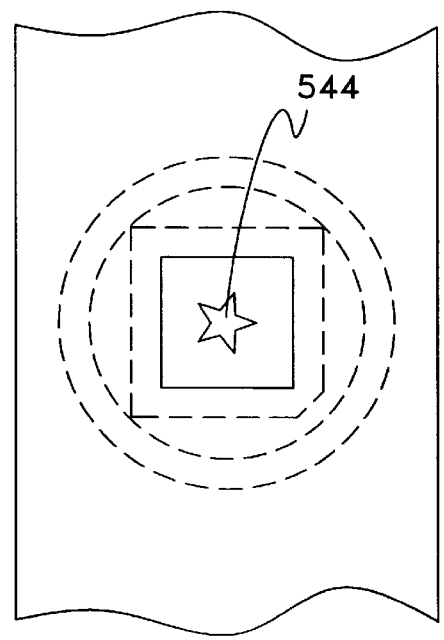
FIG. 136 is a bottom plan view of a mold and aperture defining member having a star-shaped aperture.

Aperture defining member 512 is disposed within mold opening 530 and includes a substantially planar radially extending flange 534 projecting transversely from the bore central axis. Turning now to the bottom view of FIG. 135, it is illustrated that mold opening 530 and aperture defining member bore 514 are substantially coaxially aligned, thus permitting light to pass through the transparent envelope interface area to the mold exterior. In FIG. 135, the bore 514 is illustrated as being circular in cross section, however, any aperture cross section can be used, such as, for example, the star-shaped aperture cross section of the alternate example of FIG. 136. Star-shaped aperture 544 is exemplary of many fanciful or arbitrary aperture shapes which can be defined in an aperture defining member, thus allowing a single mold to accommodate many aperture shapes.

Figure 137:
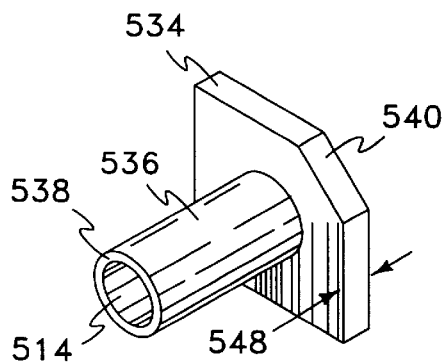
FIG. 137 is a perspective illustration (not to scale) of the aperture defining member of FIG. 135.
Figure 138:
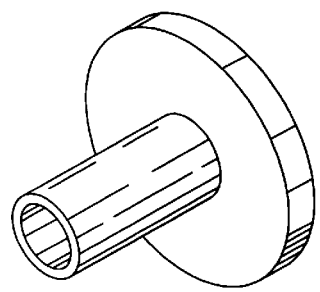
FIG. 138 is a perspective illustration of another aperture defining member.

As shown in FIG. 137, aperture defining member 512 includes a tubular body 536 having a central axis and a distal end 538 opposite proximal transverse flange 534. Bore 514 is a light transmissive passage extending through the aperture defining member 512 from the proximal end of tubular body 536 to distal end 538. In the example of FIG. 137, transverse flange 534 includes an indexing feature such as a clipped corner 540. In the alternative example illustrated in FIG. 138, the aperture defining member transverse flange is circular and includes no indexing feature.

In the method of the present invention, reflective material mold 522 is split into two (or more) parts, allowing access to the mold cavity 528 defined within. An aperture defining member 512 is positioned within and projects outwardly from mold interior cavity 528 through mold body opening 530. The aperture defining member 512 includes a proximal, radially extending flange 534 projecting in a plane transverse to the bore center axis. Envelope 16 rests upon flange 534 which has a flange thickness 548 (see, e.g., FIG. 137) selected to maintain a desired separation between the envelope exterior surface 518 and the inner surface 529 of the mold cavity. The mold 522 is closed and a flowable slurry of reflective material is injected or poured through a mold injection opening 550, filling the space in the mold cavity 528 between the envelope outer surface 518 and the mold interior cavity surface 529. The reflective slurry material 554 is then dried, sintered or fired to provide a rigid or hardened reflective jacket 556, as shown in FIG. 134. The cement material used to bond the aperture defining member 512 to envelope exterior surface 518 decomposes, thereby allowing for significant differences in coefficients of thermal expansion between the envelope 516 and the aperture defining member 512.

As noted above, the outer perimeter of the aperture defining member can include a projecting key feature (e.g., a clipped corner), thus indexing (or controlling the orientation of) the aperture defining member in the mold body opening having a complimentary receiving feature (e.g., a receiving socket having a clipped corner). Bore 514 in aperture defining member 512 can have any desired cross-sectional shape, while the outer perimeter of the aperture defining member body is a standardized shape (e.g., tubular body 536), thereby allowing a common mold member to be used in molding aperture lamps having many different aperture cross-sectional shapes, with the aperture defining member being indexed in a selected location and orientation, regardless of bore shape.

Figure 141:
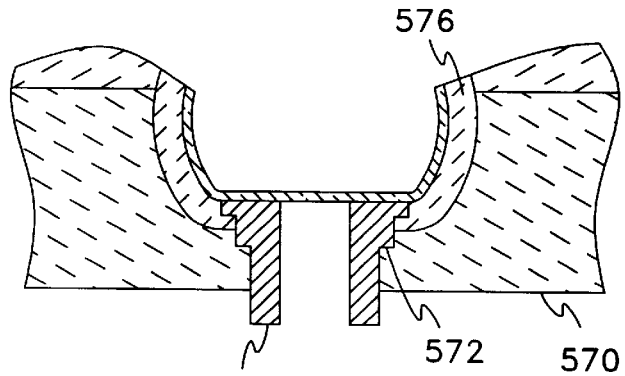
FIG. 141 is a cross-sectional view, in elevation, of an electrodeless lamp aperture bulb having a molded-on reflector, in a mold, and affixed with the aperture defining member illustrated in FIG. 139.
Figure 139:
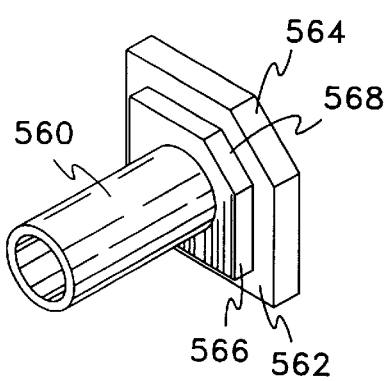
FIG. 139 is a perspective illustration (not to scale) of still another aperture defining member.

Turning now to FIGS. 139 and 141, indexing shape of an alternate example of aperture defining member 560 includes a stepped flange structure having a proximal outer flange segment 562 with a clipped corner indexing feature 564 and an intermediate stepped flange segment 566 of reduced transverse extent and having a radially aligned clipped corner indexing feature 568. A shown in FIG. 141, a mold 570 for receiving aperture defining member 560 includes a stepped receiving socket 572 adapted to receive intermediate stepped flange segment 566 in only one rotational orientation, due to a socket clipped corner indexing feature corresponding in extent to the clipped corner indexing feature 568 of intermediate stepped flange segment 566. Indexing feature 568 can also be used in later assembly steps, for alignment, positioning or the like, in making an electrodeless lamp fixture.

Figure 140:
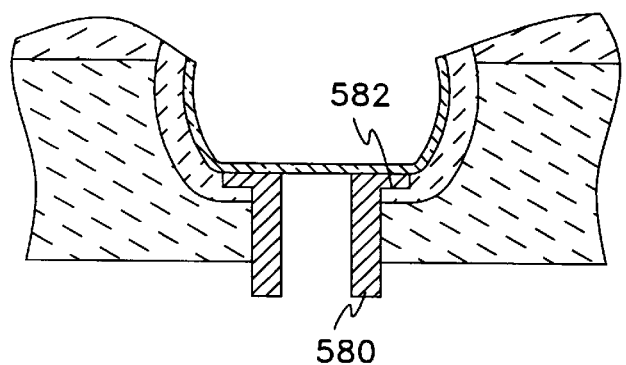
FIG. 140 is a cross-sectional view, in elevation, of an electrodeless lamp aperture bulb having a molded-on reflector, in a mold, and affixed with an alternative embodiment of the aperture defining member.

The reflective jacket 576 of the example of FIG. 141 extends over and covers the portion of outer flange segment 562 projecting radially beyond intermediate flange segment 566 and so provides a thin annular layer of jacket material providing additional retaining structure for affixing aperture defining member 560 the bulb. FIG. 140 illustrates another alternative example including an aperture defining member 580 situated within a mold cavity and having a radially transversely projecting flange 582. The reflective jacket 584 extends over and covers the radially projecting flange 582 and so provides a thin annular layer of jacket material providing additional retaining structure for affixing aperture defining member 580 to the bulb.

Figure 142:
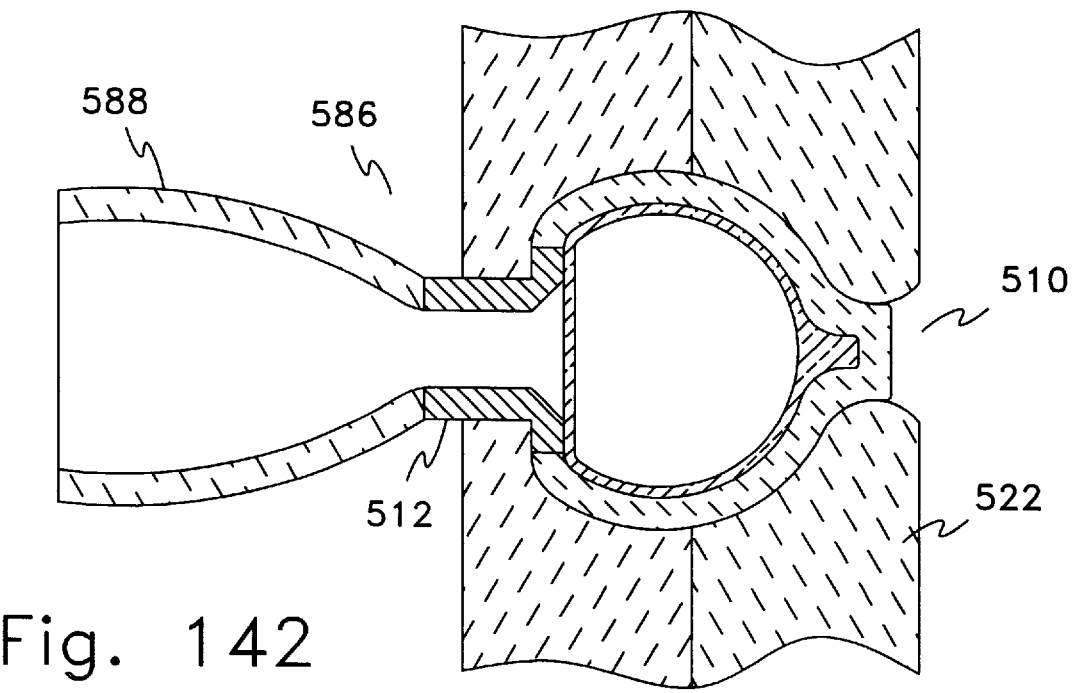
FIG. 142 is a cross-sectional view, in elevation, of an aperture defining member including an optical reflector.

As illustrated in FIG. 142, the external portion 586 of aperture defining member 512 is employed as a support for an optical element such as a coated optical reflector 588 for directing light produced in the electrodeless lamp 510.

Figure 143:
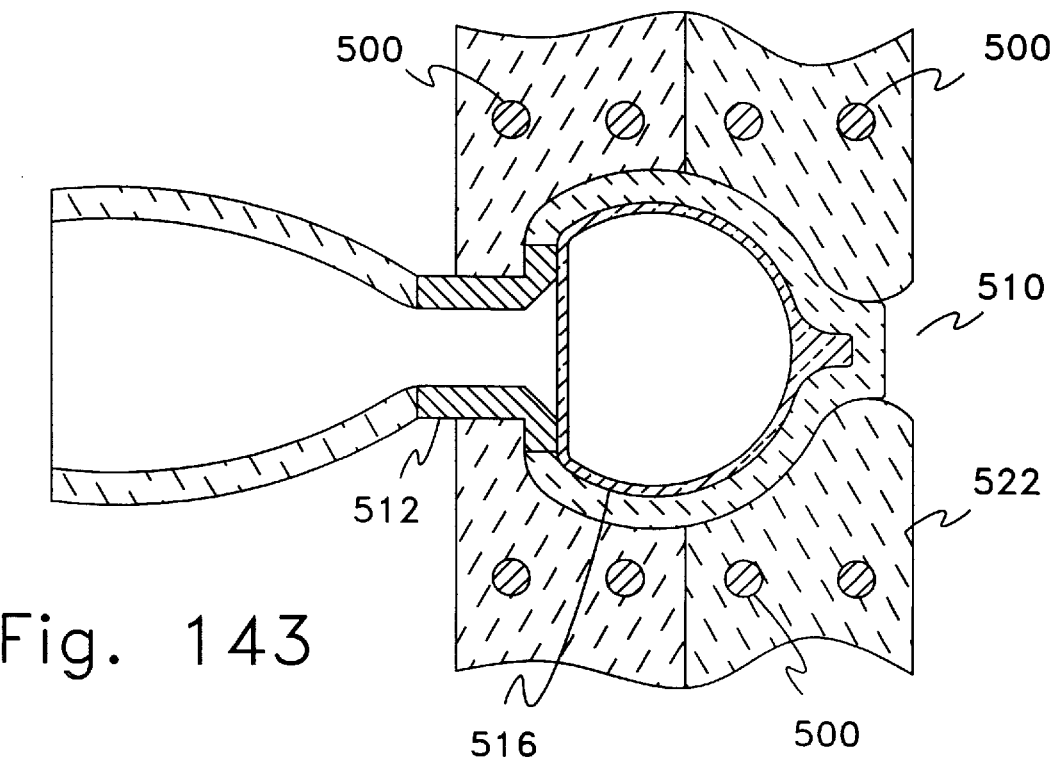
FIG. 143 is a cross-sectional view, in elevation, of an integral one-piece electrodeless lamp bulb having a mold body including RF coils.

The mold 522 of the present invention needn't be removed and can be incorporated in a lamp within an exterior housing, if desired. As shown in FIG. 143, mold 522 can be an integral part of an RF energy coupling circuit or a heat sink for the RF excitation coil 500 used to provide RF excitation power to the electrodeless lamp 510. Thus, mold 522 need not be a reusable tool solely for determining the outer shape of the reflective jacket component molded onto the envelope. Aperture defining member 512 defines an aperture of any desired cross-sectional shape, positioning envelope 516 within the reflective jacket, providing an aperture reference or index and eliminating manufacturing requirements for precise tooling for bulb shape and jacket shape.

Figure 144:
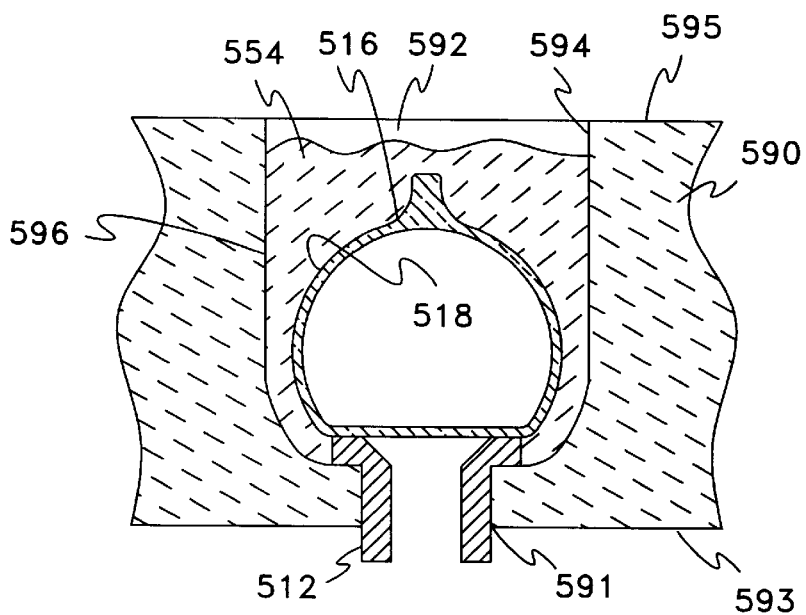
FIG. 144 is a cross-sectional view, in elevation, of an electrodeless lamp aperture bulb in a one-piece mold.

The reflective material mold need not be a two-part mold For example, as shown in FIG. 144, a one-piece reflective material mold 590 can be used. Reflective material mold 590 includes a mold opening 591 (similar to mold opening 530 shown in FIG. 133) providing access from mold interior cavity 592 to a bottom exterior mold surface 593. An aperture defining member 512 is disposed within mold opening 591, as described above.

The reflective material mold 590 further includes a mold opening 594 in the top exterior mold surface 595. Mold opening 594 is sufficiently large to allow the light transmissive envelope 516 to pass therethrough and into the mold interior cavity 592. For example, as shown in FIG. 144, the mold interior cavity 592 may be shaped such that the mold opening 594 is approximately the same width as the widest portion of the mold interior cavity 592, with the mold interior cavity surface 596 being substantially cylindrical towards the top of the mold interior cavity 592. Once the light transmissive envelope 516 is positioned in the mold interior cavity 592, a flowable slurry of reflective material 554 is poured into the mold opening 594, filling the space in the mold cavity 592 between the envelope outer surface 518 and the mold interior cavity surface 596. The wide mold opening 594 at the top of reflective material mold 590 eliminates the need for two separate mold parts.

Figures 145, 146:
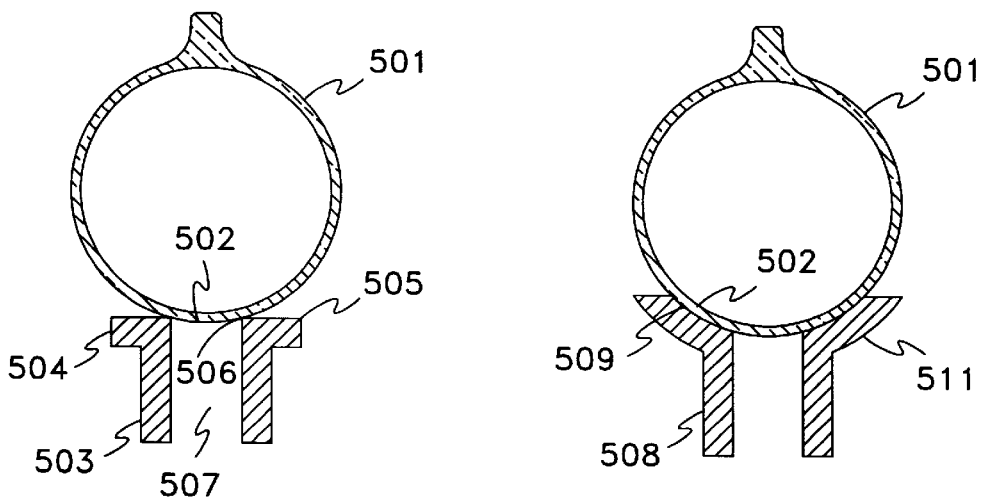
FIG. 145 is a cross-sectional view, in elevation, of an electrodeless lamp aperture bulb having a light transmissive envelope with a rounded interface area affixed to a non-conforming aperture defining member.
FIG. 146 is a cross-sectional view, in elevation, of an electrodeless lamp aperture bulb having a light transmissive envelope with a rounded interface area affixed to an aperture defining member which conforms to the shape of the rounded envelope interface area.

In general, the interface area of the envelope can have any shape which permits sufficient bonding to the light transmissive envelope, and need not be flat or planar. For example, as shown in FIGS. 145 and 146, the envelope 501 may have a ball-shaped (e.g., substantially spherical or ellipsoidal) exterior surface with a rounded envelope interface area 502. The envelope 501 can be bonded to an aperture defining member having either a non-conforming or a conforming shape. For example, as shown in cross-section in FIG. 145, a non-conforming aperture defining member 503 has a flange 504 with a planar upper surface 505. The aperture defining member 503 contacts the rounded envelope interface area 502 of the envelope 501 at an edge 506 formed at the juncture of planar upper surface 505 and aperture defining member bore 507. Thus, the planar upper surface 505 does not conform to the rounded shape of the envelope interface area 502, and the envelope 501 is bonded to the aperture defining member 503 along a narrow annual band at edge 506.

Figure 147:
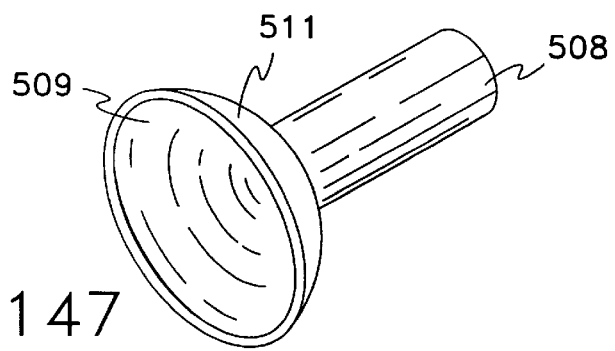
FIG. 147 is a perspective illustration of the aperture defining member shown in FIG. 146.

According to an alternative example shown in FIG. 146, an aperture defining member 508 conforms to the shape of the envelope interface area 502. Specifically, the upper surface 509 of flange 511 is cup-shaped, having a curvature corresponding to that of the rounded envelope interface area 502. The aperture defining member 508 is shown in perspective in FIG. 147. The conforming shape of the aperture defining member 508 provides a larger surface area over which the rounded envelope interface area 502 of envelope 501 can bond to the aperture defining member 508.

In use, an electrodeless lamp (e.g., lamp 510, as shown in FIGS. 134, 142 or 143) is electrically coupled to a microwave or RF source and receives energy, thereby creating a light emitting plasma in the fill material contained within the envelope interior 517. Light created thereby is internally reflected from the jacket 556 and passes outwardly through the aperture of bore 514.

The method for making electrodeless lamp 510, includes the steps of providing an envelope 516 with an exterior surface 518 and an interior volume 517 including a fill material; providing a mold 522 having an exterior surface 532, an interior cavity 528, a first segment 524 and a second segment 526, where the mold first segment 524 has a mold opening 530 providing access from the mold interior cavity 528 to the mold exterior surface 532; inserting an aperture defining insert member 512 into the mold opening 530, where the aperture defining insert member 512 includes an insert bore 514 which, when the insert member 512 is inserted in the mold, provides an internally reflective light passage or aperture from the mold interior cavity to said mold exterior surface; placing envelope 516 into the mold interior cavity and proximate to the aperture defining insert member 512 upon flange 534; and filling the mold interior cavity 528 with a flowable reflective material 554; and then curing the flowable reflective material 554 to render a solid reflective jacket 556 which encloses or surrounds, but does not uniformly adhere to or coat envelope 516. Optionally, one may proceed by removing the envelope 516, with the aperture defining member 512 and cured reflective material jacket 556 affixed thereon, from mold 522. Alternatively, one may, instead of or in addition to removing the envelope, proceed by affixing an external reflector 588 (or some other optical adjunct) to an eternal portion 86 of aperture defining member 512. The step of inserting an aperture defining insert member into the mold opening includes indexing or orienting the aperture defining insert member by aligning indexing feature 540 of insert member 512 with a corresponding indexing feature of the mold opening which, when the insert member 512 is inserted in the mold in a selected orientation, fits indexing feature 540 of insert member 512; and inserting the indexed aperture defining insert member 512 into mold opening 530. The step of placing the envelope into the mold interior cavity and proximate to the aperture defining insert member includes placing substantially planar portion 520 of envelope 516 upon supporting flange 534 of insert member 512 extending into the mold interior cavity 528, thereby supporting the envelope and providing a separation between the envelope exterior surface 518 and the interior surface 529 of the mold cavity. The step of filling the mold interior cavity 528 with a flowable reflective material 554 includes pouring a reflective material slurry into the mold interior cavity.

The resulting electrodeless lamp aperture bulb 510 thus includes a light transmissive envelope 516 having an exterior surface 518 including a first sub-area and a second sub-area, where the envelope encloses an interior volume 517 including a fill material. Bulb 510 also includes an aperture defining member 512 affixed to the first sub-area (i.e., the interface area 520) of the envelope exterior surface.

The aperture defining member 512 has a distal surface 538 and an bore 514 through a tubular body 536; bore 514 provides a light transmissive lumen or passage from envelope 516 to aperture defining member distal end 538. Bulb 510 also includes a light reflective jacket 556 covering the second sub-area (e.g., the remaining area) of the envelope exterior surface. The jacket 556 preferably has a thickness equal to or greater than one half millimeter and is a sintered solid. The aperture defining member is preferably ceramic or a material having equivalent light reflecting, thermal and structural properties.

As noted above, the electrodeless lamp aperture bulb 510 can include an integral permanently affixed mold having an interior cavity, an exterior surface and a mold opening 530 providing access from the mold interior cavity to the mold exterior, where the envelope is disposed within said mold interior cavity providing a one-piece assembly as shown in FIG. 142. Alternatively, the one-piece assembly integral mold includes RF excitation coils 100 disposed proximate the mold interior cavity 528, as shown in FIG. 143.

Inasmuch as the present invention is subject to various modifications and changes in detail, the above description of a preferred example is intended to be exemplary only and not limiting. It is believed that other modifications, variations and changes will be suggested to those skilled in the art in view of the teachings set forth herein. It is therefore to be understood that all such variations, modifications and changes are believed to fall within the scope of the present invention as defined by the appended claims.

Figure 149:
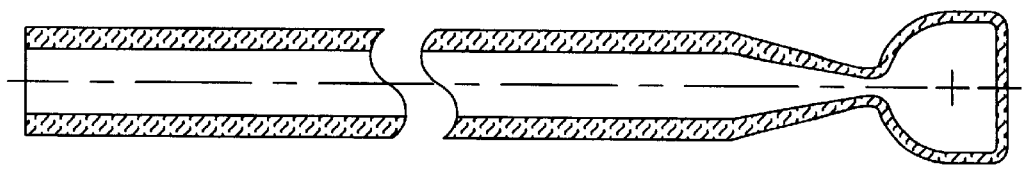
FIG. 149 is a cross sectional view of the preferred bulb blank taken along line 149—149 in FIG. 148.
Figure 148:
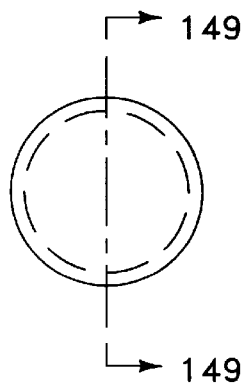
FIG. 148 is a schematic view of a preferred bulb blank for use in the lamp of the present invention.

FIG. 148 is a schematic view of a preferred bulb blank for use in the lamp of the present invention. FIG. 149 is a cross sectional view of the preferred bulb blank taken along line 149—149 in FIG. 148. The bulb is rotationally symmetric about the longitudinal axis. The bulb has a general wine glass shape with a substantially flat face. A suitable fill material is deposited in the bulb through the opening in the stem. An inert starting gas (e.g. xenon, argon, krypton) is applied to a suitable pressure. The stem is then heated at the pinched portion to seal off the bulb enclosing the fill material and starting gas.

Figure 150:
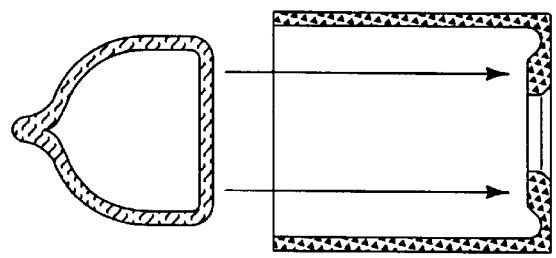
FIG. 150 is an exploded, schematic view of a preferred aperture cup according to the invention.
Figure 151:
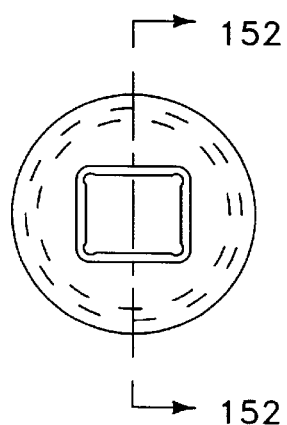
FIG. 151 is a schematic view of the aperture cup showing details of the aperture.
Figure 152:
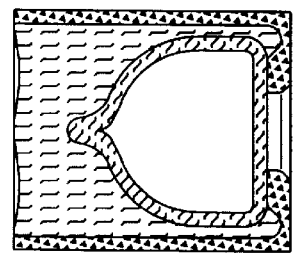
FIG. 152 is a cross sectional view taken along line 152—152 in FIG. 151.

FIG. 150 is an exploded, schematic view of a preferred aperture cup according to the invention. FIG. 151 is a schematic view of the aperture cup showing details of the aperture. FIG. 152 is a cross sectional view taken along line 152—152 in FIG. 151. As shown in FIGS. 150–152, the bulb is inserted in a reflective ceramic cup and positioned approximately symmetric with respect to the aperture. The cup is then filled with a reflective material which hardens to encase the bulb and secure the bulb in position. Other details of bulb and aperture forming processes are described above, in section 4.2.4 below, and in PCT publication WO 97/45858. Preferably, the reflective cup and the reflective material are low dielectric/high (relative) thermal conducting materials to aid in thermal management of the lamp.

Figure 153:
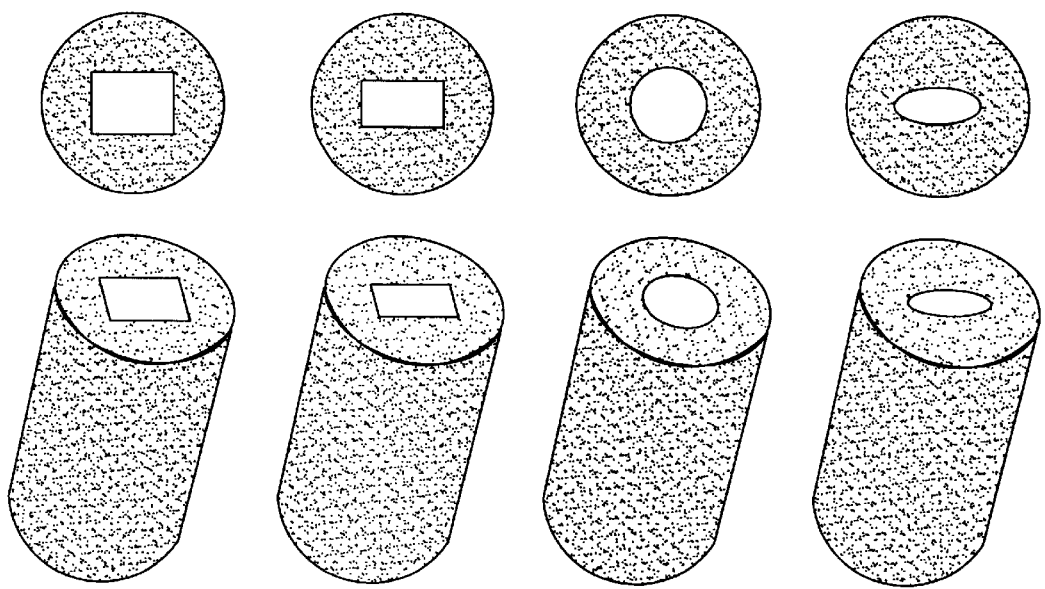
FIG. 153 shows several examples in which a bulb with a flat face is encased in a reflective cup with a variety of apertures shapes.

According to another aspect of the present invention, the shape of the aperture is configured to optimize optical efficiency. For example, a round aperture is utilized when coupling to the circular end of a fiber optic. A rectangular optic of aspect ratio of 3 to 4 or 9 to 16 is utilized when coupling to an LCD display engine. Yet more complex shapes are utilized when generating the beam for an automotive headlamp. For virtually any application an optimally shaped aperture can be designed. Lamps with two or more apertures are also possible. FIG. 153 shows several examples in which a bulb with a flat face is encased in a reflective cup with a variety of apertures shapes.

4.2.3 Exemplary Processes for Filling Aperture Cup

The preferred aperture bulb according to the invention is shown in FIG. 152. A desired aperture shape is pre-formed in a base of a ceramic cup. A quartz bulb having a goblet shape is positioned approximately symmetric with respect to the aperture and with a flat face of the bulb abutting the aperture. The volume of the cup not occupied by the bulb is filled with a reflective ceramic material. Exemplary processes for constructing the illustrated bulb are described below.

4.2.3.1 Hand Gupping

A slurry or gup comprising 60% Nichia (part no. 999-42 from Nichia America Co.) and 40% methanol is prepared. The gup should be flowable such that it can be drawn into a 5–10 cc syringe. The cup is placed in methanol and allowed to wet to fill the pores in the cup before gupping. A small amount (about 1 cc) of gup is placed into the cup near the aperture. The bulb is slid up to the aperture, displacing some of the gup through the aperture and around the bulb. The cup is then filled about half full with gup and tapped gently on a flat surface to pack the material (e.g. remove air bubbles or voids). After several minutes of air drying, the material is further packed with a small stick or the like. Additional gup is applied in several increments until the cup is filled, with each application being tapped, dried, and packed as just described. The gup is then removed from the aperture area and the assembly is oven dried at about 100° C. for 10 minutes and then baked at about 900° C. for 30 minutes.

4.2.3.2 Solid Casting

A slurry is prepared comprising about 70% Nichia, 27% DI water, and 3% Darvan 821-A. The slurry is rolled for several hours to fully disperse the Nichia. The bulb is glued to the cup from the outside in the area of the aperture and a latex tube is placed over the open end of the cup so that the cup can be overfilled by about 6 mm. The cup is placed in DI water for about 10–20 seconds to saturate the pores with water. The cup is removed and excess water is blown out of the inside of the cup with compressed air or nitrogen. The slurry is drawn into a syringe and slowly dispensed into the cup taking care to avoid air bubbles. A rubber cap is placed over the latex tube and the slurry is air dried for 2–3 hours. The rubber cap and latex tube are then removed and excess material is trimmed from the end of the cup with a knife or razor blade. The cup is heated at a rate of 10° C./minute up to about 900° C. and then held at 900° C. for about 30 to 60 minutes.

4.2.3.3 Use of Centrifuge to Pack Cup

Preferably, the resulting reflective ceramic material is dense and without air pockets. In the above-described procedures, there is a trade-off between good flow characteristics and resulting density. Also, it is time consuming and difficult to avoid air pockets using the above procedures. According to a present aspect of the invention, the cup is packed with gup using centrifugal forces. For example, using a centrifuge to pack the cup with the slurry facilitates application of significant forces on the slurry which can cause the slurry to flow into small crevices and force air pockets out. Prolonged time in the centrifuge can separate the liquids from the solids thus changing the solid content of the casting. Controlled configurations may be utilized to construct ceramic parts with variable or gradient density. According to the present invention, the centrifuge process increases the density of the resulting reflective ceramic material with a lesser requirement for good flow characteristics.

An exemplary centrifuge process is as follows. A slurry is prepared comprising about 5% Nichia and 95% water or methyl alcohol. The slurry is milled for at least about 1 hour before gupping. The bulb is centered about the aperture and glued from the outside of the cup. A centrifuge fixture is configure to hold the cup so that the aperture end of the cup is radially outward during spinning. The ceramic cup is relatively porous and the water/methyl alcohol seeps through the face of the aperture cup under sufficient centrifugal forces. The fixture may be configured to hold an amount of slurry in excess of the volume of the cups so as to reduce the number of processing steps. The fixture and/or cups are then filled with the slurry and spun at about 3900 revolutions per minute for about 5 minutes or until no further water/alcohol is observed leaking from the fixture. The filling and spinning are repeated until the cup is filled. The cups are then removed from the fixture, oven dried at about 80–90° C. for 30 minutes, and baked at about 900° C. for 30 minutes.

An alternative process is to use a first mixture of 5% Nichia/95% water and a second mixture of 50% Nichia/50% water. The 5/95 mixture is used at least until the bulb is substantially covered with the packed ceramic material. Thereafter, the 50/50 mixture is used to speed processing.

4.2.4 Exemplary Performance Data

Exemplary performance parameters of the lamp of the present invention are as follows:

TABLE 5

|  | DC Power | Aperture | Brightness | 2D Lumens | CCT | CRI |
|---|---|---|---|---|---|---|
| Case # 1 | 120 W | 9 mm$^2$ | 53 cd/mm$^2$ | 1500 | 6800° K. | >90 |
| Case # 2 | 120 W | 18 mm$^2$ | 45 cd/mm$^2$ | 2500 | 7500° K. | >90 | where in each case the bulb fill is about 1.8 mg/cc of InBr and the bulb is a wine glass shaped bulb with dimensions of about 7 mm outer diameter and 6 mm inner diameter (bulb interior volume of about 0.1 cc).

Figure 154:
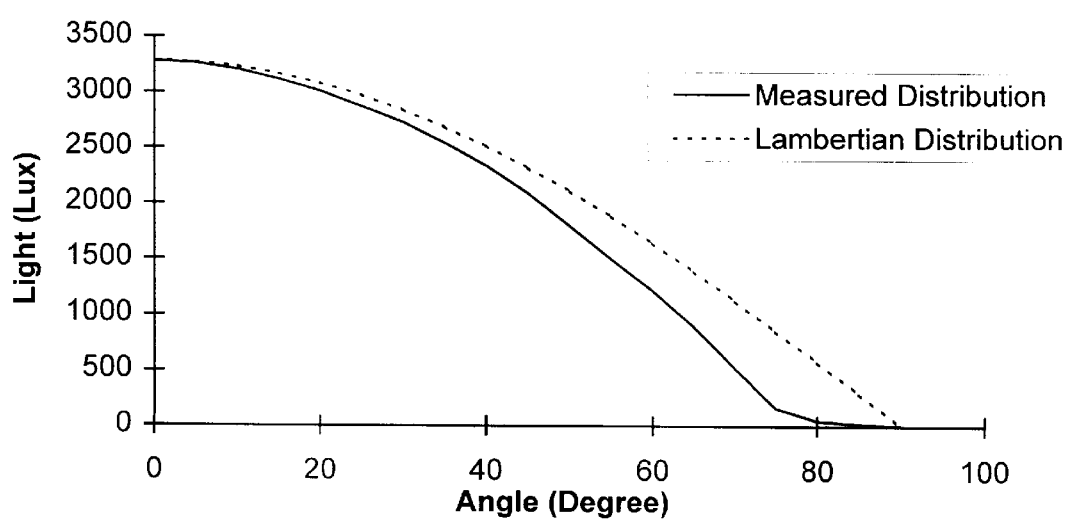
FIG. 154 is a graph of measured angular distribution of light from the lamp of the present invention as compared to a Lambertian distribution of light.

An advantage provided by the lamp and aperture structures of the present invention is a near Lambertian angular distribution of light. FIG. 154 is a graph of measured angular distribution of light from the lamp of the present invention as compared to a Lambertian distribution of light. The near cosine distribution of the light allows for the efficient generation of highly collimated shafts of light. Both imaging and non-imaging optical elements can be matched to the aperture to achieve the desired beam angle.

The aperture lamp topology holds other important advantages. By adjusting the size of the aperture relative to the size of the bulb, the lamp of the present invention can trade lumen efficacy for source brightness. A smaller aperture port will yield lower lumen efficacy, but higher source brightness. Conversely, a larger aperture increases the luminous flux but reduces the brightness of the source. For example, an efficient light source which is excellent for general illumination is achieved by opening the aperture to match or nearly match the bulb diameter. In such a configuration, the lamp of the present invention is readily adapted to up light or down light fixtures to provide effective lighting for office environments, schools, factories, shops, homes, and virtually anywhere which requires or benefits from artificial lighting.

The shape of the bulb can likewise be varied to optimize coupling to the RF field and to the optical aperture. For example, a bulb shaped like the top of a wine glass with a flat face on top works well for a lamp with a single aperture. A bulb shaped like a hockey puck could be chosen for better optical coupling when two oppositely disposed apertures are desired. The size of the bulb can also be varied. In general the size of the bulb is a function of power level and the required source brightness. In general, larger bulbs are required for higher power levels. At a given power level a small bulb with a smaller aperture will produce a brighter source. Bulbs can be constructed from a variety of materials, glass, quartz, alumina, etc. The bulb envelop does not need to be transparent, only translucent. Any material that is translucent, can withstand the necessary operating temperatures, is chemically inert to the chosen fill and does not excessively interfere with the RF wave can be used.

Traditional light sources emit light in three dimensions. A reflector is typically used to redirect and focus the light onto the desired object or plane. For the illumination of large areas these tried and true techniques work fine. However, when a narrow, highly collimated light beam is needed, conventional light sources are quite inefficient. Moreover, many conventional lamps provide only a localized bright spot, with most of the source lumens emanating from a different, significantly less bright portion of the discharge.

Figure 155:
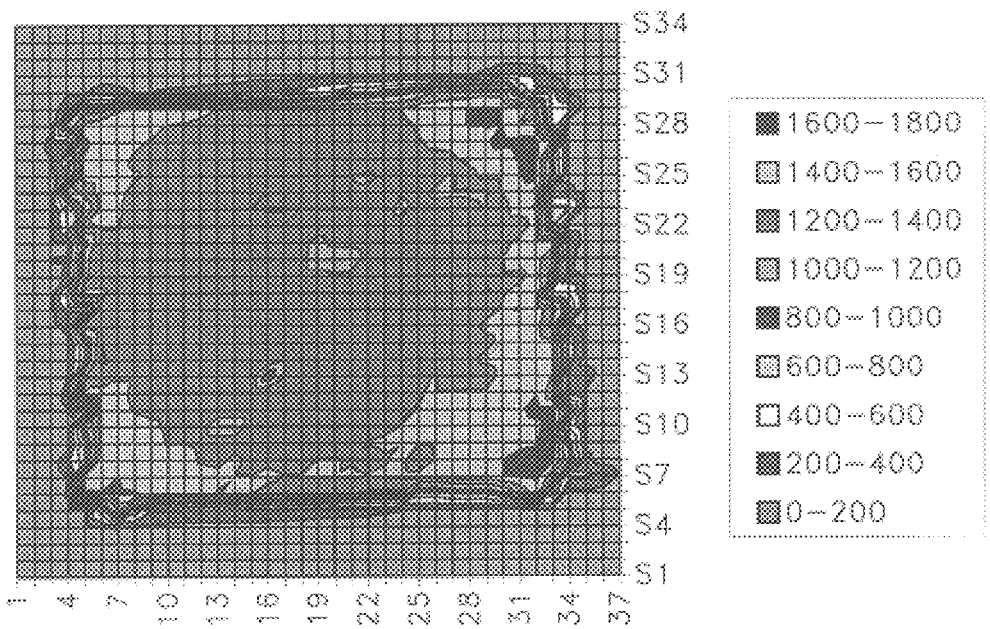
FIG. 155 is a graph of near field distribution.
Figure 156:
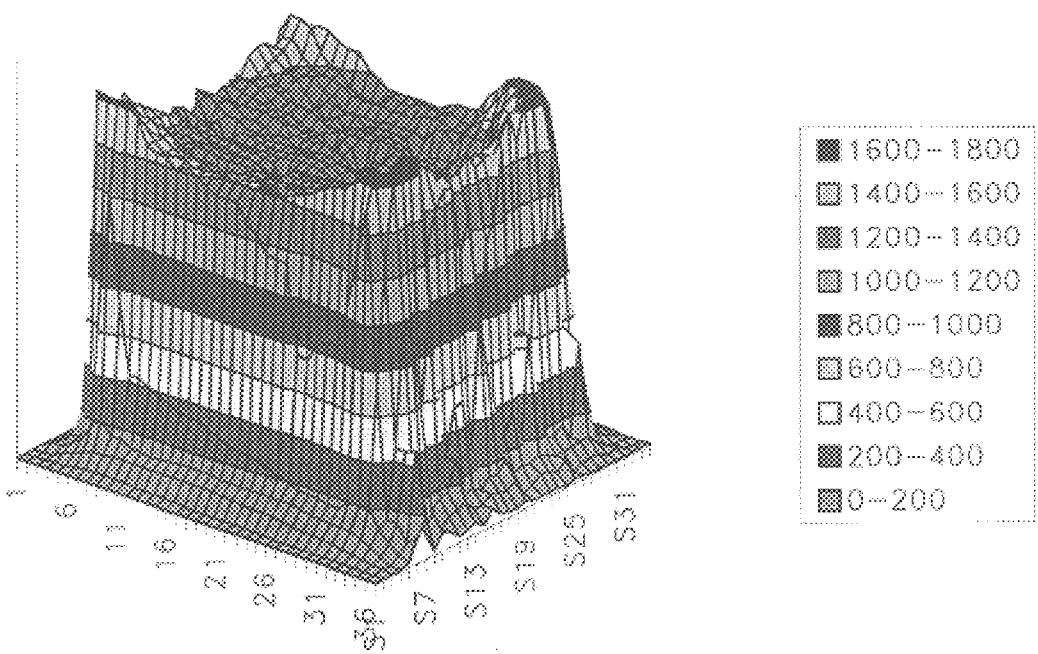
FIG. 156 is a three dimensional graph of an exemplary near field distribution of the lamp of the present invention.

In contrast to conventional light sources, light emitted from the lamp of the present invention aperture is directed in only two dimensions. In other words, the brightness is uniform with little deviation between the peak and average brightness across a two dimensional area. FIG. 155 is a graph of an exemplary intensity map of the lamp of the present invention for a near field distribution. FIG. 156 is a three dimensional graph of an exemplary near field distribution of the lamp of the present invention.

A low étendue is a necessary but not sufficient feature for efficiently coupling of light into small optical systems such as fiber optics or small diagonal LCDs. The other necessary feature to maximize coupling is the match of skewness distribution between source and target. Unless the source and target skewness distributions are well matched, it is difficult to maintain both low étendue and high collection efficiency. Generally, three-dimensional light sources do not provide a good match of skewness distribution with planar targets such as fiber optics or LCDs. For example, it is well known in the art that transferring light from a spherical source with axially symmetric optics causes a loss of étendue or collection efficiency or both.

Advantageously, the lamp of the present invention provides both low étendue and an excellent skewness match for planar targets. The two-dimensional light source provided by the lamp of the present invention maximizes the collection efficiency for optical systems in which it is also necessary to maintain low étendue.

The foregoing advantages concerning low étendue, skewness match, and angular distribution can be effectively utilized by reflective, refractive, imaging, and non-imaging optics to create bright and efficient optical systems. For example, the angular distribution of the lamp of the present invention is well suited to all types of collection optics such as reflective or refractive compound parabolic concentrators (CPCs) and light pipes, and a variety of imaging optical solutions.

While the lamp of the present invention uses an inductive RF coupling structure, the benefits of the aperture lamp technology is broadly applicable when used with other coupling structures.

4.2.5 Spectral Distribution

Figure 157:
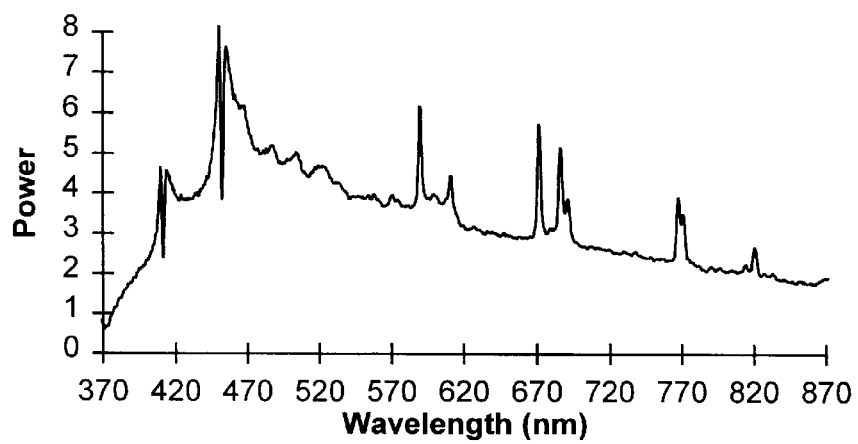
FIG. 157 is a graph of spectral power distribution for an indium bromide only fill as described above.
Figure 158:
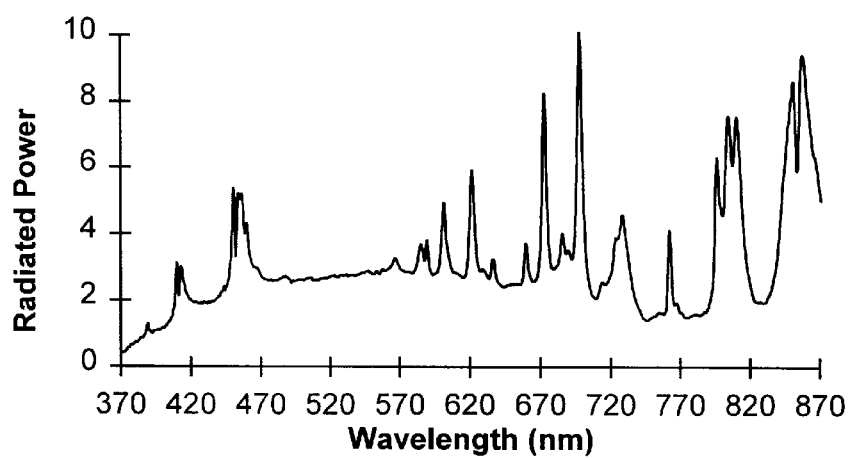
FIG. 158 is a graph of spectral power distribution for a fill including indium bromide and cesium bromide.
Figure 159:
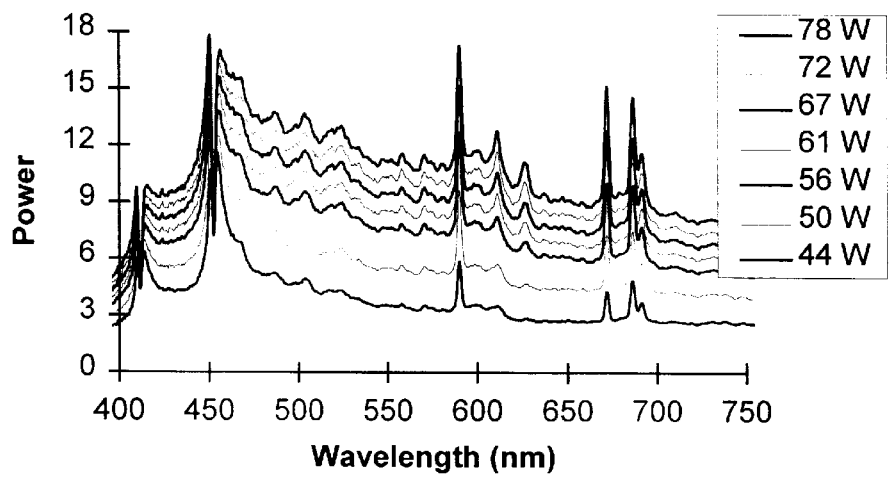
FIG. 159 is a graph of spectral power distribution for an indium bromide only fill at varying levels of RF power.

The aperture bulb technology described herein, coupled with selected bulb fills, delivers full spectral light at high CRI and color temperatures which are excellent for many applications. Color temperature and spectral balance can be tailored by choice of bulb fill chemistries and dose. The lamp of the present invention can also utilize fills and/or filters to produce light of specific color bands. A full range of bulb fill materials from conventional mercury and metal halides to sulfur and selenium can be used in the lamp of the present invention. FIG. 157 is a graph of spectral power distribution for an indium bromide only fill as described above. FIG. 158 is a graph of spectral power distribution for a fill including indium bromide and cesium bromide (0.8 mg/cc InBr, 0.2 mg/cc CsBr, 50 Torr Kr). Unlike most other discharge lamps, the light output of the lamp of the present invention can be readily dimmed. FIG. 159 is a graph of spectral power distribution for an indium bromide only fill at varying levels of RF power.

4.2.6 Ball Lens

As noted above, the angular distribution from the lamp of the present invention can be configured to be a nearly Lambertian distribution. In other words, the light exits the aperture distributed over an angle of 180 degrees or over a cone with a half angle of 90 degrees. In certain applications, it is desirable to focus as much as possible of the exiting light onto another surface while providing a maximum concentration.

Figure 12:
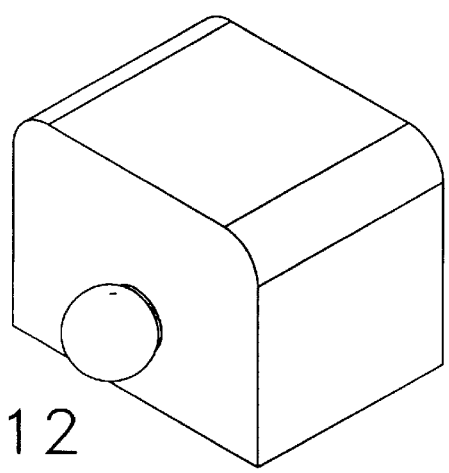
FIG. 12 is a perspective view of the lamp of the present invention utilized in conjunction with a ball lens.
Figure 13:
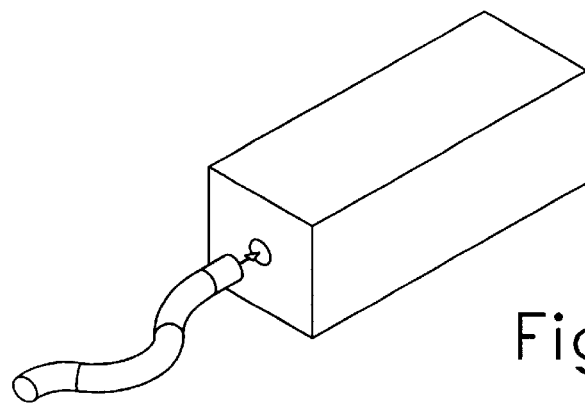
FIG. 13 is a perspective view of the lamp of the present invention directly coupled to a large core fiber optic.
Figure 14:
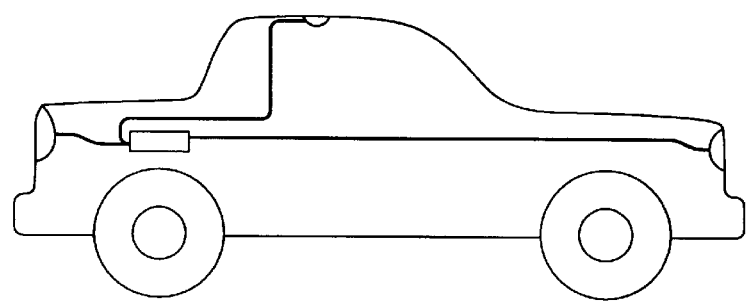
FIG. 14 is a schematic diagram of the lamp of the present invention used in an automotive lighting system with fiber optic distribution.
Figure 15:
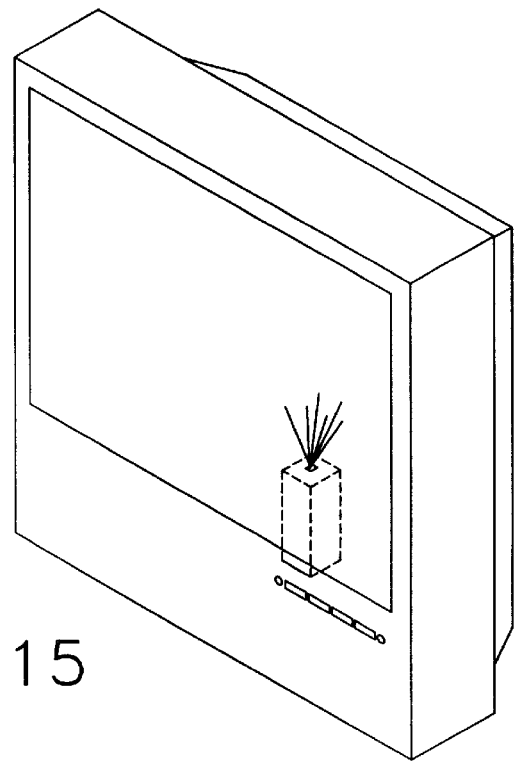
FIG. 15 is a perspective view of the lamp of the present invention used in a projection display.

With conventional light source, and in general, it is difficult to capture light distributed over 180 degrees. However, as shown in FIG. 12, a ball lens may be utilized in conjunction with the lamp of the present invention to capture substantially all of the light exiting the aperture. A ball lens may take the form of a truncated sphere or ellipsoid. In this case, the light enters a first surface (the flat side) of the ball lens which is placed in contact or near contact with the aperture and exits a second surface (the spherical side) of the ball lens. The light exiting the aperture enters the ball lens, passing from a region of low refractive index (air) to a region of high refractive index (the ball lens). The light is thereby refracted so that it is distributed over a cone angle much less than 180 degrees.

Even when passing from air to an optical material with a relatively low refractive index such as fused silica, the cone angle is less than 90 degrees. The ball lens has a convex second surface from which light exits without returning to an angular distribution of 180 degrees. With the appropriate choice of center thickness and radius, the second surface can reduce the cone angle significantly below 90 degrees.

After exiting the ball lens with a reduced angle of distribution, conventional lens design can manipulate the light. Significantly, substantially all of the light exiting the aperture is utilized by the optical system.

Alternatively, the ball lens may take the form of a complete sphere or ellipsoid or other solid arcuate shape. Total utilization of the available light may be achieved using a completely spherical ball lens. Also, the first surface of the ball lens may be aspheric. Even with a spherical second surface the ball lens may be designed to be an aplanat.

For a ball lens without a truncated surface, a round aperture shape is preferred.

4.2.7 Ceramo-quartz Lamp

Electrodeless lamps of the type with which the present invention is concerned are comprised of a light transmissive bulb having an envelope containing a plasma-forming medium. A microwave or radio frequency (RF) energy source has its output energy coupled to the envelope via a coupling arrangement to excite a plasma, resulting in a light discharge. The envelope is embedded in or surrounded by a jacket of reflective material over nearly the entire envelope surface, except for a small area, known as an aperture, through which light is permitted to pass.

Section 4.2.2 above discusses a method of manufacturing an electrodeless aperture lamp which possesses certain advantages over the prior art. In the aperture structures from section 4.2.2, a mold cavity is provided, an aperture forming member is inserted therein, a lamp envelope is placed therein proximate the aperture forming member, and the interior of the mold cavity is filled with a flowable, reflective material, which after hardening forms a jacket around the lamp envelope.

A present aspect of the invention is directed to a method of manufacturing an electrodeless aperture lamp which possesses other advantages over the prior art.

It is important for certain methods of making electrodeless lamps to be easily accomplished by mass production so that large production quotas can be readily filled. It is also important that the resulting lamp be durable, so that its longevity is increased. The electrodeless lamps to which the invention pertain operate at a high temperature and become very hot, especially during operation over extended periods. It is therefore important to remove the heat from the bulb, which is made of quartz, and will otherwise melt. To accomplish this, the heat is transmitted from the bulb to a heat sink where the heat is dissipated, and it is desirable for the transmission of the heat from the bulb to the heat sink to be high.

It is thus an object of one aspect of the present invention to provide a method of making an electrodeless aperture lamp which is easy to implement and lends itself to the economies of mass production.

It is a further object of one aspect of the invention to provide an electrodeless aperture lamp which is durable.

It is still a further object of the invention to provide an electrodeless aperture lamp which has a high heat transmission characteristic.

It should be understood that the above objects are achieved individually and in combination with each other, so the invention should not be construed as requiring two or more of the objects to be combined.

First Example of a Ceramo-Quartz Aperture Structure

Figure 160:
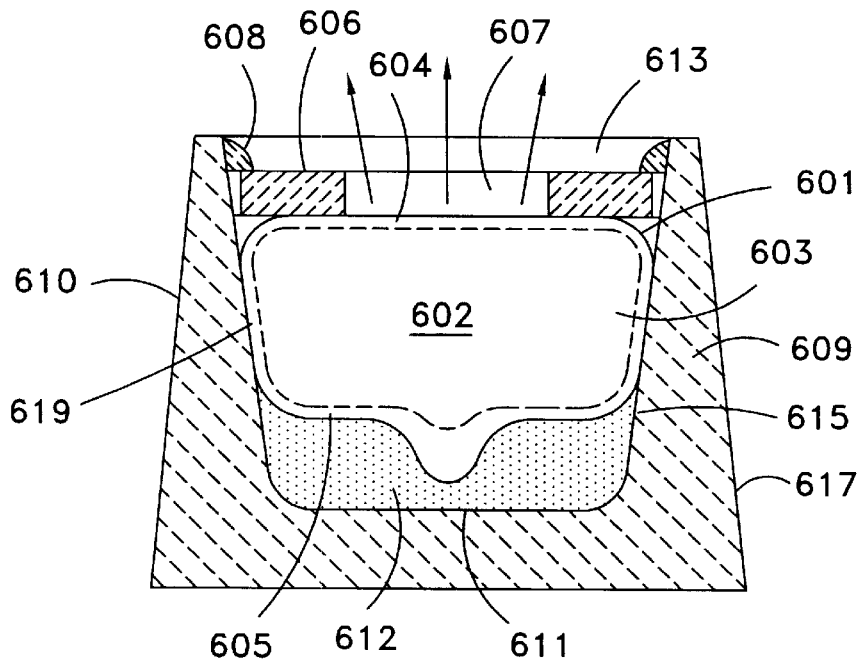
FIG. 160 shows a ceramo-quartz aperture lamp bulb in accordance with a first embodiment of one aspect of the invention.

A lamp bulb in accordance with a first example of the present invention is depicted in FIG. 160. A lamp envelope 602 is shown which is typically made of quartz and is filled with a discharge forming medium which emits light when excited. By way of non-limiting example, a possible fill is a sulfur or selenium based substance, as disclosed in the above-mentioned U.S. Pat. No. 5,404,076. Also, the envelope may be made by the method discussed in section 4.2.1 above.

The envelope is located in a container 610 which has a closed end 611, and a side wall 609 which opens into a mouth 613. The side wall has an inside surface 615 and an outside surface 617, and at least the portion of the inside surface 615 which abuts the lamp envelope is arranged to be reflective. In the preferred example, the container 610 is made of reflective, ceramic material, and is cup-shaped.

Between the lamp envelope 602 and the container end 611 is a reflective fill material 612 which, as shown, fills the region between the container end and the lamp envelope. In the preferred example, this material is a reflective ceramic having a lower density than the ceramic of which the container 610 is made. For example, the fill material 612 may be a hardened slurry or powder.

A bulb surface 604, which faces the container mouth 613 has a washer 606, at least the inside surface of which is reflective, secured thereto, e.g., with a ring 608 of bonding material. The washer comprises an aperture-forming member which forms an aperture 607, and in the preferred example is made of reflective, ceramic material. The bulb surface 604 is preferably flat to allow for easy attachment of the washer 606, although the washer can be secured to rounded surface portions 601 also.

The inside surface 615 of the container side wall is conical in shape and tapers toward the container end. In the preferred example, it has circular cross-sections of progressively decreasing diameters in the direction towards the container end. The lamp envelope 602 has a side wall 619 in the preferred example which is also conical in shape. It is congruent with the inside surface 615 of the container side wall, and abuts such inside surface. The outside surface 617 of the container wall is also conically tapered, and in the preferred example, tapers in the opposite direction from the inside surface.

Figure 161:
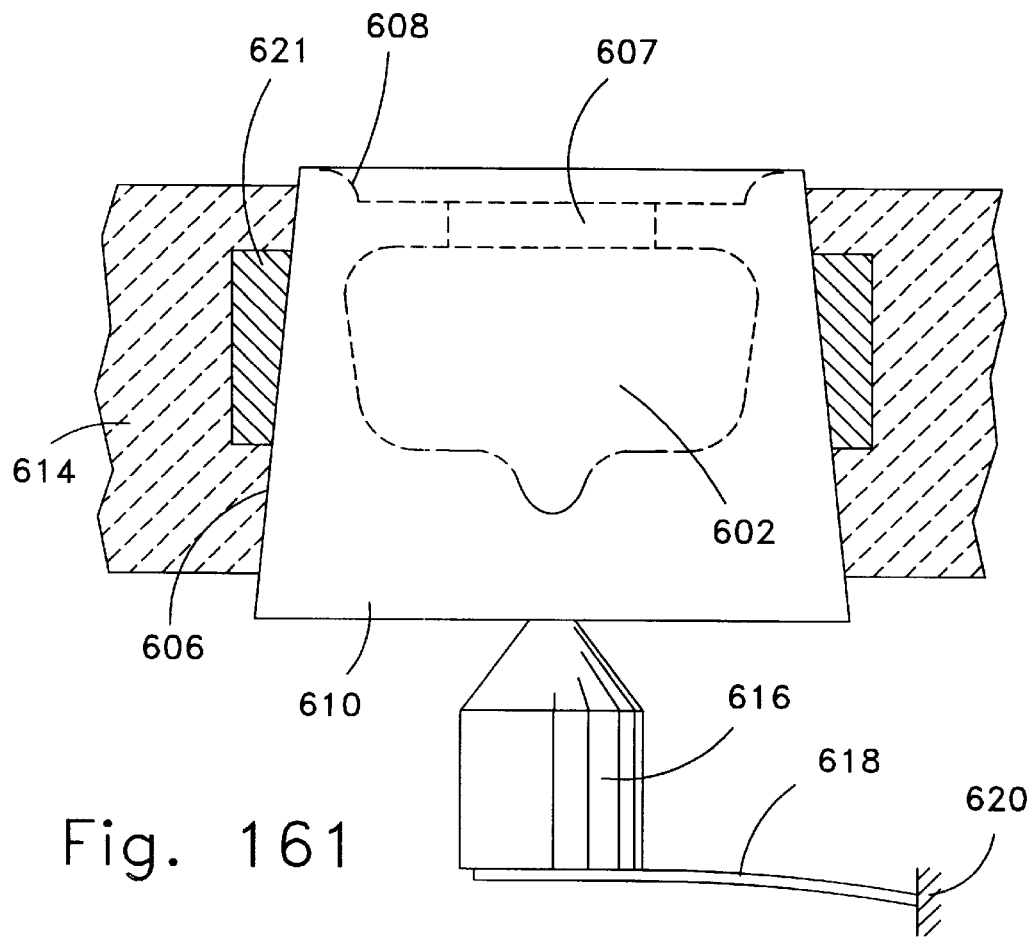
FIG. 161 shows the embodiment of FIG. 160 combined with an excitation coil and heat sink.

FIG. 161 shows a lamp which incorporates the aperture lamp bulb of FIG. 160. An excitation coil 621, which may be in the form of a metallic band, is disposed around the container 610, while a heat sink 614, which may be made of a boron-nitride ceramic material surrounds the bulb and excitation coil. A plunger 616 which is biased by a spring 618, attached to a support 620, prevents movement of the lamp when it is turned off and physical contraction takes place due to cooling. It is noted that the inside surface 622 of the excitation coil 621 is tapered so as to mate with the taper of the outside surface 617 of the container wall.

The bulb shown in FIG. 160 and the lamp depicted in FIG. 161 possess many advantages, which will be described in greater detail below.

FIGS. 162 to 165 illustrate an example of the method of the invention. Referring to FIG. 162, the washer 606, which may be made of reflective ceramic is first cemented to the lamp envelope 602 with cement 623, which is preferably an organic material selected to decompose at the temperature used to dry, cure, or sinter the reflective material in the present invention.

The ceramic washer may be made of an alumina/silica combination, e.g., 90% alumina and 10% silica with a desired porosity. As is known to those skilled in the art, ceramic technology is available to easily mass produce such washers by mold pressing ceramic bodies as they are transported on a conveyor belt. To accomplish the cementing of the washer 606 to the bulb envelope, lamp envelope 602 is placed in a holder 624 which is of a similar shape as the bulb. The holder 624 has a centrally located opening 625 in which the bulb tip 626 may be inserted to effectively hold the lamp envelope 602 steady during the cementing step.

As shown in FIG. 163, the container 610 is provided, which may be cup-shaped. The container 610 may be of relatively high density ceramic material, e.g., the same material as the washer. The container 610 may be made in a mold, and is easy to mass produce with known ceramics technology. As noted above, the side wall of the container has inside and outside surfaces which are conically shaped, with the inside surface tapering towards the container bottom while the outside surface tapers towards the container top.

The next step of the method is to fill the container 610 with a reflective slurry or powder 612 to a predetermined level, e.g., with a nozzle 627 which is fed by a source of the slurry or powder. The slurry or powder is preferably made of a relatively low density ceramic material, e.g., substantially pure alumina mixed with water and a small amount of organic additive to prevent sedimentation.

The next step is shown in FIG. 164, and is comprised of inserting the bulb envelope/ceramic washer combination in the container 610. A vacuum holder 629 may be used to hold and lower the envelope into the proper position, which is shown in FIG. 160. After the lamp envelope is in the correct position, as shown in FIG. 165, the ring 608 of ceramic bonding material is applied to secure the ceramic washer 606 to the wall of container 610. The ceramobond has a paste-like consistency, and is typically made of a combination of alumina and silica powders combined with organics.

The slurry is allowed to harden by drying, and the next step in the method is to cure the lamp bulb in an oven in order to cure the slurry and ceramobond. Curing of the slurry may be at a temperature of at least 500° C. and may be done for a period of 15 to 20 minutes, while curing of the ceramobond may be at about 50° C. and may take 1 to 2 hours to finish. If a powder is used, the powder may be heated and/or partially sintered.

It can now be appreciated the method of the invention described above provides an easy way to manufacture an aperture lamp, which can be conveniently accomplished by mass production. Additionally, it follows from the method that the lamp which is produced is quite durable.

Referring to FIG. 160 again, it is seen that the conical side wall 619 of the lamp envelope 602 abuts the inside surface 615 of container side wall 609. The mating tapered surfaces provide sure contact, which facilitates heat transfer away from the lamp envelope, ensuring that the lamp operates at a low enough temperature.

Referring to FIG. 161, it is seen that the inside surface 622 of excitation coil 621 is tapered so as to mate with the outside surface 617 of the container side wall. The inside surface of the annularly shaped heat sink 614 is similarly tapered. The mating tapered surfaces provide sure contact therebetween, resulting in high heat transfer. In the preferred example, the taper of both the inside and outside surfaces of the container side wall is between 0.5° and 2.0°.

Referring again to FIG. 160, it is seen that the washer 606 forms the aperture 607 through which light exits the bulb. The use of a flat washer as an aperture forming member is one of the improvements of the present invention, since this part is standardized and easy to manufacture and install. In some lamp applications, the washer would be used as shown, while in other applications, additional light extraction members such as fiber optics would be associated with the washer, for controlling the light as desired.

Second Example of a Ceramo-Quartz Aperture Structure

Figure 166:
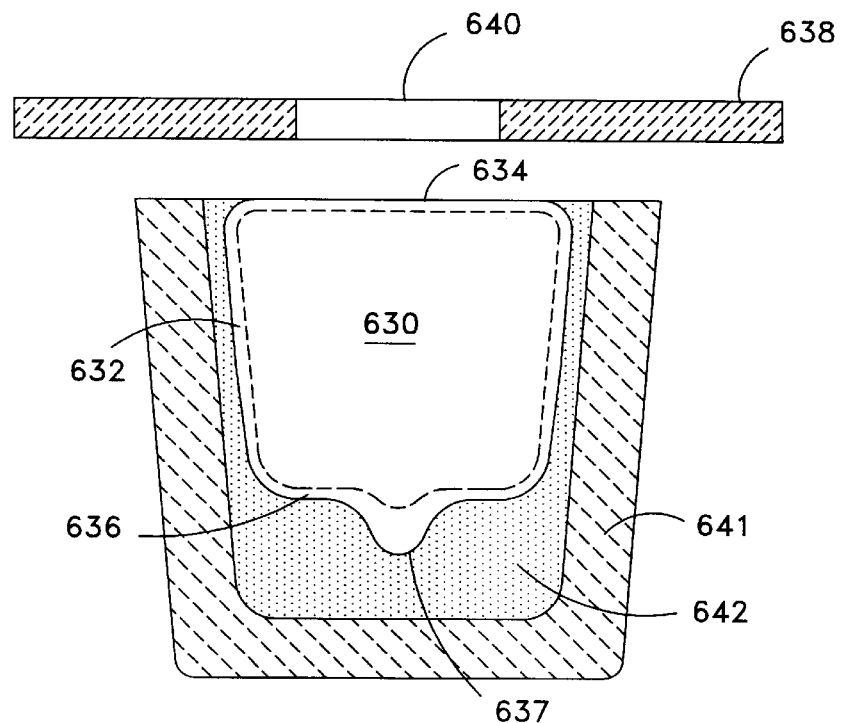
FIG. 166 shows an aperture lamp bulb in accordance with a second embodiment of the invention.

Referring to FIG. 166, a second example of an aperture lamp bulb in accordance with the invention is shown. In this example, the entire region in the container between the side wall and the lamp envelope is filled with a reflective fill material 642.

Figure 167:
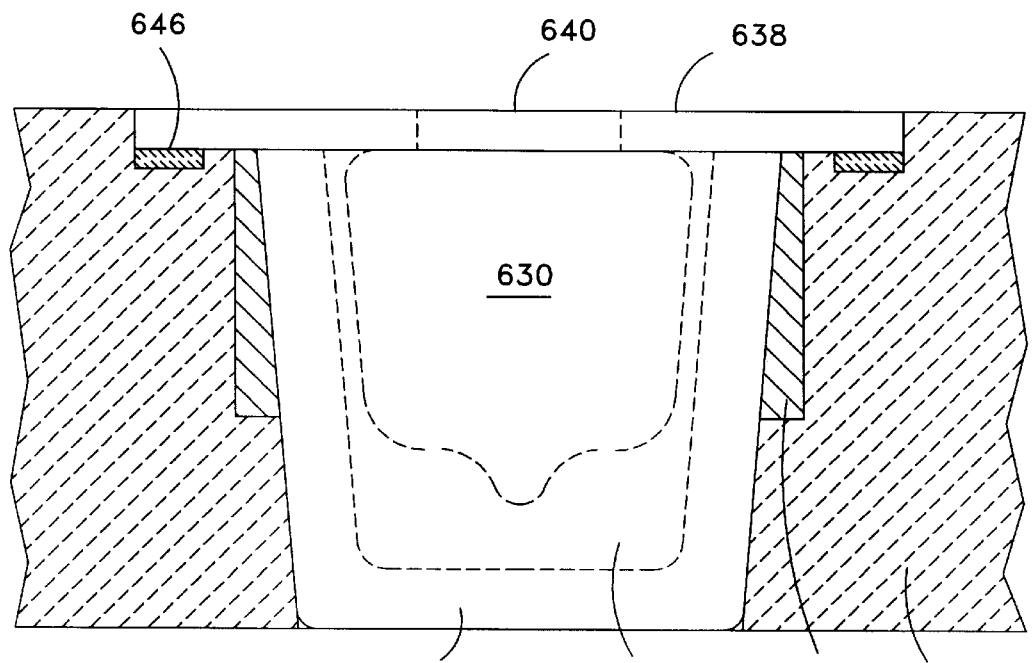
FIG. 167 shows the bulb of FIG. 166 combined with an excitation coil and heat sink.

Referring to the aperture lamp of FIG. 167, it is noted that a ceramic washer 638 is wider than in the first example, and is joined to the heat sink 644 with ceramobond 646. The flange provided by the oversized washer 638 facilitates heat transfer away from the bulb. The other components depicted in FIGS. 166 and 167 are similar to the corresponding components of FIGS. 160 and 161.

Figure 168:
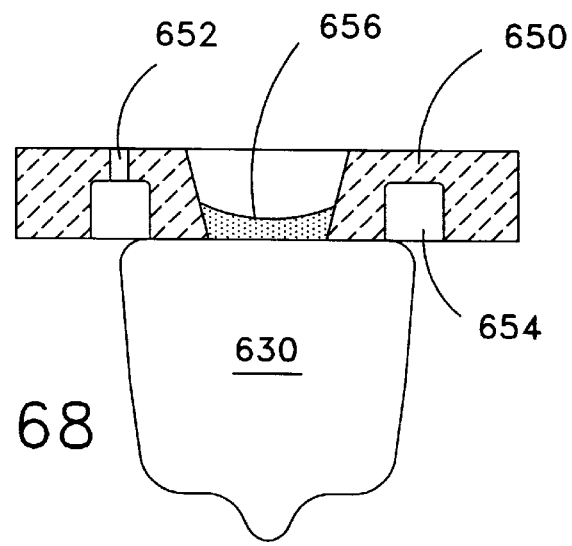
FIGS. 168–171 show an embodiment of a method of making the bulb of FIG. 166.

The method of manufacturing the example of FIGS. 166 and 167 is illustrated in FIGS. 168 to 171. Referring to FIG. 168, the first step is comprised of cementing a technological ceramic washer 650 to the top flat surface of a lamp envelope 630 with cement 656, as explained in connection with the prior example. The technological washer 650 has a circular channel 654 therein, which leads to an orifice 652.

Figure 169:
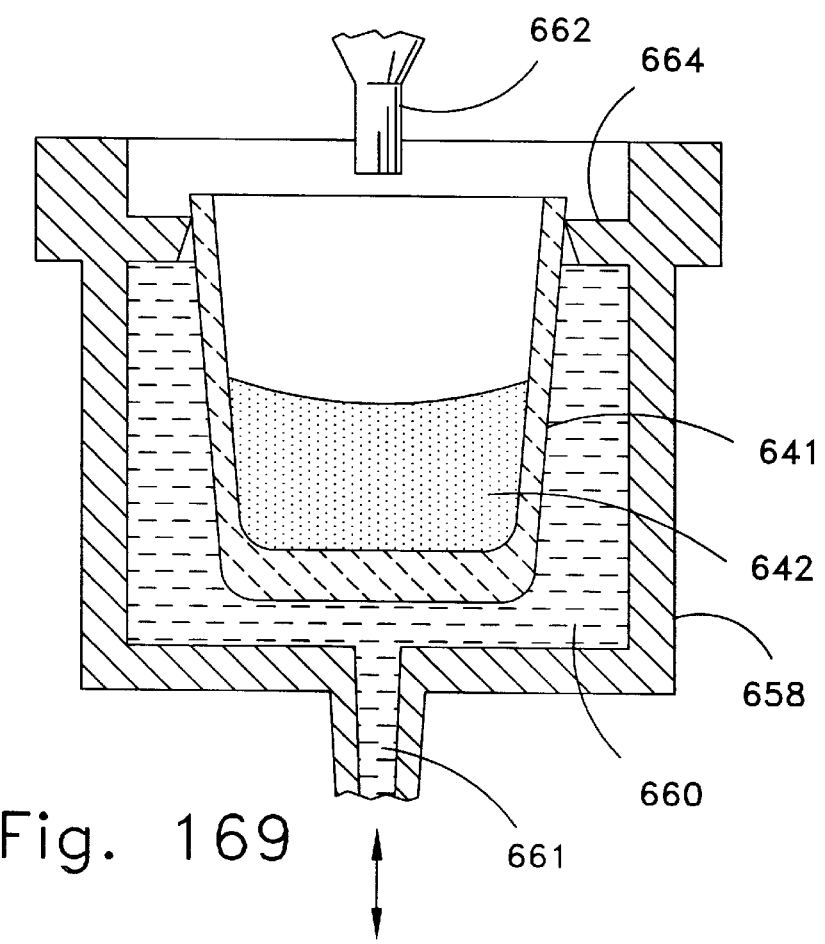

Referring to FIG. 169, a container 641 is provided, which may be cup-shaped, and is made of ceramic which may be reflective. A vessel 658 is also provided, to which water may be supplied and extracted through an inlet/outlet 661.

The container 641 is inserted in the vessel 658 until its side wall abuts ledge 664 in the vessel. Water 660 is then caused to flow into the vessel 658 as shown. Then, container 641 is filled with reflective, flowable material such as a ceramic slurry to a predetermined level through nozzle 662. The purpose of the water is to exert pressure on the ceramic container 641 and seal its pores. This prevents liquid from leaking, which would cause the slurry to dry out.

Figure 170:
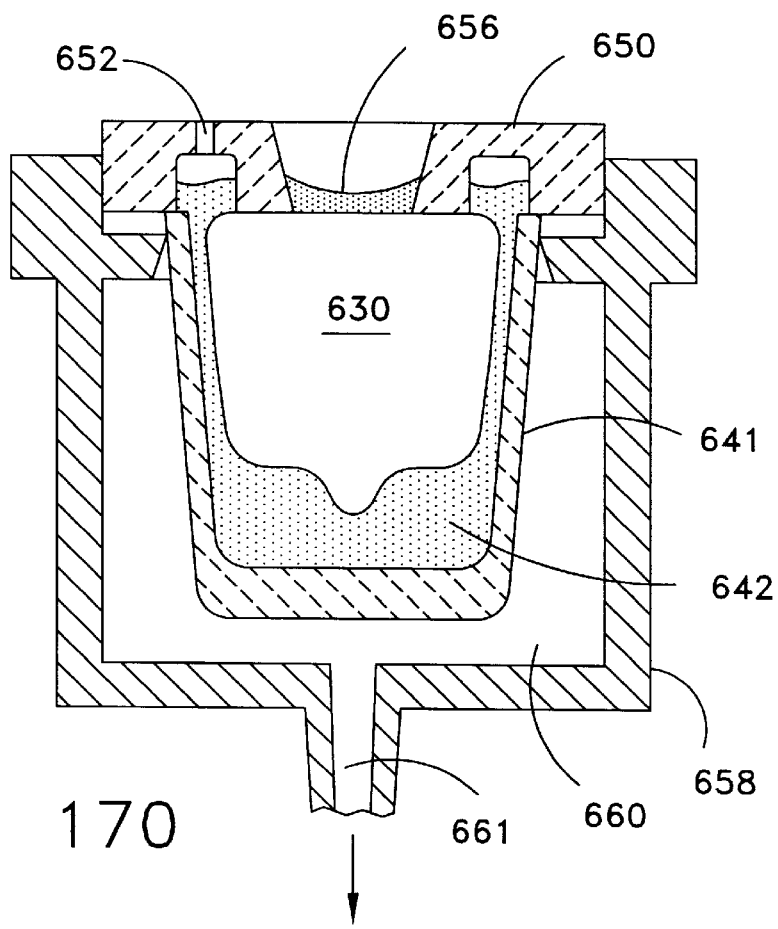

Then, referring to FIG. 170, the water 660 is evacuated from the vessel 658 and the lamp envelope/technological washer combination is inserted in the container 641. This causes part of the slurry 642 to flow into the channel 654 of the technological washer 650. It is necessary to overfill the container 641 with slurry, since in the thermal curing step, the slurry will shrink.

Figure 171:
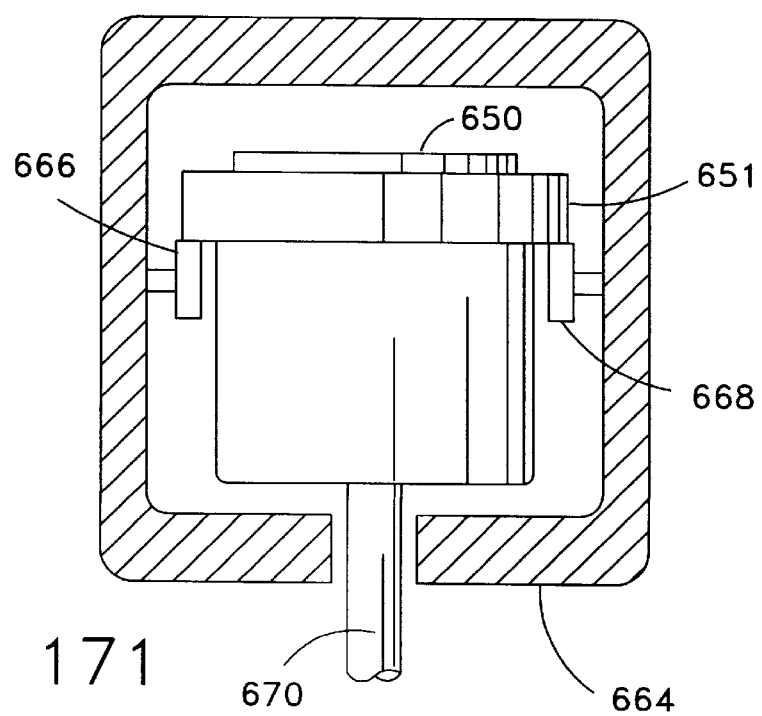

After drying of the slurry, the entire assembly shown in FIG. 170 is placed in tunnel oven 664, shown in FIG. 171, for thermal curing. Supports 668 are located in the interior of the oven for holding the assembly of FIG. 170. After curing the face of the bulb is cleaned of foreign material.

In the resulting lamp bulb, the hardened slurry 642 forms a jacket which covers the surface of envelope 630, but which does not uniformly adhere to or coat the envelope. Referring to FIG. 167, a ceramic heat sink 644, which may be boron nitride has an annular cross section, and is cemented to the container 641 and a coil 643. The heat sink has an annular channel therein near the top as depicted in FIG. 167, and ceramobond 646 joining the washer 638 to the heat sink 644 is located in this channel. The large size of the washer and ceramobond connection to the heat sink promote heat transfer from the bulb.

4.2.8 Design Feature for Alignment of the Aperture Cup

A preferred aperture cup/bulb assembly is shown in FIGS. 150–152. This assembly is axially, radially, and rotationally aligned in the lamp head, as shown in FIGS. 213 and 215. According to a present aspect of the invention, the aperture cup is provided with structural features for aiding the alignment of the assembly.

Figure 172:
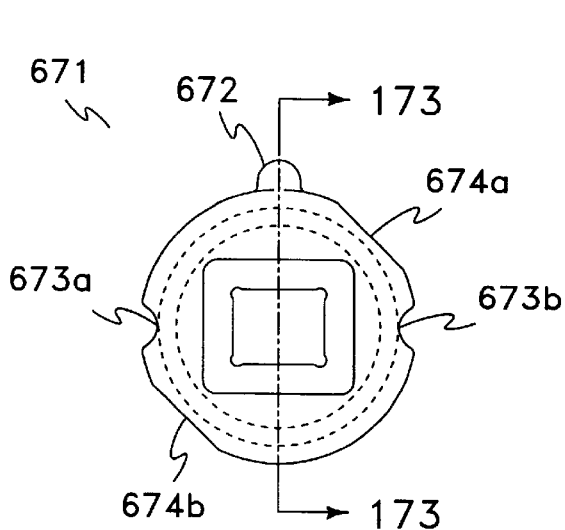
FIG. 172 is a schematic view of an aperture cup 671 according to the invention.
Figure 173:
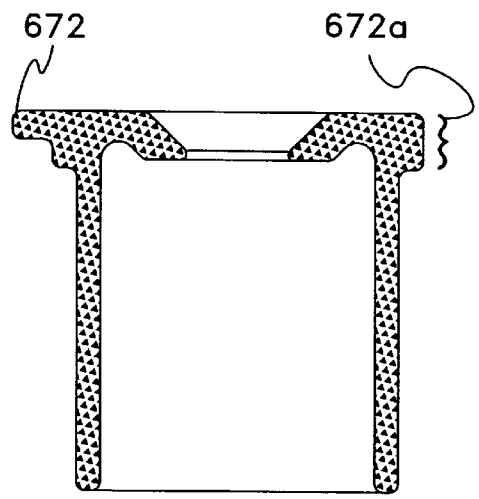
FIG. 173 is a cross-sectional view taken along line 173—173 in FIG. 172.

FIG. 172 is a schematic view of an aperture cup 671 according to the invention. FIG. 173 is a cross-sectional view taken along line 173—173 in FIG. 172. The aperture cup 671 includes several features for aiding alignment, including a protrusion 672, notches 673*a* and 673*b*, and flattened portions 674*a* and 674*b*. These features may be used individually or in combination as shown.

For example, the protrusion 672 may be sized to fit with the drilled area 260 as illustrated in FIG. 95 to provide rotational alignment of the assembly. As shown in FIG. 173, the aperture cup 671 further includes a rim 672*a* which acts as a stop (e.g. abutting the excitation coil) when the assembly is placed inside the lamp head at a desired axial alignment.

Figure 174:
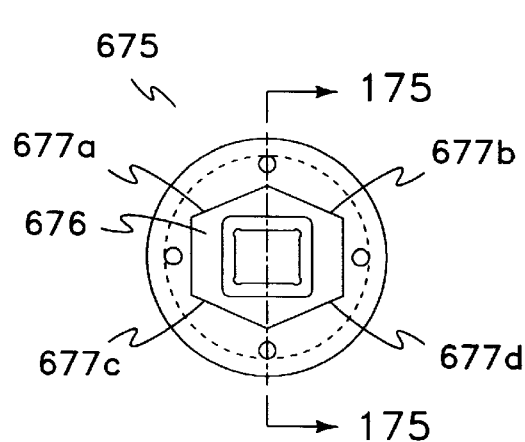
FIG. 174 is a schematic view of an alternative aperture cup 675 according to the invention.
Figure 175:
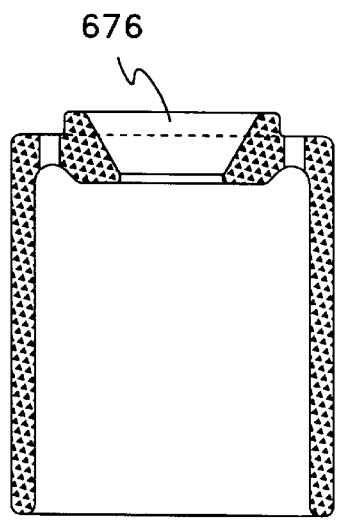
FIG. 175 is a cross-sectional view taken along line 175—175 in FIG. 174.

FIG. 174 is a schematic view of an alternative aperture cup 675 according to the invention. FIG. 175 is a cross-sectional view taken along line 175—175 in FIG. 174. The aperture cup 675 includes a raised portion 676 surrounding the aperture area. The raised portion 676 includes outside edges 677*a–d* which form a polygon. In the example shown, the polygon is a non-equiangular hexagon. The raised portion 676 may be readily grasped and aligned by automated component assembly equipment. For example, a fixture utilizing mating v-shaped fingers which move synchronously in diametrically opposite directions would be suitable to capture the aperture cup 675 in a repeatable rotational orientation. The automated component assembly equipment can be readily adapted to position the captured cup axially and radially in the lamp head. The angled orientation of the faces 677*a*, 667*b* and 677*c*, 677*d* accommodates a certain amount of dimensional variations while still facilitating accurate rotational alignment.

4.2.9 Flanged Aperture Cup

FIG. 176 is a schematic view of an alternative, preferred aperture cup 678 according to the present invention. FIG. 177 is a cross-sectional view taken along line 177—177 in FIG. 176. FIG. 178 is a perspective view of the aperture cup 678. The cup 678 includes a flange portion 679 extending from an end of the cup 678. The cup 678 may be made out of a ceramic material of, for example, fully densified alumina. Preferably, the flange cup 678 comprises about 90% alumina, 10% silica with a porosity of about 17% to 20%. As illustrated, the flange 679 is semi-circular with a flattened portion 680 along its periphery. A preferred bulb for the flanged cup is a 6.5 mm OD, 5.5 mm ID spherical bulb filled with 0.16 mg InBr and 30 Torr Kr.

The flanged cup 678 may be used an integrated lamp head as shown in FIG. 179. Preferably, the BN insert is counterbored to mate with the flange portion 679 to provide axial, radial, and rotational alignment of the cup, and to promote heat transfer away from the bulb. Thermal putty (e.g. T-putty 502) is applied between the flange cup 678 and the BN insert around an outer periphery of the flange 679. FIG. 180 is a perspective view of an alternative flanged aperture cup with the flange at the end of the cup opposite from the end with the aperture.

4.2.10 Starting Aid

An electrodeless aperture lamp may be inductively excited by a conductive excitation member which extends around the bulb in the azimuthal direction, for example a coil or similar member. However, the field which is coupled by the excitation coil, while sufficient to sustain a discharge, may not be locally concentrated enough to start the discharge. This is especially true if the fill includes one or more high pressure noble buffer gasses. Also the presence of the ceramic jacket may modify the field which penetrates through to the fill. Thus, a starting assist member is sometimes desirable to produce a field which is concentrated enough to trigger ignition.

Many different types of lamp starting assist arrangements are known in the prior art. However, the prior art arrangements may be unduly complex, contain parts which may break, and/or introduce appreciable additional size to the lamp. For example, such arrangements, include coils which may be moveable in and out of starting assist position, and metallic or gas electrodes which are located in elongated quartz housings which are attached to the bulb.

It is therefore an object of one aspect of a present aspect of the invention to provide a lamp starting arrangement for an inductively coupled aperture lamp which is simple, easy to manufacture, and reliable.

In accordance with an aspect of the invention, an electrodeless aperture lamp is provided which comprises a bulb containing a discharge forming fill, a ceramic reflecting jacket encasing the bulb except for an aperture, a conductive excitation member for inductively coupling excitation power to the fill which extends around the bulb and ceramic jacket in the azimuthal direction, and at least one conductive starting element embedded in the ceramic reflecting jacket for coupling a starting electrical field to the fill.

In accordance with a further aspect of the invention, the starting element which is embedded in the ceramic reflecting jacket is not connected to an electrical power source, but couples a starting electrical field caused by a voltage on the element which is induced by an electric field created by the conductive excitation member.

EXAMPLES OF STARTING ARRANGEMENTS

Figure 181:
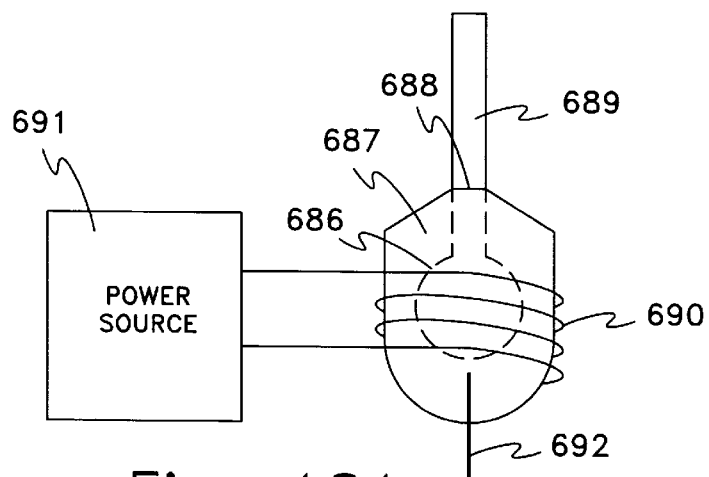
FIG. 181 shows an embodiment of the present invention utilizing a linear starting element which lies in the axial direction.

Referring to FIG. 181, a first example of the present invention is shown. A bulb 686 is surrounded by a non-adherent ceramic jacket 687. Light exits via an aperture 688 and fiber optic 689. The fill in the bulb 686 is inductively excited by a conductive excitation member 690, which in the example depicted is a helical coil which extends around the bulb 686 in the azimuthal direction. The coil 690 is connected to a power source 691, which typically is time varying electrical energy at radio frequency (RF).

The alternating current in the excitation coil produces a time-varying magnetic field (H field), which induces an electric field (E field) in the fill. During steady state operation, both applied H field and applied E field components are present, with the H field component usually being much greater. While it is the applied E field which starts the discharge, the E field produced by the excitation coil by itself may not be concentrated enough to ionize the fill and start the lamp. This is particularly true when the fill includes one or more high pressure buffer gases, which may be present to increase efficiency.

In accordance with an aspect of the invention, a starting element 692, which may be in the form of a wire, is embedded in the ceramic jacket. The ceramic jacket provides a suitable support means for the starting element, so that extra components such as subsidiary support envelopes are not necessary. The element may be installed in the ceramic jacket during the early stages of the sintering process, so that the sintered solid is formed around the element, firmly embedding it in the solid. It is preferably installed so that one end is near the bulb which is to be ignited.

Figures 182, 183, 184:
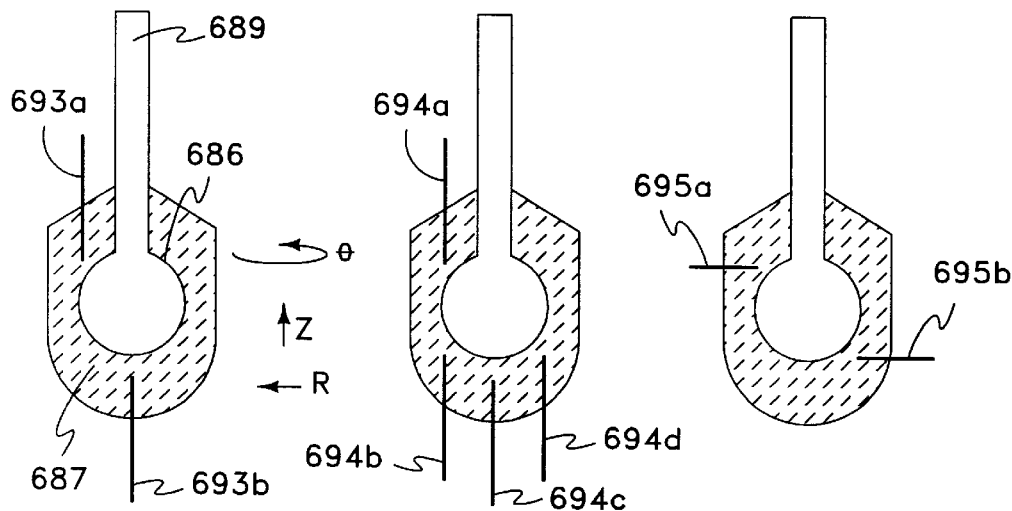
FIGS. 182 to 184 are cross-sectional views of further embodiments of the invention.

In the example shown in FIGS. 181 to 183, the starting element is disposed in a non-azimuthal direction, meaning that it has only axial and/or radial directional components. This minimizes "cross-talk" between the excitation coil and the starting element, which might decrease power coupled to the fill during steady state operation. As used herein, the term "the azimuthal direction" represented by the symbol q in FIG. 182, refers to the direction of any circular line around the bulb. The "axial direction" (Z) refers to the direction of a line which is perpendicular to the plane of the area bounded by the circular line, and "the radial direction" (R) refers to the direction of any radius of the circular line.

In accordance with a further aspect of the invention, the starting element is not connected to a separate source of electrical power, but rather couples a starting field caused by a voltage on the element which is induced by the electric field created by the excitation coil. The helical coil has a dimension in the axial direction (top to bottom of coil in FIG. 181). It has been recognized by the inventors that while the primary field induced by the coil is toroidal in shape, because of its axial dimension there is a potential difference between the top and bottom parts of the coil, thus creating an electric field in the axial direction, and it is this electric field which is coupled to the starting element in the example of FIG. 181. Since the element has an abrupt termination (the end of wire 692 in FIG. 181), it concentrates the field near the bulb, aiding ionization of the gas therein, and ignition of the lamp.

FIGS. 182 to 184 are cross-sectional views of alternative examples of the invention, the coil not being shown in these Figures. In FIGS. 182 and 183, instead of using a single wire, a plurality of starting wires are used. In FIG. 182, starting wires 693*a* and 693*b* are positioned in the axial direction. In FIG. 183, wires 694*a*, 694*b*, 694*c* and 694*d* are positioned in the axial direction. The number and position of wires may be experimented with to provide the optimum starting arrangement for a particular lamp.

In addition to having an electric field in the axial direction, the excitation coil also has an electric field in the radial (R) direction, although typically, this will not be as large the axial field. In FIG. 184, starting wires 695*a* and 695*b*, which lie in the radial direction are depicted. It is of course possible for the starting elements to have directional components lying in both the axial and radial directions, although in order to take advantage of the relatively large electric field in the axial direction of a helical coil, it is preferred that the starting element have a substantial directional component in the axial direction.

The shape of the ceramic jacket 687 in FIGS. 181 to 184 is generally an elongated cylinder. The jacket is relatively thick, which allows proper insertion and retention of the starting wire without breaking. The thickness of the jacket is preferably in the range of 0.25–2 mm. In the above-discussed aperture structures (including sections 4.2.2, 4.2.7, 4.2.8, and 4.2.9), the starting elements disclosed herein are situated in the ceramic before it hardens.

Figure 185:
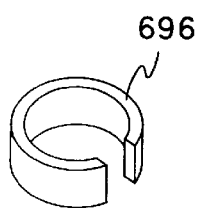
FIG. 185 shows an excitation member in the shape of a wedding ring.
Figure 186:
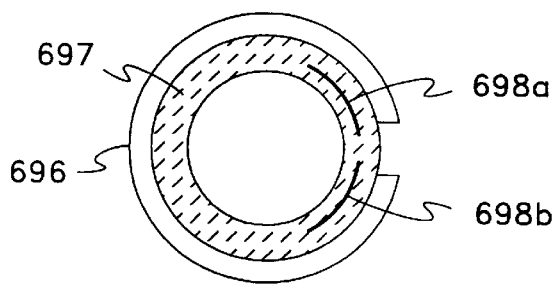
FIG. 186 show an embodiment of the invention which is used with the excitation member of FIG. 185.

While the conductive excitation member 690 shown in FIG. 181 is a helically wound coil, other configurations are possible. For example, FIG. 185 shows a conductive excitation member 696 which is in the shape of a wedding ring except for a gap. FIG. 186 shows a further example of a starting assist arrangement according to the invention, which is for use with a wedding ring or similar shaped excitation member, such as shown in FIG. 185. In this case, unlike in the examples of FIGS. 181 to 184, it is preferred for the starting elements to lie in the azimuthal direction. Referring to FIG. 186, it is seen that azimuthally curved starting wires 698*a* and 698*b* are embedded in reflecting ceramic jacket 697 and lie in the azimuthal direction. The gap of the wedding ring member 696 is a high field area and starting wires 698*a* and 698*b* are located in the ceramic 697, opposite the gap in the wedding ring structure.

More particularly, it may be advantageous to situate both starting elements at the same height as the top or bottom edge of the wedding ring structure, with the interior ends of the elements extending a little way into a region in the ceramic which is directly opposite the gap, as shown in FIG. 186. The starting elements may have the same azimuthal curvature as the wedding ring structure so as to be congruent therewith.

The high field in the gap of the wedding ring structure will induce a relatively high electric field in the "gap" between the two starting wires, thus facilitating ignition of the lamp.

The present invention may be applied to lamps having various specific fills which, by way of non-limiting example, include sulfur, selenium, and tellurium based fills as described in U.S. Pat. Nos. 5,404,076 and 5,661,365 or various metal halide fills. If necessary to start specific lamps, the starting element(s) may be connected to a separate source of AC or higher frequency power.

There thus has been described a starting assist arrangement which is particularly adapted for use with an inductively coupled electrodeless aperture lamp having a ceramic jacket. The invention has many advantages and provides a simple and effective starting means.

4.3 High Power Oscillator

Microwave solid state oscillators are described in various textbooks including "Microwave Solid State Circuit Design," written by I. Bahi and P. Bhartia (Wiley-Interscience Publication, 1988, Chapters 3 and 9) and "Microwave Circuit Design Using Linear and Nonlinear Techniques," written by George D. Vendelin, Anthony M. Pavio, and Ulrich L. Rohde (Wiley-Interscience Publication, 1990, Chapter 6). Articles on such oscillators include "Microwave Solid State Oscillator Circuits," written by K. Kurokawa (Microwave Devices, Wiley, 1976) and "Accurate Linear Oscillator Analysis and Design," written by J. L. Martin and F. J. Gonzales (Microwave Journal, June 1996 pp. 22–37).

Microwave oscillators utilizing solid state components and strip-line transmission lines are described in U.S. Pat. Nos. Re 32,527, 4,736,454, and 5,339,047. Solid state microwave oscillators having various feedback structures are described in U.S. Pat. Nos. 4,775,845, 4,906,946, 4,949,053, and 5,483,206.

Conventional solid state microwave oscillators produce relatively low power output, for example, ranging from a few hundred milliwatts (mW) up to a few watts (W) at most. Moreover, conventional solid-state microwave oscillators are relatively inefficient, typically less than 40%.

Figure 187:
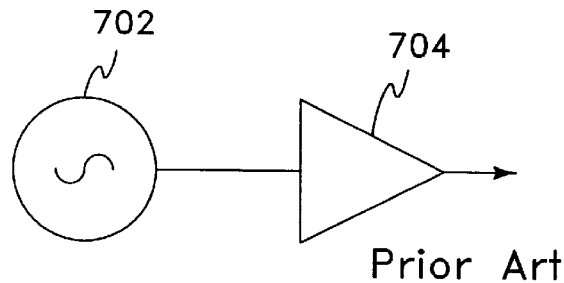
FIG. 187 is a schematic diagram of a conventional system for providing a high power, high frequency signal.

For higher power applications requiring a high frequency signal, the oscillator signal is typically provided to an amplifier to increase the output power. For example, FIG. 187 is a schematic diagram of a conventional system for providing a high power, high frequency signal. An oscillator 702 provides a low power, high frequency signal to an amplifier 704 which increases the power level and outputs a high power, high frequency signal.

A radio frequency (RF) powered electrodeless light source is one example of an application which could utilize a high power, high frequency signal source. For example, U.S. Pat. No. 4,070,603 discloses an electrodeless light source which is powered by a solid state microwave power source. The microwave power source described therein has the general structure shown in FIG. 187. Namely, the output of a relatively low power oscillator is applied to a power amplifier to provide a 40 W, 915 MHz signal, at a purported 50% direct current (DC) to RF efficiency.

SUMMARY OF A NOVEL HIGH POWER OSCILLATOR ACCORDING TO THE PRESENT INVENTION

A number of parameters characterize highly useful sources of high frequency power. These include power output, oscillating frequency, DC to RF efficiency, reliability, mean time between failure (MTBF), economy, durability (working life), and others. For example, a highly efficient, high power output source with a long working life, particularly a power source with long MTBF, represents a highly desirable combination of operating features. High power, as used herein, is defined as greater than about 10 watts (W). Solid state microwave power sources have the potential to provide a much longer working life than, for example, magnetrons. However, due in part to relatively low power output and/or relatively low efficiency, conventional solid state microwave power sources have found only limited commercial applications, typically in low power applications.

The present invention provides one or more of the following advantageous operating features in a high frequency oscillator system:

Voltage protection of the active element
High efficiency
High output power
Low drift of the oscillating frequency
Low level of harmonics
Wide tolerance of load mismatch
Linear dependence of output power from DC drain voltage
Pulse width modulation of output power
Single active element (lower cost, higher reliability)
High durability, long working life
Small physical dimensions
Low weight

Voltage Protection

An obstacle to achieving a high power, high frequency oscillator with conventional circuits is that a high level of voltage may be fed back in excess of the breakdown limit of the device, thereby causing device failure. The present invention overcomes this problem.

According to one aspect of the invention, a high power oscillator includes an amplifier with a positive feedback loop configured to initiate and sustain an oscillating condition. The feedback loop comprises an impedance transformation circuit which transforms a high reflected voltage on the amplifier output to a proportionately lower voltage on the amplifier input to protect the amplifier from an over-voltage condition on its input. The voltage on the input is limited to less than the breakdown voltage of the amplifier input.

According to the invention, the feedback circuit utilizes micro-strip transmission lines and stubs to limit the maximum reflected voltage provided to the output side of the feedback circuit to a maximum of two times the voltage on the output of the amplifier. With the voltage on the output side of the feedback circuit thus limited to a fixed maximum, the feedback circuit is then configured to reduce the voltage fed back to the input side of the amplifier to some fraction of the output voltage which is within the safe operating limits of the amplifier. For example, a lumped capacitor circuit element may be utilized to couple with the output and reduce the voltage provided to the feedback circuit. As used herein, a "lumped" element refers to a discrete electrical component.

Load Tolerance

In some applications, the load driven by an oscillator varies widely during operation. For example, an electrodeless lamp presents a high impedance load when there is no discharge in the bulb and a low impedance load when the lamp is lit. Thus, during lamp ignition, or if the lamp extinguishes, the load changes dramatically. These load changes cause high voltage reflections which are potentially destructive if fed back to the amplifier input. Conventional oscillator circuits which include lumped elements in the feedback circuit typically include lumped inductor elements which have a high quality factor (Q) and are thus more susceptible to feeding back destructive high voltage from such voltage reflections.

According to the invention, the oscillator circuit operates without destruction of the amplifier element at all phase angles and at all magnitudes from open to short circuit. Preferably, the feedback circuit includes only transmission lines and non-inductive lumped elements.

According to another aspect of the invention, the feedback circuit comprises impedance transformation circuits in two feedback loops with reduced feedback voltage on each loop. For example, two smaller lumped capacitor elements are utilized (one for each loop) to decrease the coupling between the output and the input and thereby reduce the voltage in each loop. This improves load tolerance because of improved voltage protection. Preferably, the two feedback loops are symmetrical so that the voltage provided to each feedback loop is the same. Symmetrical dual feedback loops also improve efficiency.

According to another aspect of the invention, a four way junction of micro-strip transmission lines (e.g. a microwave cross) is connected to the amplifier output to provide distribution of current and minimize inductance at the amplifier output.

Load Sensitivity

According to another aspect of the invention, the oscillator includes an output impedance matching circuit connected to the amplifier output and the feedback circuit is coupled with a high impedance end of the output impedance matching circuit to reduce sensitivity to the load impedance.

Circuit Size

According to another aspect of the invention, lumped capacitors element are utilized in the feedback circuit to reduce the circuit size by adding phase shift to the feedback circuit without long lengths of transmission line. The circuit size is further reduced by selecting suitable dielectric material to reduce the physical length and/or width of the transmission lines while maintaining suitable electrical length.

Pulse Width Modulation

The oscillator examples described below may be configured with a gating pulse applied to the gate of the active element to turn the oscillator off for some fraction of a cycle and thereby reduce the average output power delivered to the load. This form of pulse width modulation allows for dimming of the lamp from full brightness down to about 30% of full brightness.

Thus, the present invention provides a power source which is suitable for many commercially practical applications, including high power applications such as electrodeless lighting. Of course, depending on the application one or more of the above features may not be required. The above features are achieved individually and in combination, and it is not intended that the present invention be construed as requiring two or more of the features unless expressly required by the claims attached hereto.

The invention is hereinafter described with respect to seven specific circuit examples. Exemplary part numbers for each of the first through seventh examples are as follows:

TABLE 6

| Example | Q1 | C1 | C2 | C3 | C4 | C5 | C6 | C7 | C8 | C9 | C10 | L1 | R1 | R2 | R3 | R4 | D1 |
|---|---|---|---|---|---|---|---|---|---|---|---|---|---|---|---|---|---|
| First   | 1 | 9 | 4 | 7 | 8 | 4  | 12 | 14 | —  | —  | — | 15 | 16 | 20 | 20 | 16 | 23 |
| Second  | 1 | 5 | 5 | 8 | 8 | 5  | 13 | 9  | —  | —  | — | 15 | 22 | 18 | —  | —  | —  |
| Third   | 1 | 4 | 6 | 4 | 8 | 4  | 8  | 10 | 14 | 13 | 9 | 15 | 16 | 17 | 21 | —  | 24 |
| Fourth  | 1 | 4 | 4 | 8 | 8 | 10 | 13 | 14 | 9  | —  | — | 15 | 16 | 17 | 21 | —  | 24 |
| Fifth   | 2 | 5 | 5 | 8 | 8 | 10 | 11 | 14 | 9  | —  | — | 15 | 16 | 17 | 21 | —  | 24 |
| Six     | 1 | 5 | 5 | 8 | 8 | 10 | 11 | 14 | 9  | —  | — | 15 | 16 | 17 | 21 | —  | 24 |
| Seventh | 3 | 5 | 5 | 8 | 8 | 5  | 10 | 11 | 14 | 9  | — | 15 | 22 | 19 | 19 | 17 | 25 | where:

TABLE 7

| | |
|---|---|
| 1- Motorola ® MRF184 | 14- 4.7 $\mu$F surface mount capacitor |
| 2- Ericson ® E10044-E9584 | |
| 3- Motorola ® MRF184S | 15- 0.4 $\mu$H wire wound inductor |
| 4- 0.7 to 2.6 pF surface mount variable capacitor | 16- 0 to 5.1K ohm surface mount variable resistor |
| 5- 0.6 to 2.5 pF surface mount variable capacitor | 17- 2.1K ohm surface mount resistor |
| 6- 1.5 to 9 pF surface mount variable capacitor | 18- 2.2K ohm surface mount resistor |
| 7- 2.5 to 8 pF surface mount variable capacitor | 19- 5K ohm surface mount resistor |
| 8- 22 pF surface mount capacitor | 20- 10K ohm leaded resistor |
| 9- 130 pF surface mount capacitor | 21- 15K ohm surface mount resistor |
| 10- 470 pF suriace mount capacitor | |
| 11- 100 nF surface mount capacitor | 22- 100K ohm surface mount resistor |
| 12- 130 nF surface mount capacitor | |
| 13- 150 nF surface mount capacitor | 23- Varactor diode |
| | 24- Zener diode |
| | 25- surface mount Zener diode |

Exemplary performance characteristics for each of the first through seventh examples are as follows:

TABLE 8

| | 30 Watts | | | 40 Watts | | | 50 Watts | | | 60 Watts | | | 70 Watts | | |
|---|---|---|---|---|---|---|---|---|---|---|---|---|---|---|---|
| | V | % | f | V | % | f | V | % | f | V | % | f | V | % | f |
| 1 | 21.4 | 60 | 864.0 | 23.2 | 62 | 866.0 | 25.1 | 63 | 867.0 | 27.2 | 61 | 868.0 | — | — | — |
| 2 | 14.0 | 71 | 749.5 | 16.0 | 71 | 750.4 | 18.0 | 71 | 751.0 | 19.9 | 69 | 751.4 | 21.9 | 67 | 751.6 |
| 3 | 18.0 | 67 | 879.7 | 20.7 | 67 | 880.6 | 23.2 | 66 | 881.1 | 25.6 | 65 | 881.6 | — | — | — |
| 4 | — | — | — | 17.2 | 70 | 763.4 | 19.2 | 71 | 764.7 | 21.2 | 71 | 765.8 | 23.2 | 71 | 765.9 |
| 5 | 16.7 | 70 | 771.5 | 19.6 | 68 | 773.0 | 22.6 | 65 | 774.0 | 26.2 | 62 | 775.0 | — | — | — |
| 6 | 17.8 | 67 | 746.4 | 20.2 | 68 | 748.9 | 22.8 | 68 | 750.0 | 25.0 | 68 | 751.0 | 27.0 | 68 | 752.0 |
| 7 | 13.9 | 73 | 748.5 | 16.0 | 74 | 749.5 | 17.9 | 74 | 750.3 | 19.8 | 73 | 750.7 | 21.5 | 72 | 751.0 | where the first column corresponds to the example number and:

V—DC Voltage;

%—DC to RF Efficiency; and f—Oscillating frequency in MHz.

EXAMPLES OF HIGH POWER OSCILLATORS

Figure 188:
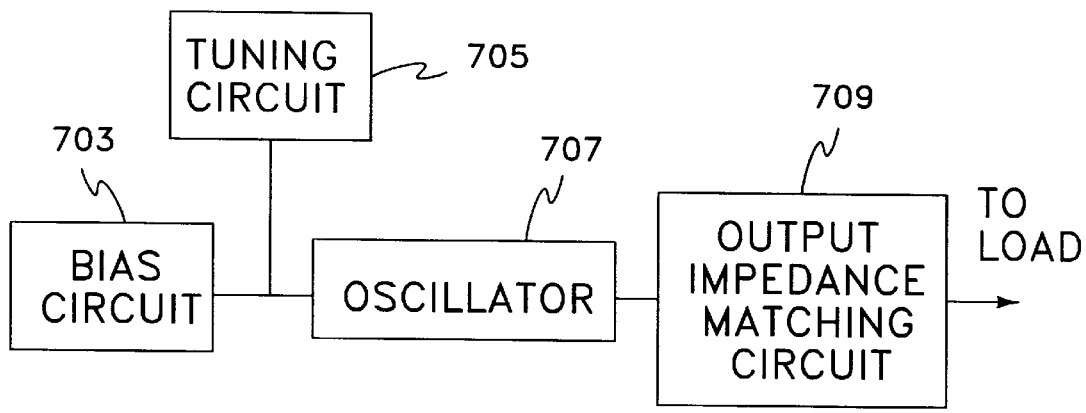
FIG. 188 is a block-level schematic diagram of an oscillator system according to the invention for producing a high power, high frequency signal.

FIG. 188 is a block-level schematic diagram of an oscillator system according to the invention for producing a high power, high frequency signal. A power supply circuit (not shown) provides a DC voltage to an oscillator 707 and a bias circuit 703. The bias circuit 703 provides a suitable DC voltage to the oscillator 707 to bias the active element of the oscillator 707. For example, the bias circuit 703 provides sufficient bias for the active element to initially operate in its linear region with enough gain to support oscillation. The oscillator 707 oscillates at a design frequency which is tuned by a tuning circuit 705. The oscillator 707 provides a high power, high frequency signal to an output impedance matching circuit 709, which may be connected to a suitable load.

Single Impedance Transformation Network Feedback Circuit

Figure 189:
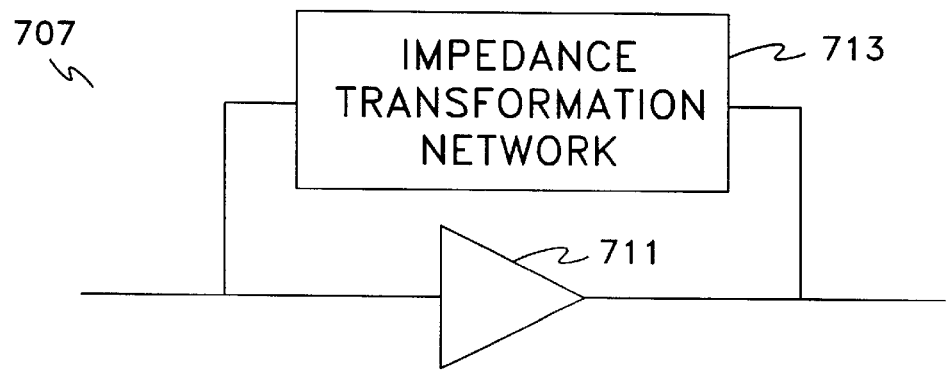
FIG. 189 is a block-level schematic diagram of an oscillator 707 according to the invention utilizing an impedance transformation network in a feedback circuit.

FIG. 189 is a block-level schematic diagram of an oscillator 707 according to the invention utilizing an impedance transformation network in a feedback circuit. According to the invention, an output of an amplifier 711 is fed back to an input of the amplifier 711 through an impedance transformation network 713.

The impedance transformation network 713 is configured to provide suitable positive feedback for initiating and sustaining an oscillating condition. According to the invention, the impedance transformation network 713 is further configured to protect the amplifier input, during high output power operation, from an over-voltage condition which would otherwise destroy the device. For example, the voltage protection is achieved by preventing voltage build up at the output through controlled voltage reflections and transforming a high voltage at the output terminal of the amplifier 711 to a low voltage at the input terminal of the amplifier 711, which assures that the maximum voltage-breakdown rating of the amplifier is not exceeded.

According to the invention, the impedance transformation network 713 is preferably further configured to create a matching condition between the amplifier input impedance and the feedback circuit to improve efficiency. The amplifier 711 is preferably biased near cutoff so that the circuit operates efficiently.

Figure 190:
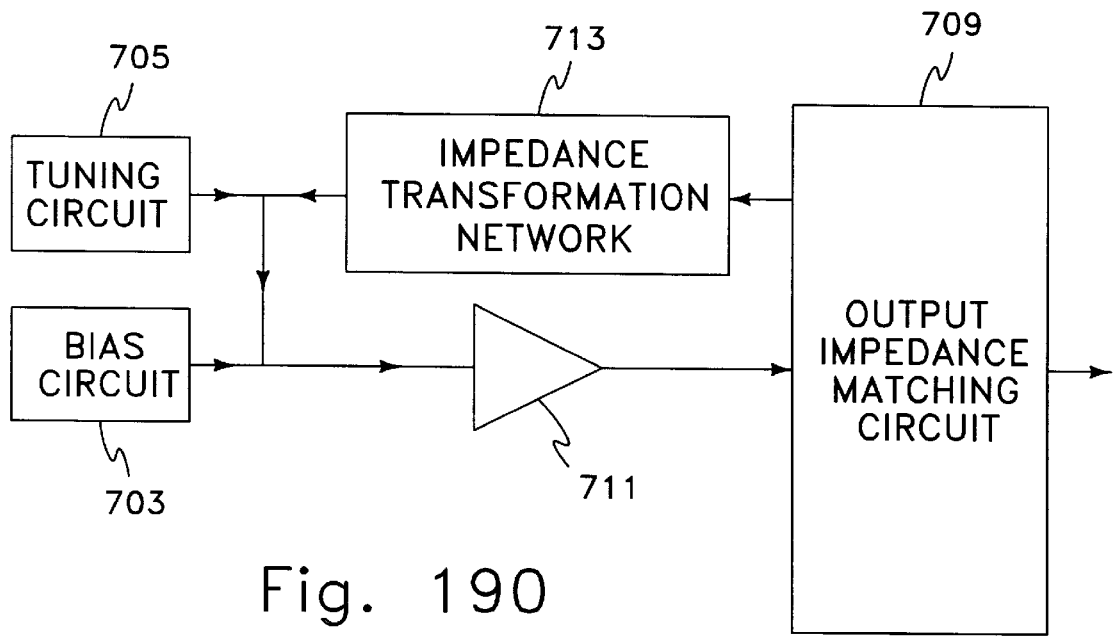
FIG. 190 is a block-level schematic diagram of an oscillator system according to the invention incorporating the oscillator from FIG. 189.

FIG. 190 is a block-level schematic diagram of an oscillator system according to the invention incorporating the oscillator from FIG. 189. In FIG. 190, the impedance transformation network 713 is not directly coupled to the drain, but is instead coupled to the output impedance matching network 709. Preferably, there is a relatively high impedance (e.g. greater than about 100 ohms reactance) between the point of connection and the drain output. By coupling to the output impedance matching circuit 709 at a high impedance point, the feedback loop has less influence on the drain output and the oscillator system is less sensitive to the load impedance.

First Example of a High Power Oscillator

Figure 191:
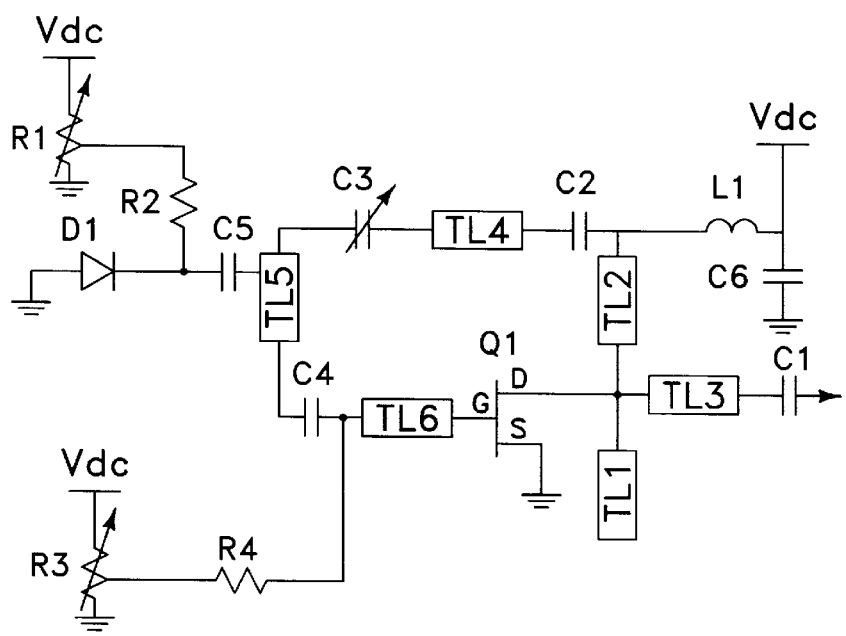
FIG. 191 is a circuit-level schematic diagram of a first example of an oscillator system according to the invention.

FIG. 191 is a circuit-level schematic diagram of a first example of an oscillator system according to the invention. A transistor Q1 has a source terminal S which is grounded. An output from a drain terminal D is connected to an output impedance matching circuit including a transmission line TL1 (with a characteristic impedance Z1) connected at one end to the drain D and unconnected at the other end, a transmission line TL2 (with a characteristic impedance Z2) connected at one end to the drain D and to a feedback circuit at the other end, and a transmission line TL3 (with a characteristic impedance Z3) connected at one end to the junction of TL1 and TL2 and connected at the other end in series with a first lead of a capacitor C1, the other lead of C1 providing an output which may be connected to a load.

The feedback circuit is connected between the end of the transmission line TL2 and an input of the transistor Q1 at a gate terminal G and includes a capacitor C2, a transmission line TL4 (with a characteristic impedance Z4), a capacitor C3, a transmission line TL5 (with a characteristic impedance Z5), a capacitor C4, and a transmission line TL6 (with a characteristic impedance Z6) connected in series.

A DC supply voltage Vdc provides power to the oscillator system through an RF filter circuit, a tuning circuit, and a bias circuit for the transistor Q1. The RF filter circuit includes inductor L1 and a filter capacitor C6 and provides a DC operating voltage to the drain D of the transistor Q1.

The tuning circuit includes a variable resistor R1 which is a three terminal device, wherein a first and second terminal are respectively connected to opposite ends of a variable voltage divider and a third terminal is connected at the junction of the voltage divider. In FIG. 191, the first terminal is connected to Vdc, the second terminal is connected to ground, and the third terminal is connected to one end of a resistor R2. The other end of resistor R2 is connected to a junction of a cathode end of a varactor diode D1 and a capacitor C5. The other end of diode D1 is grounded. The other end of capacitor C5 is connected to the transmission line TL5. The resistors R1 and R2, the varactor diode D1, and the capacitor C5 provide a tuning function for the oscillator system.

The bias circuit includes a variable resistor R3 with the first terminal connected to Vdc and the second terminal connected to ground. The third terminal of R3 is connected to one end of a resistor R4. The other end of the resistor R4 is connected to the transmission line TL6. The bias circuit provides a DC bias voltage to the gate G of the transistor Q1.

Figure 192:
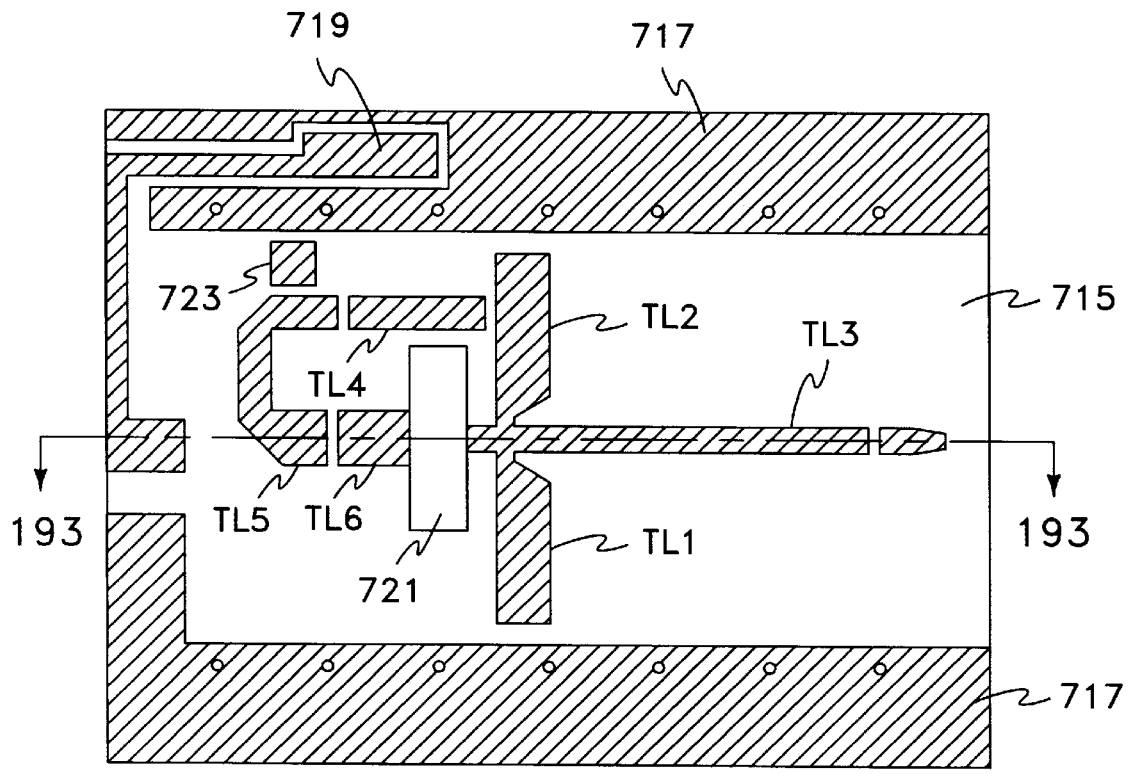
FIG. 192 is a printed circuit board layout suitable for use in implementing the circuit set forth in the first example.
Figure 193:
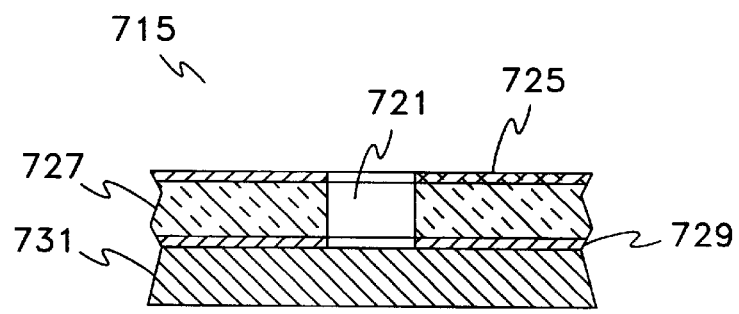
FIG. 193 is a cross-section view of the printed circuit board taken along line 193—193 in FIG. 192.

FIG. 192 is a printed circuit board layout suitable for use in implementing the circuit set forth in the first example. Overall board dimensions are about 102 mm (4 inches) by about 76 mm (3 inches). The thickness of the dielectric material is about 1.27 mm (0.05 inch), and the dielectric constant is about 9.2. FIG. 193 is a cross-section view of the printed circuit board taken along line 193—193 in FIG. 192. As can be seen in FIG. 193, a printed circuit board 715 includes a layer 725 for conductive traces, a dielectric layer 727, and a ground plane layer 729. Preferably, the printed circuit 715 is further mounted to a metal plate 731 which is electrically connected to the ground plane 729. In the first example, the printed circuit board 715 further includes a cutout portion 721, which is sized to accommodate the active element of the oscillator circuit.

The printed circuit board 715 has conductive traces TL1–TL6 disposed thereon which are transmission lines respectively corresponding to the various characteristic impedances Z1–Z6. Ground areas 717 are also disposed on the top layer 725 and are electrically connected to the ground plane 729 by plated through holes or other conventional methods. A conductive area 719 is isolated from the ground area 717 and provides a connection area for the DC supply voltage Vdc. Another conductive area 723 provides a connection area for the tuning circuit. Approximate characteristic impedances and electrical lengths for each of the transmission lines are as follows.

TABLE 9

| TRANSMISSION LINE | CHARACTERISTIC IMPEDANCE | ELECTRICAL LENGTH |
|---|---|---|
| TL1 | Z1 = 25 Ohm | 0.154 $\lambda_g$ |
| TL2 | Z2 = 25 Ohm | 0.154 $\lambda_g$ |
| TL3 | Z3 = 50 Ohm | Not applicable |
| TL4 | Z4 = 40 Ohm | 0.115 $\lambda_g$ |
| TL5 | Z5 = 40 to 25 Ohm* | 0.23 $\lambda_g$ |
| TL6 | Z6 = 25 Ohm | 0.016 $\lambda_g$ |

*TL5 transitions from 40 Ohms to 25 Ohms to match the 40 Ohm impedance of TL4 with the 25 Ohm impedance of TL6.

Figure 194:
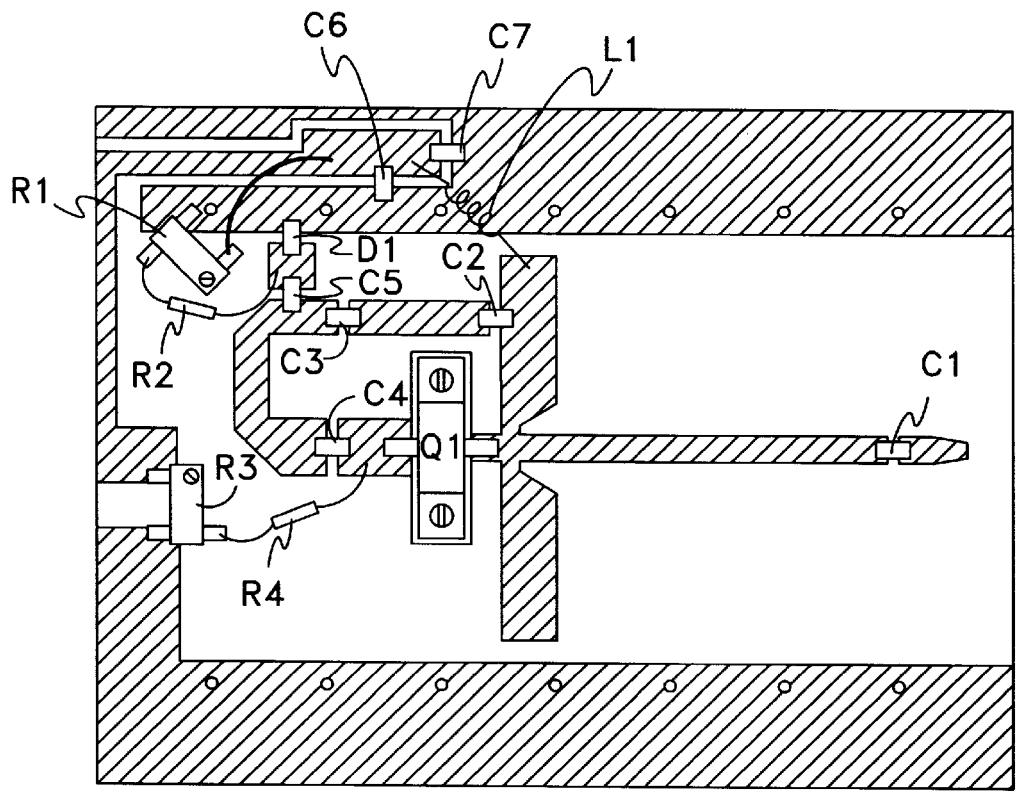
FIG. 194 is an assembly-level schematic diagram of the printed circuit board from FIG. 192 populated with suitable electronic devices and other parts for implementing the oscillator system of the first example.

FIG. 194 is an assembly-level schematic diagram of the printed circuit board from FIG. 192 populated with suitable electronic devices and other parts for implementing the oscillator system of the first example. Reference designators in FIG. 194 corresponds to like circuit elements in FIG. 191. Q1 is preferably a power field effect transistor (FET), for example, a metal-oxide semiconductor (MOS) field effect transistor (MOSFET) fabricated with laterally diffused MOS (LDMOS) technology. As set forth in FIG. 194, the source terminal of Q1 provides mounting holes through which a screw or bolt is inserted for mounting Q1 to the metal plate 731 and making the electrical connection from the source terminal of Q1 to ground. The source terminal S of the transistor Q1 is preferably also soldered to the metal plate 731 so that Q1 is well grounded (i.e. RF current flows over a wide area of the wave structure). The metal plate 731 also provides a heat sink for the transistor Q1 and is referred to as a heat spreader. The gate G and drain D terminals of Q1, and the remaining electrical components are mechanically and electrically secured to the printed circuit board 715 by soldering or other conventional means.

General operation of the circuit is as follows. A DC voltage Vdc is applied to the circuit. The voltage Vdc is supplied to the drain D of the transistor Q1 through the RF filter circuit. The drain voltage may be varied from about 20 V to about 28 V. The voltage Vdc is also supplied to the gate G of the transistor Q1 through a voltage divider circuit which is configured to provide a gate bias voltage to the transistor near cutoff which initially places the transistor Q1 at an operating point just inside its linear region. For example, for the above-specified Motorola® MRF184 the gate voltage is set to about 4V. The voltage Vdc is also supplied to the varactor diode D1 through a voltage divider circuit. Varying the voltage provided to D1 tunes the oscillating frequency.

Once the voltage Vdc is applied to the circuit, the transistor Q1 conducts. Some amount of random noise is inherent in the circuit. Noise which is present on the drain D is fed back through the feedback loop and amplified. This process initiates the oscillation. Once initiated, the oscillation becomes sustained at the design frequency. To sustain oscillation at the design frequency, the time delay (i.e. phase shift) in the feedback loop and the transistor Q1 should be approximately equal to $1/(2 \times f_{osc})$, where $f_{osc}$ is the design frequency.

The transmission lines TL1 and TL2 are stubs configured such that the length of transmission line between the drain D and the TL1, TL2 stubs' junction together with the length of the stubs TL1, TL2 result in an impedance match of drain impedance to the impedance of the transmission line TL3 (e.g. a characteristic impedance Z3 of about 50 ohms). Characteristic of the transmission line arrangement for TL1 is that the maximum reflected voltage seen at any point on TL1 is at most two times the voltage applied to TL1 from a conjugately matched source. Thus, the voltage on the open (i.e. high impedance) end of the stub TL1 (i.e. the end of TL1 distal to the drain) is limited to at most two times the voltage on the amplifier output (i.e. the drain RF voltage). This voltage is progressively decreased through the feedback circuit so that the voltage at the input side of the active device (i.e. the gate) is significantly less than two times the voltage on the drain. The RF voltage fed back to the gate G is, however, sufficiently high to produce a large current in the transistor Q1.

Moreover, in order to achieve the desired voltage protection under all load conditions, the feedback circuit is configured such that even if the gate voltage instantaneously doubles (e.g. due to a doubling of the voltage at TL1), the doubled gate voltage is within the safe operating limit of the device. For example, for the above-specified Motorola® MRF184 the gate to source breakdown voltage is about 20V. During operation, the circuit is configured to operate with a gate voltage of about 8V plus the DC bias voltage of 4V for a total gate to source voltage of about 12V. If the operating voltage were to instantaneously double, the gate voltage would be about 16V plus the DC bias voltage of 4V for a total of 20V which is within the safe operating limits of the device.

Dual Impedance Transformation Network Feedback Circuit

Figure 195:
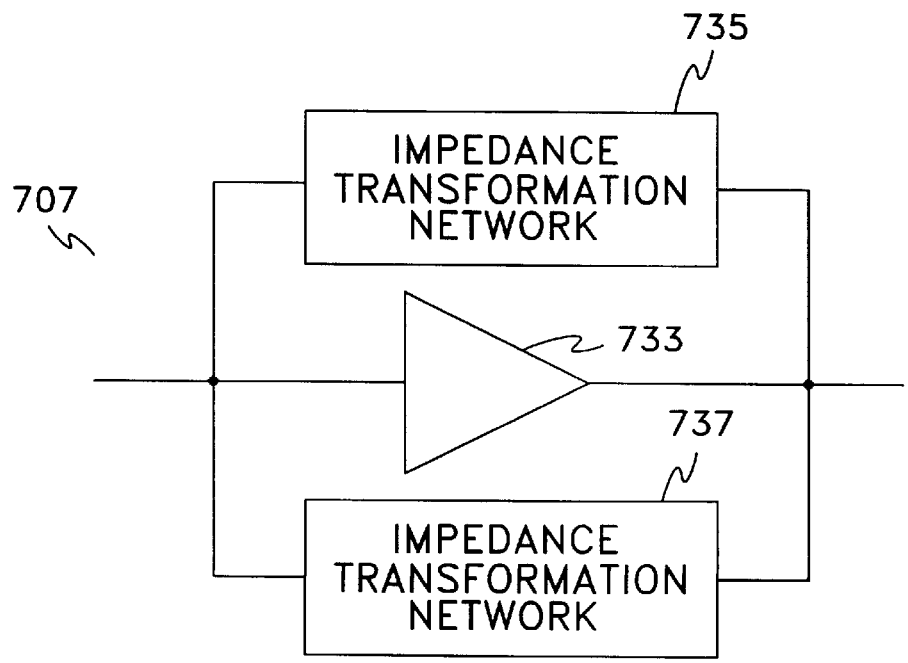
FIG. 195 is a block-level schematic diagram of an oscillator according to the invention utilizing dual impedance transformation networks in respective feedback circuits.

Further improvements in output power, efficiency, and working life are achieved by an oscillator according to the invention which utilizes two feedback circuits. FIG. 195 is a block-level schematic diagram of an oscillator according to the invention utilizing dual impedance transformation networks in respective feedback circuits. According to the invention, an output of an amplifier 733 is fed back to an input of the amplifier 733 through a first impedance transformation network 735 and a second impedance transformation network 737.

Figure 196:
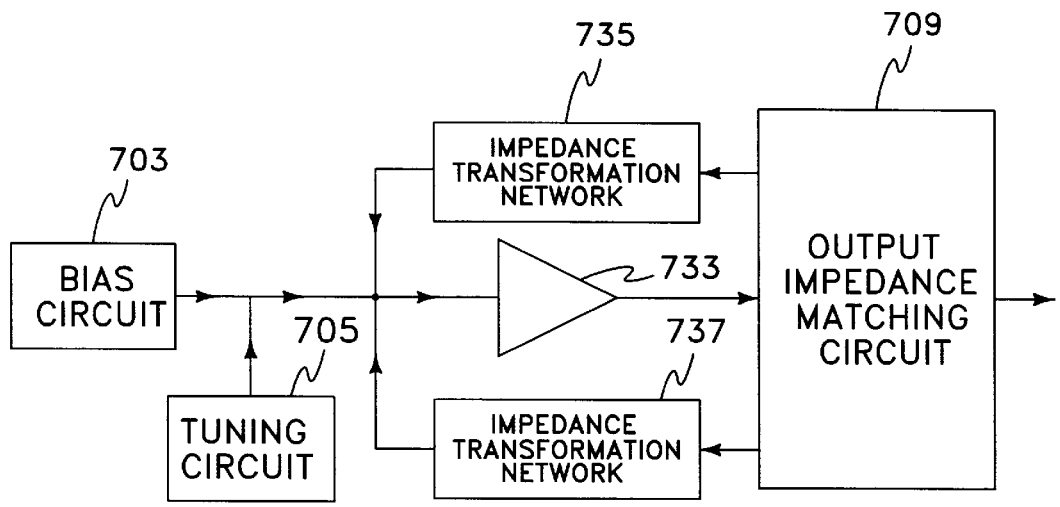
FIG. 196 is a block-level schematic diagram of an oscillator system according to the invention incorporating the oscillator from FIG. 195.

FIG. 196 is a block-level schematic diagram of an oscillator system according to the invention incorporating the oscillator from FIG. 195. In FIG. 196, the impedance transformation networks 735 and 737 are not directly coupled to the drain, but are instead coupled to the output impedance matching circuit 709 to improve the load impedance sensitivity as discussed above with respect to FIG. 190.

According to the invention, the dual impedance transformation networks 735, 737 are configured to provide suitable positive feedback for initiating and sustaining an oscillating condition. As in the first example, the dual impedance transformation networks are further configured to protect the amplifier input, during high output power operation, from an over-voltage condition which would otherwise destroy the device. Advantageously, the dual impedance transformation feedback networks provide even greater positive feedback to the amplifier input, as compared to a single feedback circuit, and at the same time improve the voltage protection and improve efficiency. By utilizing two feedback loops, the feedback current to the gate remains high while the feedback voltage in each feedback line is halved. Because the destruction of the device is caused largely by over-voltage conditions, the voltage protection is significantly improved. In some of the following examples, full voltage swing and/or class C operation may be achieved.

Second Example of a High Power Oscillator

Figure 197:
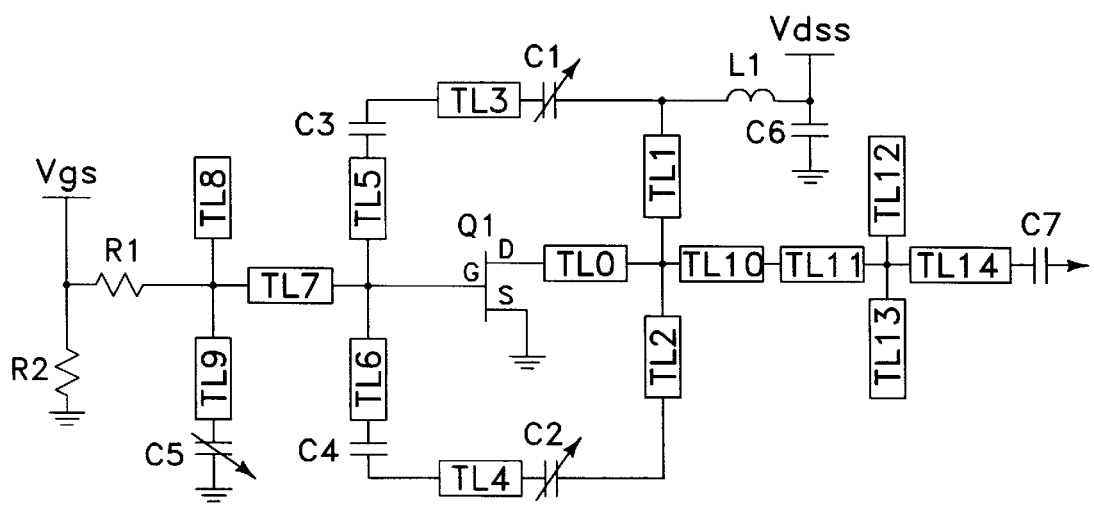
FIG. 197 is a circuit-level schematic diagram of a second example of an oscillator system according to the invention.

FIG. 197 is a circuit-level schematic diagram of a second example of an oscillator system according to the invention. A transistor Q1 has a source terminal S which is grounded. An output of the transistor Q1 is taken from a drain terminal D and is connected to an output impedance matching circuit including a transmission line TL0 (with a characteristic impedance Z0) connected at one end to the drain D and connected at the other end between respective ends of two transmission lines TL1 and TL2 (with characteristic impedances Z1 and Z2, respectively). The other end of TL1 is connected to a first feedback circuit. The other end of TL2 is connected to a second feedback circuit. The output impedance matching circuit further includes a transmission line TL10 (with a characteristic impedance Z10) connected at one end to the junction of TL0, TL1, and TL2 and connected at the other end to an end of transmission line TL11 (with a characteristic impedance Z11). The other end of TL11 is connected to a junction of transmission lines TL12, TL13, and TL14 (with respective characteristic impedances Z12, Z13, and Z14). TL12 and TL13 are matching stubs which are unconnected at their respective other ends. The other end of transmission line TL14 is connected in series with a capacitor C7. The output of the capacitor C7 may be supplied to a load.

The first feedback circuit is connected between the end of the stub TL1 which is distal to the drain D and an input of the transistor Q1 at a gate terminal G. The first feedback circuit includes a capacitor C1, a transmission line TL3, a capacitor C3, and a transmission line TL5 connected in series. The second feedback circuit is connected between the end of the stub TL2 which is distal to the drain D and the gate G and includes a capacitor C2, a transmission line TL4, a capacitor C4, and a transmission line TL6 connected in series.

A DC supply voltage Vdss provides operating voltage to the drain D of the transistor Q1 through an RF filter circuit including an inductor L1 and capacitor C6. In FIG. 197, one end of the inductor L1 is connected to Vdss and the other end of the inductor L1 is connected at the junction of C1 and TL1. One end of the capacitor C6 is connected to Vdss and the other of the capacitor C6 is connected to ground.

A DC supply voltage Vgs provides bias voltage to the gate G of the transistor Q1 through a bias circuit including resistors R1 and R2. In FIG. 197, one end of the resistor R1 is connected to Vgs and the other end of the resistor R1 is connected in series with a transmission line TL7 which is connected to the gate G. One end of the resistor R2 is connected to Vgs and the other end of the resistor R2 is connected to ground.

The oscillator system illustrated in FIG. 197 further includes a tuning circuit comprising a transmission line TL8 (with a characteristic impedance Z8) which is unconnected at one end and at the other end is connected in series with a transmission line TL9 (with a characteristic impedance Z9) and a trimming capacitor C5, which is RF-grounded. The junction of the transmission line TL8 and the transmission line TL9 is connected to the junction of the resistor R1 and the transmission line TL7.

Figure 198:
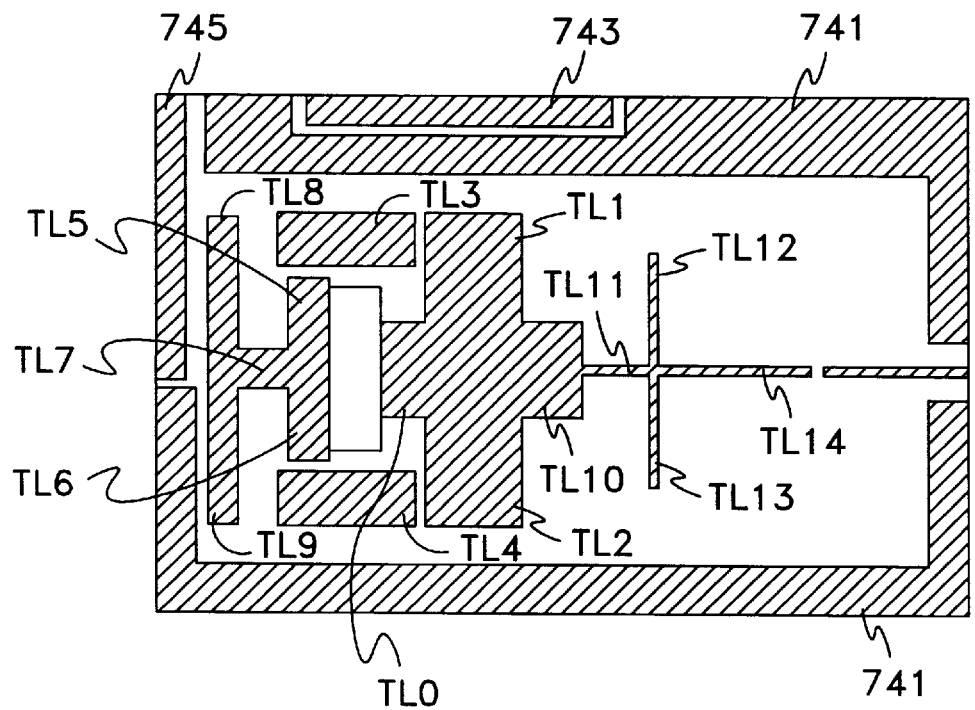
FIG. 198 is a printed circuit board layout suitable for use in implementing the circuit set forth in the second example.

FIG. 198 is a printed circuit board layout suitable for use in implementing the circuit set forth in the second example. Approximate board dimensions are about 102 mm (4 inches) by about 64 mm (2.5 inches). The thickness of the dielectric material is about 1.27 mm (0.050 inch), and the dielectric constant is about 9.2. The printed circuit board has conductive traces TL0–TL14 disposed thereon which are transmission lines respectively corresponding to the various characteristic impedances Z0–Z14. Approximate characteristic impedances and electrical lengths for each of the transmission lines are as follows.

TABLE 10

| TRANSMISSION LINE | CHARACTERISTIC IMPEDANCE | ELECTRICAL LENGTH |
|---|---|---|
| TL0 | Z0 = 10 Ohms | * |
| TL1 | Z1 = 10 Ohms | * |
| TL2 | Z2 = 10 Ohms | * |
| TL3 | Z3 = 2× Z1 | λg/8 |
| TL4 | Z4 = 2× Z1 | λg/8 |
| TL5 | Z5 = 15\|Zin\| | 0.075 λg |
| TL6 | Z6 = 15\|Zin\| | 0.075 λg |
| TL7 | Z7 = 22 Ohms | 0.045 λg |
| TL8 | Z8 = 28 Ohms | 0.12 λg |
| TL9 | Z9 = 28 Ohms | 0.12 λg |
| TL10 | Z10 = 10 Ohms | ≧0.07 λg |
| TL11 | Z11 = 50 Ohms | ** |
| TL12 | Z12 = 50 Ohms | ** |
| TL13 | Z13 = 50 Ohms | ** |
| TL14 | Z14 = 50 Ohms | Not applicable | where
*The respective electrical lengths of TL0, TL1, and TL2 are calculated from a Smith Chart to match the output impedance Zout of the transistor with a ten (10) Ohm impedance;
**The respective electrical lengths of TL11, TL12, and TL13 are calculated from a Smith Chart to match a fifty (50) Ohm impedance with a ten (10) Ohm impedance;
λg is the wavelength of the oscillating frequency;
$Z_{in}$ is the input impedance of the gate G; and
$Z_{out}$ is the output impedance of the drain D.

Ground areas 741 are also disposed on a top side of the printed circuit board and are electrically connected to a ground plane on the opposite side of the printed circuit board by plated through holes or other conventional methods for good RF-grounding practices. A conductive area 743 is isolated from the ground area 41 and provides a connection area for the DC supply voltage Vdss. Another conductive area 745 provides a connection area for the DC supply voltage Vgs.

The short length of transmission line TL0 attached to the drain D compensates for the capacitance of the drain. The stub lines TL1 and TL2 are configured to match the output impedance of the drain D. C1 and C2 are used as trimming capacitors to change the level of feedback for optimized output power and efficiency. Preferably, C1 and C2 each have a relatively high impedance of $X_{C1}=X_{C2}$=between about 150 and 250 Ohms. The relatively high impedance of C1 and C2 limits the RF voltage which transfers to the feedback circuits and creates an essentially open circuit condition on the ends of stub lines TL1 and TL2 distal to the drain. As discussed above, under this condition the RF voltage on the ends of stub lines TL1 and TL2 distal to the drain is limited to no more than about two times the drain RF voltage. The dual feedback configuration increases the positive feedback (e.g. beta) of the feedback circuits and an increased efficiency of the oscillator is observed.

As used herein, a "stub" refers to a branch off of a transmission line, typically forming a "T" junction with the transmission line. A microwave transmission line "stub" produces an immittance effect at the branch point in a guided wave structure by transforming the impedance seen at the end of the stub through a length of transmission line of the stub. The length of the stub is selected to have a particular characteristic impedance which produces the desired immittance at the branch point.

Figure 199:
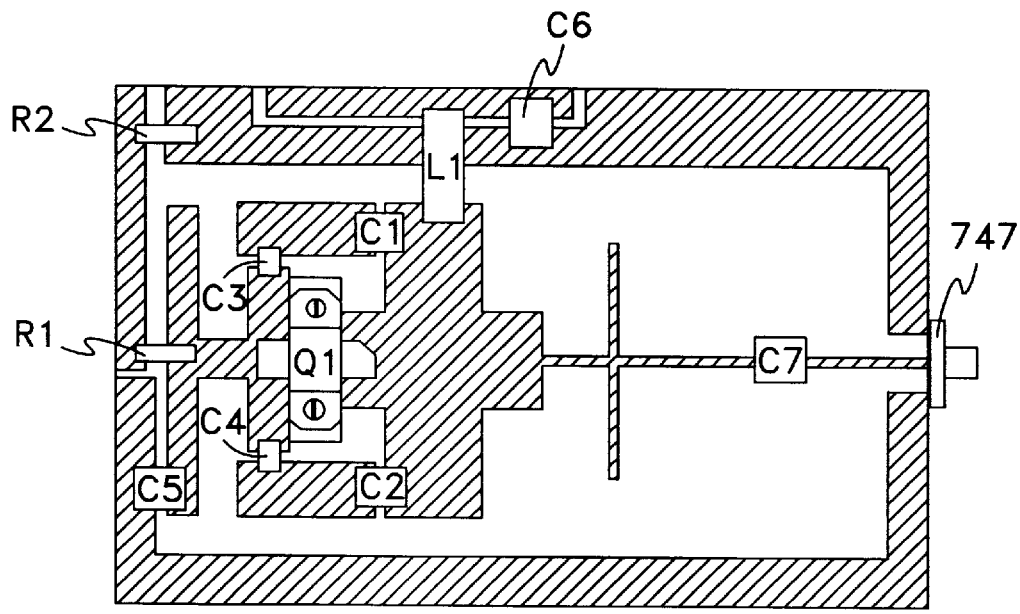
FIG. 199 is an assembly-level schematic diagram of the printed circuit board from FIG. 198 populated with suitable electronic devices and other parts for implementing the oscillator system of the second example.

In the circuit illustrated in FIGS. 197–199, high voltage damage to the transistor Q1 is ameliorated by providing low characteristic impedance lines TL5 (Z5) and TL6 (Z6) to transform the feedback impedance to the complex conjugate of the gate impedance. TL5 and TL6 are lines which prevent high voltage transients on the feedback circuit by producing an extra shunt capacitive effect at the gate G, and decreasing the peak voltage appearing at the gate G.

Transmission lines TL3 and TL4 provide feedback lines for the signals from C1 and C2, respectively. Capacitors C3 and C4 provide coupling between the feedback lines TL3 and TL4 and the protective stubs TL5 and TL6. The impedance of C3 and C4 is configured to be $X_{C3}=X_{C4}$=between about 8 and 10 Ohms at the oscillating frequency λg.

Transmission line TL7 and tuning stubs TL8 and TL9 decrease the input impedance at the gate G and provide additional protection for the gate G from voltage transients on the feedback signal. Tuning stub TL8 may be trimmed (e.g. cut) to adjust the input impedance. Preferably, the sum of the lengths of lines TL7 and TL8 and the sum of the lengths of lines TL7 and TL9 are each about equal to one-half wavelength of the third harmonic of the oscillating frequency (i.e. $L_{TL7}+L_{TL8}=L_{TL7}+L_{TL9}=\lambda g/6$). Maintaining this length relationship increases the third harmonic signal in the gate voltage and increases efficiency.

Capacitor C5 is a variable capacitor which may be adjusted to tune the oscillating frequency. The oscillating frequency may be determined by the following equation:

$$2\pi\left(\frac{L_1}{\lambda_{g1}} + \frac{L_3}{\lambda_{g3}} + \frac{L_5}{\lambda_{g5}}\right) + \arctan\left(\frac{\omega C_{in} Z_5}{2}\right) + \varphi_{Q1} - \arctan\left(\frac{1}{\omega C_1 (Z_1 + Z_3)}\right) - \arctan\left(\frac{1}{\omega C_3 (Z_3 + Z_5)}\right) = \pi \quad \text{Equation (5)}$$

where:
$L_1$ is the length of transmission line TL1
$L_3$ is the length of transmission line TL3
$L_5$ is the length of transmission line TL5
$\lambda_{gi}$ is the appropriate wavelength at the oscillating frequency for the transmission line TLi ω is the oscillating frequency
$Z_1$ is the characteristic impedance of transmission line TL1
$Z_3$ is the characteristic impedance of transmission line TL3
$Z_5$ is the characteristic impedance of transmission line TL5
$\phi_{Q1}$ is the delay phase angle inside the transistor Q1
$C_{in}$ is the input capacitance created by the transistor gate capacitance, the capacitance of transmission lines TL7, TL8, and TL9, and capacitor C5.

FIG. 199 is an assembly-level schematic diagram of the printed circuit board from FIG. 198 populated with suitable electronic devices and other parts for implementing the oscillator system of the second example. The transistor Q1 is mounted to a metal plate which is electrically connected to ground as described above with respect to the first example. The other transistor terminals and electrical components are mechanically and electrically connected to the micro-strip lines and/or printed circuit board by soldering or other conventional means. A coaxial connector 747 is provided on the printed circuit board with its center conductor connected to the output of the capacitor C7 and its outer conductor connected to ground. C7 is referred to as a "blocking" capacitor because it acts to block the output from DC bias.

General operation of the circuit is as described above with respect to the first example. The drain voltage may be adjusted from about 14V to about 28V and the gate bias voltage is about 4 volts. The practical operating range for the second example is from about 10 W to about 100 W of output power over a frequency range of about 680 MHz to about 915 MHz. Higher efficiencies are typically obtained at the lower end of the frequency range. Those skilled in the art will understand that the amount of output power obtained is limited by the maximum operating characteristics of the active element and that higher output power may be provided by an oscillator system according to the invention utilizing an active element with correspondingly higher operating characteristics. Moreover, those skilled in the art will understand that the effective frequency range and oscillating frequency may be adjusted by appropriate sizing of the printed circuit board and transmission lines thereon and proper selection of the values for the discrete components.

Figure 200:
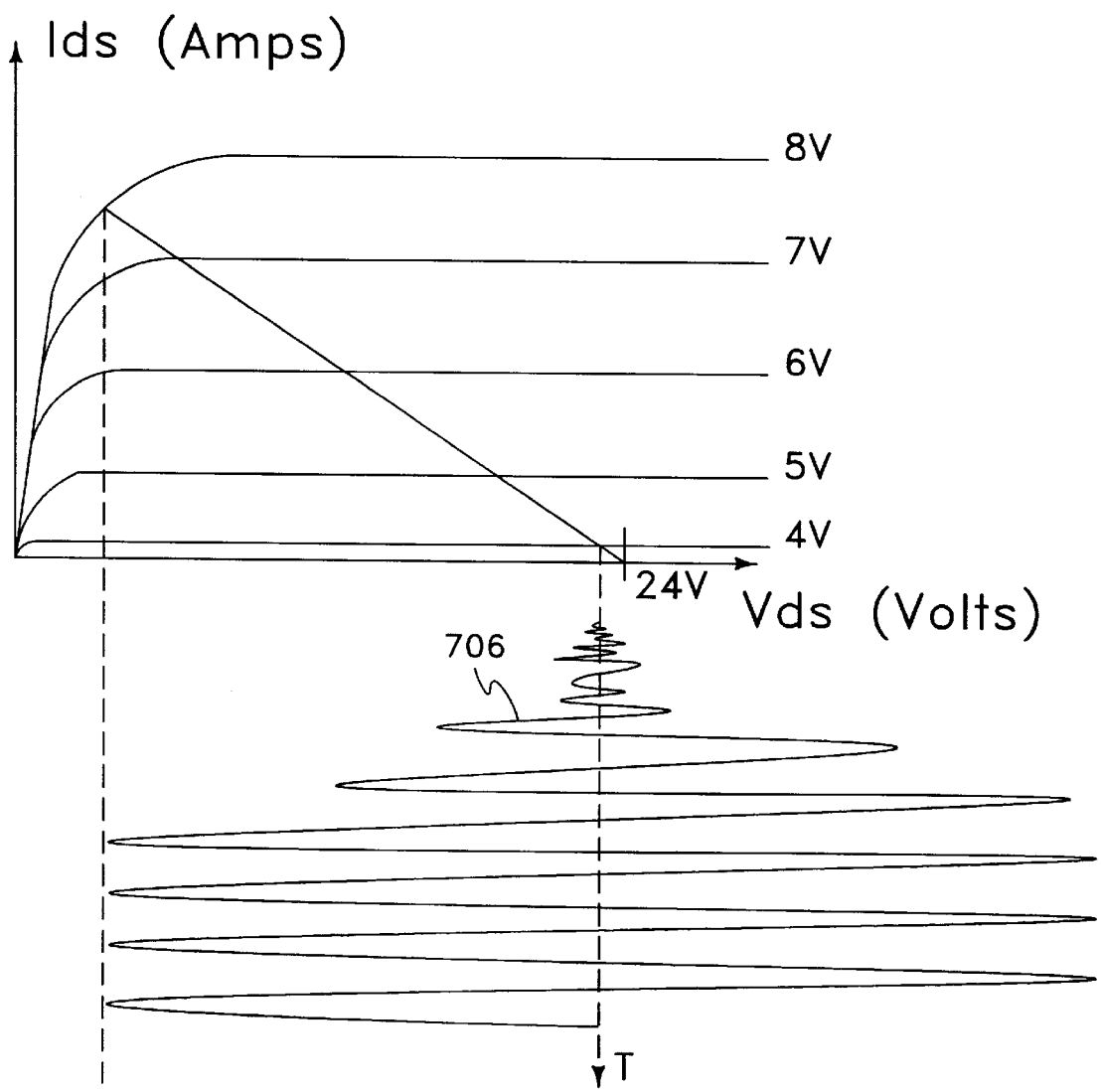
FIG. 200 is a combination graph of a characteristic I-V curve for the transistor and the output signal of the drain of the transistor.

FIG. 200 is a combination graph of a characteristic I-V curve for the transistor and the output signal of the drain of the transistor. As shown in FIG. 200, the signal 706 on the drain starts as random noise and oscillates with increasing amplitude until the transistor Q1 becomes saturated. The circuit then oscillates at a frequency where the following conditions are satisfied:

$$\beta \times A \geq 1 \quad \text{Equation (6)}$$

and $$\Sigma \phi_i = 2\pi \quad \text{Equation (7)}$$

where
β is the feedback transfer coefficient;
A is the amplification coefficient for the amplifier element in a linear mode of operation; and
$\phi_i$ is the phase shift of each element in the feedback loop.

Figure 201:
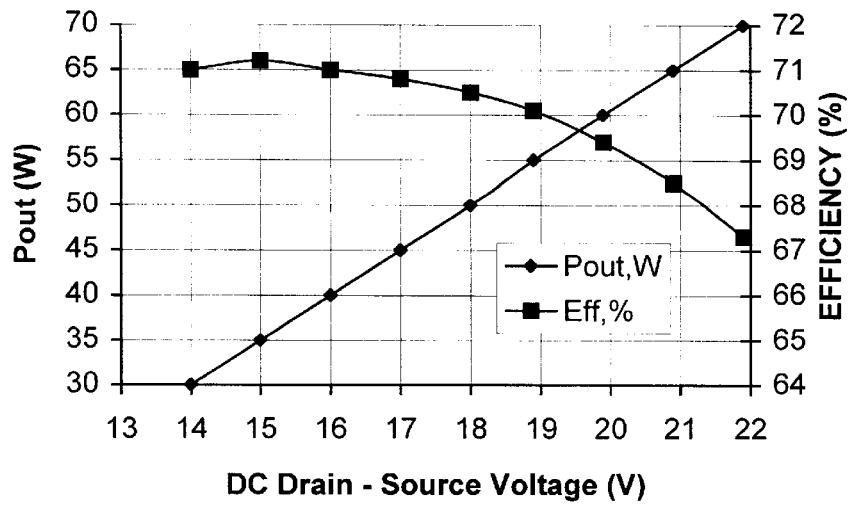
FIG. 201 is a combination graph of the output power and efficiency of the oscillator system in the second example as a function of the DC drain voltage.

FIG. 201 is a combination graph of the output power and efficiency of the oscillator system in the second example as a function of the DC drain voltage. As can be seen from FIG. 201, the output power increases linearly with the DC drain voltage from about 30 W at about 14 V Vdss to about 70 W at 22 V Vdss. Over this entire range of DC drain voltages, the DC to RF efficiency of the oscillator system is over 67%, peaking at about 71% efficiency at 15 V Vdss.

Figure 202:
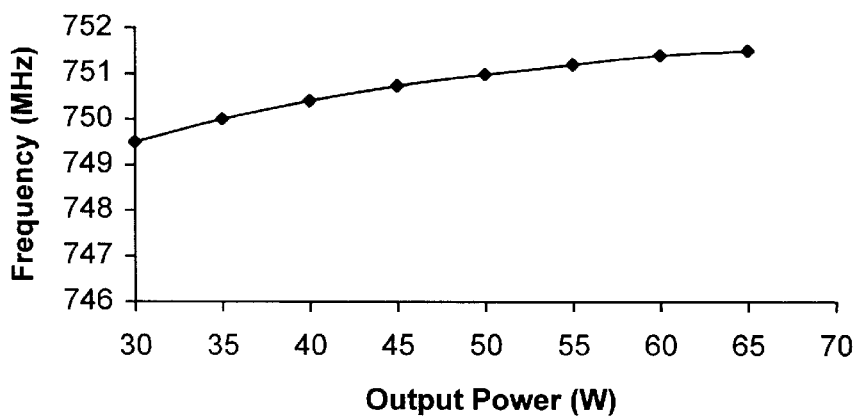
FIG. 202 is a graph of oscillating frequency as a function of output power.

FIG. 202 is a graph of oscillating frequency as a function of output power. As can be seen from FIG. 202, the oscillating frequency increases only slightly (e.g. by about 0.27%) as output power is increased from about 30 W to about 70 W. The change in frequency is a result of a change in the drain junction capacitance at the different DC voltages for the different output powers.

Figure 203:
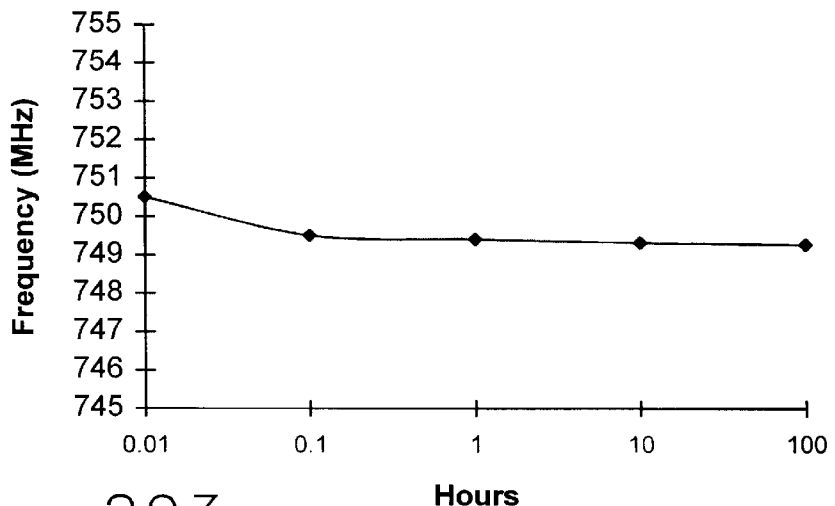
FIG. 203 is a graph of oscillating frequency versus time for an oscillator system operating at about 50 W with a drain voltage of about 18 V.

FIG. 203 is a graph of oscillating frequency versus time for an oscillator system operating at about 50 W with a drain voltage of about 18 V. As can be seen from FIG. 203, the oscillator system exhibits low drift of the oscillating frequency over about 100 hours of relatively constant temperature operation.

Thus, the second example of the invention provides a highly desirable combination of operating features. Namely, a highly efficient, high output power oscillator system with low drift of the oscillating frequency. The second example also exhibits substantially linear dependence of output power on the DC drain voltage. Advantageously, these and other features of the invention are achieved in an oscillator system having only a single active element, which provides lower cost and higher reliability as compared to prior art high power RF generator systems which required both a low power oscillator and an external amplifier (i.e. at least two active elements) to achieve high output power. The oscillator system according to the invention also advantageously provides small physical dimensions and low weight, thus making the system suitable for many practical applications.

Third Example of a High Power Oscillator

Figure 204:
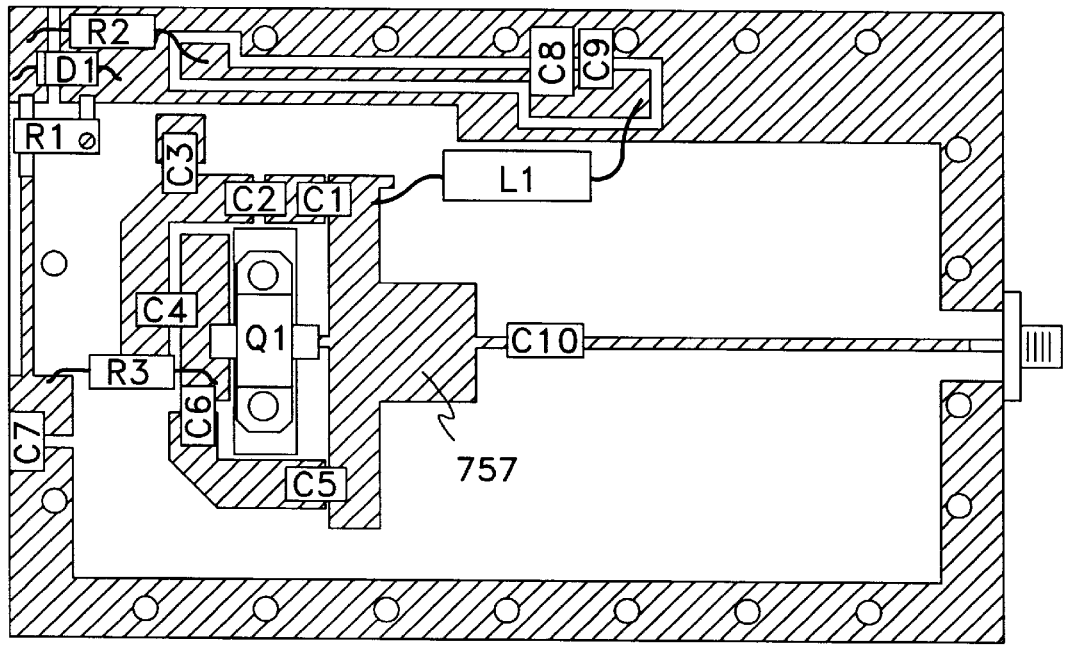
FIG. 204 is an assembly-level schematic diagram of a printed circuit board populated with suitable electronic devices and other parts for implementing a third example of an oscillator system according to the invention.

FIG. 204 is an assembly-level schematic diagram of a printed circuit board populated with suitable electronic devices and other parts for implementing a third example of an oscillator system according to the invention. The third example differs from the second example in that, among other things, the dual feedback circuits in the third example are asymmetrical.

The printed circuit board in the third example has approximate dimensions of about 102 mm (4 inches) by 64 mm (2.5 inches). The thickness of the dielectric material is about 1.25 mm (50 mils), and the dielectric constant is about 9.2.

The oscillator system according to the third example is operated in a frequency range of between about 790 to 920 MHz, with an output power ranging from about 30 W to about 70 W (corresponding to a DC drain voltage range of 18 V to 28 V). The circuit exhibits a DC to RF efficiency of between about 56 to 68% with a frequency stability of +/−0.5 MHz.

Fourth Example of a High Power Oscillator

Figure 205:
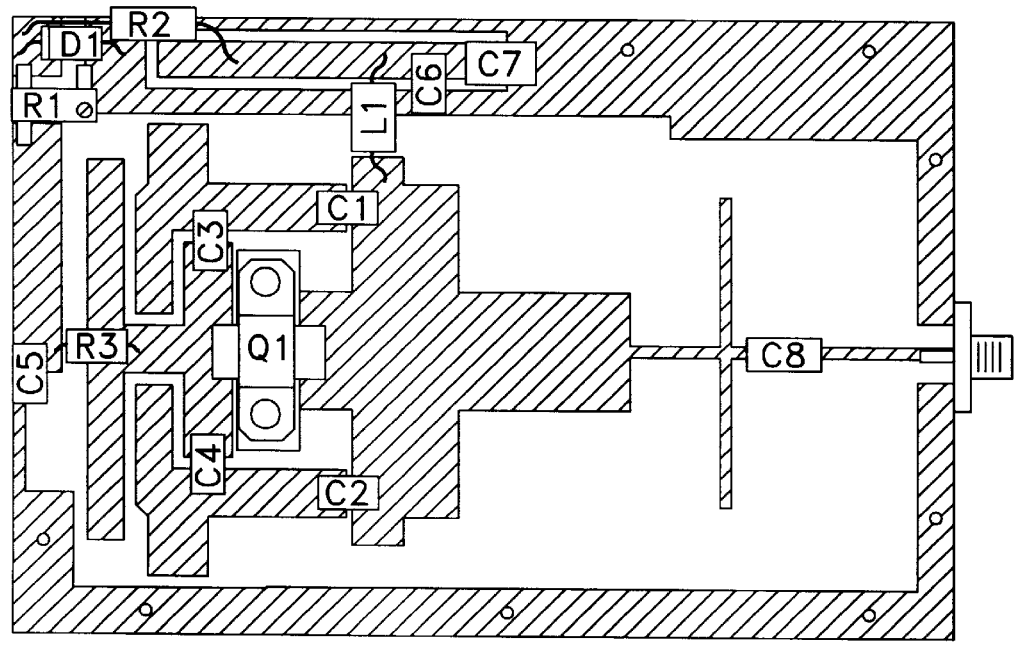
FIG. 205 is an assembly-level schematic diagram of a printed circuit board populated with suitable electronic devices and other parts for implementing a fourth example of an oscillator system according to the invention.

FIG. 205 is an assembly-level schematic diagram of a printed circuit board populated with suitable electronic devices and other parts for implementing a fourth example of an oscillator system according to the invention. The dual feedback circuits in the fourth example are substantially symmetrical. The fourth example differs from the second example in that, among other things, the fourth example utilizes a single DC power supply which is connected to the drain through an RF filter circuit (L1, C8, C9) and to the gate through a bias circuit (R1, R2, R3, D1). The fourth example exhibits better load matching and efficiency as compared to the second example.

The printed circuit board has approximate dimensions of about 102 mm (4 inches) by about 64 mm (2.5 inches). The thickness of the dielectric material is about 1.25 mm (50 mils), and the dielectric constant is about 9.2.

Fifth Example of a High Power Oscillator

Figure 206:
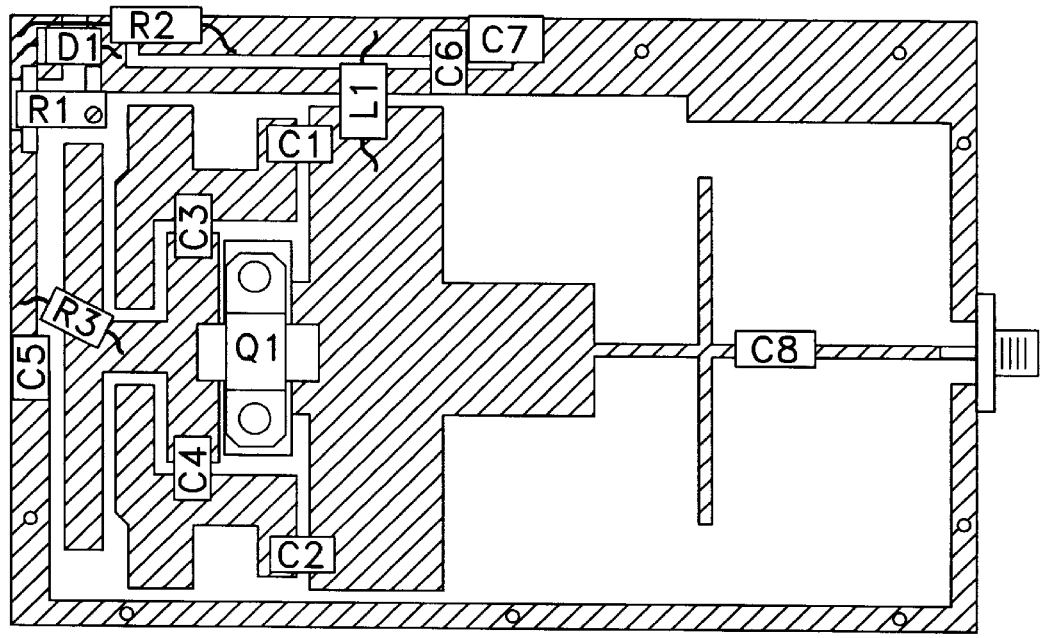
FIG. 206 is an assembly-level schematic diagram of a printed circuit board populated with suitable electronic devices and other parts for implementing a fifth example of an oscillator system according to the invention.

FIG. 206 is an assembly-level schematic diagram of a printed circuit board populated with suitable electronic devices and other parts for implementing a fifth example of an oscillator system according to the invention. The dual feedback circuits in the fifth example are substantially symmetrical. The fifth example is a variant of the fourth example as modified to match the impedance characteristics of a different power transistor.

The printed circuit board has approximate dimensions of about 102 mm (4 inches) by about 64 mm (2.5 inches). The thickness of the dielectric material is about 1.25 mm (50 mils), and the dielectric constant is about 9.2.

Sixth Example of a High Power Oscillator

Figure 207:
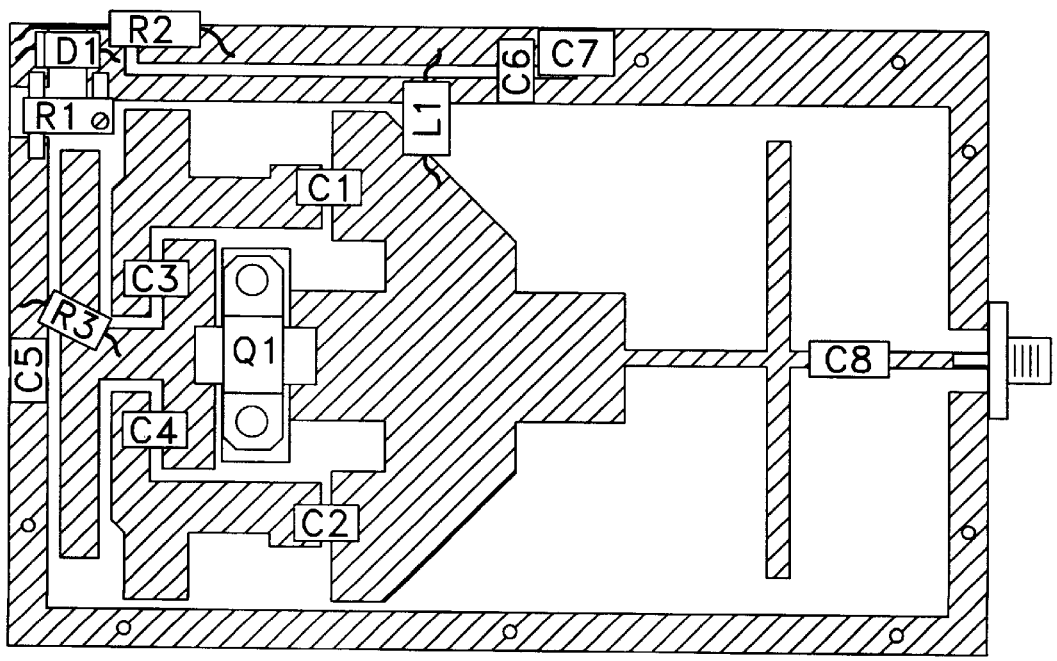
FIG. 207 is an assembly-level schematic diagram of a printed circuit board populated with suitable electronic devices and other parts for implementing a sixth example of an oscillator system according to the invention.

FIG. 207 is an assembly-level schematic diagram of a printed circuit board populated with suitable electronic devices and other parts for implementing a sixth example of an oscillator system according to the invention. The dual feedback circuits in the sixth example are substantially symmetrical. The sixth example is a variant of the fourth example as modified for a different dielectric material and thickness of the printed circuit board material. The output impedance matching circuit is reshaped with angled corners to provide the appropriate electrical length in substantially the same size printed circuit board.

The printed circuit board has approximate dimensions of about 102 mm (4 inches) by about 64 mm (2.5 inches). The thickness of the dielectric material (FR-4) is about 0.8 mm (31 mils), and the dielectric constant is about 4.

Seventh Example of a High Power Oscillator

Figure 208:
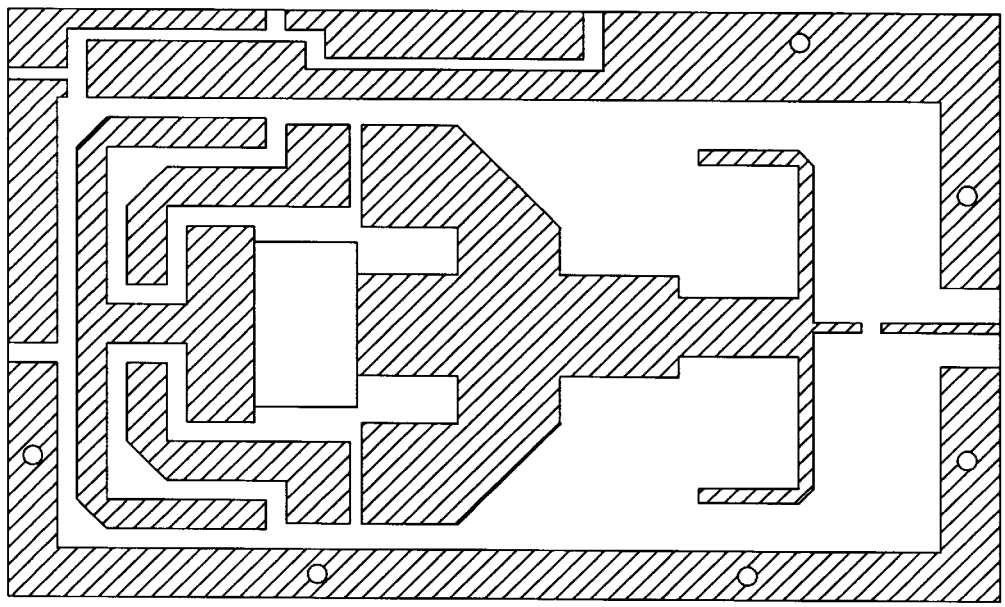
FIG. 208 is a printed circuit board layout suitable for use in implementing a seventh example of an oscillator system according to the invention.
Figure 209:
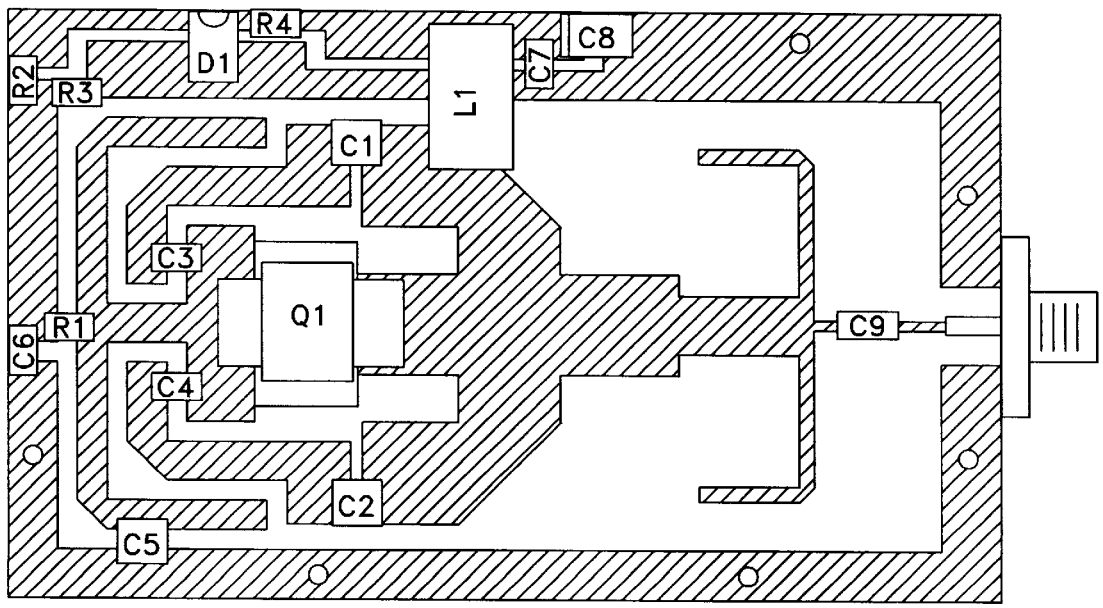
FIG. 209 is an assembly-level schematic diagram of the printed circuit board from FIG. 208 populated with suitable electronic devices for implementing the oscillator system of the seventh example.

FIG. 208 is a printed circuit board layout suitable for use in implementing a seventh example of an oscillator system according to the invention. FIG. 209 is an assembly-level schematic diagram of the printed circuit board from FIG. 208 populated with suitable electronic devices, including a surface mount version of the Motorola® transistor, and other parts for implementing the oscillator system of the seventh example. As shown in FIG. 209, the transistor Q1 is drain justified. The dual feedback circuits in the seventh example are substantially symmetrical. The seventh example is a variant of the sixth example as modified for a different dielectric material and reduced printed circuit board size. As compared with the preceding examples, the seventh examples provides the highest efficiency and smallest physical dimensions.

The printed circuit board has approximate dimensions of about 64 mm (2.5 inches) by about 38 mm (1.5 inches). The thickness of the dielectric material is about 0.6 mm (25 mils), and the dielectric constant is about 10.2.

While the invention has been described with respect to specific examples, the invention is not so limited. Based on the drawings, the detailed description, and the teachings set forth herein, numerous other examples will occur to those skilled in the art. For example, one of ordinary skill in the art will appreciate that other circuit configurations may be utilized to provide appropriate tuning and bias voltages for the various examples set forth herein. Moreover, the examples includes variable resistors and/or capacitors which may be replaced by fixed value components in production. The preceding examples should therefore be considered as illustrative only, with the scope and spirit of the invention being set forth in the appended claims.

4.4 Lamp and Oscillator

In general, the present aspect of the invention refers to an integrated lamp head as described in Section 4.1.8 powered by an RF power oscillator as described in Section 4.3, and various improvements and/or alterations thereof.

The lamp according to the present invention represents a true revolution in lighting. Just as the vacuum tube has been replaced by the transistor, first in niche applications and later in virtually all applications, the solid state electrodeless lamp will push into all aspects of lighting. At the heart of the RF source is the same silicon technology that has given us the transistor radio and the computer. By utilizing a novel combination of electrodeless bulbs and solid state technology, the resulting lamp is reliable, long lived, and is contemplated as being highly cost effective when produced in volume. While the lamp of the present invention preferably employs a high power oscillator as described in section 4.3, other circuit topologies can alternatively be used to generate the required RF energy. Lamps have been successfully operated with more conventional circuitry employing a low wattage oscillator followed by one or more stages of amplification. Unlike most RF applications, linearity is not of paramount importance, and amplifiers of any class including class E and F can be used.

As noted above, the RF source preferably uses a commercially available silicon RF transistor, which meets certain cost and performance targets. Other suitable choices for the transistor technology include, but are not limited to, germanium, gallium and silicon carbide. The same forces that are collapsing computers from boxes to boards and finally to a single integrated circuit are also driving the lamp of the present invention. The lamp of the present invention contemplates product configurations in which the power supply, power RF oscillator, the coupling circuit, and the bulb are integrated into a single device. For certain applications, the integration can extend beyond the lamp. For example, an optical modulator could be integrated with the lamp device to provide a display engine.

According to another aspect of the present invention, the lamp head is mounted directly on the same printed circuit board as the RF oscillator circuitry. In some examples, the printed circuit board in mechanically and electrically connected to a metal plate, referred to as a spreader plate, which has an opening under the printed circuit board in the area of the lamp head in order to allow the printed circuit board to flex in response to thermal forces.

According to another aspect of the present invention, a control circuit is provided for matching the operating characteristics of the lamp to the operating frequency of the oscillator at a plurality of different frequencies.

Class E Amplifier

Class E RF sources offer the potential for efficiency greater than 80% and have also been the subject of much development effort at frequencies up to about 13 MHz. Some development has occurred at frequencies up to about 5 GHz using GaAs MESFET transistors.

Significantly, an extremely wide range of RF frequencies may be utilized to power the lamp of the present invention. Operation from a few KHz to several GHz and beyond have been demonstrated. Moreover, the Lamp of the present invention may be operated over a wide range of lamp power. The only significant practical limitations on the amount of power applied to the lamp is the availability of cost effective RF energy sources and certain considerations of keeping the bulb temperature within a suitable operating window.

EXAMPLES OF LAMP AND OSCILLATOR SYSTEMS

Figure 210:
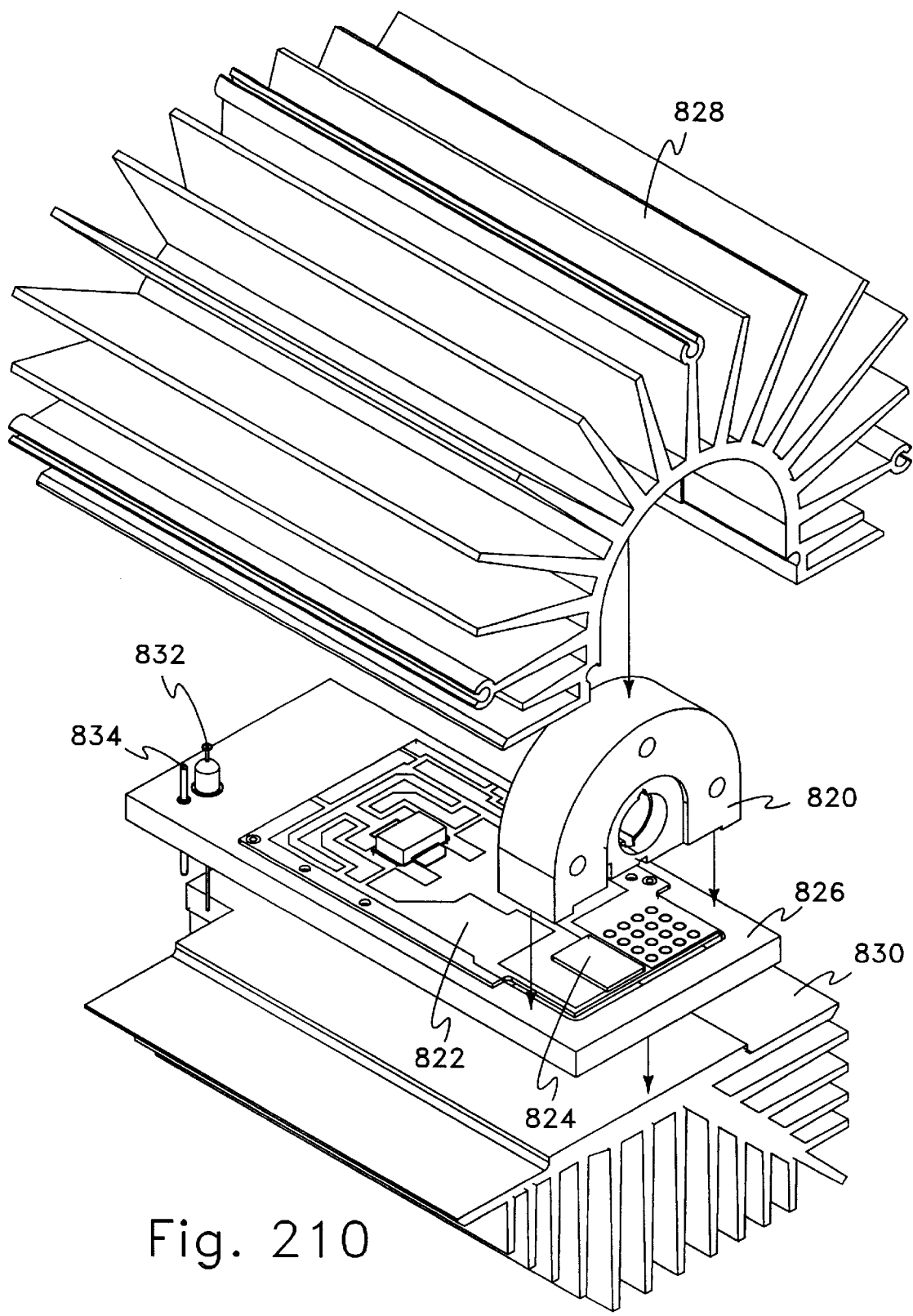
FIG. 210 is an exploded, perspective view of a first example of a high brightness lamp according to the present invention.

FIG. 210 is an exploded, perspective view of a first example of a high brightness lamp according to the present invention. A lamp head 820 is mounted on an oscillator board 822. A suitable dielectric material 824 is positioned between a high voltage plate of the lamp head 820 and a pad on the oscillator board 822. The oscillator board 822 is mechanically and electrically connected to a metal plate 826, hereinafter referred to as a spreader plate 826. A ground plate of the lamp head 820 is mechanically and electrically connected to a ground pad on the oscillator board 822. A perimeter portion of the lamp head 820 is also mechanically and electrically connected to the spreader plate 826. The lamp head 820 and oscillator board 822 are enclosed by a first heatsink 828 and a second heatsink 830. Power is supplied to the oscillator board 822 from an insulated pin 832 and a ground pin 834.

The lamp head 820 is constructed as described in detail in section 4.1.8.1 above in connection with FIGS. 89–94. As illustrated in FIG. 210, the lamp head 820 omits the optional protruding ridge. The oscillator board 822 is constructed as described in detail in section 4.3 above in connection with FIGS. 208–209, except for the addition of the ground pad and power feed pad for connecting to the lamp head 820.

Figure 211:
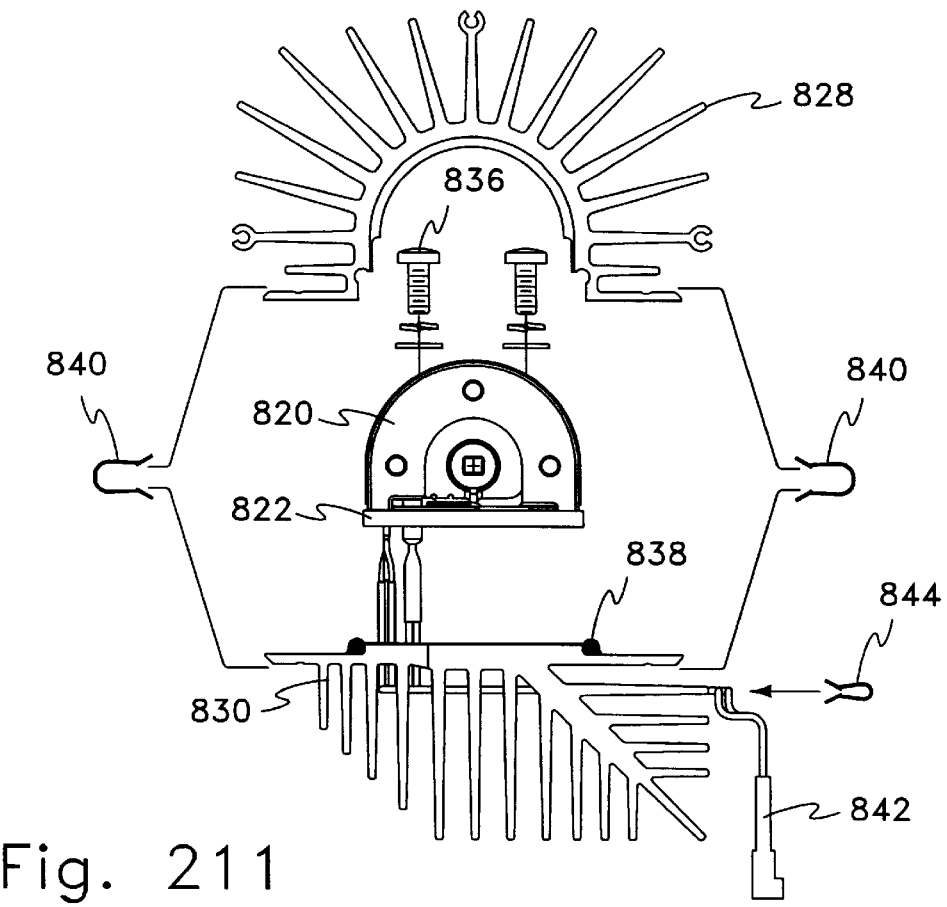
FIG. 211 is an exploded, schematic view of the first example illustrating various assembly details.

FIG. 211 is an exploded, schematic view of the first example illustrating various assembly details. The oscillator board 822 is secured to the heatsink 830 by fasteners 836 (e.g., bolts or screws). The heatsink 828 is secured to the heatsink 830 by RF sealing adhesive 838 and clips 840. A power cord 842 is connected to the power pins 832 and 834. An optional clip 844 may be used to provide stress relief for the power cord 842.

Figure 212:
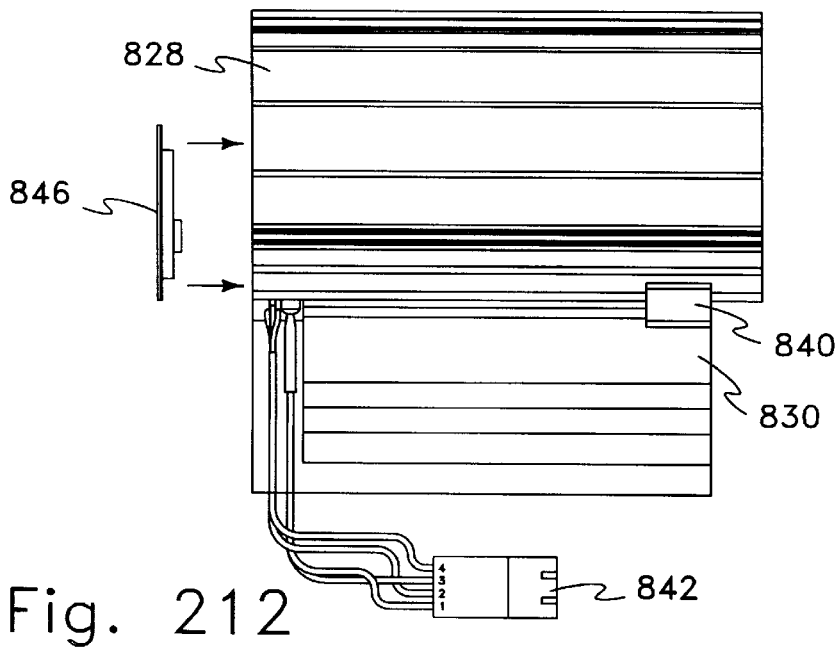
FIG. 212 is an exploded, schematic view of the first example illustrating assembly details for an end plate.

FIG. 212 is an exploded, schematic view of the first example illustrating assembly details for an end plate 846. The end plate 846 is secured to the heatsinks 828 and 830 with an RF sealing adhesive. FIGS. 213 and 214 are schematic views of the completed assembly of the first example. FIG. 215 is a cross sectional view taken along line 215—215 in FIG. 213. In general, the lamp of the present invention is configured to contains the RF fields generated therein. The power line is filtered, metal enclosures are used with openings constricted to below cutoff, and gasketing is employed between surfaces. Gasketing involves glues, strips of compressible rope, resistive films and associated mechanical design to restrict the flow of RF current and associated radiation/coupling.

Figure 216:
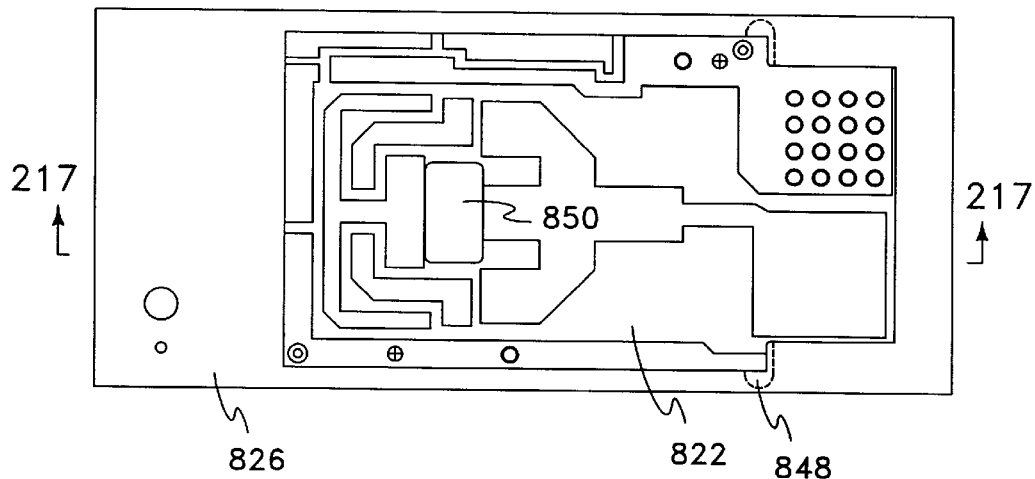
FIG. 216 is a schematic view of the oscillator board 822 and spreader plate 826.
Figure 217:
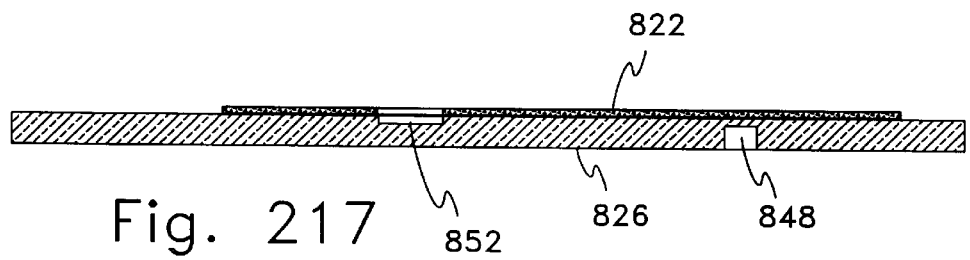
FIG. 217 is a cross sectional view taken along line 217—217 in FIG. 216.
Figure 218:
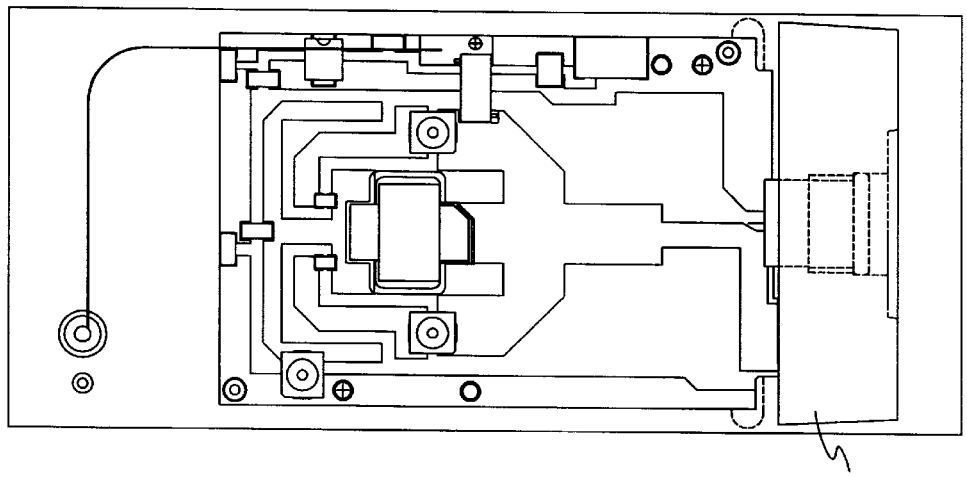
FIG. 218 is a schematic view of the lamp head mounted on the oscillator board and spreader plate.

FIG. 216 is a schematic view of the oscillator board 822 and spreader plate 826. FIG. 217 is a cross sectional view taken along line 217—217 in FIG. 216. A groove 848 is formed in the spreader plate 826 to restrict the transfer of heat from the lamp head 820 to the oscillator circuitry. The oscillator board 822 includes a cut-out section 850 and the spreader plate 826 includes a corresponding depression 852 where the active element of the oscillator is directly grounded to the spreader plate 826. FIG. 218 is a schematic view of the lamp head 820 mounted on the oscillator board 822 and spreader plate 826, with the oscillator board 822 populated with suitable electrical components, such as those described in connection with FIGS. 208–209 in section 4.3 above.

4.4.1 Cantilevered Oscillator Board

Figure 219:
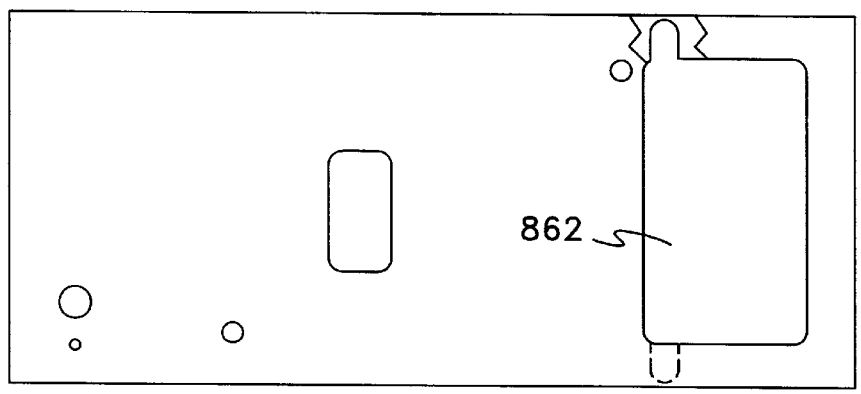
FIG. 219 is a schematic view of an alternative structure for the spreader plate.
Figure 220:
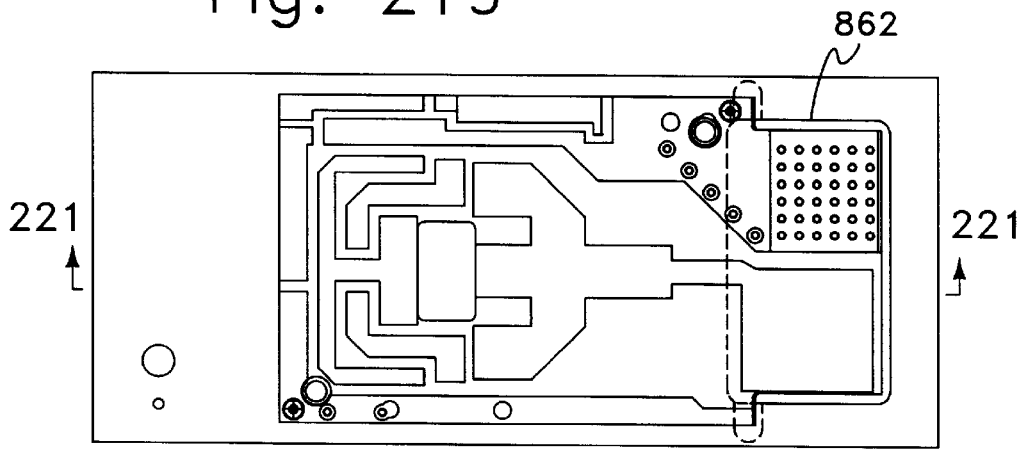
FIG. 220 is a schematic view of the oscillator board mounted on the alternative spreader plate.
Figure 221:
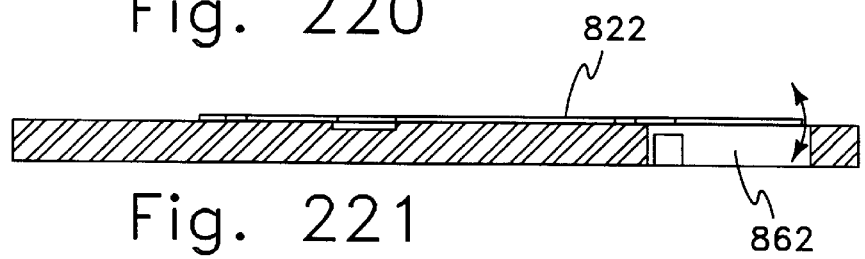
FIG. 221 is a cross sectional view taken along line 221—221 in FIG. 220.

FIG. 219 is a schematic view of an alternative structure for the spreader plate 826. FIG. 220 is a schematic view of the oscillator board 822 mounted on the alternative spreader plate. FIG. 221 is a cross sectional view taken along line 221—221 in FIG. 220. As shown in FIGS. 219–221, the spreader plate is provided with an opening 862 and the oscillator board 822 is secured the spreader plate with a portion of the board cantilevered over the opening 862. The lamp head, including the capacitor stack is connected the oscillator board at the cantilevered portion. As shown in FIG. 221, the oscillator board can flex in the area of the lamp head connection.

As described in section 4.1.8.1 and 4.1.8.3, a capacitor stack of dielectric and conductive plates is positioned between the lamp head and the PCB. The different materials utilized therein may have different coefficients of thermal expansion. For example, the dielectric material can be either rigid (as in glass or ceramic) or soft (as in plastics). The connection from the stack to the other elements is typically made with a tin lead solder which may be characterized as a plastic material at the lamp operating temperatures.

As the lamp head is heated, it may expand at a greater rate than the capacitor stack. Moreover, if the capacitor stack is compressed by a pre-load in assembly, high stresses may be generated within the rigid materials while distortions are generated in the plastic materials (which may relieve some of the pre-load). During thermal cycling of the lamp, the stack assembly may undergo tensile stresses which can lead to degradation or failure through delamination of the stack.

According to the present aspect of the invention, the lamp assembly is configured so that the PCB can flex in the area of the lamp head so that a small amount of motion generated by the different rates of thermal expansion can be accommodated without causing unit failure.

Figure 222:
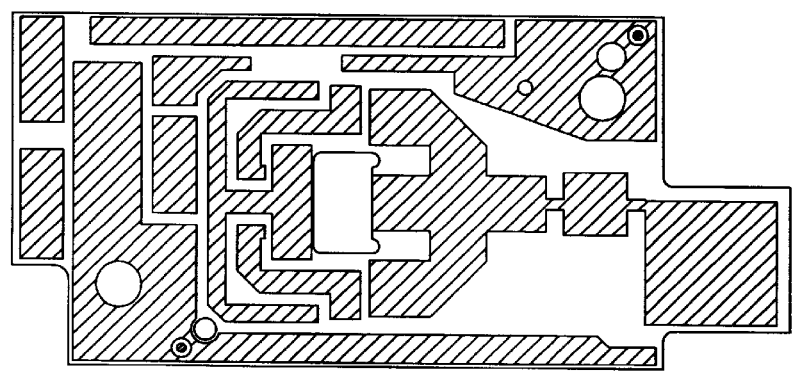
FIG. 222 is a schematic diagram of an alternative, preferred printed circuit board layout for the oscillator board.

FIG. 222 is a schematic diagram of an alternative, preferred printed circuit board layout for the oscillator board 822. In the preferred layout, the ground pad on the oscillator board is eliminated and the ground plate on the lamp head is connected directly to the spreader plate.

4.4.2 Separate Lamp Head Housing

Figure 223:
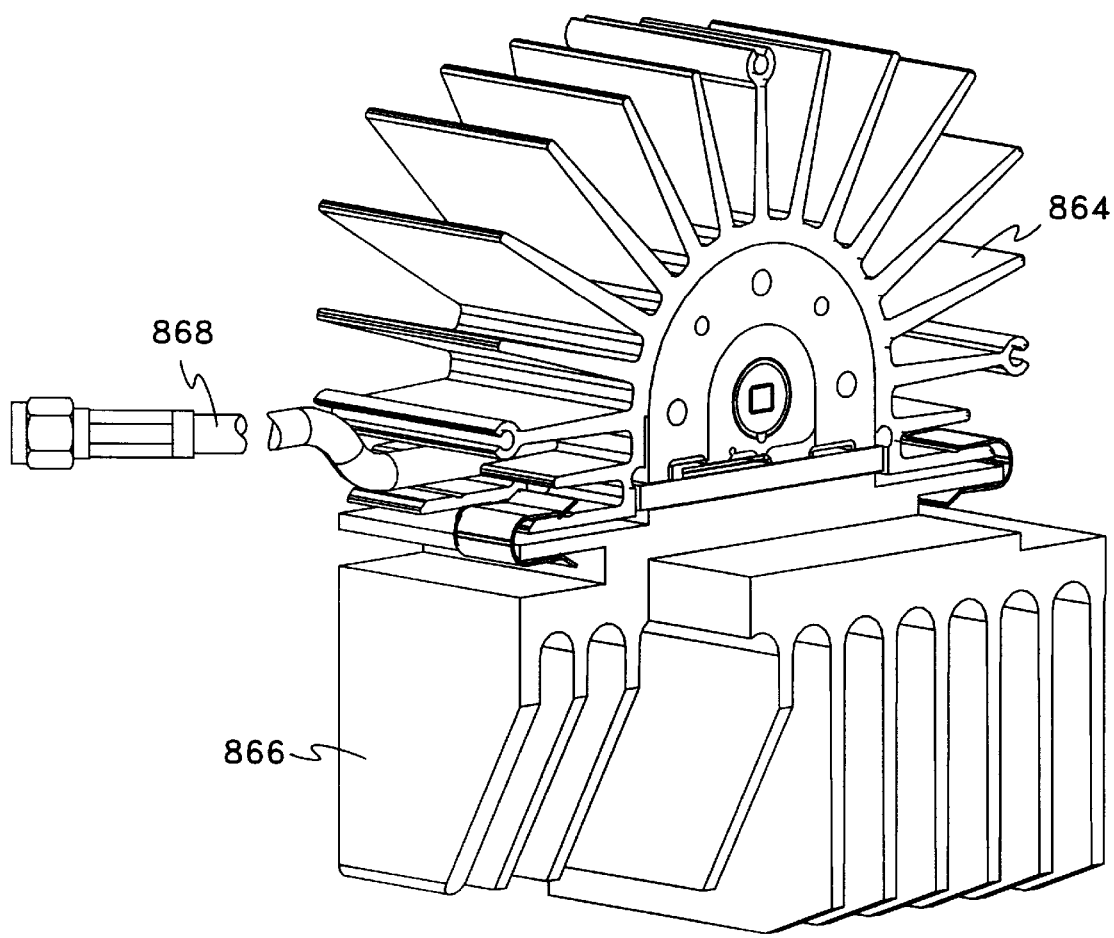
FIG. 223 is a perspective view of a housing for the lamp head.
Figure 224:
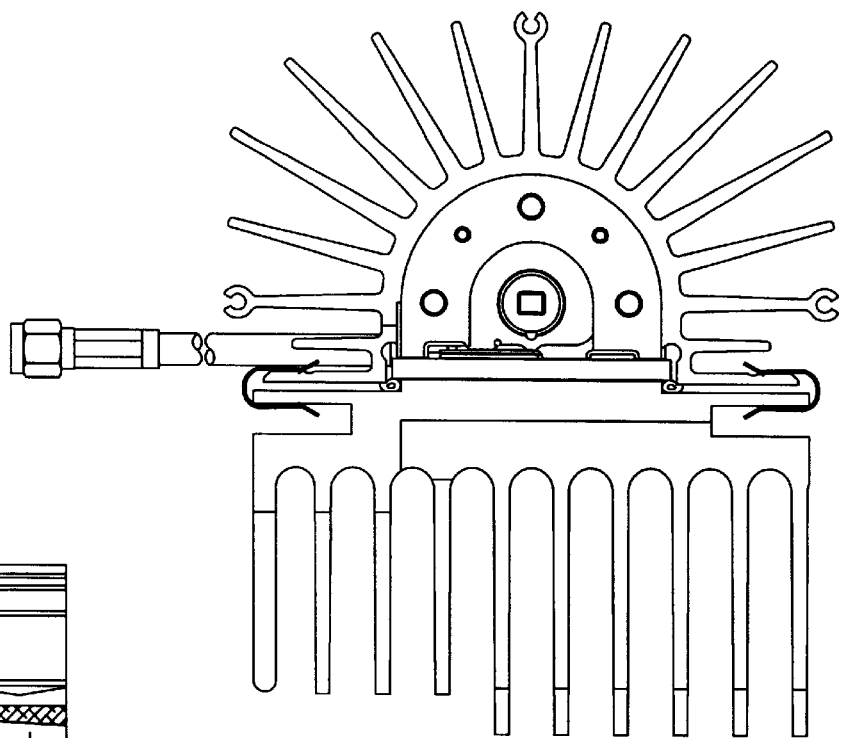
FIGS. 224–226 are schematic views of various assembly details for the separate lamp head housing.
Figure 225:
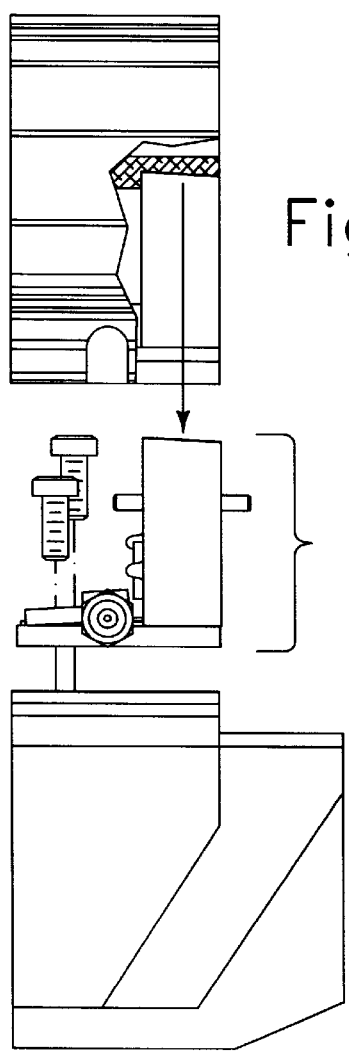
Figure 226:
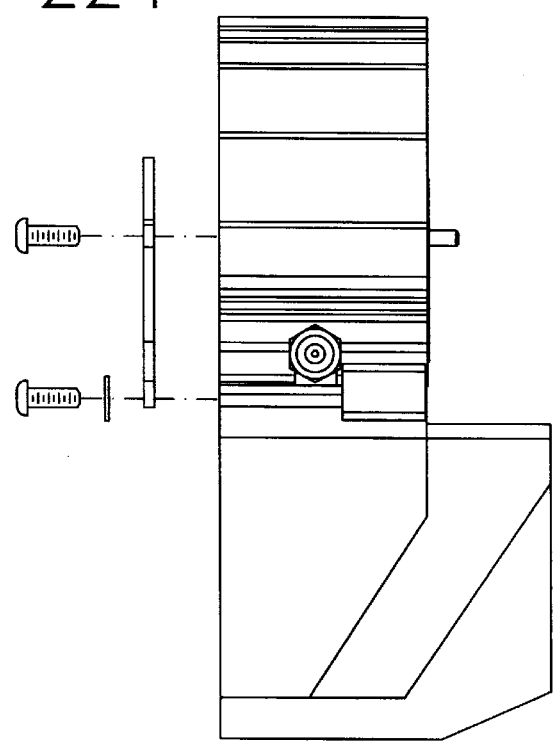

FIG. 223 is a perspective view of a housing for the lamp head. The housing includes heatsinks 864 and 866 which are relatively shorter as compared to heatsinks 828 and 830. RF power is provided to the lamp head via a coaxial cable 868 from any suitable source of RF energy. Advantageously, the lamp head assembly is smaller and may be located remote from the RF source. FIGS. 224–226 are schematic views of various assembly details for the separate lamp head housing.

Figures 227, 228:
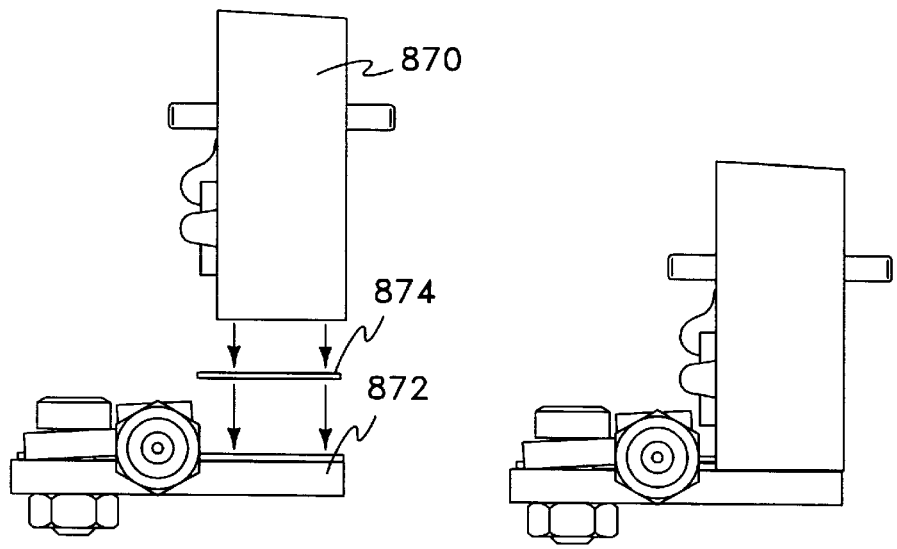
FIG. 227 is an exploded, schematic view of the lamp head/power feed assembly.
FIGS. 228–230 are schematic views of various assembly details of the lamp head/power feed assembly.
Figure 229:
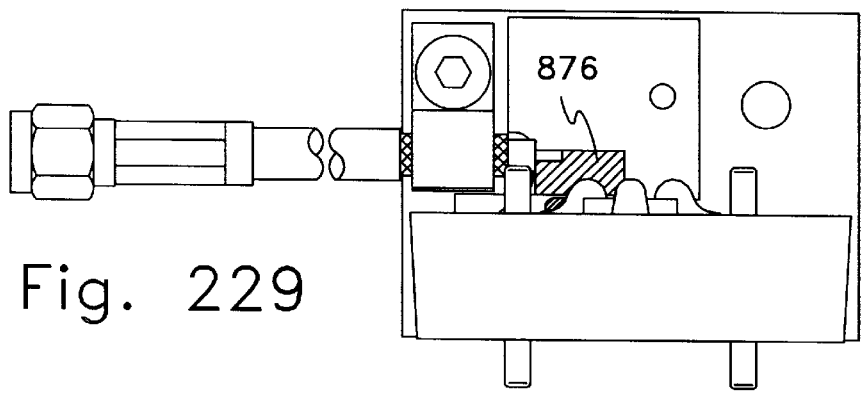
Figure 230:
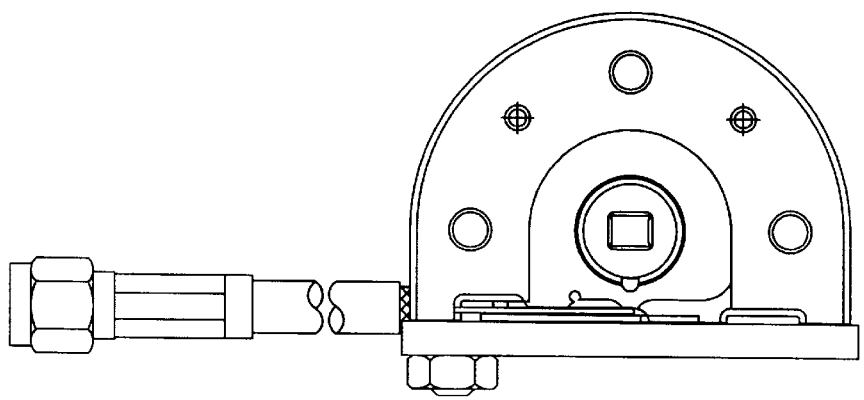

FIG. 227 is an exploded, schematic view of the lamp head/power feed assembly. The lamp head 870 is mounted on a power feed assembly 872. A capacitor assembly 874 is positioned between a high voltage plate of the lamp head 870 and a high voltage pad 876 of the power feed assembly 872. FIGS. 228–230 are schematic views of various assembly details of the lamp head/power feed assembly.

Figure 231:
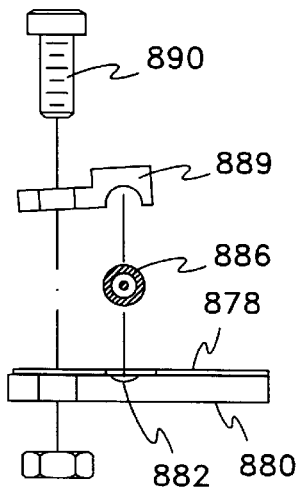
FIG. 231 is an exploded, schematic view of the power feed assembly.
Figure 232:
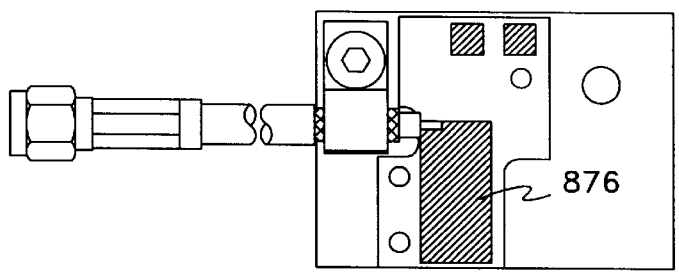
FIGS. 232–234 are schematic views of various assembly details of the power feed assembly.
Figure 233:
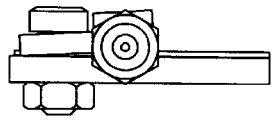
Figure 234:
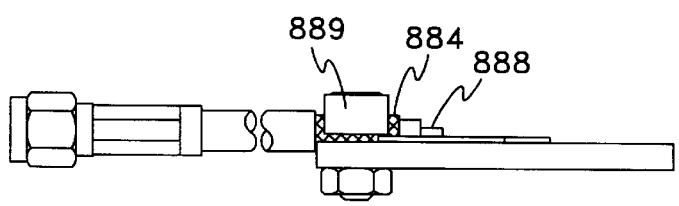
Figure 235:
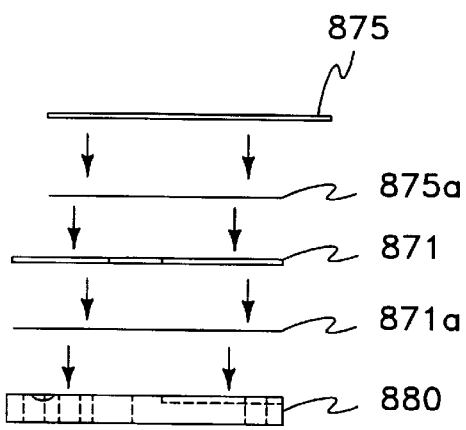
FIGS. 235–237 are schematic diagrams of an alternative, preferred construction of the capacitor stack according to the invention.
Figure 236:
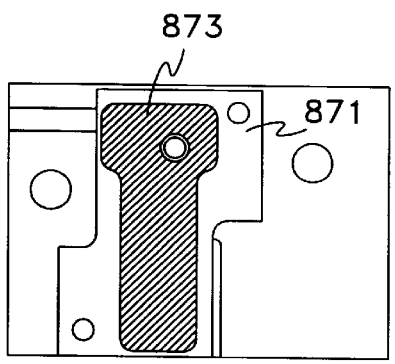
Figure 237:
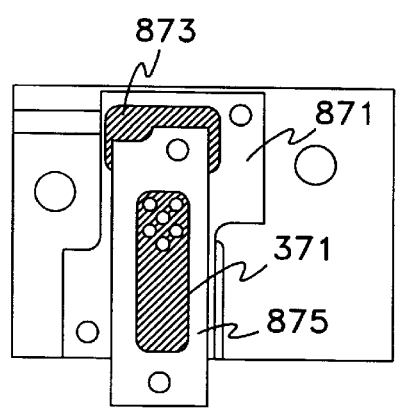

FIG. 231 is an exploded, schematic view of the power feed assembly 872. A power feed printed circuit board 878 is electrically and mechanically connected to a spreader plate 880. The spreader plate 880 is formed with a groove 882 configured to receive a grounded outer conductor 884 of a coaxial cable 886 and to suitably position a center conductor 888 of the coaxial cable on the high voltage pad 876 of the power feed printed circuit board 878. A bracket 889 secures the coaxial cable 886 to the spreader plate 880 via a fastener 890 (e.g. a bolt or a screw). FIGS. 232–234 are schematic views of various assembly details of the power feed assembly 872.

FIGS. 110 and 111 are schematic views of opposite sides of an exemplary capacitor assembly 874. As described in section 4.1.8, the capacitor assembly 874 is of suitable dielectric material and thickness to provide a desired capacitance. As shown in FIGS. 110–111, the capacitor assembly 874 is laminated with conductive pads and provided with through holes for alignment with the power feed assembly 872.

Figure 238:
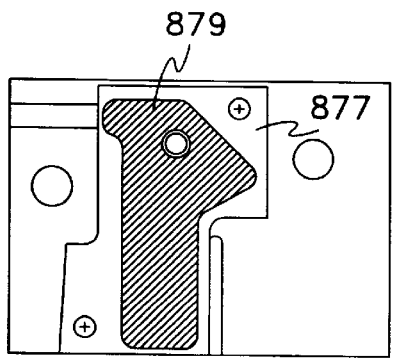
FIGS. 238–239 show an alternative preferred arrangement for a single sided printed circuit board with a power feed pad on one side.
Figure 239:
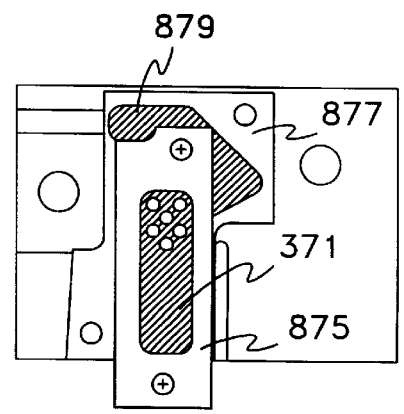

An alternative, preferred construction of the capacitor stack according to the invention is shown in FIGS. 235–239. The power feed assembly comprises a single sided printed circuit board 871 with a power feed pad 873 on one side and a bonding adhesive 871a on the other for bonding the board to the spreader plate 880. The high voltage capacitor assembly comprises a single sided circuit board 875 having a conductive pad 371 as described above in section 4.1.8.3 with respect to FIG. 120 on one side and adhesive bonding 875a on the other for bonding the capacitor assembly to the power feed assembly. This alternative, preferred construction eliminates a number of solder layers in the capacitor stack. As compared to the foregoing constructions, this preferred construction ameliorates arcing by utilizing a minimum number of well-controlled solder posts. FIGS. 238–239 show an alternative preferred arrangement for a single sided printed circuit board 877 with a power feed pad 879 on one side.

Figure 240:
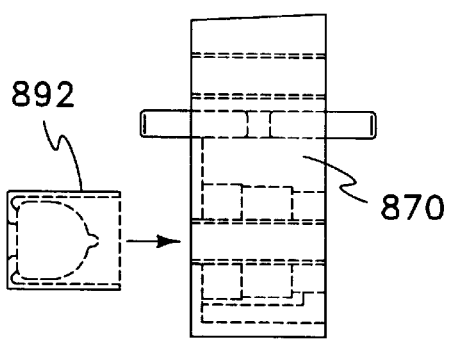
FIG. 240 is an exploded schematic view of the lamp head.
Figure 241:
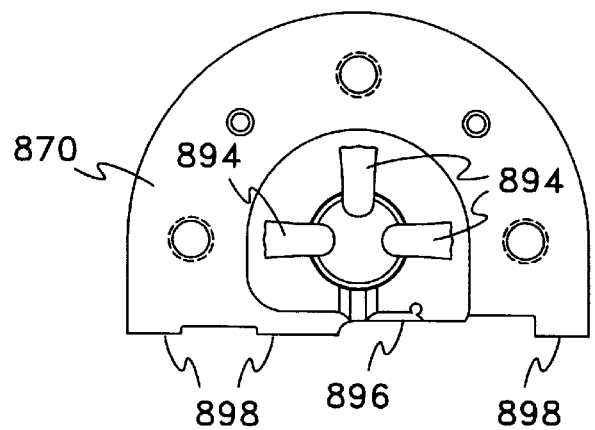
FIGS. 241–242 are schematic views of the lamp head from opposite sides.
Figure 242:
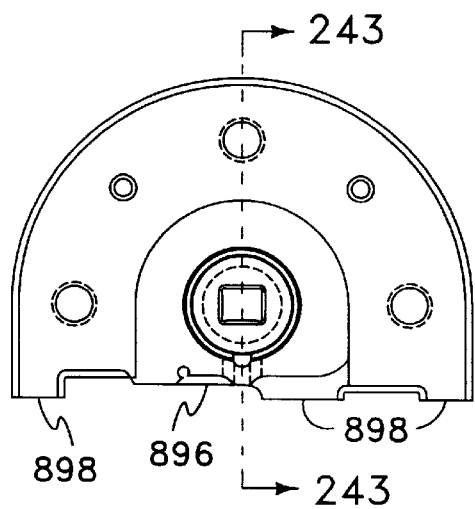
Figure 243:
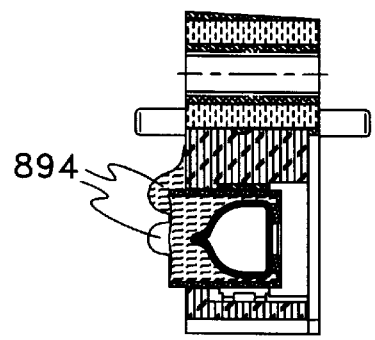
FIG. 243 is a cross sectional view taken along line 243—243 in FIG. 242.
Figure 244:
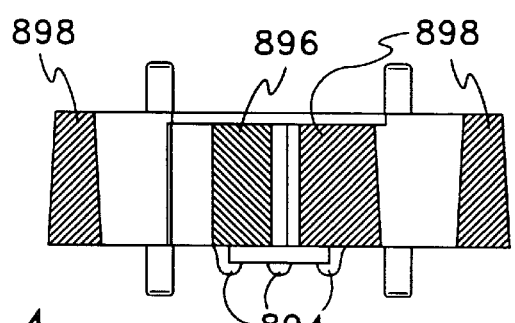
FIG. 244 is a schematic view of a side of the lamp head which is mounted to the power feed assembly.

FIG. 240 is an exploded schematic view of the lamp head. An aperture cup 892 (enclosing a bulb) is inserted in an opening in the lamp head 870. FIGS. 241–242 are schematic views of the lamp head from opposite sides. FIG. 243 is a cross sectional view taken along line 243–243 in FIG. 242. FIG. 244 is a schematic view of a side of the lamp head which is mounted to the power feed assembly 872. As shown in FIGS. 240–244, the aperture cup 892 is positioned in the lamp head with the bulb aligned with the wedding ring shaped coil. The aperture cup 892 is secured in this position with a high temperature adhesive 894 on the outside of the lamp head 870. Securing the aperture cup 892 from the outside of the lamp head 870 aids in thermal management of the lamp. The lamp head 870 has a high voltage plate 896 and ground plates 898 which are electrically connected to the high voltage pad 876 and spreader plate 880, respectively, of the power feed assembly 872.

4.4.3 Exemplary Lamp Head Soldering Processes

Any of a number of techniques may be utilized for effecting an electrical connection between the lamp head and the printed circuit board (PCB)/spreader plate assembly. Preferably, the lamp head has a coating of Babbit metal applied to the high voltage pad and ground pads to assist soldering and mechanical attachment to the PCB assembly. The lamp head connection pads are preferably grit blasted just prior to spray coating of the Babbit metal.

One method according to the invention is to place solder in the area of the desired connection and then heat the lamp head and PCB assembly to about 200° C., for example, with a heating plate. The lamp head is then manually placed in the appropriate location and the parts cool together to form a bond.

Another exemplary method for forming an electrical connection between the lamp head and the PCB assembly is as follows. Solder is pre-applied to the lamp head and/or PCB assembly. The lamp head is placed on the PCB assembly and a high amperage current is run through the lamp head and PCB assembly in the area of the lamp head connection. High heat is generated at the contact areas, causing the pre-applied solder to melt. The current is then removed and a bond forms as the parts cool. For example, a clamping fixture is used which holds the lamp head and PCB assembly together. The clamping fixtures includes oppositely disposed carbon electrodes through which the high amperage current is passed. The current heats the carbon electrodes which in turn heats the lamp head and PCB assembly. This method has the advantage of heating only a portion of the PCB assembly, thereby avoiding reflow of solder on other parts of the PCB assembly. This method is also faster because only a portion of the PCB assembly needs to be heated.

4.4.4 Improved Solderability Inserts

According to a present aspect of the invention, the lamp head includes conductive inserts in the area(s) of the high voltage pad and/or ground pads which improve solderability as compared to integral aluminum pads. Preferably the insert is selected from materials which will not melt in the presence of molten aluminum. More preferably, the selected material will form a metalurgical bond between the insert and the aluminum portion of the lamp head. Also, the selected material preferably exhibits an improved solderability for connection to copper areas on the PCB assembly. For example, suitable materials include nickel, nickel plated with platinum, and nickel alloyed with a small amount (e.g. less than about 25%) of iron.

FIG. 245 is a schematic, top view of a lamp head 950 according to the invention. FIG. 246 is a schematic, front view of the lamp head 950. The lamp head 950 includes an insert 951 in an area of a high voltage pad of the lamp head 950 and inserts 952a, 952b, and 952c in respective areas of ground pads of the lamp head 950.

As described above, the lamp head 950 is integrally formed through a vacuum injection molding process. The mold, BN insert, and/or silicon carbide pre-form are adapted to retain the pad inserts in position during the molding process. FIG. 247 is an enlarged, fragmented, cross-sectional view of the insert 951 positioned in a mold 954 prior to infiltration of the aluminum. The insert 951 is further positioned by the BN insert 956. For the high voltage pad insert 951, one end of the insert 951 will make electrical connection with the peg(s) 958 which connects to the excitation coil. The lamp head 950 may be machined, for example, along line 960—960 to expose an inner portion of the pad material.

FIG. 248 is an enlarged, fragmented, cross-sectional view of the insert 952a positioned in the mold 954 prior to infiltration of aluminum. The insert 952a is held in place by the silicon carbide pre-form 962.

Figure 249:
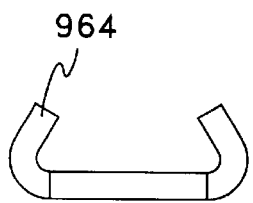
FIGS. 249–251 are schematic and perspective views, respectively of an insert with shortened leg segments.
Figure 250:
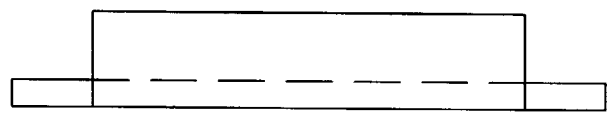
Figure 251:
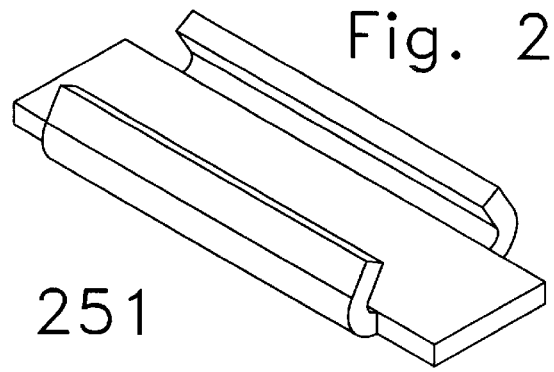
Figure 252:
FIGS. 252–254 are schematic and perspective views, respectively, of an insert with through holes.
Figure 253:
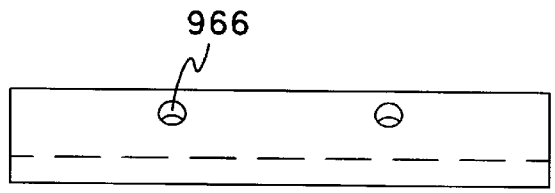
Figure 254:
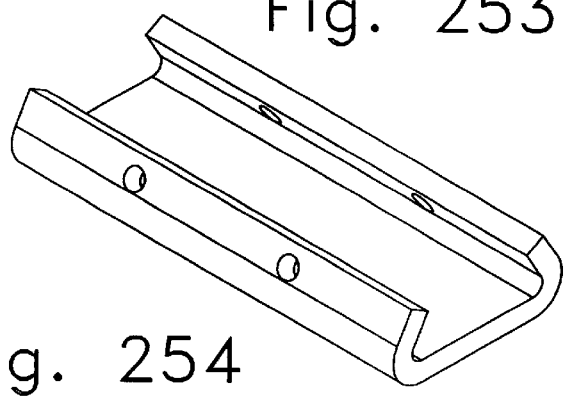
Figure 255:
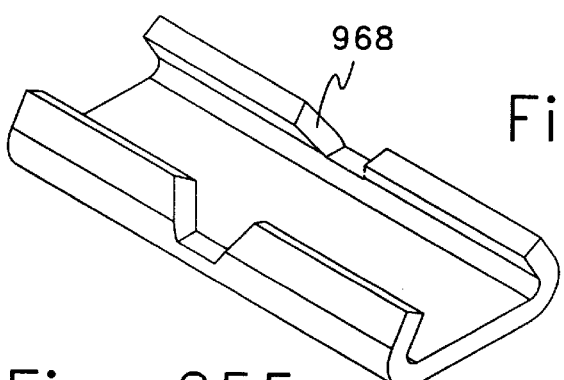
FIG. 255 is a perspective view of an insert with notches.

The inserts 951 and 952a–c may be of any suitable shape and may be of uniform longitudinal cross-section. Alternatively, the inserts may have a non-uniform longitudinal cross-section to aid retention during the molding process and/or in the finished integrated lamp head. FIGS. 249–251 are schematic and perspective views, respectively of an insert with shortened leg segments 964. FIGS. 252–254 are schematic and perspective views, respectively, of an insert with through holes 966. FIG. 255 is a perspective view of an insert with notches 968.

4.4.5 Separate RF Source

Figure 256:
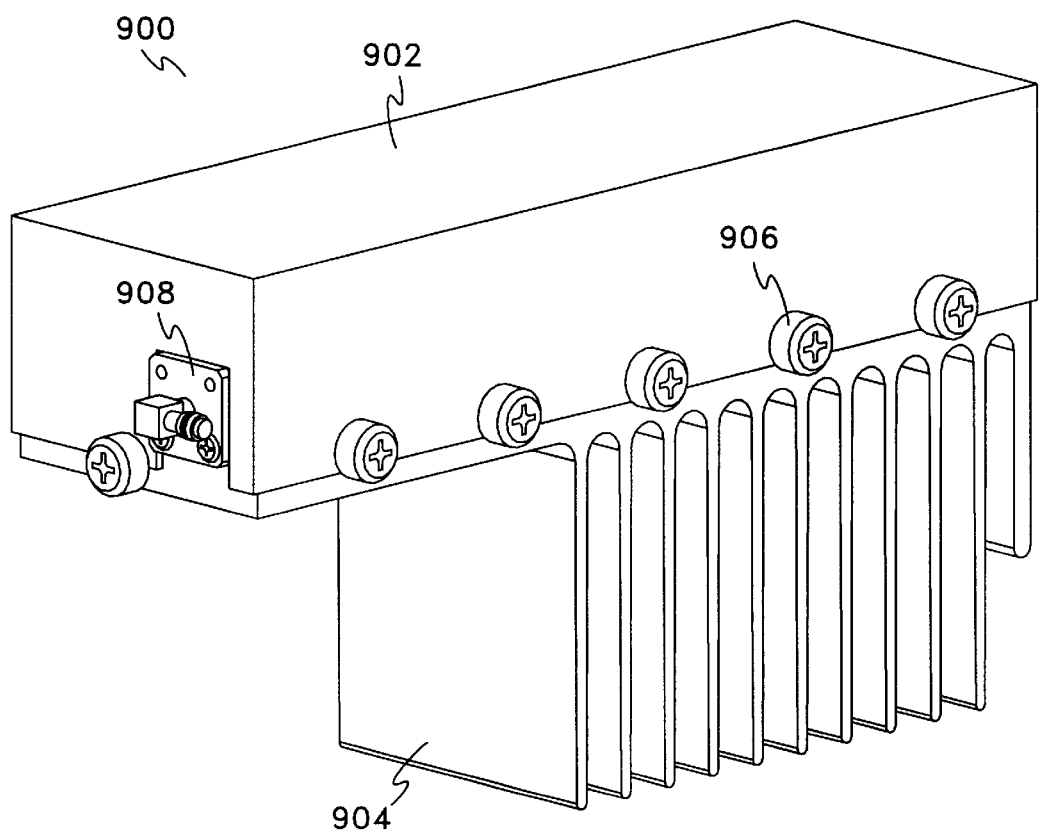
FIG. 256 is a perspective view of a preferred RF source for the separate lamp head described above in connection with FIGS. 223–255.

FIG. 256 is a perspective view of a preferred RF source 900 for the separate lamp head described above in connection with FIGS. 223–255. An RF power supply is housed in an enclosure 902 which is secured to a heatsink 904 by fasteners 906. A coaxial connector 908 is also mounted to the heatsink 904.

FIG. 257 is an exploded, schematic view of the RF source 900. As shown in FIG. 257, the RF source 900 includes a control circuit 910, an oscillator assembly 912, and a circulator 914, connected as described hereinafter. FIG. 258 is a schematic diagram of a power connection for the RF source 900. Power is provided to the RF source 900 through a filter assembly 916, one lead of which is grounded to the heatsink 904 and the other of which provides DC power.

FIG. 259 is a partial cross sectional view of the power filter assembly 916. A capacitor 918, a transient voltage suppressor 920, and a resistor 922 are connected in parallel between a DC supply voltage and ground. For example, the capacitor 918 has a value of about 1000 $\mu$F and a rating of 50V, the voltage suppressor 920 is a Motorola P6KE27A, and the resistor has a value of about 6.6K ohms with a rating of about ¼ watt.

4.4.6 Oscillator Control Circuits

Figure 260:
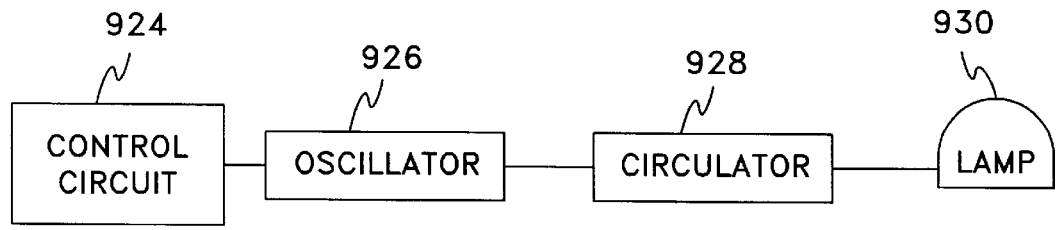
FIG. 260 is a diagram of an RF circuit including a control circuit which provides a control signal to an oscillator.
Figure 261:
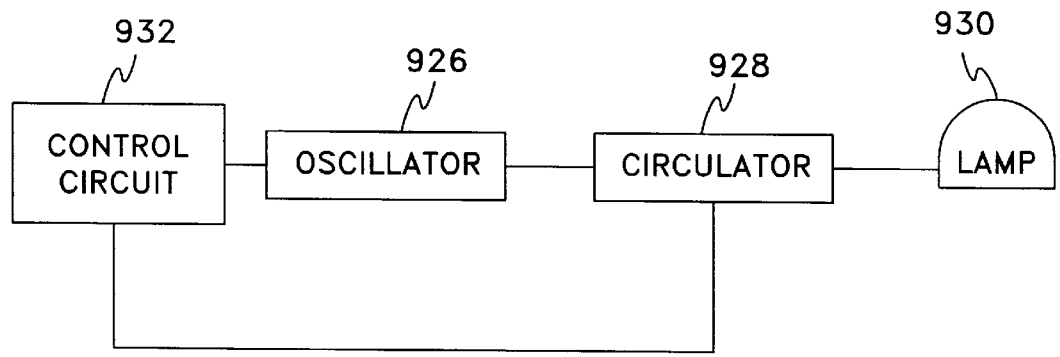
FIG. 261 is a diagram of an alternative RF circuit including a control circuit which provides a control signal to an oscillator.
Figure 262:
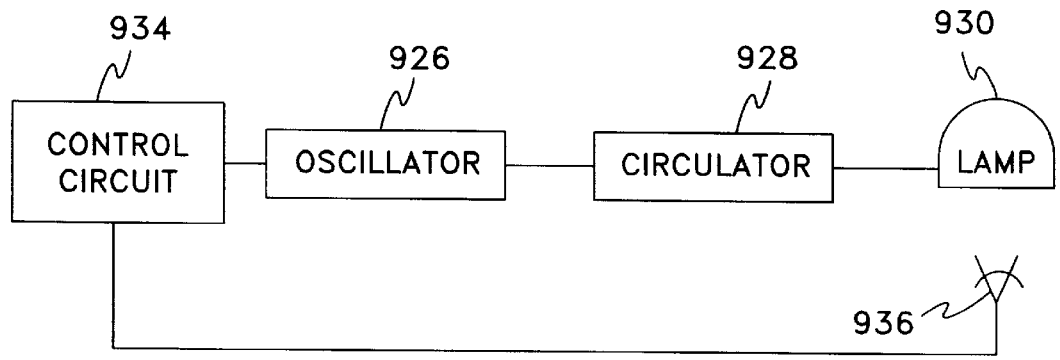
FIG. 262 is a diagram of another RF circuit including a control circuit which provides a control signal to an oscillator.

FIGS. 260–262 are block level schematic diagrams for various RF circuits powering a lamp according to the present invention. In the lamp of the present invention, especially when utilizing an indium halide only fill, the ignited cold lamp state has a significantly different electrical condition (e.g. impedance) as compared to the ignited hot state of the lamp. In order to improve starting and operation of the lamp, it is therefore preferred to provide a plurality of tuning states which correspond to various lamp parameters. These parameters include, for example, light output level, RF power reflection, and light color.

A feature of the oscillator described in section 4.3 is that the frequency of the oscillation may be tuned by adjusting a capacitor value. According to the present aspect of the invention, a control circuit is provided to switch the value of the capacitor in order to provide a desired frequency of oscillation.

The capacitor value may be switched, for example, by providing a varactor diode in series with the tuning capacitor, providing two tuning capacitors in series with one another which are both switched open or closed with a pin diode, and two tuning capacitors in parallel with each other with one being driven by a pin diode.

The control circuit may include, for example, a timer circuit based on observed lamp operating characteristics, a DC input current monitor, a light level output monitor, and an RF reflected power monitor.

FIG. 260 is a diagram of an RF circuit including a control circuit 924 which provides a control signal to an oscillator 926. The output of the oscillator 926 is directed to though a circulator 928 to an RF powered lamp 930. In the control circuit 924, the control signal is provided independent of any feed back from the rest of the circuit. For example, the control circuit 924 comprises a timer circuit configured to provide a suitable control signal based on timed intervals from when the lamp is switched on. The timed intervals are based on, for example, empirical observation of the lamp performance.

FIG. 261 is a diagram of an RF circuit including a control circuit 932 which provides a control signal to an oscillator 926. The output of the oscillator 926 is directed to though a circulator 928 to an RF powered lamp 930. In the control circuit 932, the control signal is provided based on feed back received from the circulator. For example, the control circuit monitors reflected RF power and adjust the frequency of the oscillator to obtain a minimum amount of reflected RF power.

FIG. 262 is a diagram of an RF circuit including a control circuit 934 which provides a control signal to an oscillator 926. The output of the oscillator 926 is directed to though a circulator 928 to an RF powered lamp 930. In the control circuit 934, the control signal is provided based on feed back received from the lamp. For example, a optical sensor 936

(e.g. a photo-detector) is positioned to monitor light output or light to sense light color. The control circuit monitors the measured quantity and adjust the frequency of the oscillator accordingly.

Figure 263:
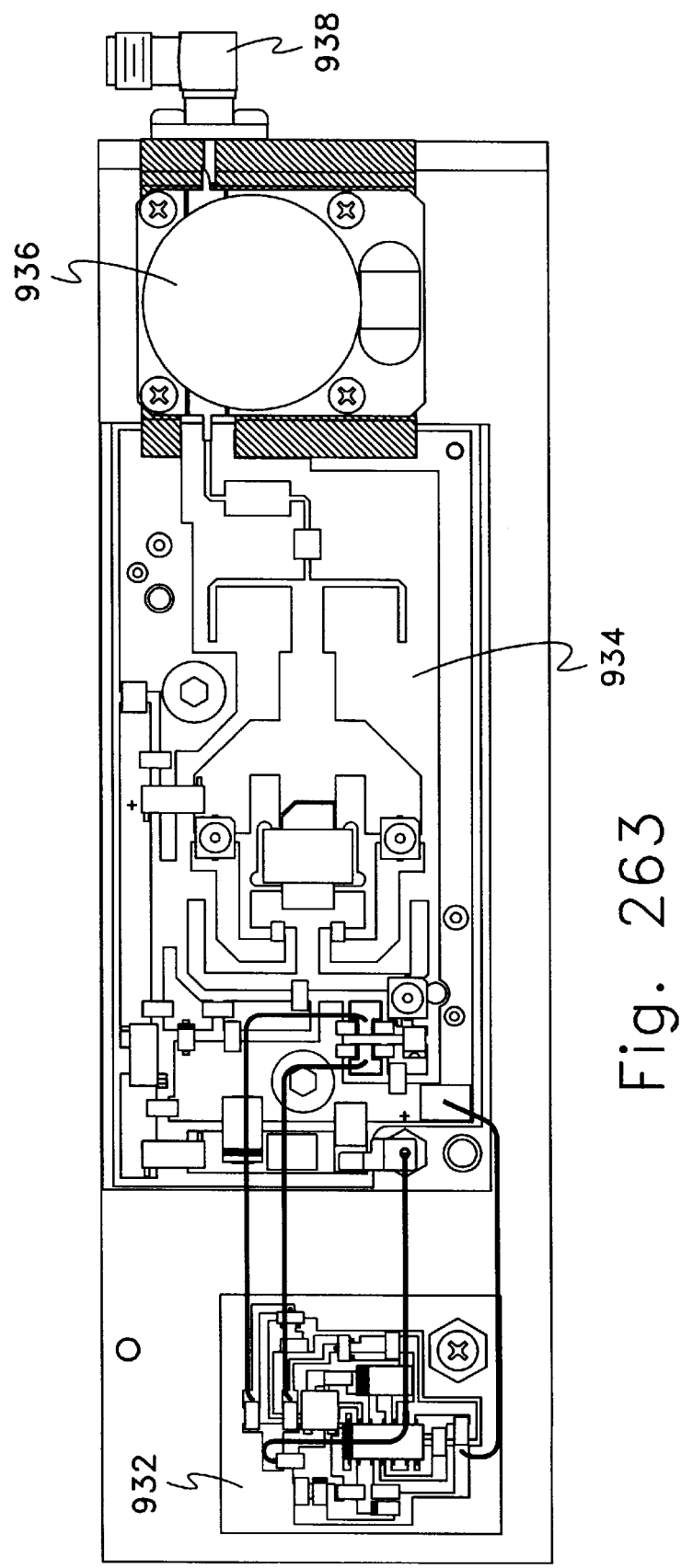
FIG. 263 is a schematic diagram of a preferred RF circuit according to the invention.

FIG. 263 is a schematic diagram of a preferred RF circuit according to the invention. A timer circuit 942 provides control signals to adjust the frequency of an oscillator 944. An output of the oscillator 934 is provided to a circulator 946. The output of the circulator 946 is connected to the center conductor of a coaxial connector 948.

The circulator is a non-reciprocal device that reduces the effects of the lamp load and its changing impedances on the power, frequency, voltages, and currents of the oscillator. The circulator improves the ability to perform tuning of the oscillator.

Based on empirical observations, the lamp of the present invention operated better with two tuning states. The oscillator board is constructed as described in connection with FIGS. 208–209, except that a varactor diode D2 is connected in series with the tuning capacitor C14. When the varactor diode is off, the frequency of the oscillator is adjusted to be somewhat lower (corresponding to a first tuning state) as compared to the frequency of the oscillator when the varactor diode is on (corresponding to a second tuning state). The first tuning state is preferred while the lamp is igniting and during steady state operation. The second tuning state is preferred after the lamp has ignited, but before the lamp reaches full output (also referred to as run-up).

The timing circuit is configured to begin a first timer when the lamp is turned on. Initially, the varactor diode is off and the lamp operates in the first tuning state. After a suitable period of time has passed for the lamp to ignite (based on empirical observation), the first timer expires and the timing circuit switches in the varactor diode to switch the oscillator to the second tuning state. The timing circuit begins a second timer which allows a suitable period of time for run-up. After the second timer expires, the varactor diode is switched off and the lamp operates in steady state in the first tuning state.

Figure 264:
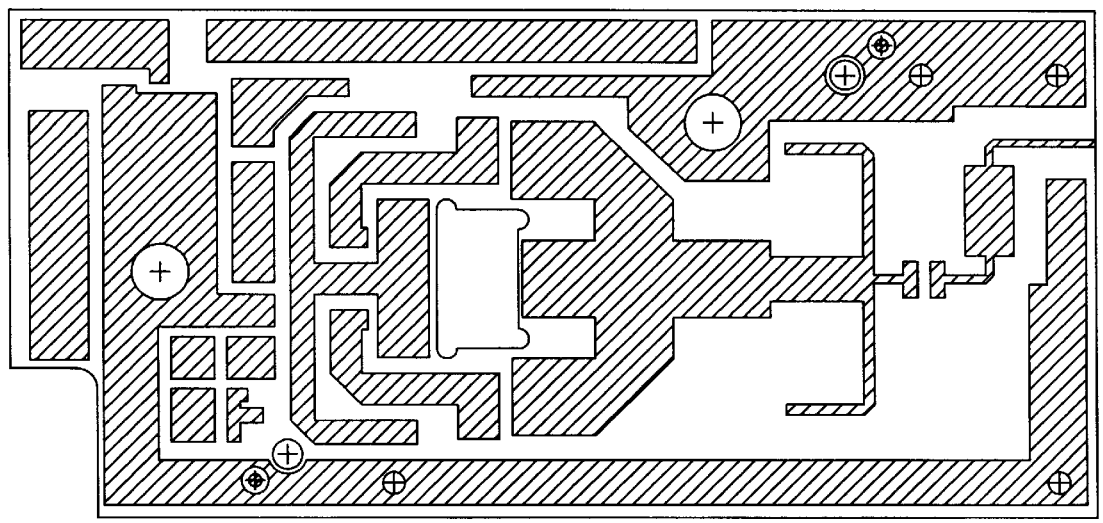
FIG. 264 is a schematic diagram of an exemplary printed circuit board layout for oscillator board described in connection with FIG.
Figure 265:
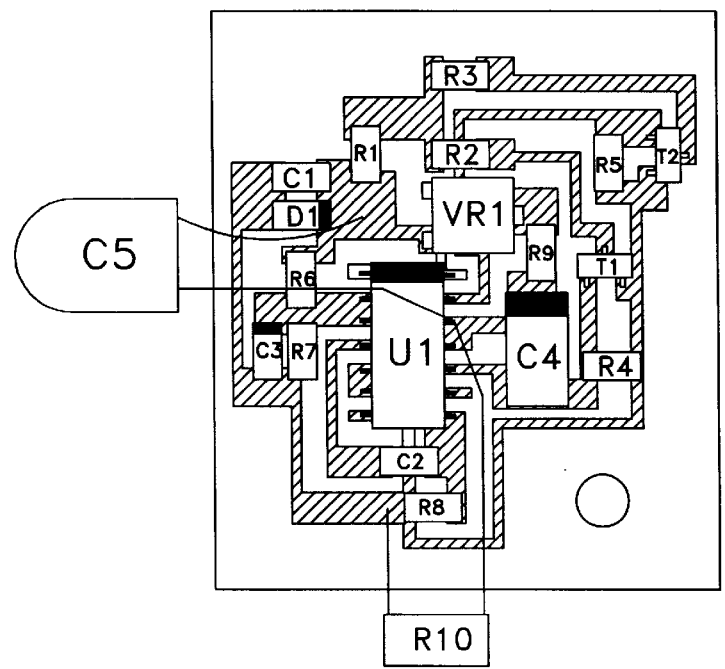
FIG. 265 is a schematic diagram of a timer circuit according to the invention.

FIG. 264 is a schematic diagram of an exemplary printed circuit board layout for oscillator board described in connection with FIG. 263. FIG. 265 is a schematic diagram of a timer circuit according to the invention. Integrated circuit U1 is a quad 2-input nor gate logic device. The timing intervals are determined by the decay of the various capacitive elements.

Alternatively, each of control circuit 924, 932, and 934 may comprise a microprocessor based circuit or a micro-controller programmed to provide a control signal to adjust the oscillator frequency. For example, a timer circuit is readily implemented using a micro-controller. The above-described circulator feedback and/or sensor feedback may be provided as information to the micro-controller. The micro-controller can use the information in an algorithm (e.g. a frequency dithering technique) to determine if the frequency needs to be adjusted. For example, the micro-controller can periodically make small adjustments to the frequency and determine the effect on the lamp performance in accordance with the feedback information. Such techniques provides automatic real-time tuning of the oscillator frequency. Other types of feedback (e.g. a bi-directional coupler) may also be used.

While the invention has been described with respect to specific examples, the invention is not so limited. Based on the drawings, the detailed description, and the teachings set forth herein, numerous other examples will occur to those skilled in the art. The preceding examples should be considered as illustrative only, with the scope and spirit of the invention being set forth in the following claims.

5. CLAIMS

What is claimed is:
1. An inductively coupled electrodeless lamp, comprising:
   an envelope enclosing a fill, said fill forming a plasma discharge when excited;
   an excitation coil positioned proximate to the envelope, the excitation coil having an effective electrical length which is less than a half wavelength of a driving frequency applied thereto; and
   a high frequency power source connected to the excitation coil, the high frequency power source being configured to provide power to the excitation coil at the driving frequency, the driving frequency being greater than 100 MHz,
   wherein said excitation coil is configured to inductively couple power to the excited plasma.
2. The inductively coupled electrodeless lamp as recited in claim 1, wherein the effective electrical length of the excitation coil is less than a quarter wavelength.
3. The inductively coupled electrodeless lamp as recited in claim 1, wherein the effective electrical length of the excitation coil is less than one eighth wavelength.
4. The inductively coupled electrodeless lamp as recited in claim 1, wherein the driving frequency is greater than about 300 MHz.
5. The inductively coupled electrodeless lamp as recited in claim 1, wherein the driving frequency is greater than about 500 MHz.
6. The inductively coupled electrodeless lamp as recited in claim 1, wherein the driving frequency is greater than about 700 MHz.
7. The inductively coupled electrodeless lamp as recited in claim 1, wherein the driving frequency is greater than about 900 MHz.
8. The inductively coupled electrodeless lamp as recited in claim 1, wherein the high frequency power source comprises a solid state high frequency power source.
9. The inductively coupled electrodeless lamp as recited in claim 1, further comprising a series resonant coupling circuit for coupling the high frequency power source to the excitation coil.
10. The inductively coupled electrodeless lamp as recited in claim 9, wherein the series resonant coupling circuit comprises the excitation coil, a series resonant capacitor, a low inductive power feed connected to receive the power from the high frequency power source and supply power to the series resonant capacitor, and a lower inductance conductive surface, relative to the power feed, connected between the series resonant capacitor and ground.
11. The inductively coupled electrodeless lamp as recited in claim 10, wherein the lower inductance conductive surface comprises a diving board structure.
12. The inductively coupled electrodeless lamp as recited in claim 11, wherein the series resonant capacitor is formed between a portion of the diving board and a portion of the excitation coil, wherein the portion of the diving board provides a first electrode of the series resonant capacitor and the portion of the excitation coil provides a second electrode of the series resonant capacitor, and wherein a dielectric is provided between the first electrode and the second electrode.
13. The inductively coupled electrodeless lamp as recited in claim 9, wherein the series resonant coupling circuit comprises a conductive low inductance surface connected to receive the power from the high frequency power source.

14. The inductively coupled electrodeless lamp as recited in claim 13, wherein the conductive low inductance surface comprises a blade structure.

15. The inductively coupled electrodeless lamp as recited in claim 14, wherein the series resonant circuit includes a first capacitor formed between a first portion of the blade and a first portion of the excitation coil and a second capacitor formed between a second portion of the blade and a second portion of the excitation coil, wherein a first dielectric is provided between the first portion of the blade and the first portion of the excitation coil and a second dielectric is provided between the second portion of the blade and the second portion of the excitation coil.

16. The inductively coupled electrodeless lamp as recited in claim 1, wherein the excitation coil comprises a substantially non-helical, semi-cylindrical conductive surface having less than one turn.

17. The inductively coupled electrodeless lamp as recited in claim 16, wherein the conductive surface comprises a wedding ring shape.

18. The inductively coupled electrodeless lamp as recited in claim 1, further comprising a grounded conductive surface spaced from and radially surrounding the excitation coil at least 180 degrees.

19. The inductively coupled electrodeless lamp as recited in claim 18, wherein the grounded conductive surface comprises a stovepipe.

20. The inductively coupled electrodeless lamp as recited in claim 18, wherein the grounded conductive surface is spaced from the excitation coil by a distance corresponding to between about one half and one excitation coil diameter, and wherein the grounded conductive surface axially extends above and below the excitation coil, respectively, by a distance corresponding to between about one half and one excitation coil diameter.

21. The inductively coupled electrodeless lamp as recited in claim 1, further comprising a heatsink in thermal contact with the excitation coil over substantially all of the excitation coil's outer surface.

22. The inductively coupled electrodeless lamp as recited in claim 21, wherein the heatsink comprises a thermally conductive ceramic having a relatively low dielectric constant.

23. The inductively coupled electrodeless lamp as recited in claim 22, wherein the thermally conductive ceramic comprises boron nitride.

24. The inductively coupled electrodeless lamp as recited in claim 1, wherein the fill comprises one of sulfur, selenium, and a mixture of sulfur and selenium.

25. The inductively coupled electrodeless lamp as recited in claim 1, wherein the fill consists essentially of selenium, a halide of cesium, and a noble gas.

26. The inductively coupled electrodeless lamp as recited in claim 1, wherein the fill consists essentially of a halide of indium, a halide of cesium, and a noble gas.

27. The inductively coupled electrodeless lamp as recited in claim 1, wherein the fill consists essentially of a halide of praseodymium, a halide of indium, and a noble gas.

28. The inductively coupled electrodeless lamp as recited in claim 1, wherein the fill consists essentially of a halide of indium and a noble gas.

* * * * *